(12) United States Patent
Blume-Jensen et al.

(10) Patent No.: US 12,433,888 B1
(45) Date of Patent: Oct. 7, 2025

(54) METHODS AND SYSTEMS FOR TREATING DISEASE USING AN ATR/CHK1 SIGNALING PATHWAY INHIBITOR

(71) Applicant: Acrivon Therapeutics, Inc., Watertown, MA (US)

(72) Inventors: Peter Blume-Jensen, Cambridge, MA (US); James Dunyak, Cambridge, MA (US); Kristina Masson, Lund (SE); Ayesha Murshid, Milford, MA (US); Michail Shipitsin, Brookline, MA (US); Caroline Maria Wigerup, Dalby (SE)

(73) Assignee: Acrivon Therapeutics, Inc., Watertown, MA (US)

(*) Notice: Subject to any disclaimer, the term of this patent is extended or adjusted under 35 U.S.C. 154(b) by 0 days.

(21) Appl. No.: 19/076,811

(22) Filed: Mar. 11, 2025

Related U.S. Application Data

(63) Continuation of application No. 18/993,467, filed as application No. PCT/US2023/027579 on Jul. 13, 2023.

(60) Provisional application No. 63/388,914, filed on Jul. 13, 2022.

(51) Int. Cl.
*A61K 31/497* (2006.01)
*A61K 45/06* (2006.01)
*G01N 33/574* (2006.01)

(52) U.S. Cl.
CPC ............ *A61K 31/497* (2013.01); *A61K 45/06* (2013.01); *G01N 33/57449* (2013.01); *G01N 2440/14* (2013.01)

(58) Field of Classification Search
CPC .................................................. A61K 31/497
USPC .................................................... 514/255.05
See application file for complete search history.

(56) References Cited

U.S. PATENT DOCUMENTS

2008/0145358 A1    6/2008   Zabludoff et al.

FOREIGN PATENT DOCUMENTS

| WO | WO-2018/222970 A1 | 12/2018 |
| WO | WO-2024/015484 A2 | 1/2024 |
| WO | WO-2024/015484 A3 | 3/2024 |

OTHER PUBLICATIONS

U.S. Appl. No. 18/993,467, filed Jan. 10, 2025.
Blasius, M. et al., A phospho-proteomic screen identifies substrates of the checkpoint kinase Chk1, Genome Biology, 12(R78): 1-14 (2011).
Gorecki, L. et al., Clinical Candidates Targeting the ATR-CHK1-WEE1 Axis in Cancer. Cancers, 13(795): 1-22 (2021).
Gupta, A. et al., Cell cycle checkpoint defects contribute to genomic instability in PTEN deficient cells independent of DNA DSB repair. Cell Cycle, 8(14): 2198-2210 (2009).
International Search Report for PCT/US23/27579, 5 pages (mailed Feb. 1, 2024).
Written Opinion for PCT/US23/27579, 10 pages (mailed Feb. 1, 2024).
Bryant, C et al., Chk1 Inhibition as a novel therapeutic strategy for treating triple-negative breast and ovarian cancers, Bmc Cancer, 14:570 (2014).

*Primary Examiner* — Raymond J Henley, III
(74) *Attorney, Agent, or Firm* — Choate, Hall & Stewart LLP; Brenda Herschbach Jarrell; Kristen C. Buteau

(57) ABSTRACT

Provided herein are methods and systems for determining and/or validating response to a checkpoint kinase 1 (Chk1) inhibitor, a Wee1 inhibitor, an ATR inhibitor, or a combination thereof, and methods of administering a Chk1 inhibitor, a Wee1 inhibitor, an ATR inhibitor, or a combination thereof to a subject determined to be responsive to said therapy.

27 Claims, 35 Drawing Sheets
Specification includes a Sequence Listing.

Absolute EC$_{50}$ siRNA control: 0.100 μM siRNA BM2 (KAP1): >10 μM

Absolute EC$_{50}$ siRNA control: 0.025 μM siRNA BM3 (CCNE1): >10 μM

SEQUENCE LISTING

```
Sequence total quantity: 24
SEQ ID NO: 1              moltype = AA  length = 476
FEATURE                   Location/Qualifiers
source                    1..476
                          mol_type = protein
                          organism = Homo sapiens
SEQUENCE: 1
MAVPFVEDWD LVQTLGEGAY GEVQLAVNRV TEEAVAVKIV DMKRAVDCPE NIKKEICINK   60
MLNHENVVKF YGHRREGNIQ YLFLEYCSGG ELFDRIEPDI GMPEPDAQRF FHQLMAGVVY   120
LHGIGITHRD IKPENLLLDE RDNLKISDFG LATVFRYNNR ERLLNKMCGT LPYVAPELLK   180
RREFHAEPVD VWSCGIVLTA MLAGELPWDQ PSDSCQEYSD WKEKKTYLNP WKKIDSAPLA   240
LLHKILVENP SARITIPDIK KDRWYNKPLK KGAKRPRVTS GGVSESPSGF SKHIQSNLDF   300
SPVNSASSEE NVKYSSSQPE PRTGLSLWDT SPSYIDKLVQ GISFSQPTCP DHMLLNSQLL   360
GTPGSSQNPW QRLVKRMTRF FTKLDADKSY QCLKETCEKL GYQWKKSCMN QVTISTTDRR   420
NNKLIFKVNL LEMDDKILVD FRLSKGDGLE FKRHFLKIKG KLIDIVSSQK IWLPAT       476

SEQ ID NO: 2              moltype = AA  length = 543
FEATURE                   Location/Qualifiers
source                    1..543
                          mol_type = protein
                          organism = Homo sapiens
```

```
SEQUENCE: 2
MSRESDVEAQ QSHGSSACSQ PHGSVTQSQG SSSQSQGISS SSTSTMPNSS QSSHSSSGTL   60
SSLETVSTQE LYSIPEDQEP EDQEPEEPTP APWARLWALQ DGFANLECVN DNYWFGRDKS  120
CEYCFDEPLL KRTDKYRTYS KKHFRIFREV GPKNSYIAYI EDHSGNGTFV NTELVGKGKR  180
RPLNNNSEIA LSLSRNKVFV FFDLTVDDQS VYPKALRDEY IMSKTLGSGA CGEVKLAFER  240
KTCKKVAIKI ISKRKFAIGS AREADPALNV ETEIEILKKL NHPCIIKIKN FFDAEDYYIV  300
LELMEGGELF DKVVGNKRLK EATCKLYFYQ MLLAVQYLHE NGIIHRDLKP ENVLLSSQEE  360
DCLIKITDFG HSKILGETSL MRTLCGTPTY LAPEVLVSVG TAGYNRAVDC WSLGVILFIC  420
LSGYPPFSEH RTQVSLKDQI TSGKYNFIPE VWAEVSEKAL DLVKKLLVVD PKARFTTEEA  480
LRHPWLQDED MKRKFQDLLS EENESTALPQ VLAQPSTSRK RPREGEAEGA ETTKRPAVCA  540
AVL                                                               543

SEQ ID NO: 3            moltype = AA  length = 835
FEATURE                 Location/Qualifiers
source                  1..835
                        mol_type = protein
                        organism = Homo sapiens
SEQUENCE: 3
MAASAAAASA AAASAASGSP GPGEGSAGGE KRSTAPSAAA SASASAAASS PAGGGAEALE   60
LLEHCGVCRE RLRPEREPRL LPCLHSACSA CLGPAAPAAA NSSGDGGAAG DGTVVDCPVC  120
KQQCFSKDIV ENYFMRDSGS KAATDAQDAN QCCTSCEDNA PATSYCVECS EPLCETCVEA  180
HQRVKYTKDH TVRSTGPAKS RDGERTVYCN VHKHEPLVLF CESCDTLTCR DCQLNAHKDH  240
QYQFLEDAVR NQRKLLASLV KRLGDKHATL QKSTKEVRSS IRQVSDVQKR VQVDVKMAIL  300
QIMKELNKRG RVLVNDAQKV TEGQQERLER QHWTMTKIQK HQEHILRFAS WALESDNNTA  360
LLLSKKLIYF QLHRALKMIV DPVEPHGEMK FQWDLNAWTK SAEAFGKIVA ERPGTNSTGP  420
APMAPPRAPG PLSKQGSGSS QPMEVQEGYG FGSGDDPYSS APHVSGVKR SRSGEGEVSG   480
LMRKVPRVSL ERLDLDLTAD SQPPVFKVFP GSTTEDYNLI VIERGAAAAA TGQPGTAPAG  540
TPGAPPLAGM AIVKEEETEA AIGAPPTATE GPETKPVLMA LAEGPGAEGP RLASPSGSTS  600
SGLEVVAPEG TSAPGGGPGT LDDSATICRV CQKPGDLVMC NQCEFCFHLD CHLPALQDVP  660
GEEWSCSLCH VLPDLKEEDG SLSLDGADST GVVAKLSPAN QRKCERVLLA LFCHEPCRPL  720
HQLATDSTFS LDQPGGTLDL TLIRARLQEK LSPPYSSPQE FAQDVGRMFK QFNKLTEDKA  780
DVQSIIGLQR FFETRMNEAF GDTKFSAVLV EPPPMSLPGA GLSSQELSGG PGDGP        835

SEQ ID NO: 4            moltype = AA  length = 646
FEATURE                 Location/Qualifiers
source                  1..646
                        mol_type = protein
                        organism = Homo sapiens
SEQUENCE: 4
MSFLSRQQPP PPRRAGAACT LRQKLIFSPC SDCEEEEEEE EEEGSGHSTG EDSAFQEPDS   60
PLPPARSPTE PGPERRRSPG PAPGSPGELE EDLLLPGACP GADEAGGGAE GDSWEEEGFG  120
SSSPVKSPAA PYFLGSSFSP VRCGGPGDAS PRGCGARRAG EGRRSPRPDH PGTPPHKTFR  180
KLRLFDTPHT PKSLLSKARG IDSSSVKLRG SSLFMDTEKS GKREFDVRQT PQVVNINPFTP  240
DSLLLHSSGQ CRRRKRTYWN DSCGEDMEAS DYELEDETRP AKRITITESN MKSRYTTEFH  300
ELEKIGSGEF GSVFKCVKRL DGCIYAIKRS KKPLAGSVDE QNALREVYAH AVLGQHSHVV  360
RYFSAWAEDD HMLIQNEYCN GGSLADAISE NYRIMSYFKE AELKDLLLQV GRGLRYIHSM  420
SLVHMDIKPS NIFISRTSIP NAASEEGDED DWASNKVMFK IGDLGHVTRI SSPQVEEGDS  480
RFLANEVLQE NYTHLPKADI FALALTVVCA AGAEPLPRNG DQWHEIRQGR LPRIPQVLSQ  540
EFTELLKVMI HPDPERRPSA MALVKHSVLL SASRKSAEQL RIELNAEKFK NSLLQKELKK  600
AQMAKAAAEE RALFTDRMAT RSTTQSNRTS RLIGKKMNRS VSLTIY                  646

SEQ ID NO: 5            moltype = AA  length = 1910
FEATURE                 Location/Qualifiers
source                  1..1910
                        mol_type = protein
                        organism = Homo sapiens
SEQUENCE: 5
MACCHKVMLL LDTAGGAARH SRVRRAALRL LTYLSCRFGL ARVHWAFKFF DSQGARSRPS   60
RVSDFRELGS RSWEDFEEEL EARLEDRAHL PGPAPRATHT HGALMETLLD YQWDRPELLS  120
PTKPILRSSG RRLLDVESEA KEAEAALGGL VNAVFLLAPC PHSQRELLQF VSGCEAQAQR  180
LPPTPKQVME KLLPKRVREV MVARKITFYW VDTTEWSKLW ESPDHLGYWT VCELLHHGGG  240
TVLPSESFSW DFAQAGEMLL RSGIKLSSEP HLSPWISMLP TDATLNRLLY NSPEYEASFP  300
RMEGMLFLPV EAGKEIQETW TVTLEPLAMH QRHFQKPVRI FLKGSVAQWS LPTSSTLGTD  360
SWMLGSPEES TATQRLLFQQ LVSRLTAEEL HLVADVDPGE GRPPITGVIS PLSASAMILT  420
VCRTKEAEFQ RHVLQTAVAD SPRDTASLFS DVVDSILNQT HDSLADTASA ASPVPEWAQQ  480
ELGHTTPWSP AVVEKWFPFC NISGASSDLM ESFGLLQAAS ANKEESSKTE GELIHCLAEL  540
YQRKSREEST IAHQEDSKKK RGVPRTPVRQ KMNTMCRSLK MLNVARLNVK AQKLHPDGSP  600
DVAGEKGIQK IPSGRTVDKL EDRGRTLRSS KPKDFKTEEE LLSYIRENYQ KTVATGEIML  660
YACARNMIST VKMFLKSKGT KELEVNCLNQ VKSSLLKTSK SLRQNLGKKL DKEDKVRECQ  720
LQVFLRLEMC LQCPSINEST DDMEQVVEEV TDLLRMVCLT EDSAYLAEFL EEILRLYIDS  780
IPKTLGNLYN SLGFVIPQKL AGVLPTDFFS DDSMTQENKS PLLSVPFLSS ARRSVSGSPE  840
SDELQELRTR SAKKRRKNAL IRHKSIAEVS QNLRQIEIPK VSKRATKKEN SHPAPQQPSQ  900
PVKDTVQEVT KVRRNLFNQE LLSPSKRSLK RGLPRSHSVS AVDGLEDKLD NFKKNKGYHK  960
LLTKSVAETP VHKQISKRLL HRQIKGRSSD PGPDIGVVEE SPEKGDEISL RRSPRIKQLS 1020
FSRTHSASFY SVSQPKSRSV QRVHSFQQDK SDQRENSPVQ SIRSPKSLLF GAMSEMISPS 1080
EKGSARMKKR SRNTLDSEVP AAYQTPKKSH QKSLSFSKTT PRRISHTPQT PLYTPERLQK 1140
SPAKMTPTKQ AAFKESLKDS SSPGHDSPLD SKITPQKRHT QAGEGTSLET KTPRTPKRQG 1200
TQPPGFLPNC TWPHSVNSSP ESPSCPAPPT SSTAQPRREC LTPIRDPLRT PPRAAAFMGT 1260
PQNQTHQQPH VLRAARAEEP AQKLKDKAIK TPKRPGNSTV TSSPPVTPKK LFTSPLCDVS 1320
```

-continued

```
KKSPFRKSKI ECPSPGELDQ KEPQMSPSVA ASLSCPVPST PPELSQRATL DTVPPPPPSK  1380
VGKRCRKTSD PRRSIVECQP DASATPGVGT ADSPAAPTDS RDDQKGLSLS PQSPPERRGY  1440
PGPGLRSDWH ASSPLLITSD TEHVTLLSEA EHHGIGDLKS NVLSVEEGEG LRTADAEKSS  1500
LSHPGIPPSP PSCGPGSPLM PSRDVHCTTD GRQCQASAQL DNLPASAWHS TDSASPQTYE  1560
VELEMQASGL PKLRIKKIDP SSSLEAEPLS KEESSLGEES FLPALSMPRA SRSLSKPEPT  1620
YVSPPCPRLS HSTPGKSRGQ TYICQACTPT HGPSSTPSPF QTDGVPWTPS PKHSGKTTPD  1680
IIKDWPRRKR AVGCGAGSSS GRGEVGADLP GSLSLLESEG KDHGLELSIH RTPILEDFEL  1740
EGVCQLPDQS PPRNSMPKAE EASSWGQFGL SSRKRVLLAK EEADRGAKRI CDLREDSEVS  1800
KSKEGSPSWS AWQLPSTGDE EVFVSGSTPP PSCAVRSCLS ASALQALTQS PLLFQGKTPS  1860
SQSKDPRDED VDVLPSTVED SPFSRAFSRR RPISRTYTRK KLMGTWLEDL             1910

SEQ ID NO: 6            moltype = AA   length = 766
FEATURE                 Location/Qualifiers
source                  1..766
                        mol_type = protein
                        organism = Homo sapiens
SEQUENCE: 6
MSVQSSSGSL EGPPSWSQLS TSPTPGSAAA ARSLLNHTPP SGRPREGAMD ELHSLDPRRQ  60
ELLEARFTGV ASGSTGSTGS CSVGAKASTN NESSNHSFGS LGSLSDKESE TPEKKQSESS  120
RGRKRKAENQ NESSQGKSIG GRGHKISDYF EYQGGNGSSP VRGIPPAIRS PQNSHSHSTP  180
SSSVRPNSPS PTALAFGDHP IVQPKQLSFK IIQTDLTMLK LAALESNKIQ DLEKKEGRID  240
DLLRANCDLR RQIDEQQKLL EKYKERLNKC ISMSKKLLIE KSTQEKLSSR EKSMQDRLRL  300
GHFTTVRHGA SFTEQWTDGF AFQNLVKQQE WVNQQREDIE RQRKLLAKRK PPTANNSQAP  360
STNSEPKQRK NKAVNGAEND PFVRPNLPQL LTLAEYHEQE EIFKLRLGHL KKEEAEIQAE  420
LERLERVRNL HIRELKRINN EDNSQFKDHP TLNERYLLLH LLGRGGFSEV YKAFDLYEQR  480
YAAVKIHQLN KSWRDEKKEN YHKHACREYR IHKELDHPRI VKLYDYFSLD TDTFCTVLEY  540
CEGNDLDFYL KQHKLMSEKE ARSIVMQIVN ALRYLNEIKP PIIHYDLKPG NILLVDGTAC  600
GEIKITDFGL SKIMDDDSYG VDGMDLTSQG AGTYWYLPPE CFVVGKEPPK ISNKVDVWSV  660
GVIFFQCLYG RKPFGHNQSQ QDILQENTIL KATEVQFPVK PVVSSEAKAF IRRCLAYRKE  720
DRFDVHQLAN DPYLLPHMRR SNSSGNLHMA GLTASPTPPS SSIITY                766

SEQ ID NO: 7            moltype = AA   length = 928
FEATURE                 Location/Qualifiers
source                  1..928
                        mol_type = protein
                        organism = Homo sapiens
SEQUENCE: 7
MPPKTPRKTA ATAAAAAAEP PAPPPPPPPE EDPEQDSGPE DLPLVRLEFE ETEEPDFTAL  60
CQKLKIPDHV RERAWLTWEK VSSVDGVLGG YIQKKKELWG ICIFIAAVDL DEMSFTFTEL  120
QKNIEISVHK FFNLLKEIDT STKVDNAMSR LLKKYDVLFA LFSKLERTCE LIYLTQPSSS  180
ISTEINSALV LKVSWITFLL AKGEVLQMED DLVISFQLML CVLDYFIKLS PPMLLKEPYK  240
TAVIPINGSP RTPRRGQNRS ARIAKQLEND TRIIEVLCKE HECNIDEVKN VYFKNFIPFM  300
NSLGLVTSNG LPEVENLSKR YEEIYLKNKD LDARLFLDHD KTLQTDSIDS FETQRTPRKS  360
NLDEEVNVIP PHTPVRTVMN TIQQLMMILN SASDQPSENL ISYFNNCTVN PKESILKRVK  420
DIGYIFKEKF AKAVGQGCVE IGSQRYKLGV RLYYRVMESM LKSEEERLSI QNFSKLLNDN  480
IFHMSLLACA LEVVMATYSR STSQNLDSGT DLSFPWILNV LNLKAFDFYK VIESFIKAEG  540
NLTREMIKHL ERCEHRIMES LAWLSDSPLF DLIKQSKDRE GPTDHLESAC PLNLPLQNNH  600
TAADMYLSPV RSPKKKGSTT RVNSTANAET QATSAFQTQK PLKSTSLSLF YKKVYRLAYL  660
RLNTLCERLL SEHPELEHII WTLFQHTLQN EYELMRDRHL DQIMMCSMYG ICKVKNIDLK  720
FKIIVTAYKD LPHAVQETFK RVLIKEEEYD SIIVFYNSVF MQRLKTNILQ YASTRPPTLS  780
PIPHIPRSPY KFPSSPLRIP GGNIYISPLK SPYKISEGLP TPTKMTPRSR ILVSIGESFG  840
TSEKFQKINQ MVCNSDRVLK RSAEGSNPPK PLKKLRFDIE GSDEADGSKH LPGESKFQQK  900
LAEMTSTRTR MQKQKMNDSM DTSNKEEK                                    928

SEQ ID NO: 8            moltype = AA   length = 1328
FEATURE                 Location/Qualifiers
source                  1..1328
                        mol_type = protein
                        organism = Homo sapiens
SEQUENCE: 8
MESRDPAQPM SPGEATQSGA RPADRYGLLK HSREFLDFFW DIAKPEQETR LAATEKLLEY  60
LRGRPKGSEM KYALKRLITG LGVGRETARP CYSLALAQLL QSFEDLPLCS ILQQIQEKYD  120
LHQVKKAMLR PALFANLFGV LALFQSGRLV KDQEALMKSV KLQALAQYQ NHLQEQPRKA  180
LVDILSEVSK ATLQEILPEV LKADLNIILS SPEQLELFLL AQQKVPSKLK KLVGSVNLFS  240
DENVPRLVNV LKMAASSVKK DRKLPAIALD LLRLALKEDK FPRFWKEVVE QGLLKMQFWP  300
ASYLCFRLLG AALPLLTKEQ LHLVMQGDVI RHYGEHVCTA KLPKQFKFAP EMDDYVGTFL  360
EGCQDDPERQ LAVLVAFSSV TNQGLPVTPT FWRVVRFLSP PALQGYVAWL RAMFLQPDLD  420
SLVDFSTNNQ KKAQDSSLHM PERAVFRLRK WIIFRLVSIV DSLHLEMEEA LTEQVARFCL  480
FHSFFVTKKP TSQIPETKHP FSFPLENQAR EAVSSAFFSL LQTLSTQFKQ APGQTQGGQP  540
WTYHLVQFAD LLLNHSHNVT TVTPFTAQQR QAWDRMLQTL KELEAHSAEA RAAAFQHLLL  600
LVGIHLLKSP AESCDLLGDI QTCIRKSLGE KPRRSRTKTI DPQEPPWVEV LVEILLALLA  660
QPSHLMRQVA RSVFGHICSH LTPRALQLIL DVLNPETSED ENDRVVVTDD SDERRLKGAE  720
DKSEEGEDNR SSEEEEESEG EESEEEERDG DVDQGFREQL MTVLQAGKAL GGEDSENEEE  780
LGDEAMMALD QSLASLFAEQ KLRIQARRDE KNKLQKAKL RRDFQIRVLD LVEVLVTKQP  840
ENALVLELLE PLLSIIRRSL RSSSSKQEQD LLHKTARIFT HHLCRARRYC HDLGERAGAL  900
HAQVERLVQQ AGRPDSPTA LYHFNASLYL LRVLKGNTAE GCVHETQEKQ KAGTDPSHMP  960
TGPQAASCLD LNLVTRVYST ALSSFLTKRN SPLTVPMFLS LFSRHPVLCQ SLLPILVQHI  1020
TGPVRPRHQA CLLLQKTLSM REVRSCFEDP EWKQLMGQVL AKVTENLRVL GEAQTKAQHQ  1080
QALSSLELLN VLFRTCKHEK LTLDLTVLLG VLQGQQQSLQ QGAHSTGSSR LHDLYWQAMK  1140
```

```
TLGVQRPKLE KKDAKEIPSA TQSPISKKRK KKGFLPETKK RKKRKSEDGT PAEDGTPAAT    1200
GGSQPPSMGR KKRNRTKAKV PAQANGTPTT KSPAPGAPTR SPSTPAKSPK LQKKNQKPSQ    1260
VNGAPGSPTE PAGQKQHQKA LPKKGVLGKS PLSALARKKA RLSLVIRSPS LLQSGAKKKA    1320
QVRKAGKP                                                             1328

SEQ ID NO: 9              moltype = AA   length = 684
FEATURE                   Location/Qualifiers
source                    1..684
                          mol_type = protein
                          organism = Homo sapiens
SEQUENCE: 9
MFAEAAKTTR PCGMAEFKEK PEAPTEQLDV ACGQENLPVG AWPPGAAPAP FQYTPDHVVG     60
PGADIDPTQI TFPGCICVKT PCLPGTCSCL RHGENYDDNS CLRDIGSGGK YAEPVFECNV    120
LCRCSDHCRN RVVQKGLQFH FQVFKTHKKG WGLRTLEFIP KGRFVCEYAG EVLGFSEVQR    180
RIHLQTKSDS NYIIAIREHV YNGQVMETFV DPTYIGNIGR FLNHSCEPNL LMIPVRIDSM    240
VPKLALFAAK DIVPEEELSY DYSGRYLNLT VSEDKERLDH GKLRKPCYCG AKSCTAFLPF    300
DSSLYCPVEK SNISCGNEKE PSMCGSAPSV FPSCKRLTLE TMKMMLDKKQ IRAIFLFEFK    360
MGRKAAETTR NINNAFGPGT ANERTVQWWF KKFCKGDESL EDEERSGRPS EVDNDQLRAI    420
IEADPLTTTR EVAEELNVNH STVVRHLKQI GKVKKLDKWV PHELTENQKN RRFEVSSSLI    480
LRNHNEPFLD RIVTCDEKWI LYDNRRRSAQ WLDQEEAPKH FPKPILHPKK VMVTIWWSAA    540
GLIHYSFLNP GETITSEKYA QEIDEMNQKL QRLQLALVNR KGPILLHDNA RPHVAQPTLQ    600
KLNELGYEVL PHPPYSPDLL PTNYHVFKHL NNFLQGKRFH NQQDAENAFQ EFVESQSTDF    660
YATGINQLIS RWQKCVDCNG SYFD                                           684

SEQ ID NO: 10             moltype = AA   length = 2752
FEATURE                   Location/Qualifiers
source                    1..2752
                          mol_type = protein
                          organism = Homo sapiens
SEQUENCE: 10
MYNGIGLPTP RGSGTNGYVQ RNLSLVRGRR GERPDYKGEE ELRRLEAALV KRPNPDILDH     60
ERKRRVELRC LELEEMMEEQ GYEEQQIQEK VATFRLMLLE KDVNPGGKEE TPGQRPAVTE    120
THQLAELNEK KNERLRAAFG ISDSYVDGSS FDPQRRAREA KQPAPEPPKP YSLVRESSSS    180
RSPTPKQKKK KKKKDRGRRS ESSSPRRERK KSSKKKKHRS EESKKRKHR SPTPKSKRKS     240
KDKKRKRSRS TTPAPKSRRA HRSTSADSAS SSDTSRSRSR SAAAKTHTTA LAGRSPSPAS    300
GRRGEGDAPF SEPGTTSTQR PSSPETATKQ PSSPYEDKDK DKKEKSATRP SPSPERSSTG    360
PEPPAPTPLL AERHGGSPQP LATTPLSQEP VNPPSEASPT RDRSPPKSPE KLPQSSSSES    420
SPPSPQPTKV SRHASSSPES PKPAPAPGSH REISSSPTSK NRSHGRAKRD KSHSHTPSRR    480
MGRSRSPATA KRGRSRSRTP TKRGHSRSRS PQWRRSRSAQ RWGRSRSPQR RGRSRSPQRP    540
GWSRSRNTQR RGRSRSARRG RSHSRSPATR GRSRSRTPAR RGRSRSRTPA RRRSRSRTPT    600
RRRSRSRTPA RRGRSRSRTP ARRRSRTRSP VRRRSRSRSP ARRSGRSRSR TPARRGRSRS    660
RTPARRGRSR SRTPARRSGR SRSRTPARRG RSRSRTPRRG RSRSRTPRRG RSHSRTPQR     720
RGRSGSSSER KNKSRTSQRR SRSNSSPEMK KSRISSRRSR SLSSPRSKAK SRLSLRRSLS    780
GSSPCPKQKS QTPPRRSRSG SSQPKAKSRT PPRRSRSSSS PPPKQKSKTP SRQSHSSSSP    840
HPKVKSGTPP RQGSITSPQA NEQSVTPQRR SCFESSPDDE LKSRTPSRHS CSGSSPPRVK    900
SSTPPRQSPS RSSSPQPKVK AIISPRQRSH SGSSSPSPSR VTSRTTPRRS RSVSPCSNVE    960
SRLLPRYSHS GSSSPDTKVK PETPPRQSHS GSISPYPKVK AQTPPGPSLS GSKSPCPQEK   1020
SKDSLVQSCP GSLSLCAGVK SSTPPGESYF GVSSLQLKGQ SQTSPDHRSD TSSPEVRQSH   1080
SESPSLQSKS QTSPKGGRSR SSSPVTELAS RSPIRQDRGE FSASPMLKSG MSPEQSRFQS   1140
DSSSYPTVDS NSLLGQSRLE TAESKEKMAL PPQEDATASP PRQKDKFSPF PVQDRPESSL   1200
VPKDTLRTPP RERSGAGSSP ETKEQNSALP TSSQDEELME VVEKSEEPAG QILSHLSSEL   1260
KEMSTSNFES SPEVEERPAV SLTLDQSQSQ ASLEAVEVPS MASSWGGPHF SPEHKELSNS   1320
PLRENSFGSP LEFRNSGPLG TEMNTGFSSE VKEDLNGPPL NQLETDPSLD MKEQSTRSSG   1380
HSSSELSPDA VEKAGMSSNQ SISSPVLDAV PRTPSRERSS SASSSPEMKDG LPRTPSRRSR   1440
SGSSPGLRDG SGTPSRHSLS GSSPGMKDIP RTPSRGRSEC DSSPEPKALP QTPRPRSRSP   1500
SSPELNNKCL TPQRERSGSE SSVDQKTVAR TPLGQRSRSG SSQELDVKPS ASPQERSESD   1560
SSPDSKAKTR TPLRQRSRSG SSPEVDSKSR LSPRRSRSGS SPEVKDKPRA APRAQSGSDS   1620
SPEPKAPAPR ALPRRSRSGS SSKGRGPSPE GSSSTESSPE HPPKSRTARR GRSSPEPKT    1680
KSRTPPRRRS SRSSPELTRK ARLSRRSRSA SSSPETRSRT PPRHRRSPSV SSPEPAEKSR   1740
SSRRRRSASS PRTKTTSRRG RSPSPKPRGL QRSRSRSRRE KTRTTRRRDR SGSSQSTSRR   1800
RQRSRSRSRV TRRRGGSGY HSRSPARQES SRTSSRRRRG RSRTPPTSRK RSRSRTSPAP    1860
WKRSRSRASP ATHRRSRSRT PLISRRRSRS RTSPVSRRRS RSRTSVTRRR SRSRASPVSR   1920
RRSRSRTPPV TRRRSRSRTP TTRRRSRSRT PPVTRRRSRS RTPPVTRRRS RSRTSPITRR   1980
RSRSRTSPVT RRRSRSRTSP VTRRRSRSRT SPVTRRRSRS RTPPAIRRRS RSRTPLLPRK   2040
RSRSRSPLAI RRRSRSRTPR TARGKRSLTR SPPAIRRRSA SGSSSDRSRS ATPPATRNHS   2100
GSRTPPVALN SSRMSCFSRP SMSPTPLDRC RSPGMLEPLG SSRTPMSVLQ QAGGSMMDGP   2160
GPRIPDHQRT SVPENHAQSR IALALTAISL GTARPPPSMS AAGLAARMSQ VPAPVPLMSL   2220
RTAPAANLAS RIPAASAAM NLASARTPAI PTAVNLADSR TPAAAAAMNL ASPRTAVAPS    2280
AVNLADPRTP TAPAVNLAGA RTPAALAALS LTGSGTPPTA ANYPSSRTP QAPASANLVG    2340
PRSAHATAPV NIAGSRTAAA LAPASLTSAR MAPALSGANL TSPRVPLSAY ERVSGRTSPP   2400
LLDRARSRTP PSAPSQSRMT SERAPSPSSR MGQAPSQSLL PPAQDQPRSP VPSAFSDQSR   2460
CLIAQTTPVA GSQSLSSGAV ATTTSSAGDH NGMLSVPAPG VPHSDVGEPP ASTGAQQPSA   2520
LAALQPAKER RSSSSSSSSS SSSSSSSSSS SDSEGSSLPV QPEVALKRVP              2580
SPTPAPKEAV REGRPPEPTP AKRKRRSSSS SSSSSSSSSS SSSSSSSSSS SSSSSSSSSS   2640
SSSSSSSSPS PAKPGPQALP KPASPKKPPP GERRSRSPRK PIDSLRDSRS LSYSPVERRR   2700
PSPQPSPRDQ QSSSSERGSR RGQRGDSRSR SHKRRRETPS PRPMRHRSSR SP           2752

SEQ ID NO: 11             moltype = AA   length = 580
FEATURE                   Location/Qualifiers
```

```
source                  1..580
                        mol_type = protein
                        organism = Homo sapiens
SEQUENCE: 11
MEVPQPEPAP GSALSPAGVC GGAQRPGHLP GLLLGSHGLL GSPVRAAASS PVTTLTQTMH    60
DLAGLGSETP KSQVGTLLFR SRSRLTHLSL SRRASESSLS SESSESSDAG LCMDSPSPMD   120
PHMAEQTFEQ AIQAASRIIR NEQFAIRRFQ SMPVRLLGHS PVLRNITNSQ APDGRRKSEA   180
GSGAASSSGE DKENDGFVFK MPWKPTHPSS THALAEWASR REAFAQRPSS APDLMCLSPD   240
RKMEVEELSP LALGRFSLTP AEGDTEEDDG FVDILESDLK DDDAVPPGME SLISAPLVKT   300
LEKEEEKDLV MYSKCQRLFR SPSMPCSVIR PILKRLERPQ DRDTPVQNKR RRSVTPPEEQ   360
QEAEEPKARV LRSKSLCHDE IENLLDSDHR ELIGDYSKAF LLQTVDGKHQ DLKYISPETM   420
VALLTGKFSN IVDKFVIVDC RYPYEYEGGH IKTAVNLPLE RDAESFLLKS PIAPCSLDKR   480
VILIFHCEFS SERGPRMCRF IRERDRAVND YPSLYYPEMY ILKGGYKEFF PQHPNFCEPQ   540
DYRPMNHEAF KDELKTFRLK TRSWAGERSR RELCSRLQDQ                         580

SEQ ID NO: 12           moltype = AA  length = 1339
FEATURE                 Location/Qualifiers
source                  1..1339
                        mol_type = protein
                        organism = Homo sapiens
SEQUENCE: 12
MTGEVGSEVH LEINDPNVIS QEEADSPSDS GQGSYETIGP LSEGDSDEEI FVSKKLKNRK    60
VLQDSDSETE DTNASPEKTT YDSAEEENKE NLYAGKNTKI KRIYKTVADS DESYMEKSLY   120
QENLEAQVKP CLELSLQSGN STDFTTDRKS SKKHIHDKEG TAGKAKVKSK RRLEKEERKM   180
EKIRQLKKKE TKNQEDDVEQ PFNDSGCLLV DKDLFETGLE DENNSPLEDE ESLESIRAAV   240
KNKVKKHKKK EPSLESGVHS FEEGSELSKG TTRKERKAAR LSKEALKQLH SETQRLIRES   300
ALNLPYHMPE NKTIHDFFKR KPRPTCHGNA MALLKSSKYQ SSHHKEIIDT ANTTEMNSDH   360
HSKGSEQTTG AENEVETNAL PVVSKETQII TGSDESCRKD LVKNEELEIQ EKQKQSDIRP   420
SPGDSSVLQQ ESNFLGNNHS EECQVGGLVA FEPHALEGEG PQNPEETDEK VEEPEQQNKS   480
SAVGPPEKVR RFTLDRLKQL GVDVSIKPRL GADEDSFVIL EPETNRELEA LKQRFWKHAN   540
PAAKPRAGQT VNVNVIVKDM GTDGKEELKA DVVPVTLAPK KLDGASHTKP GEKLQVLKAK   600
LQEAMKLRRF EERQKRQALF KLDNEDGFEE EEEEEEMTD ESEEDGEEKV EKEEKEEELE    660
EEEEKEEEEE EEGNQETAEF LLSSEEIETK DEKEMDKENN DGSSEIGKAV GFLSVPKSLS   720
SDSTLLLFKD SSSKMGYFPT EEKSETDENS GKQPSKLDED DSCSLLTKES SHNSSFELIG   780
STIPSYQPCN RQTGRGTSFF PTAGGFRSPS PGLFRASLVS SASKSSGKLS EPSLSPIEDSQ  840
DLYNASPEPK TLFLGAGDFQ FCLEDDTQSQ LLDADGFLNV RNHRNQYQAL KPRLPLASMD   900
ENAMDANMDE LLDLCTGKFT SQAEKHLPRK SDKKENMEEL LNLCSGKFTS QDASTPASSE   960
LNKQEKESSM GDPMEEALAL CSGSFPTDKE EEDEEEEFGD FRLVSNDNEF DSDEDEHSDS  1020
GNDLALEDHE DDDEEELLKR SEKLKRQMRL RKYLEDEAEV SGSDVGSEDE YDGEEIDEYE  1080
EDVIDEVLPS DEELQSQIKK IHMKTMLDDD KRQLRLYQER YLADGDLHSD GPGRMRKFRW  1140
KNIDDASQMD LFHRDSDDDQ TEEQLDESEA RWRKERIERE QWLRDMAQQG KITAEEEEEI  1200
GEDSQFMILA KKVTAKALQK NASRPMVIQE SKSLLRNPFE AIRPGSAQQV KTGSLLNQPK  1260
AVLQKLAALS DHNPSAPRNS RNFVFHTLSP VKAEAAKESS KSQVKKRGPS FMTSPSPKHL  1320
KTDDSTSGLT RSIFKYLES                                              1339

SEQ ID NO: 13           moltype = AA  length = 287
FEATURE                 Location/Qualifiers
source                  1..287
                        mol_type = protein
                        organism = Homo sapiens
SEQUENCE: 13
MAQEKMELDL ELPPGTGGSP AEGGGSGGGG GLRRSNSAPL IHGLSDTSPV FQAEAPSARR    60
NSTTFPSRHG LLLPASPVRM HSSRLHQIKQ EEGMDLINRE TVHEREVQTA MQISHSWEES   120
FSLSDNDVEK SASPKRIDFI PVSPAPSPTR GIGKQCFSPS LQSFVSSNGL PPSPIPSPTT   180
RFTTRRSQSP INCIRPSVLG PLKRKCEMET EYQPKRFFQG ITNMLSSDVA QLSDPGVCVS   240
SDTLDGNSSS AGSSCNSPAK VSTTTDSPVS PAQAASPFIP LDELSSK                287

SEQ ID NO: 14           moltype = AA  length = 763
FEATURE                 Location/Qualifiers
source                  1..763
                        mol_type = protein
                        organism = Homo sapiens
SEQUENCE: 14
MKTSPRRPLI LKRRRLPLPV QNAPSETSEE EPKRSPAQQE SNQAEASKEV AESNSCKFPA    60
GIKIINHPTM PNTQVVAIPN NANIHSIITA LTAKGKESGS SGPNKFILIS CGGAPTQPPG   120
LRPQTQTSYD AKRTEVTLET LGPKPAARDV NLPRPPGALC EQKRETCADG EAAGCTINNS   180
LSNIQWLRKM SSDGLGSRSI KQEMEEKENC HLEQRQVKVE EPSRPSASWQ NSVSERPPYS   240
YMAMIQFAIN STERKRMTLK DIYTWIEDHF PYFKHIAKPG WKNSIRHNLS LHDMFVRETS   300
ANGKVSFWTI HPSANRYLTL DQVFKPLDPG SPQLPEHLES QQKRPNPELR RNMTIKTELP   360
LGARRKMKPL LPRVSSYLVP IQFPVNQSLV LQPSVKVPLP LAASLMSSEL ARHSKRVRIA   420
PKVLLAEEGI APLSSAGPGK EEKLLFGEGF SPLLPVQTIK EEEIQPGEEM PHLARPIKVE   480
SPPLEEWPSP APSFKEESSH SWEDSSQSPT PRPKKSYSGL RSPTRCVSEM LVIQHRERRE   540
RSRSRRKQHL LPPCVDEPEL LFSEGPSTSR WAAELPFPAD SSDPASQLSY SQEVGGPFKT   600
PIKETLPISS TPSKSVLPRT PESWRLTPPA KVGGLDFSPV QTSQGASDLP PDPLGLMDLS   660
TTPLQSAPPL ESPQRLLSSE PLDLISVPFG NSSPSDIDVP KPGSPEPQVS GLAANRSLTE   720
GLVLDTMNDS LSKILLDISF PGLDEDPLGP DNINWSQFIP ELQ                     763

SEQ ID NO: 15           moltype = AA  length = 410
FEATURE                 Location/Qualifiers
```

```
source                   1..410
                         mol_type = protein
                         organism = Homo sapiens
SEQUENCE: 15
MPRERRERDA KERDTMKEDG GAEFSARSRK RKANVTVFLQ DPDEEMAKID RTARDQCGSQ    60
PWDNNAVCAD PCSLIPTPDK EDDDRVYPNS TCKPRIIAPS RGSPLPVLSW ANREEVWKIM   120
LNKEKTYLRD QHFLEQHPLL QPKMRAILLD WLMEVCEVYK LHRETFYLAQ DFFDRYMATQ   180
ENVVKTLLQL IGISSLFIAA KLEEIYPPKL HQFAYVTDGA CSGDEILTME LMIMKALKWR   240
LSPLTIVSWL NVYMQVAYLN DLHEVLLPQY PQQIFIQIAE LLDLCVLDVD CLEFPYGILA   300
ASALYHFSSS ELMQKVSGYQ WCDIENCVKW MVPFAMVIRE TGSSKLKHFR GVADEDAHNI   360
QTHRDSLDLL DKARAKKAML SEQNRASPLP SGLLTPPQSG KKQSSGPEMA              410

SEQ ID NO: 16            moltype = AA   length = 294
FEATURE                  Location/Qualifiers
source                   1..294
                         mol_type = protein
                         organism = Homo sapiens
SEQUENCE: 16
MEDSMDMDMS PLRPQNYLFG CELKADKDYH FKVDNDENEH QLSLRTVSLG AGAKDELHIV    60
EAEAMNYEGS PIKVTLATLK MSVQPTVSLG GFEITPPVVL RLKCGSGPVH ISGQHLVAVE   120
EDAESEDEEE EDVKLLSISG KRSAPGGGSK VPQKKVKLAA DEDDDDDDEE DDDEDDDDDD   180
FDDEEAEEKA PVKKSIRDTP AKNAQKSNQN GKDSKPSSTP RSKGQESFKK QEKTPKTPKG   240
PSSVEDIKAK MQASIEKGGS LPKVEAKFIN YVKNCFRMTD QEAIQDLWQW RKSL         294

SEQ ID NO: 17            moltype = AA   length = 560
FEATURE                  Location/Qualifiers
source                   1..560
                         mol_type = protein
                         organism = Homo sapiens
SEQUENCE: 17
MPQTRSQAQA TISFPKRKLS RALNKAKNSS DAKLEPTNVQ TVTCSPRVKA LPLSPRKRLG    60
DDDNLCNTPHL PPCSPPKQGK KENGPPHSHT LKGRRLVFDN QLTIKSPSKR ELAKVHQNKI  120
LSSVRKSQEI TTNSEQRCPL KKESACVRLF KQEGTCYQQA KLVLNTAVPD RLPAREREMD   180
VIRNFLREHI CGKKAGSLYL SGAPGTGKTA CLSRILQDLK KELKGFKTIM LNCMSLRTAQ   240
AVFPAIAQEI CQEEVSRPAG KDMMRKLEKH MTAEKGPMIV LVLDEMDQLD SKGQDVLYTL   300
FEWPWLSNSH LVLIGIANTL DLTDRILPRL QAREKCKPQL LNFPPYTRNQ IVTILQDRLN   360
QVSRDQVLDN AAVQFCARKV SAVSGDVRKA LDVCRRAIEI VESDVKSQTI LKPLSECKSP   420
SEPLIPKRVG LIHISQVISE VDGNRMTLSQ EGAQDSFPLQ QKILVCSLML LIRQLKIKEV   480
TLGKLYEAYS KVCRKQQVAA VDQSECLSLS GLLEARGILG LKRNKETRLT KVFFKIEEKE   540
IEHALKDKAL IGNILATGLP                                              560

SEQ ID NO: 18            moltype = AA   length = 79
FEATURE                  Location/Qualifiers
source                   1..79
                         mol_type = protein
                         organism = Homo sapiens
SEQUENCE: 18
MSHKQIYYSD KYDDEEFEYR HVMLPKDIAK LVPKTHLMSE SEWRNLGVQQ SQGWVHYMIH    60
EPEPHILLFR RPLPKKPKK                                                79

SEQ ID NO: 19            moltype = AA   length = 79
FEATURE                  Location/Qualifiers
source                   1..79
                         mol_type = protein
                         organism = Homo sapiens
SEQUENCE: 19
MAHKQIYYSD KYFDEHYEYR HVMLPRELSK QVPKTHLMSE EEWRRLGVQQ SLGWVHYMIH    60
EPEPHILLFR RPLPKDQQK                                                79

SEQ ID NO: 20            moltype = AA   length = 432
FEATURE                  Location/Qualifiers
source                   1..432
                         mol_type = protein
                         organism = Homo sapiens
SEQUENCE: 20
MLGNSAPGPA TREAGSALLA LQQTALQEDQ ENINPEKAAP VQQPRTRAAL AVLKSGNPRG    60
LAQQQRPKTR RVAPLKDLPV NDEHVTVPPW KANSKQPAFT IHVDEAEKEA QKKPAESQKI   120
EREDALAFNS AISLPGPRKP LVPLDYPMDG SFESPHTMDM SIILEDEKPV SVNEVPDYHE   180
DIHTYLREME VKCKPKVGYM KKQPDITNSM RAILVDWLVE VGEEYKLQNE TLHLAVNYID   240
RFLSSMSVLR GKLQLVGTAA MLLASKFEEI YPPEVAEFVY ITDDTYTKKQ VLRMEHLVLK   300
VLTFDLAAPT VNQFLTQYFL HQQPANCKVE SLAMFLGELS LIDADPYLKY LPSVIAGAAF   360
HLALYTVTGQ SWPESLIRKT GYTLESLKPC LMDLHQTYLK APQHAQQSIR EKYKNSKYHG   420
VSLLNPPETL NL                                                      432

SEQ ID NO: 21            moltype = AA   length = 163
FEATURE                  Location/Qualifiers
source                   1..163
                         mol_type = protein
                         organism = Homo sapiens
```

```
SEQUENCE: 21
MPSIKLQSSD GEIFEVDVEI AKQSVTIKTM LEDLGMDDEG DDDPVPLPNV NAAILKKVIQ    60
WCTHHKDDPP PPEDDENKEK RTDDIPVWDQ EFLKVDQGTL FELILAANYL DIKGLLDVTC   120
KTVANMIKGK TPEEIRKTFN IKNDFTEEEE AQVRKENQWC EEK                    163

SEQ ID NO: 22           moltype = AA  length = 776
FEATURE                 Location/Qualifiers
source                  1..776
                        mol_type = protein
                        organism = Homo sapiens
SEQUENCE: 22
MSSTRSQNPH GLKQIGLDQI WDDLRAGIQQ VYTRQSMAKS RYMELYTHVY NYCTSVHQSN    60
QARGAGVPPS KSKKGQTPGG AQFVGLELYK RLKEFLKNYL TNLLKDGEDL MDESVLKFYT   120
QQWEDYRFSS KVLNGICAYL NRHWVRRECD EGRKGIYEIY SLALVTWRDC LFRPLNKQVT   180
NAVLKLIEKE RNGETINTRL ISGVVQSYVE LGLNEDDAFA KGPTLTVYKE SFESQFLADT   240
ERFYTRESTE FLQQNPVTEY MKKAEARLLE EQRRVQVYLH ESTQDELARK CEQVLIEKHL   300
EIFHTEFQNL LDADKNEDLG RMYNLVSRIQ DGLGELKKLL ETHIHNQGLA AIEKCGEAAL   360
NDPKMYVQTV LDVHKKYNAL VMSAFNNDAG FVAALDKACG RFINNNAVTK MAQSSSKSPE   420
LLARYCDSLL KKSSKNPEEA ELEDTLNQVM VVFKYIEDKD VFQKFYAKML AKRLVHQNSA   480
SDDAEASMIS KLKQACGFEY TSKLQRMFQD IGVSKDLNEQ FKKHLTNSEP LDLDFSIQVL   540
SSGSWPFQQS CTFALPSELE RSYQRFTAFY ASRHSGRKLT WLYQLSKGEL VTNCFKNRYT   600
LQASTFQMAI LLQYNTEDAY TVQQLTDSTQ IKMDILAQVL QILLKSKLLV LEDENANVDE   660
VELKPDTLIK LYLGYKNKKL RVNINVPMKT EQKQEQETTH KNIEEDRKLL IQAAIVRIMK   720
MRKVLKHQQL LGEVLTQLSS RFKPRVPVIK KCIDILIEKE YLERVDGEKD TYSYLA       776

SEQ ID NO: 23           moltype = AA  length = 707
FEATURE                 Location/Qualifiers
source                  1..707
                        mol_type = protein
                        organism = Homo sapiens
SEQUENCE: 23
MNQELLSVGS KRRRTGGSLR GNPSSSQVDE EQMNRVVEEE QQQQLRQQEE EHTARNGEVV    60
GVEPRPGGQN DSQQGQLEEN NNRFISVDED SSGNQEEQEE DEEHAGEQDE EDEEEEEMDQ   120
ESDDFDQSDD SSREDEHTHT NSVTNSSSIV DLPVHQLSSP FYTKTTKMKR KLDHGSEVRS   180
FSLGKKPCKV SEYTSTTGLV PCSATPTTFG DLRAANGQGQ QRRRITSVQP PTGLQEWLKM   240
FQSWSGPEKL LALDELIDSC EPTQVKHMMQ VIEPQFQRDF ISLLPKELAL YVLSFLEPKD   300
LLQAAQTCRY WRILAEDNLL WREKCKEEGI DEPLHIKRRK VIKPGFIHSP WKSAYIRQHR   360
IDTNWRRGEL KSPKVLKGHD DHVITCLQFC GNRIVSGSDD NTLKVWSAVT GKCLRTLVGH   420
TGGVWSSQMR DNIIISGSTD RTLKVWNAET GECIHTLYGH TSTVRCMHLH EKRVVSGSRD   480
ATLRVWDIET GQCLHVLMGH VAAVRCVQYD GRRVVSGAYD FMVKVWDPET ETCLHTLQGH   540
TNRVYSLQFD GIHVVSGSLD TSIRVWDVET GNCIHTLTGH QSLTSGMELK DNILVSGNAD   600
STVKIWDIKT GQCLQTLQGP NKHQSAVTCL QFNKNFVITS SDDGTVKLWD LKTGEFIRNL   660
VTLESGGSGG VVWRIRASNT KLVCAVGSRN GTEETKLLVL DFDVDMK                707

SEQ ID NO: 24           moltype = AA  length = 198
FEATURE                 Location/Qualifiers
source                  1..198
                        mol_type = protein
                        organism = Homo sapiens
SEQUENCE: 24
MSNVRVSNGS PSLERMDARQ AEHPKPSACR NLFGPVDHEE LTRDLEKHCR DMEEASQRKW    60
NFDFQNHKPL EGKYEWQEVE KGSLPEFYYR PPRPPKGACK VPAQESQDVS GSRPAAPLIG   120
APANSEDTHL VDPKTDPSDS QTGLAEQCAG IRKRPATDDS STQNKRANRT EENVSDGSPN   180
AGSVEQTPKK PGLRRRQT                                                198
```

METHODS AND SYSTEMS FOR TREATING DISEASE USING AN ATR/CHK1 SIGNALING PATHWAY INHIBITOR

CROSS-REFERENCE TO RELATED APPLICATIONS

The present application claims the benefit of U.S. Provisional Application No. 63/388,914, filed Jul. 13, 2022, the content of which is hereby incorporated by reference herein in its entirety.

SEQUENCE LISTING

In accordance with 37 C.F.R. § 1.52(e)(5), the present specification makes reference to a Sequence Listing (submitted electronically as a .xml file named "2014014-0085_SL.xml"). The .xml file was generated on Mar. 6, 2025 and is 39,032 bytes in size. The entire contents of the Sequence Listing are herein incorporated by reference.

BACKGROUND

Checkpoint kinases 1 and 2 (Chk1 and Chk2) are serine/threonine protein kinases that play a key role in the regulation of DNA replication and DNA damage response Hong et al., *Clin. Cancer Res.* 24(14).3263-3272 (2018); Smith et al., *Exp. Rev. Mol. Med.* 22(e2): 1-15 (2020). In response to DNA replication stress or damage, Chk1 and/or Chk2 are activated as part of the DNA damage and replication checkpoints, as illustrated in FIGS. 1A and 1B. prexasertib (also known as LY606368 and ACR-368) is a potent, small molecule inhibitor of Chk1, which has been shown to modulate DNA damage response, replication fork stability, origin firing, and mitotic entry. See Nikolaev and Yang, *Improving the Therapeutic Ratio in Head and Neck Cancer*, pp. 301-316, $6^{th}$ ed., 2020; Lowry et al., *Clin. Cancer Res.* 23(15):4354-4363 (August 2017); Blasius et al., *Genome Biology*, 12-R78 (1-14) (2011) Chk1 inhibitors, e.g., prexasertib, have been described as promising therapies for certain cancers, with some patients achieving partial or complete response. Not all patients, however, respond to Chk1 inhibitors (e.g., prexasertib), and response rates are typically lower than 15% for most cancer indications, with a few notable exceptions. See Hong et al., *Clin. Cancer Res.* 24(14):3263-3272 (2018); Lee et al., *A Study of Prexasertib (LY2606368) in Platinum-Resistant or Refractory Recurrent Ovarian Cancer*, ClinicalTrials.gov Identifier: NCT03414047, available at clinicaltrials.gov/ct2/show/record/NCT03414047.

Significant efforts have been made to identify biomarkers that predict responsiveness to Chk1 inhibitors (e.g., prexasertib), particularly focused on cancer patients having HPV-driven tumors. See Hong et al., *Clin. Cancer Res.* 24(14): 3263-3272 (2018); Martinez et al., Proceedings of the American Association for Cancer Research Annual Meeting 2017; 2017 April 1-5; Washington, DC. Philadelphia (PA): AACR; Cancer Res 2017; 77(13 Suppl): Abstract nr 1778. To date, no success has been reported providing a consistent, reliable method of identifying which patients will or will not respond to Chk1 inhibitor (e.g., prexasertib) therapy. Thus, efficacy of these therapies, e.g., prexasertib, can only be assessed by administering the therapies to patients without knowing their likelihood of response, and waiting for the outcome. Given the low observed response rates with such an approach, no Chk1 inhibitors, including prexasertib, have been approved to date. Accordingly, there is a huge need for a method to identify the patients that will benefit from treatment with Chk1 inhibitors (including prexasertib), to ensure sufficient overall response rate for approval. Not only will this ensure that responders can readily receive this effective therapy, but also that one can avoid unnecessary overtreatment of those who will not benefit from Chk1 inhibitor therapy.

SUMMARY

The present disclosure, among other things, solves this problem by defining a simple treatment benefit-predictive biomarker signature (also called Response-Predictive Signature throughout) that effectively predicts treatment benefit (e.g., before start of therapy) by distinguishing responder and non-responder populations to Chk1 inhibition therapy (e.g., prexasertib), Wee1 inhibition therapy, ATR inhibition therapy, or a combination thereof.

In some embodiments, the present disclosure provides a method of treating a disease, disorder, or condition comprising a step of: administering a therapeutic agent that is an inhibitor of expression or activity of a protein in an ATR/Chk1 signaling pathway to a subject whose tissue sample has been determined to exhibit a Response-Predictive Signature; wherein the Response-Predictive Signature comprises one or more of: (a) a first biomarker score that is greater than or equal to a first predictive threshold, wherein the first biomarker is selected from Ser280 phosphorylated Chk1, Ser296 phosphorylated Chk1, Ser317 phosphorylated Chk1, Ser345 phosphorylated Chk1, nuclear pan Chk1, Thr68 phosphorylated Chk2, Ser516 phosphorylated Chk2, Thr383 phosphorylated Chk2, and Thr387 phosphorylated Chk2; (b) a second biomarker score that is greater than or equal to a second predictive threshold, wherein the second biomarker is selected from Ser473 phosphorylated Kap1, Ser642 phosphorylated Wee1, pan Wee1, Ser865 phosphorylated treslin, Ser743 phosphorylated TLK1, Ser612 phosphorylated RB1, Ser1310 phosphorylated MYBBP1A, Ser508 phosphorylated SETMAR, Thr2252 phosphorylated SRRM2, Ser230 phosphorylated CDC25B, Ser950 phosphorylated claspin, Ser37 phosphorylated FAM122A, Ser151 phosphorylated CDC25B, Ser280 phosphorylated CDC25B, Ser481 phosphorylated FOXM1, and Ser704 phosphorylated FOXM1; and (c) a third biomarker score that is: (i) greater than or equal to a third predictive threshold, wherein the third biomarker is selected from total cyclin E1, Ser100 phosphorylated cyclin E1, Ser103 phosphorylated cyclin E1, Ser387 phosphorylated cyclin E1, Thr395 phosphorylated cyclin E1, Thr199 phosphorylated nucleophosmin, Ser54 phosphorylated CDC6, Ser74 phosphorylated CDC6, pan nuclear CDC6, Ser1000 phosphorylated treslin, pan Cks1, pan Cks2, or total cyclin A2, or (ii) less than or equal to a third predictive threshold, wherein the third biomarker is selected from total SCF (which is a complex of Skp1, cullin, and an F-box protein), total FBXW7, or total p27 Exemplary amino acid sequences for these aforementioned biomarkers can be found in the below section entitled "Sequences".

In some embodiments, the present disclosure provides a method of treating a disease, disorder, or condition comprising a step of: administering a therapeutic agent that is an inhibitor of expression or activity of a protein in an ATR/Chk1 signaling pathway in combination with a DNA synthesis inhibitor to a subject whose tissue sample has been determined to not exhibit a Response-Predictive Signature to the therapeutic agent; wherein the Response-Predictive Signature comprises one or more of: (a) a first biomarker score that is greater than or equal to a first predictive threshold, wherein the first biomarker is selected from Ser280 phosphorylated Chk1, Ser296 phosphorylated Chk1, Ser317 phosphorylated Chk1, Ser345 phosphorylated Chk1, nuclear pan Chk1, Thr68 phosphorylated Chk2, Ser516 phosphorylated Chk2, Thr383 phosphorylated Chk2, and Thr387 phosphorylated Chk2; (b) a second biomarker score that is greater than or equal to a second predictive threshold, wherein the second biomarker is selected from Ser473 phosphorylated Kap1, Ser642 phosphorylated Wee1, pan Wee1, Ser865 phosphorylated treslin, Ser743 phosphorylated TLK1, Ser612 phosphorylated RB1, Ser1310 phosphorylated MYBBP1A, Ser508 phosphorylated SETMAR, Thr2252 phosphorylated SRRM2, Ser230 phosphorylated CDC25B, Ser950 phosphorylated claspin, Ser37 phosphorylated FAM122A, Ser151 phosphorylated CDC25B, Ser280 phosphorylated CDC25B, Ser481 phosphorylated FOXM1, and Ser704 phosphorylated FOXM1; and (c) a third biomarker score that is: (i) greater than or equal to a third predictive threshold, wherein the third biomarker is selected from total cyclin E1, Ser100 phosphorylated cyclin E1, Ser103 phosphorylated cyclin E1, Ser387 phosphorylated cyclin E1, Thr395 phosphorylated cyclin E1, Thr199 phosphorylated nucleophosmin, Ser54 phosphorylated CDC6, Ser74 phosphorylated CDC6, pan nuclear CDC6, Ser1000 phosphorylated treslin, pan Cks1, pan Cks2, or total cyclin A2; or (ii) less than or equal to a third predictive threshold, wherein the third biomarker is selected from total SCF, total FBXW7, or total p27. In some embodiments, a DNA synthesis inhibitor is gemcitabine.

In some embodiments, the present disclosure provides a method for validating and/or classifying a subject as a likely responder or non-responder to a therapeutic agent that is an inhibitor of expression or activity of a protein in an ATR/Chk1 signaling pathway, the method comprising: (a) receiving, by a processor of a computing device, data from a tissue sample of the subject's cells providing levels of each of one or more of a first, second, and a third biomarker in the tissue sample; (b) receiving, by the processor, a corresponding first, second, and third predictive threshold for each of the first, second, and third biomarkers; (c) calculating, by the processor, a first, second, and third biomarker score from the levels of each of the first, second, and third biomarkers using the data received in step (a); (d) comparing, by the processor, the first, second, and third biomarker scores relative to the corresponding first, second, and third predictive thresholds using the data received in step (b) and calculated in step (c) to determine the presence or absence of a Response-Predictive Signature in the tissue sample; (e) classifying, by the processor, the subject as responsive to the therapeutic agent based on presence of the Response-Predictive Signature in the tissue sample or as non-responsive to the therapeutic agent based on absence of the Response-Predictive Signature in the tissue sample; wherein: the first biomarker is selected from Ser280 phosphorylated Chk1, Ser296 phosphorylated Chk1, Ser317 phosphorylated Chk1, Ser345 phosphorylated Chk1, nuclear pan Chk1, Thr68 phosphorylated Chk2, Ser516 phosphorylated Chk2, Thr383 phosphorylated Chk2, and Thr387 phosphorylated Chk2; the second biomarker is selected from Ser473 phosphorylated Kap1, Ser642 phosphorylated Wee1, pan Wee1, Ser865 phosphorylated treslin, Ser743 phosphorylated TLK1, Ser612 phosphorylated RB1, Ser1310 phosphorylated MYBBP1A, Ser508 phosphorylated SETMAR, Thr2252 phosphorylated SRRM2, Ser230 phosphorylated CDC25B, Ser950 phosphorylated claspin, Ser37 phosphorylated FAM122A, Ser151 phosphorylated CDC25B, Ser280 phosphorylated CDC25B, Ser481 phosphorylated FOXM1, and Ser704 phosphorylated FOXM1; and the third biomarker is selected from total cyclin E1, Ser100 phosphorylated cyclin E1, Ser103 phosphorylated cyclin E1, Ser387 phosphorylated cyclin E1, Thr395 phosphorylated cyclin E1, Thr199 phosphorylated nucleophosmin, Ser54 phosphorylated CDC6, Ser74 phosphorylated CDC6, pan nuclear CDC6, Ser1000 phosphorylated treslin, pan Cks1, pan Cks2, total cyclin A2, total SCF, total FBXW7, or total p27.

In some embodiments, a Response-Predictive Signature comprises at least two of a first biomarker score, a second biomarker score, and a third biomarker score. In some embodiments, a Response-Predictive Signature comprises each of a first biomarker score, a second biomarker score, and a third biomarker score.

In some embodiments, at least one of a first biomarker score, a second biomarker score, and a third biomarker score is determined as the percentage of cells positive for a corresponding first biomarker, second biomarker, or third biomarker in a tissue sample. In some embodiments, each of a first biomarker score, a second biomarker score, and a third biomarker score is determined as the percentage of cells positive for a corresponding first biomarker, second biomarker, and third biomarker in a tissue sample. In some embodiments, a first predictive threshold is 3% or greater of cells positive for a first biomarker. In some embodiments, a first predictive threshold is 5%, 6%, 7%, 8%, 9%, or 10% of cells positive for a first biomarker. In some embodiments, a second predictive threshold is 3% or greater of cells positive for a second biomarker. In some embodiments, a second predictive threshold is 5%, 6%, 7%, 8%, 9%, or 10% of cells positive for a second biomarker. In some embodiments, a third predictive threshold is 3% or greater of cells positive for a third biomarker. In some embodiments, a third predictive threshold is 5%, 6%, 7%, 8%, 9%, or 10% of cells positive for a third biomarker. In some embodiments, a first biomarker is Ser296 phosphorylated Chk1, a second biomarker is Ser473 phosphorylated Kap1, and a third biomarker is total cyclin E1; and each of a first predictive threshold, a second predictive threshold, and a third predictive threshold is 5%, 6%, 7%, 8%, 9%, or 10% of cells positive for each of the first biomarker, the second biomarker, and the third biomarker.

In some embodiments, at least one of a first biomarker score, a second biomarker score, and a third biomarker score is determined from a weighted intensity distribution of a corresponding first biomarker, second biomarker, or third biomarker in a tissue sample. In some embodiments, each of a first biomarker score, a second biomarker score, and a third biomarker score is determined from a weighted intensity distribution of a corresponding first biomarker, second biomarker, and third biomarker in a tissue sample.

In some embodiments, the present disclosure provides a method of treating a disease, disorder or condition comprising a step of: administering a therapeutic agent that is an inhibitor of expression or activity of a protein in an ATR/Chk1 signaling pathway to a subject whose tissue sample has been determined to exhibit a Response-Predictive Signature; wherein the Response-Predictive Signature comprises a composite score greater than or equal to a composite threshold, wherein the composite score comprises two or more of: (a) a first biomarker score, wherein the first biomarker is selected from Ser280 phosphorylated Chk1, Ser296 phosphorylated Chk1, Ser317 phosphorylated Chk1, Ser345 phosphorylated Chk1, nuclear pan Chk1, Thr68 phosphorylated Chk2, Ser516 phosphorylated Chk2, Thr383 phosphorylated Chk2, and Thr387 phosphorylated Chk2; (b)

a second biomarker score, wherein the second biomarker is selected from Ser473 phosphorylated Kap1, Ser642 phosphorylated Wee1, pan Wee1, Ser865 phosphorylated treslin, Ser743 phosphorylated TLK1, Ser612 phosphorylated RB1, Ser1310 phosphorylated MYBBP1A, Ser508 phosphorylated SETMAR, Thr2252 phosphorylated SRRM2, Ser230 phosphorylated CDC25B, Ser950 phosphorylated claspin, Ser37 phosphorylated FAM122A, Ser151 phosphorylated CDC25B, Ser280 phosphorylated CDC25B, Ser481 phosphorylated FOXM1, and Ser704 phosphorylated FOXM1; and (c) a third biomarker score, wherein the third biomarker is selected from total cyclin E1, Ser100 phosphorylated cyclin E1, Ser103 phosphorylated cyclin E1, Ser387 phosphorylated cyclin E1, Thr395 phosphorylated cyclin E1, Thr199 phosphorylated nucleophosmin, Ser54 phosphorylated CDC6, Ser74 phosphorylated CDC6, pan nuclear CDC6, Ser1000 phosphorylated treslin, pan Cks1, pan Cks2, and total cyclin A2.

In some embodiments, the present disclosure provides a method of treating a disease, disorder or condition comprising a step of: administering a therapeutic agent that is an inhibitor of expression or activity of a protein in an ATR/Chk1 signaling pathway in combination with a DNA synthesis inhibitor to a subject whose tissue sample has been determined to not exhibit a Response-Predictive Signature to the therapeutic agent; wherein the Response-Predictive Signature comprises a composite score greater than or equal to a composite threshold, wherein the composite score comprises two or more of: (a) a first biomarker score, wherein the first biomarker is selected from Ser280 phosphorylated Chk1, Ser296 phosphorylated Chk1, Ser317 phosphorylated Chk1, Ser345 phosphorylated Chk1, nuclear pan Chk1, Thr68 phosphorylated Chk2, Ser516 phosphorylated Chk2, Thr383 phosphorylated Chk2, and Thr387 phosphorylated Chk2; (b) a second biomarker score, wherein the second biomarker is selected from Ser473 phosphorylated Kap1, Ser642 phosphorylated Wee1, pan Wee1, Ser865 phosphorylated treslin, Ser743 phosphorylated TLK1, Ser612 phosphorylated RB1, Ser1310 phosphorylated MYBBP1A, Ser508 phosphorylated SETMAR. Thr2252 phosphorylated SRRM2, Ser230 phosphorylated CDC25B, Ser950 phosphorylated claspin, Ser37 phosphorylated FAM122A, Ser151 phosphorylated CDC25B, Ser280 phosphorylated CDC25B, Ser481 phosphorylated FOXM1, and Ser704 phosphorylated FOXM1; and (c) a third biomarker score, wherein the third biomarker is selected from total cyclin E1, Ser100 phosphorylated cyclin E1, Ser103 phosphorylated cyclin E1, Ser387 phosphorylated cyclin E1, Thr395 phosphorylated cyclin E1, Thr199 phosphorylated nucleophosmin, Ser54 phosphorylated CDC6, Ser74 phosphorylated CDC6, pan nuclear CDC6, Ser1000 phosphorylated treslin, pan Cks1, pan Cks2, and total cyclin A2. In some embodiments, a DNA synthesis inhibitor is gemcitabine.

In some embodiments, the present disclosure provides a method for validating and/or classifying a subject as a likely responder or non-responder to a therapeutic agent that is an inhibitor of expression or activity of a protein in an ATR/Chk1 signaling pathway, the method comprising: (a) receiving, by a processor of a computing device, data from a tissue sample of the subject's cells providing levels of each of one or more of a first, second, and a third biomarker in the tissue sample; (b) receiving, by the processor, a composite threshold; (c) calculating, by the processor, a first, second, and third biomarker score from the levels of each of the first, second, and third biomarkers using the data received in step (a); (d) calculating, by the processor, a composite score from the first, second, and third biomarker scores using the data calculated in step (c); (e) comparing, by the processor, the composite score relative to the composite threshold using the data received in step (b) and calculated in step (d) to determine the presence or absence of a Response-Predictive Signature in the tissue sample; (f) classifying, by the processor, the subject as responsive to the therapeutic agent based on presence of the Response-Predictive Signature in the tissue sample or as non-responsive based on absence of the Response-Predictive Signature in the tissue sample; wherein the first biomarker is selected from Ser280 phosphorylated Chk1, Ser296 phosphorylated Chk1, Ser317 phosphorylated Chk1, Ser345 phosphorylated Chk1, nuclear pan Chk1, Thr68 phosphorylated Chk2, Ser516 phosphorylated Chk2, Thr383 phosphorylated Chk2, and Thr387 phosphorylated Chk2; the second biomarker is selected from Ser473 phosphorylated Kap1, Ser642 phosphorylated Wee1, pan Wee1, Ser865 phosphorylated treslin, Ser743 phosphorylated TLK1, Ser612 phosphorylated RB1, Ser1310 phosphorylated MYBBP1A, Ser508 phosphorylated SETMAR, Thr2252 phosphorylated SRRM2, Ser230 phosphorylated CDC25B, Ser950 phosphorylated claspin, Ser37 phosphorylated FAM122A, Ser151 phosphorylated CDC25B, Ser280 phosphorylated CDC25B, Ser481 phosphorylated FOXM1, and Ser704 phosphorylated FOXM1; and the third biomarker is selected from total cyclin E1, Ser100 phosphorylated cyclin E1, Ser103 phosphorylated cyclin E1, Ser387 phosphorylated cyclin E1, Thr395 phosphorylated cyclin E1, Thr199 phosphorylated nucleophosmin, Ser54 phosphorylated CDC6, Ser74 phosphorylated CDC6, pan nuclear CDC6, Ser1000 phosphorylated treslin, pan Cks1, pan Cks2, total cyclin A2, total SCF, total FBXW7, or total p27.

In some embodiments, a composite score comprises each of a first biomarker score, a second biomarker score, and a third biomarker score. In some embodiments, a composite score is the sum of each of the biomarker scores, optionally wherein the biomarker scores are differentially weighted prior to summing.

In some embodiments, at least one of a first biomarker score, a second biomarker score, and a third biomarker score is determined as the percentage of cells positive for a corresponding first biomarker, second biomarker, or third biomarker in a tissue sample. In some embodiments, each of a first biomarker score, a second biomarker score, and a third biomarker score is determined as the percentage of cells positive for a corresponding first biomarker, second biomarker, and third biomarker in a tissue sample.

In some embodiments, at least one of a first biomarker score, a second biomarker score, and a third biomarker score is determined from a weighted intensity distribution of a corresponding first biomarker, second biomarker, or third biomarker in a tissue sample. In some embodiments, each of a first biomarker score, a second biomarker score, and a third biomarker score is determined from a weighted intensity distribution of a corresponding first biomarker, second biomarker, and third biomarker in a tissue sample.

In some embodiments, a disease, disorder, or condition is associated with Chk1, Wee1, ATR, or a combination thereof. In some embodiments, a disease, disorder, or condition is a cancer. In some embodiments, a cancer is characterized by solid tumors. In some embodiments, a cancer is selected from ovarian cancer, anal cancer, cervical cancer, cancer of the head and neck, esophageal cancer, colon cancer, lung cancer (small cell and non-small cell), pancreatic cancer, liver cancer, bladder cancer, breast cancer, endometrial cancer, and sarcomas. In some embodiments, a cancer is ovarian cancer. In some embodiments, an ovarian cancer is high grade serous ovarian cancer. In some embodiments, a disease, disorder, or condition is associated with an oncogenic virus.

In some embodiments, a tissue sample is a tumor biopsy. In some embodiments, a tissue sample is tumor cells in a tumor biopsy. In some embodiments, at least one of a first biomarker score, a second biomarker score, and a third biomarker score is determined based on detection of a first biomarker, a second biomarker, or a third biomarker in the nucleus of cells in a tissue sample. In some embodiments, each of a first biomarker score, a second biomarker score, and a third biomarker score are determined based on detection of a first biomarker, a second biomarker, or a third biomarker in the nucleus of cells in a tissue sample.

In some embodiments, a therapeutic agent is a Chk1 inhibitor, a Wee1 inhibitor, an ATR inhibitor, or a combination thereof. In some embodiments, a therapeutic agent is a Chk1 inhibitor. In some embodiments, a Chk1 inhibitor is prexasertib, SRA-737, PHI-101, LY2880070, V158411, CASC-578, IMP10, SOL-578, or a pharmaceutically acceptable salt of any of the foregoing. In some embodiments, a Chk1 inhibitor is prexasertib, or a pharmaceutically acceptable salt thereof. In some embodiments, a Chk1 inhibitor is prexasertib (S)-lactate monohydrate. In some embodiments, a therapeutic agent is a Wee1 kinase inhibitor. In some embodiments, a Wee1 kinase inhibitor is selected from adavosertib (AZD1775, MK1775), azenosertib (Zn-C3), Debio0123, STC 8123, ATRN-1051, NUV-569, and IMP7068. In some embodiments, a therapeutic agent is an ATR inhibitor. In some embodiments, an ATR inhibitor is selected from berzosertib (M6620, VX-970), gartisertib (M4344, VX-803), elimusertib (BAY1895344), ceralasertib (AZD6738), M1774, ATRN-119, and camonsertib (RP-3500).

In some embodiments, a first biomarker is selected from: Ser296 phosphorylated Chk or nuclear Chk1. In some embodiments, a first biomarker is Ser296 phosphorylated Chk1. In some embodiments, a second biomarker is Ser473 phosphorylated Kap1. In some embodiments, a third biomarker is total cyclin E1. In some embodiments, a first biomarker is Ser296 phosphorylated Chk1, a second biomarker is Ser473 phosphorylated Kap1, and a third biomarker is total cyclin E1.

In some embodiments, a method of treating a disease, disorder, or condition, further comprises administering a second anti-cancer agent to a subject.

In some embodiments, the present disclosure provides a system for validating and/or classifying a subject suffering from a disease, disorder, or condition as likely responsive or likely non-responsive to a therapy prior to administration of said therapy, the system comprising: a processor, and a memory having instructions thereof, the instruction, when executed by the processor, cause the processor to perform one or more steps of the methods described herein.

BRIEF DESCRIPTION OF THE DRAWING

FIG. 1A is reproduced from Smith et al., *Advances in Cancer Research,* 108: 73-112 (2010).

FIG. 2 is reproduced from Goto et al., *Cell Structure and Function,* 40:43-50 (2015).

FIG. 3 is reproduced from Matheson et al., *Trends in Pharmacological Sciences,* 37:872-881 (2016).

FIG. 4 is reproduced from Alvarellos et al., *Pharmacogenet. Genomics,* 24:564-574 (2014).

FIG. 14A is a plot for prediction based on all three biomarkers. FIG. 14B is a plot for prediction based on biomarkers BM1 and BM2. FIG. 14C is a plot for prediction based on biomarkers BM1 and BM3 FIG. 14D is a plot for prediction based on biomarkers BM2 and BM3. FIG. 14E is a plot for prediction based on biomarker BM1. FIG. 14F is a plot for prediction based on biomarker BM2. FIG. 14G is a plot for prediction based on biomarker BM3. BM1, BM2, and BM3 in FIGS. 14A-14G are as defined in Example 4.

FIG. 16A is a plot showing the reduced sensitivity of OVCAR3 cells to prexasertib when total KAP1 protein (when BM2 is pKAP1 S473) is knocked down with siRNA versus a control siRNA FIG. 16B is a plot showing the reduced sensitivity of OVCAR3 cells to prexasertib when CCNE1 is knocked down with siRNA (cyclin E2 expression is inhibited) versus a control siRNA. FIG. 16C is a plot showing the reduced sensitivity of OVCAR3 cells to prexasertib when CCNA2 is knocked down with siRNA (cyclin A2 expression is inhibited) versus a control siRNA. FIG. 16D is a plot showing the reduced sensitivity of OVCAR3 cells to prexasertib when total CHEK2 is knocked down with siRNA (Chk2 expression is inhibited) versus a control siRNA.

FIG. 20A shows results for parental OVCAR3 (OVCAR3-P) cells. FIG. 20B shows results for acquired prexasertib resistant OVCAR3 (OVCAR3-R) cells. FIG. 20C shows results for parental OV90 (OV90-P) cells. FIG. 20D shows results for acquired prexasertib resistant OV90 (OV90-R) cells. FIG. 20E shows results for A2780 cells. FIG. 20F shows results for AN3CA cells. FIG. 20G shows results for KLE cells. FIG. 20H shows results for TCCSUP cells. FIG. 20I shows results for SW780 cells. FIG. 20J shows results for T47D cells. FIG. 20K shows results for PC3 cells.

DETAILED DESCRIPTION OF CERTAIN EMBODIMENTS

Figure 1A:
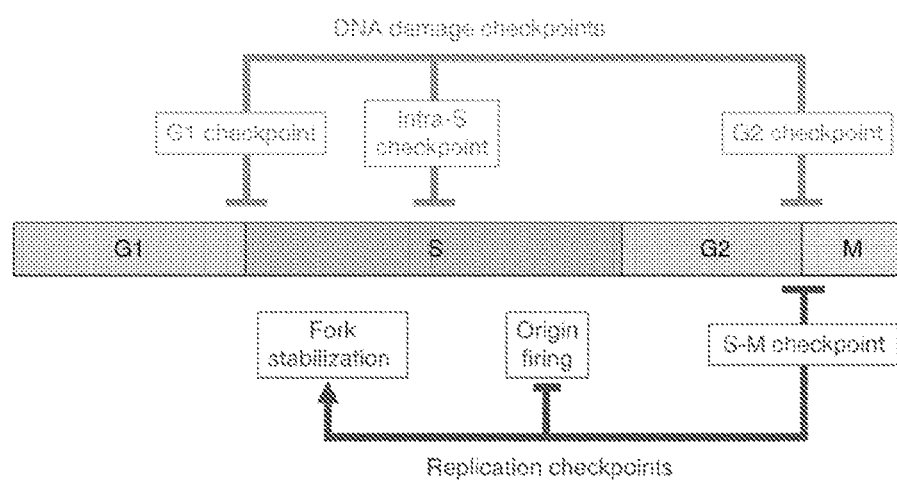
FIG. 1A illustrates the DNA damage and replication checkpoints.

Provided herein are systems and methods useful, for example, for administering therapy to a subject that has been determined to be responsive to therapy, or otherwise has their responsive status validated prior to administration of said therapy. In some embodiments, the present disclosure provides systems and methods for predicting and/or validating response to a therapy.

Definitions

[AA][###] phosphorylated protein: As used herein, reference to a specific amino acid at a specific numbered position in a protein that is phosphorylated, e.g., Ser280 phosphorylated Chk1, refers to that particular numbered amino acid residue of the canonical isoform of the wild-type protein as indicated by the referenced UniProt ID number, (Version; Jul. 6, 2023) (see section entitled "Sequences" herein). It will be understood by those of ordinary skill in the art that the corresponding position number of the specific amino acid may be altered in different or newly discovered isoforms of that protein. The position of the corresponding amino acid in such isoforms can easily be identified by comparing the full sequence of the canonical wild-type form with that of the alternate isoform. Accordingly, any reference herein to a particular amino acid at a particular numbered position in a protein will be understood by those skilled in the art to also include reference to the corresponding amino acid and its corresponding numbered position in any isoforms of that protein.

About: As used herein, the term "about" refers to a value that is similar, in context to the referenced value. In general, those skilled in the art, familiar with the context, will appreciate the relevant degree of variance encompassed by "about" in that context. For example, in some embodiments, the term "about" may encompass a range of values that are within 25%, 20%, 19%, 18%, 17%, 16%, 15%, 14%, 13%, 12%, 11%, 10%, 9%, 8%, 7%, 6%, 5%, 4%, 3%, 2%, 1%, or less of the referred value. In some embodiments, "about" refers to ±10%, ±9%, ±8%, ±7%, ±6%, ±5%, ±4%, ±3%, 2%, ±1% of a referenced value.

Administration: As used herein, the term "administration" typically refers to the administration of a composition to a subject or system, for example to achieve delivery of an agent that is, or is included in or otherwise delivered by, the composition.

Agent: As used herein, the term "agent" refers to an entity (e.g., for example, a lipid, metal, nucleic acid, polypeptide, polysaccharide, small molecule, etc., or complex, combination, mixture or system [e.g., cell, tissue, organism] thereof), or phenomenon (e.g., heat, electric current or field, magnetic force or field, etc.).

Analog: As used herein, the term "analog" refers to a substance that shares one or more particular structural features, elements, components, or moieties with a reference substance. Typically, an "analog" shows significant structural similarity with the reference substance, for example sharing a core or consensus structure, but also differs in certain discrete ways. In some embodiments, an analog is a substance that can be generated from the reference substance, e.g., by chemical manipulation of the reference substance. In some embodiments, an analog is a substance that can be generated through performance of a synthetic process substantially similar to (e.g., sharing a plurality of steps with) one that generates the reference substance. In some embodiments, an analog is or can be generated through performance of a synthetic process different from that used to generate the reference substance.

Antagonist: As used herein, the term "antagonist" may refer to an agent, or condition whose presence, level, degree, type, or form is associated with a decreased level or activity of a target. An antagonist may include an agent of any chemical class including, for example, small molecules, polypeptides, nucleic acids, carbohydrates, lipids, metals, and/or any other entity that shows the relevant inhibitory activity. In some embodiments, an antagonist may be a "direct antagonist" in that it binds directly to its target; in some embodiments, an antagonist may be an "indirect antagonist" in that it exerts its influence by means other than binding directly to its target (e.g., by interacting with a regulator of the target, so that the level or activity of the target is altered). In some embodiments, an "antagonist" may be referred to as an "inhibitor."

Antibody: As used herein, the term "antibody" refers to a polypeptide that includes canonical immunoglobulin sequence elements sufficient to confer specific binding to a particular target antigen. As is known in the art, intact antibodies as produced in nature are approximately 150 kD tetrameric agents comprised of two identical heavy chain polypeptides (about 50 kD each) and two identical light chain polypeptides (about 25 kD each) that associate with each other into what is commonly referred to as a "Y-shaped" structure. Each heavy chain is comprised of at least four domains (each about 110 amino acids long), an amino-terminal variable (VH) domain (located at the tips of the Y structure), followed by three constant domains: CH1, CH2, and the carboxy-terminal CH3 (located at the base of the Y's stem) A short region, known as the "switch," connects the heavy chain variable and constant regions. The "hinge" connects CH2 and CH3 domains to the rest of the antibody. Two disulfide bonds in this hinge region connect the two heavy chain polypeptides to one another in an intact antibody. Each light chain is comprised of two domains—an amino-terminal variable (VL) domain, followed by a carboxy-terminal constant (CL) domain, separated from one another by another "switch." Intact antibody tetramers are comprised of two heavy chain-light chain dimers in which the heavy and light chains are linked to one another by a single disulfide bond; two other disulfide bonds connect the heavy chain hinge regions to one another, so that the dimers are connected to one another and the tetramer is formed. Naturally-produced antibodies are also glycosylated, typically on the CH2 domain. Each domain in a natural antibody has a structure characterized by an "immunoglobulin fold" formed from two beta sheets (e.g., 3-, 4-, or 5-stranded sheets) packed against each other in a compressed antiparallel beta barrel. Each variable domain contains three hypervariable loops known as "complement determining regions" (CDR1, CDR2, and CDR3) and four somewhat invariant "framework" regions (FR1, FR2, FR3, and FR4). When natural antibodies fold, the FR regions form the beta sheets that provide the structural framework for the domains, and the CDR loop regions from both the heavy and light chains are brought together in three-dimensional space so that they create a single hypervariable antigen binding site located at the tip of the Y structure. The Fc region of naturally occurring antibodies binds to elements of the complement system, and also to receptors on effector cells, including for example effector cells that mediate cytotoxicity. As is known in the art, affinity and/or other binding attributes of Fc regions for Fc receptors can be modulated through glycosylation or other modification. In some embodiments, antibodies produced and/or utilized in accordance with the present invention include glycosylated Fc domains, including Fe domains with modified or engineered such glycosylation. For purposes of the present invention, in certain embodiments, any polypeptide or complex of polypeptides that includes sufficient immunoglobulin domain sequences as found in natural antibodies can be referred to and/or used as an "antibody," whether such polypeptide is naturally produced (e.g., generated by an organism reacting to an antigen), or produced by recombinant engineering, chemical synthesis, or other artificial system or methodology. In some embodiments, an antibody is polyclonal; in some embodiments, an antibody is monoclonal. In some embodiments, an antibody has constant region sequences that are characteristic of mouse, rabbit, primate, or human antibodies. In some embodiments, antibody sequence elements are humanized, primatized, chimeric, etc., as is known in the art. Moreover, the term "antibody," as used herein, can refer in appropriate embodiments (unless otherwise stated or clear from context) to any of the art-known or developed constructs or formats for utilizing antibody structural and functional features in alternative presentation. For example, embodiments, an antibody utilized in accordance with the present invention is in a format selected from, but not limited to, intact IgA, IgG, IgE or IgM antibodies; bi- or multi-specific antibodies (e.g., Zybodies®, etc); antibody fragments such as Fab fragments, Fab' fragments, F(ab')2 fragments, Fd' fragments, Fd fragments, and isolated CDRs or sets thereof: single chain Fvs; polypeptide-Fc fusions, single domain antibodies (e.g., shark single domain antibodies such as IgNAR or fragments thereof): cameloid antibodies; masked antibodies (e.g., Probodies®); Small Modular Immunopharmaceuticals ("SMIPs"); single chain or Tandem diabodies (TandAb®); VHHs; Anticalins®; Nanobodies® minibodies; BiTE®s; ankyrin repeat proteins or DARPINs®; Avimers®; DARTs; TCR-like antibodies; Adnectins®; Affilins®; Trans-bodies®; Affibodies®; TrimerX®: MicroProteins; Fynomers®, Centyrins®; and KALBITOR®s. In some embodiments, an antibody may lack a covalent modification (e.g., attachment of a glycan) that it would have if produced naturally. In some embodiments, an antibody may contain a covalent modification (e.g., attachment of a glycan, a payload [e.g., a detectable moiety, a therapeutic moiety, a catalytic moiety, etc], or other pendant group [e.g., poly-ethylene glycol, etc.]).

Associated: Two events or entities are "associated" with one another, as that term is used herein, if the presence, level, degree, type and/or form of one is correlated with that of the other. For example, a particular entity (e.g., polypeptide, genetic signature, metabolite, microbe, etc) is considered to be associated with a particular disease, disorder, or condition, if its presence, level and/or form correlates with incidence of and/or susceptibility to the disease, disorder, or condition (e.g., across a relevant population). In some embodiments, two or more entities are physically "associated" with one another if they interact, directly or indirectly, so that they are and/or remain in physical proximity with one another. In some embodiments, two or more entities that are physically associated with one another are covalently linked to one another; in some embodiments, two or more entities that are physically associated with one another are not covalently linked to one another but are non-covalently associated, for example by means of hydrogen bonds, van der Waals interaction, hydrophobic interactions, magnetism, and combinations thereof.

Biological Sample: As used herein, the term "biological sample" typically refers to a sample obtained or derived from a biological source (e.g., a tissue or organism or cell culture) of interest, as described herein. In some embodiments, a source of interest comprises an organism, such as an animal or human. In some embodiments, a biological sample is or comprises biological tissue or fluid. In some embodiments, a biological sample may be or comprise bone marrow; blood; blood cells; ascites; tissue or fine needle biopsy samples; cell-containing body fluids; free floating nucleic acids; sputum; saliva; urine; cerebrospinal fluid, peritoneal fluid; pleural fluid; feces; lymph; gynecological fluids; skin swabs; vaginal swabs; oral swabs; nasal swabs; washings or lavages such as a ductal lavages or bronchioalveolar lavages; aspirates; scrapings; bone marrow specimens; tissue biopsy specimens; surgical specimens; other body fluids, secretions, and/or excretions; and/or cells therefrom, etc. In some embodiments, a biological sample is or comprises cells obtained from an individual. In some embodiments, obtained cells are or include cells from an individual from whom the sample is obtained. In some embodiments, a sample is a "primary sample" obtained directly from a source of interest by any appropriate means. For example, in some embodiments, a primary biological sample is obtained by methods selected from the group consisting of biopsy (e.g., fine needle aspiration or tissue biopsy), surgery, collection of body fluid (e.g., blood, lymph, feces etc.), etc. In some embodiments, the biological sample is a tumor biopsy. In some embodiments, as will be clear from context, the term "sample" refers to a preparation that is obtained by processing (e.g., by removing one or more components of and/or by adding one or more agents to) a primary sample. For example, filtering using a semi-permeable membrane. Such a "processed sample" may comprise, for example nucleic acids or proteins extracted from a sample or obtained by subjecting a primary sample to techniques such as amplification or reverse transcription of mRNA, isolation and/or purification of certain components, etc.

Biomarker: The term "biomarker" is used herein, consistent with its use in the art, to refer to an entity (or form thereof) whose presence, or level, correlates with a particular biological event or state of interest, so that it is considered to be a "marker" of that event or state. To give but a few examples, in some embodiments, a biomarker may be or comprise a marker for a particular disease state, or for likelihood that a particular disease, disorder or condition may develop, occur, or reoccur. In some embodiments, a biomarker may be or comprise a marker for a particular disease or therapeutic outcome, or likelihood thereof. Thus, in some embodiments, a biomarker is predictive, in some embodiments, a biomarker is prognostic, in some embodiments, a biomarker is diagnostic, of the relevant biological event or state of interest.

Combination Therapy: As used herein, the term "combination therapy" refers to a clinical intervention in which a subject is simultaneously exposed to two or more therapeutic regimens (e.g. two or more therapeutic agents). In some embodiments, the two or more therapeutic regimens may be administered simultaneously. In some embodiments, the two or more therapeutic regimens may be administered sequentially (e.g., a first regimen administered prior to administration of any doses of a second regimen). In some embodiments, the two or more therapeutic regimens are administered in overlapping dosing regimens. In some embodiments, administration of combination therapy may involve administration of one or more therapeutic agents or modalities to a subject receiving the other agent(s) or modality. In some embodiments, combination therapy does not necessarily require that individual agents be administered together in a single composition (or even necessarily at the same time). In some embodiments, two or more therapeutic agents or modalities of a combination therapy are administered to a subject separately, e.g., in separate compositions, via separate administration routes (e.g., one agent orally and another agent intravenously), and/or at different time points. In some embodiments, two or more therapeutic agents may be administered together in a combination composition, or even in a combination compound (e.g. as part of a single chemical complex or covalent entity), via the same administration route, and/or at the same time.

Comparable: As used herein, the term "comparable" refers to two or more agents, entities, situations, sets of conditions, etc., that may not be identical to one another but that are sufficiently similar to permit comparison there between so that one skilled in the art will appreciate that conclusions may reasonably be drawn based on differences or similarities observed. In some embodiments, comparable sets of conditions, circumstances, individuals, or populations are characterized by a plurality of substantially identical features and one or a small number of varied features. Those of ordinary skill in the art will understand, in context, what degree of identity is required in any given circumstance for two or more such agents, entities, situations, sets of conditions, etc. to be considered comparable. For example, those of ordinary skill in the art will appreciate that sets of circumstances, individuals, or populations are comparable to one another when characterized by a sufficient number and type of substantially identical features to warrant a reasonable conclusion that differences in results obtained or phenomena observed under or with different sets of circumstances, individuals, or populations are caused by or indicative of the variation in those features that are varied.

Corresponding to: As used herein, the phrase "corresponding to" refers to a relationship between two entities, events, or phenomena that share sufficient features to be reasonably comparable such that "corresponding" attributes are apparent. For example, in some embodiments, the term may be used in reference to a compound or composition, to designate the position and/or identity of a structural element in the compound or composition through comparison with an appropriate reference compound or composition. For example, in some embodiments, a monomeric residue in a polymer (e.g., an amino acid residue in a polypeptide or a nucleic acid residue in a polynucleotide) may be identified as "corresponding to" a residue in an appropriate reference polymer. For example, those of ordinary skill will appreciate that, for purposes of simplicity, residues in a polypeptide are often designated using a canonical numbering system based on a reference related polypeptide, so that an amino acid "corresponding to" a residue at position 190, for example, need not actually be the $190^{th}$ amino acid in a particular amino acid chain but rather corresponds to the residue found at 190 in the reference polypeptide; those of ordinary skill in the art readily appreciate how to identify "corresponding" amino acids. For example, those skilled in the art will be aware of various sequence alignment strategies, including software programs such as, for example, BLAST, CS-BLAST, CUSASW++, DIAMOND, FASTA, GGSEARCH/GLSEARCH, Genoogle, HMMER, HHpred/HHsearch, IDF, Infernal, KLAST, USEARCH, parasail, PSI-BLAST, PSI-Search, ScalaBLAST, Sequilab, SAM, SSEARCH, SWAPHI, SWAPHI-LS, SWIMM, or SWIPE that can be utilized, for example, to identify "corresponding" residues in polypeptides and/or nucleic acids in accordance with the present disclosure.

Dosing regimen or therapeutic regimen: Those skilled in the art will appreciate that the terms "dosing regimen" and "therapeutic regimen" may be used to refer to a set of unit doses (typically more than one) that are administered individually to a subject, typically separated by periods of time. In some embodiments, a given therapeutic agent has a recommended dosing regimen, which may involve one or more doses. In some embodiments, a dosing regimen comprises a plurality of doses each of which is separated in time from other doses. In some embodiments, individual doses are separated from one another by a time period of the same length; in some embodiments, a dosing regimen comprises a plurality of doses and at least two different time periods separating individual doses. In some embodiments, all doses within a dosing regimen are of the same unit dose amount. In some embodiments, different doses within a dosing regimen are of different amounts. In some embodiments, a dosing regimen comprises a first dose in a first dose amount, followed by one or more additional doses in a second dose amount different from the first dose amount. In some embodiments, a dosing regimen comprises a first dose in a first dose amount, followed by one or more additional doses in a second dose amount same as the first dose amount. In some embodiments, a dosing regimen is correlated with a desired or beneficial outcome when administered across a relevant population (i.e., is a therapeutic dosing regimen).

Improved, increased or reduced: As used herein, the terms "improved," "increased," or "reduced,", or grammatically comparable comparative terms thereof, indicate values that are relative to a comparable reference measurement. For example, in some embodiments, an assessed value achieved with an agent of interest may be "improved" relative to that obtained with a comparable reference agent. Alternatively or additionally, in some embodiments, an assessed value achieved in a subject or system of interest may be "improved" relative to that obtained in the same subject or system under different conditions (e.g., prior to or after an event such as administration of an agent of interest), or in a different, comparable subject (e.g., in a comparable subject or system that differs from the subject or system of interest in presence of one or more indicators of a particular disease, disorder or condition of interest, or in prior exposure to a condition or agent, etc.).

Non-responder: As used herein, the term "non-responder" refers to a patient or subject that displays a lack of improvement in clinical signs and symptoms after receiving a therapy (e.g., a Chk1 inhibitor, a Wee1 inhibitor, and/or an ATR inhibitor). In some embodiments, a non-responder may show initial improvement in clinical signs and symptoms, but show a decrease in such improvement over time.

Pan or total: As used herein, the terms "pan" or "total" when referring to a particular biomarker (e.g., pan Wee1, nuclear pan Chk1, total cyclin E1, total cyclin A2) are used interchangeably and refer to the total amount of all species (e.g., all possible modified (e.g., phosphorylated) forms as well as the unmodified (e.g., non-phosphorylated) form of that biomarker in the cell or in a certain location in the cell (e.g., the nucleus for "nuclear pan Chk1").

Patient or subject: As used herein, the term "patient" or "subject" refers to any organism to which a provided composition is or may be administered, e.g., for experimental, diagnostic, prophylactic, cosmetic, and/or therapeutic purposes. Typical patients or subjects include animals (e.g., mammals such as mice, rats, rabbits, non-human primates, and/or humans). In some embodiments, a patient is a human. In some embodiments, a patient or a subject is suffering from or susceptible to one or more disorders or conditions. In some embodiments, a patient or subject displays one or more symptoms of a disorder or condition. In some embodiments, a patient or subject has been diagnosed with one or more disorders or conditions. In some embodiments, a patient or a subject is receiving or has received certain therapy to diagnose and/or to treat a disease, disorder, or condition.

Pharmaceutical composition: As used herein, the term "pharmaceutical composition" refers to an active agent, formulated together with one or more pharmaceutically acceptable carriers. In some embodiments, the active agent is present in unit dose amounts appropriate for administration in a therapeutic regimen to a relevant subject (e.g., in amounts that have been demonstrated to show a statistically significant probability of achieving a predetermined therapeutic effect when administered), or in a different, comparable subject (e.g., in a comparable subject or system that differs from the subject or system of interest in presence of one or more indicators of a particular disease, disorder or condition of interest, or in prior exposure to a condition or agent, etc.). In some embodiments, comparative terms refer to statistically relevant differences (e.g., that are of a prevalence and/or magnitude sufficient to achieve statistical relevance). Those skilled in the art will be aware, or will readily be able to determine, in a given context, a degree and/or prevalence of difference that is required or sufficient to achieve such statistical significance.

Pharmaceutically acceptable: As used herein, the phrase "pharmaceutically acceptable" refers to those compounds, materials, compositions, and/or dosage forms which are, within the scope of sound medical judgment, suitable for use in contact with the tissues of human beings and animals without excessive toxicity, irritation, allergic response, or other problem or complication, commensurate with a reasonable benefit/risk ratio.

Pharmaceutically acceptable salt: The term "pharmaceutically acceptable salt", as used herein, refers to salts of such compounds that are appropriate for use in pharmaceutical contexts, i.e., salts which are, within the scope of sound medical judgment, suitable for use in contact with the tissues of humans and lower animals without undue toxicity, irritation, allergic response and the like, and are commensurate with a reasonable benefit/risk ratio Pharmaceutically acceptable salts are well known in the art. For example, S. M. Berge et al describes pharmaceutically acceptable salts in detail in *J. Pharmaceutical Sciences*, 66: 1-19 (1977). In some embodiments, pharmaceutically acceptable salts include, but are not limited to, nontoxic acid addition salts, which are salts of an amino group formed with inorganic acids such as hydrochloric acid, hydrobromic acid, phosphoric acid, sulfuric acid and perchloric acid or with organic acids such as acetic acid, maleic acid, tartaric acid, citric acid, succinic acid or malonic acid or by using other methods used in the art such as ion exchange. In some embodiments, pharmaceutically acceptable salts include, but are not limited to, adipate, alginate, ascorbate, aspartate, benzenesulfonate, benzoate, bisulfate, borate, butyrate, camphorate, camphorsulfonate, citrate, cyclopentanepropionate, digluconate, dodecylsulfate, ethanesulfonate, formate, fumarate, glucoheptonate, glycerophosphate, gluconate, hemisulfate, heptanoate, hexanoate, hydroiodide, 2-hydroxy-ethanesulfonate, lactobionate, lactate, laurate, lauryl sulfate, malate, maleate, malonate, methanesulfonate, 2-naphthalenesulfonate, nicotinate, nitrate, oleate, oxalate, palmitate, pamoate, pectinate, persulfate. 3-phenylpropionate, phosphate, picrate, pivalate, propionate, stearate, succinate, sulfate, tartrate, thiocyanate, p-toluenesulfonate, undecanoate, valerate salts, and the like Representative alkali or alkaline earth metal salts include sodium, lithium, potassium, calcium, magnesium, and the like. In some embodiments, pharmaceutically acceptable salts include, when appropriate, nontoxic ammonium, quaternary ammonium, and amine cations formed using counterions such as halide, hydroxide, carboxylate, sulfate, phosphate, nitrate, alkyl having from 1 to 6 carbon atoms, sulfonate and aryl sulfonate.

Prevent or prevention: As used herein, the terms "prevent" or "prevention", when used in connection with the occurrence of a disease, disorder, and/or condition, refer to reducing the risk of developing the disease, disorder and/or condition and/or to delaying onset of one or more characteristics or symptoms of the disease, disorder or condition. Prevention may be considered complete when onset of a disease, disorder or condition has been delayed for a predefined period of time.

Reference: As used herein, the term "reference" describes a standard or control relative to which a comparison is performed. For example, in some embodiments, an agent, animal, individual, population, sample, sequence or value of interest is compared with a reference or control agent, animal, individual, population, sample, sequence or value. In some embodiments, a reference or control is tested and/or determined substantially simultaneously with the testing or determination of interest. In some embodiments, a reference or control is a historical reference or control, optionally embodied in a tangible medium. Typically, as would be understood by those skilled in the art, a reference or control is determined or characterized under comparable conditions or circumstances to those under assessment. Those skilled in the art will appreciate when sufficient similarities are present to justify reliance on and/or comparison to a particular possible reference or control.

Responder: As used herein, the term "responder" refers to a patient or subject that displays an improvement in clinical signs and symptoms after receiving a therapy (e.g., a Chk1 inhibitor, a Wee1 inhibitor, and/or an ATR inhibitor).

Small molecule: As used herein, the term "small molecule" means a low molecular weight organic and/or inorganic compound. In general, a "small molecule" is a molecule that is less than about 5 kilodaltons (kD) in size. In some embodiments, a small molecule is less than about 4 kD, 3 kD, about 2 kD, or about 1 kD. In some embodiments, the small molecule is less than about 800 daltons (D), about 600 D, about 500 D, about 400 D, about 300 D, about 200 D, or about 100 D. In some embodiments, a small molecule is less than about 2000 g/mol, less than about 1500 g/mol, less than about 1000 g/mol, less than about 800 g/mol, or less than about 500 g/mol. In some embodiments, a small molecule is not a polymer.

In some embodiments, a small molecule does not include a polymeric moiety. In some embodiments, a small molecule is not and/or does not comprise a protein or polypeptide (e.g., is not an oligopeptide or peptide). In some embodiments, a small molecule is not and/or does not comprise a polynucleotide (e.g., is not an oligonucleotide). In some embodiments, a small molecule is not and/or does not comprise a polysaccharide, for example, in some embodiments, a small molecule is not a glycoprotein, proteoglycan, glycolipid, etc.). In some embodiments, a small molecule is not a lipid.

In some embodiments, a small molecule is a modulating agent (e.g., is an inhibiting agent or an activating agent). In some embodiments, a small molecule is biologically active. In some embodiments, a small molecule is detectable (e g, comprises at least one detectable moiety). In some embodiments, a small molecule is a therapeutic agent.

Those of ordinary skill in the art, reading the present disclosure, will appreciate that certain small molecule compounds described herein may be provided and/or utilized in any of a variety of forms such as, for example, crystal forms (e.g., polymorphs, solvates, etc), salt forms, protected forms, pro-drug forms, ester forms, isomeric forms (e.g., optical and/or structural isomers), isotopic forms, etc.

Therapeutic agent: As used herein, the phrase "therapeutic agent" in general refers to any agent that elicits a desired pharmacological effect when administered to an organism. In some embodiments, an agent is considered to be a therapeutic agent if it demonstrates a statistically significant effect across an appropriate population. In some embodiments, the appropriate population may be a population of model organisms. In some embodiments, an appropriate population may be defined by various criteria, such as a certain age group, gender, genetic background, preexisting clinical conditions, etc. In some embodiments, a therapeutic agent is a substance that can be used to alleviate, ameliorate, relieve, inhibit, prevent, delay onset of, reduce severity of, and/or reduce incidence of one or more symptoms or features of a disease, disorder, and/or condition. In some embodiments, a "therapeutic agent" is an agent that has been or is required to be approved by a government agency before it can be marketed for administration to humans. In some embodiments, a "therapeutic agent" is an agent for which a medical prescription is required for administration to humans.

Therapeutically effective amount: As used herein, the term "therapeutically effective amount" refers to an amount of a substance (e.g., a therapeutic agent, composition, and/or formulation) that elicits a desired biological response when administered as part of a therapeutic regimen. In some embodiments, a therapeutically effective amount of a substance is an amount that is sufficient, when administered to a subject suffering from or susceptible to a disease, disorder, and/or condition, to treat, diagnose, prevent, and/or delay the onset of the disease, disorder, and/or condition. As will be appreciated by those of ordinary skill in this art, the effective amount of a substance may vary depending on such factors as the desired biological endpoint, the substance to be delivered, the target cell or tissue, etc. For example, the effective amount of compound in a formulation to treat a disease, disorder, and/or condition is the amount that alleviates, ameliorates, relieves, inhibits, prevents, delays onset of, reduces severity of and/or reduces incidence of one or more symptoms or features of the disease, disorder and/or condition. In some embodiments, a therapeutically effective amount is administered in a single dose; in some embodiments, multiple unit doses are required to deliver a therapeutically effective amount.

Treat: As used herein, the terms "treat," "treatment," or "treating" refer to any method used to partially or completely alleviate, ameliorate, relieve, inhibit, prevent, delay onset of, reduce severity of, and/or reduce incidence of one or more symptoms or features of a disease, disorder, and/or condition. Treatment may be administered to a subject who does not exhibit signs of a disease, disorder, and/or condition. In some embodiments, treatment may be administered to a subject who exhibits only early signs of the disease, disorder, and/or condition, for example, for the purpose of decreasing the risk of developing pathology associated with the disease, disorder, and/or condition.

Response-Predictive Signature

The present disclosure describes a Response-Predictive Signature that can distinguish between responder and non-responder populations to a Chk1 inhibitor, a Wee1 inhibitor, an ATR inhibitor, or a combination thereof. In some embodiments, a Response-Predictive Signature defined herein is ascertained via post-hoc analysis of a population of responder and non-responder subjects who had been administered the inhibitor.

In some embodiments, a provided Response-Predictive Signature is remarkably effective for predicting response to one or more of Chk1 inhibition therapy, Wee1 inhibition therapy, and ATR inhibition therapy in a subject. Previous attempts to identify a Response-Predictive Signature via single biomarkers, to date, have been met with limited success. The provided technologies, in contrast, consistently and reliably determine whether a subject will or will not respond to a particular therapy. In some embodiments, the provided technologies are useful for predicting response to one or more of Chk1 inhibition therapy, Wee1 inhibition therapy, and ATR inhibition therapy before any Chk1 inhibition therapy, Wee1 inhibition therapy, ATR inhibition therapy, or any combination thereof has been administered to a subject.

In some embodiments, a provided Response-Predictive Signature can discriminate between responders and non-responders based on no more than three biomarker components. As described herein, methods and systems utilize detection and quantification of a first, second, and third biomarker to determine whether a subject will respond to a Chk1 inhibitor (e.g. prexasertib), a Wee1 inhibitor, an ATR inhibitor, or a combination thereof. The present disclosure encompasses an insight that particular biomarkers in isolation are insufficient to predict response, and that it is combinations of biomarkers provided herein that provide accurate and consistent predictions as to response status for a given subject. Previous efforts to identify any single biomarker or combinations of biomarkers to predict response to a Chk1 inhibitor with the accuracy of the presently disclosed sets of biomarkers have failed.

For example, Lee, et al., reported no clear association between clinical response to prexasertib and homologous recombination deficiency (HRD) status. Lee et al., *Lancet Oncol.*, 19(2):207-215 (2018). Lee identified a potential correlation of prexasertib activity with CCNE1 amplification and/or overexpression, but the correlation was simply a trend (amplification in 2 responders) and Lee noted that prospective validation would be required to see if such correlation would hold up and no other clinical studies with prexasertib have demonstrated such correlation. Similarly, Hong et al., tracked tumor response relative to genetic markers, including waterfall plots of maximal percentage change in tumor size from baseline. Hong identified loss of function mutations in two classes of genes for responsive subjects: (1) DDR pathway genes, e.g., BRCA1, BRCA2, MRE11A, and ATR; and (2) genes known to increase replication stress, e.g., E3 ubiquitin ligases known to target cyclin E1, such as FBXW7 and PARK2, but no consistent or reliable markers were identified Hong et al., *Clin. Cancer Res.* 24(14):3263-3272(2018). Blosser et al., in an attempt "to identify molecular traits tracking with prexasertib response across the pan-cancer cell line panel genetic variants, including mutations, insertion/deletions, frame-shift alterations, splice mutations, and copy number alterations derived from whole-exome analysis" found that "[n]one of the variants identified passed a statistical cutoff." Blosser et al., *Oncotarget*, 11.216-236 (2020). Others, including Byers et al., and Gatti-Mays et al., also attempted to identify biomarkers that accurately predicted a subject's response to prexasertib, but none were found during their respective works. Byers et al., *Clin. Lung Cancer*, 22(6):531-540 (2021); Gatti-Mays, et al., *The Oncologist*, 25(6):479-e899 (2020), see also Sen et al., *Cancer Res.*, 77(14):3870-3884 (2017) (suggesting that cMYC overexpression predicts sensitivity to Chk1 inhibition in SCLC).

The present disclosure, however, overcomes the deficiencies of previous work to provide a signature that predicts response to a Chk1 inhibitor, e.g., prexasertib, with high accuracy. As described herein, such a signature (referred to as a Response-Predictive Signature) comprises analysis of certain biomarkers e.g., particular proteins and/or modified (e.g., phosphorylated) proteins which, when present in particular quantities in a tissue sample of a subject, indicate that the subject is responsive to treatment with a Chk1 inhibitor, a Wee1 inhibitor, an ATR inhibitor, or a combination thereof. For just one such example, see FIG. 5, where the Response-Predictive Signature accurately predicted response to prexasertib in a blinded, prospectively designed study when applied to pretreatment tumor biopsies from ovarian cancer patients from past trials with prexasertib, as evidenced by substantially increased median survival time of predicted responders being administered prexasertib as compared to predicted non-responders.

In some embodiments, a Response-Predictive Signature comprises detecting the presence (e.g., an amount or a level) of a first biomarker, a second biomarker, and/or a third biomarker. Once the presence of a first biomarker, a second biomarker, and/or a third biomarker is detected, analysis of the various amounts or levels of a first biomarker, a second biomarker, and/or a third biomarker are assessed according to methods described herein to provide a Response-Predictive Signature.

In some embodiments, presence of a first, second, and third biomarker is determined and compared to a first, second, and third predictive threshold (as described herein), respectively. In some embodiments, at least one of a first, second, and third biomarker is a phospho-protein biomarker or presence of a total protein. In some embodiments, at least one of a first, second, and third biomarker is detected and quantified in a particular subcellular localization of a cell. In some embodiments, at least one of a first, second, and third biomarker is detected and quantified in a particular region of interest within the tumor sample (e.g., within tumor cells only, within stromal region only, etc.) In some embodiments, at least one of a first, second, and third biomarker is detected and quantified in the nucleus of a cell. In some embodiments, each of a first, second, and third biomarker is detected and quantified in the nucleus of a cell.

In some embodiments, a Response-Predictive Signature comprises the presence of only two of a first biomarker, a second biomarker, and a third biomarker. The presence of those two biomarkers is determined and compared to their corresponding predictive threshold. In some of these embodiments, a Response-Predictive Signature comprises the presence of a first biomarker and a second biomarker. In some of these embodiments, a Response-Predictive Signature comprises the presence of a second biomarker and a third biomarker. In some of these embodiments, the Response-Predictive Signature comprises the presence of a first biomarker and a third biomarker. In some embodiments, at least one of the two biomarkers is detected and quantified in a particular subcellular localization of a cell. In some embodiments, at least one of the two biomarkers is detected and quantified in a particular region of the tumor sample (e.g. within tumor cells only, within stromal region only, etc.). In some embodiments, at least one of the two biomarkers is detected and quantified in the nucleus of a cell. In some embodiments, each of the two biomarkers is detected and quantified in the nucleus of a cell.

Each of the first, second, and third biomarkers, and their respective analyses for utilization into a Response-Predictive Signature is described below.

A First Biomarker

Chk1 activity is controlled by the upstream kinase ATR, and the ATR-Chk1 pathway controls genomic integrity via a cell cycle checkpoint mechanism. Upon DNA damage, ATR is activated and phosphorylates Chk1 at serine 317 and 345, leading to increased catalytic activity of Chk1. The increased activity promotes autophosphorylation at serine 296 Phosphorylation of this site allows Chk1 to be released from the damaged site and convey the DDR signal to its downstream targets dispersed throughout the nucleus, including e.g. Wee1. The output of this signaling cascade is pausing of the cell division cycle and repair of DNA lesions. Normal cells as well as cancer cells depend on functional ATR-Chk1 pathway for effective DDR. However, due to several common perturbations in cancer cells, including p53 loss of function and high replication stress, cancer cells rely more heavily on this pathway to survive/resolve DNA damage Chk1 inhibition promotes accumulation of replication-induced DNA damage and premature mitotic entry.

In some embodiments, a first biomarker is a phosphorylated form of Chk1. In some embodiments, a first biomarker is Chk1 that is phosphorylated at Ser280, Ser296, Ser317, or Ser345 In some embodiments, a first biomarker is a phosphorylated form of Chk2 In some embodiments, a first biomarker is Chk2 that is phosphorylated at Thr68 or Se516. In some embodiments, a first biomarker is a presence of total protein (e.g., nuclear Chk1 (i.e., nuclear pan Chk1)). In some embodiments, a first biomarker is selected from one or more of: Ser280 phosphorylated Chk1, Ser296 phosphorylated Chk1, Ser317 phosphorylated Chk1, Ser345 phosphorylated Chk1, nuclear pan Chk1, Thr68 phosphorylated Chk2, Ser516 phosphorylated Chk2, Thr383 phosphorylated Chk2, and Thr387 phosphorylated Chk2. In some embodiments, a first biomarker is selected from one or more of: Ser280 phosphorylated Chk1, Ser296 phosphorylated Chk1, Ser317 phosphorylated Chk1, nuclear pan Chk1, Thr68 phosphorylated Chk2, Ser516 phosphorylated Chk2, and Thr383 phosphorylated Chk2. In some embodiments, a first biomarker is selected from one or more of: Ser280 phosphorylated Chk1, Ser296 phosphorylated Chk1, nuclear pan Chk1, Thr68 phosphorylated Chk2, Ser516 phosphorylated Chk2, and Thr383 phosphorylated Chk2. In some embodiments, a first biomarker is Ser280 phosphorylated Chk1. In some embodiments, a first biomarker is Ser296 phosphorylated Chk1. In some embodiments, a first biomarker is Ser317 phosphorylated Chk1. In some embodiments, a first biomarker is Ser345 phosphorylated Chk1. In some embodiments, a first biomarker is nuclear Chk1. In some embodiments, a first biomarker is Thr68 phosphorylated Chk2. In some embodiments, a first biomarker is Ser516 phosphorylated Chk2. In some embodiments, a first biomarker is Thr383 phosphorylated Chk2. In some embodiments, a first biomarker is Thr387 phosphorylated Chk2.

A Second Biomarker

Kap1, also known as TRIM28, is a large multi-domain protein implicated in many cellular functions, including transcriptional repression and DDR. Via structural domains, Kap1 interacts with other proteins to facilitate formation of condensed heterochromatin and transcriptional silencing. The central part of Kap1 contains a region that mediates interaction with Heterochromatin Protein 1 (HP1). In response to DNA damage, Kap1 is phosphorylated at multiple sites, including serine 473 located near the HP1 binding site. This phosphorylation event disrupts the interaction between Kap1 and HP1, leading to slightly decondensed DNA structure and importantly provides accessibility of damaged DNA to the repair machinery. Depending on the type of damage, either Chk1 or Chk2 can phosphorylate serine 473. Kap1 is also phosphorylated at serine 824 upon DNA damage, disrupting the interaction with other types of repressor proteins.

In some embodiments, a second biomarker is a phosphorylated form of Kap1, treslin, claspin, FAM122A, Wee1, CDC25B, or FOXM1. In some embodiments, a second biomarker is a phosphorylated form of Kap1. In some embodiments, a second biomarker is a presence of total protein (e.g., Wee1 (i.e., total/pan Wee1)). In some embodiments, a second biomarker is selected from one or more of: Ser473 phosphorylated Kap1, Ser865 phosphorylated treslin, Ser743 phosphorylated TLK1, Ser612 phosphorylated RB1, Ser1310 phosphorylated MYBBP1A, Ser508 phosphorylated SETMAR, Thr2252 phosphorylated SRRM2, Ser230 phosphorylated CDC25B, Ser950 phosphorylated claspin, Ser37 phosphorylated FAM122A, Ser642 phosphorylated Wee1, total Wee1, Ser151 phosphorylated CDC25B, Ser280 phosphorylated CDC25B, Ser481 phosphorylated FOXM1, and Ser704 phosphorylated FOXM1. In some embodiments, a second biomarker is selected from one or more of Ser473 phosphorylated Kap1, Ser642 phosphorylated Wee1, pan Wee1, Ser865 phosphorylated treslin, Ser743 phosphorylated TLK1, Ser1310 phosphorylated MYBBP1A, Ser508 phosphorylated SETMAR, Thr2252 phosphorylated SRRM2, Ser230 phosphorylated CDC25B, Ser950 phosphorylated claspin, and Ser280 phosphorylated CDC25B. In some embodiments, a second biomarker is selected from one or more of: Ser473 phosphorylated Kap1, Ser642 phosphorylated Wee1, Ser865 phosphorylated treslin, Ser1310 phosphorylated MYBBP1A, Ser230 phosphorylated CDC25B, and Ser950 phosphorylated claspin. In some embodiments, a second biomarker is Ser473 phosphorylated Kap1. In some embodiments, a second biomarker is Ser865 phosphorylated treslin. In some embodiments, a second biomarker is Ser743 phosphorylated TLK1. In some embodiments, a second biomarker is Ser612 phosphorylated RB1. In some embodiments, a second biomarker is Ser1310 phosphorylated MYBBP1A. In some embodiments, a second biomarker is Ser508 phosphorylated SETMAR. In some embodiments, a second biomarker is Thr2252 phosphorylated SRRM2. In some embodiments, a second biomarker is Ser230 phosphorylated CDC25B. In some embodiments, a second biomarker is Ser950 phosphorylated claspin. In some embodiments, a second biomarker is Ser37 phosphorylated FAM122A. In some embodiments, a second biomarker is Ser642 phosphorylated Wee1 In some embodiments, a second biomarker is total Wee1. In some embodiments, a second biomarker is Ser151 phosphorylated CDC25B. In some embodiments, a second biomarker is Ser280 phosphorylated CDC25B. In some embodiments, a second biomarker is Ser481 phosphorylated FOXM1. In some embodiments, a second biomarker is Ser704 phosphorylated FOXM1.

A Third Biomarker

Cyclin E1 is a key regulator of DNA replication initiation (G1/S transition) and a major driver of replication stress in cancer. By activating cyclin-dependent kinase 2 (CDK2), the cyclin E-CDK2 complex promotes cell cycle progression through several mechanisms, including firing of DNA replication origins. Dysregulated cyclin E1 expression is common in many cancer types and can be caused by genomic amplification, transcriptional upregulation, or disruption of protein degradation. Upregulated cyclin E1 expression leads to enhanced CDK2 activity and increased DNA replication beyond the cellular capacity, leading to replication stress and genomic instability. Hence, such cancer cells are constantly in need of repairing replication-induced DNA damage for their survival, rendering them dependent on active ATR-Chk1 signaling. The SCF complex and FBXW7 regulate cyclin E1 degradation, and p27 regulates cyclin E1/CDK2 activity Thus, low expression of one or more of SCF, FBXW7, and/or p27 is likely to lead to upregulation of cyclin E1 or higher activity of cyclin E1/CDK2 complex. See e.g., Koepp et al., *Science* 294(5540):173-7 (2001); and Sheaff et al., *Genes Dev* 11(11):1464-78 (1997). This validates the use of any of these three as biomarkers (as a third biomarker) when they are less than or equal to a third predictive threshold for determining sensitivity of a subject to a therapeutic agent that is an inhibitor of expression or activity of a protein in an ATR/Chk1 signaling pathway.

In some embodiments, a third biomarker is a phosphorylated form of nucleophosmin, CDC6, or treslin. In some embodiments, a third biomarker is a presence of total protein (e.g., cyclin E1, CDC6, Cks1, Cks2, or cyclin A2). In some embodiments, a third biomarker is selected from one or more of: total cyclin E1, Ser100 phosphorylated cyclin E1, Ser103 phosphorylated cyclin E1, Ser387 phosphorylated cyclin E1, Thr395 phosphorylated cyclin E1, Thr199 phosphorylated nucleophosmin, Ser54 phosphorylated CDC6, Ser74 phosphorylated CDC6, nuclear CDC6 (i.e., pan nuclear CDC6), Ser1000 phosphorylated treslin, total Cks1 (i.e., pan Cks1), total Cks2, or total cyclin A2. In some embodiments, a third biomarker is selected from one or more of total cyclin E1, Ser100 phosphorylated cyclin E1, Ser103 phosphorylated cyclin E1, Ser387 phosphorylated cyclin E1, Thr395 phosphorylated cyclin E1, Ser54 phosphorylated CDC6, Ser74 phosphorylated CDC6, pan nuclear CDC6, Ser1000 phosphorylated treslin, total Cks1, total Cks2, and total cyclin A2. In some embodiments, a third biomarker is selected from one or more of: total cyclin E1, Ser100 phosphorylated cyclin E1, Ser103 phosphorylated cyclin E1, Ser387 phosphorylated cyclin E1, Thr395 phosphorylated cyclin E1, Ser54 phosphorylated CDC6, Ser74 phosphorylated CDC6, and total cyclin A2. In some embodiments, a third biomarker is selected from one or more of: total cyclin E1 and total cyclin A2. In some embodiments, a third biomarker is total cyclin E1. In some embodiments, a third biomarker is Ser100 phosphorylated cyclin E1. In some embodiments, a third biomarker is Ser103 phosphorylated cyclin E1. In some embodiments, a third biomarker is Ser387 phosphorylated cyclin E1. In some embodiments, a third biomarker is Thr395 phosphorylated cyclin E1. In some embodiments, a third biomarker is Thr199 phosphorylated nucleophosmin. In some embodiments, a third biomarker is Ser54 phosphorylated CDC6. In some embodiments, a third biomarker is Ser74 phosphorylated CDC6 In some embodiments, a third biomarker is pan nuclear CDC6.

In some embodiments, a third biomarker is Ser1000 phosphorylated treslin. In some embodiments, a third biomarker is total Cks1. In some embodiments, a third biomarker is total Cks2. In some embodiments, a third biomarker is total cyclin A2.

In some embodiments, a third biomarker is selected from total SCF, total FBXW7, or total p27. In some embodiments, a third biomarker is total SCF. In some embodiments, a third biomarker is total FBXW7. In some embodiments, a third biomarker is total p27.

In some embodiments, a third biomarker is not total cyclin E1 In some embodiments, a third biomarker is not Ser100 phosphorylated cyclin E1. In some embodiments, a third biomarker is not Ser103 phosphorylated cyclin E1. In some embodiments, a third biomarker is not Ser387 phosphorylated cyclin E1. In some embodiments, a third biomarker is not Thr395 phosphorylated cyclin E1.

In some embodiments, when a Response-Predictive Signature comprises the presence of only a third biomarker (and not a first or second biomarker), that third biomarker is not total cyclin E1. In some aspects of these embodiments, that third biomarker is not Ser100 phosphorylated cyclin E1 In some aspects of these embodiments, that third biomarker is not Ser103 phosphorylated cyclin E1. In some aspects of these embodiments, that third biomarker is not Ser387 phosphorylated cyclin E1. In some aspects of these embodiments, that third biomarker is not Thr395 phosphorylated cyclin E1.

Biomarker Combinations

In some embodiments, a first biomarker is Ser296 phosphorylated Chk1, a second biomarker is Ser473 phosphorylated Kap1, and a third biomarker is selected from total cyclin E1, Ser100 phosphorylated cyclin E1, Ser103 phosphorylated cyclin E1, Ser387 phosphorylated cyclin E1, Thr395 phosphorylated cyclin E1. Thr199 phosphorylated nucleophosmin, Ser54 phosphorylated CDC6, Ser74 phosphorylated CDC6, pan nuclear CDC6, Ser1000 phosphorylated treslin, total Cks1, total Cks2, and total cyclin A2.

In some embodiments, a first biomarker is Ser296 phosphorylated Chk1, a third biomarker is total cyclin E1, and a second biomarker is selected from Ser473 phosphorylated Kap1, Ser865 phosphorylated treslin, Ser743 phosphorylated TLK1, Ser612 phosphorylated RB1, Ser1310 phosphorylated MYBBP1A, Ser508 phosphorylated SETMAR, Thr2252 phosphorylated SRRM2, Ser230 phosphorylated CDC25B, Ser950 phosphorylated claspin. Ser37 phosphorylated FAM122A, Ser642 phosphorylated Wee1, total Wee1, Ser151 phosphorylated CDC25B, Ser280 phosphorylated CDC25B, Ser481 phosphorylated FOXM1, and Ser704 phosphorylated FOXM1.

In some embodiments, a second biomarker is Ser473 phosphorylated Kap1, a third biomarker is total cyclin E1, and a first biomarker is selected from Ser280 phosphorylated Chk1, Ser296 phosphorylated Chk1, Ser317 phosphorylated Chk1, Ser345 phosphorylated Chk1, nuclear Chk1, Thr68 phosphorylated Chk2, Ser516 phosphorylated Chk2, Thr383 phosphorylated Chk2, and Thr387 phosphorylated Chk2.

In some embodiments, the first, second, and third biomarker combination is selected from any one of the combinations set forth in Table A, below:

TABLE A

Exemplary Biomarker Combinations

| # | Biomarker 1 | Biomarker 2 | Biomarker 3 |
|---|---|---|---|
| 1 | Ser280 phosphorylated Chk1 | Ser473 phosphorylated Kap1 | total cyclin E1 |
| 2 | Ser280 phosphorylated Chk1 | Ser473 phosphorylated Kap1 | total cyclin A2 |
| 3 | Ser280 phosphorylated Chk1 | Ser642 phosphorylated Wee1 | total cyclin E1 |
| 4 | Ser280 phosphorylated Chk1 | Ser642 phosphorylated Wee1 | total cyclin A2 |
| 5 | Ser280 phosphorylated Chk1 | Ser865 phosphorylated treslin | total cyclin E1 |
| 6 | Ser280 phosphorylated Chk1 | Ser865 phosphorylated treslin | total cyclin A2 |
| 7 | Ser280 phosphorylated Chk1 | Ser1310 phosphorylated MYBBP1A | total cyclin E1 |
| 8 | Ser280 phosphorylated Chk1 | Ser1310 phosphorylated MYBBP1A | total cyclin A2 |
| 9 | Ser280 phosphorylated Chk1 | Ser230 phosphorylated CDC25B | total cyclin E1 |
| 10 | Ser280 phosphorylated Chk1 | Ser230 phosphorylated CDC25B | total cyclin A2 |
| 11 | Ser280 phosphorylated Chk1 | Ser950 phosphorylated claspin | total cyclin E1 |
| 12 | Ser280 phosphorylated Chk1 | Ser950 phosphorylated claspin | total cyclin A2 |
| 13 | Ser296 phosphorylated Chk1 | Ser473 phosphorylated Kap1 | total cyclin E1 |
| 14 | Ser296 phosphorylated Chk1 | Ser473 phosphorylated Kap1 | total cyclin A2 |
| 15 | Ser296 phosphorylated Chk1 | Ser642 phosphorylated Wee1 | total cyclin E1 |
| 16 | Ser296 phosphorylated Chk1 | Ser642 phosphorylated Wee1 | total cyclin A2 |
| 17 | Ser296 phosphorylated Chk1 | Ser865 phosphorylated treslin | total cyclin E1 |
| 18 | Ser296 phosphorylated Chk1 | Ser865 phosphorylated treslin | total cyclin A2 |
| 19 | Ser296 phosphorylated Chk1 | Ser1310 phosphorylated MYBBP1A | total cyclin E1 |
| 20 | Ser296 phosphorylated Chk1 | Ser1310 phosphorylated MYBBP1A | total cyclin A2 |
| 21 | Ser296 phosphorylated Chk1 | Ser230 phosphorylated CDC25B | total cyclin E1 |
| 22 | Ser296 phosphorylated Chk1 | Ser230 phosphorylated CDC25B | total cyclin A2 |
| 23 | Ser296 phosphorylated Chk1 | Ser950 phosphorylated claspin | total cyclin E1 |
| 24 | Ser296 phosphorylated Chk1 | Ser950 phosphorylated claspin | total cyclin A2 |
| 25 | nuclear pan Chk1 | Ser473 phosphorylated Kap1 | total cyclin E1 |
| 26 | nuclear pan Chk1 | Ser473 phosphorylated Kap1 | total cyclin A2 |
| 27 | nuclear pan Chk1 | Ser642 phosphorylated Wee1 | total cyclin E1 |
| 28 | nuclear pan Chk1 | Ser642 phosphorylated Wee1 | total cyclin A2 |
| 29 | nuclear pan Chk1 | Ser865 phosphorylated treslin | total cyclin E1 |
| 30 | nuclear pan Chk1 | Ser865 phosphorylated treslin | total cyclin A2 |
| 31 | nuclear pan Chk1 | Ser1310 phosphorylated MYBBP1A | total cyclin E1 |
| 32 | nuclear pan Chk1 | Ser1310 phosphorylated MYBBP1A | total cyclin A2 |
| 33 | nuclear pan Chk1 | Ser230 phosphorylated CDC25B | total cyclin E1 |
| 34 | nuclear pan Chk1 | Ser230 phosphorylated CDC2SB | total cyclin A2 |
| 35 | nuclear pan Chk1 | Ser950 phosphorylated claspin | total cyclin E1 |
| 36 | nuclear pan Chk1 | Ser950 phosphorylated claspin | total cyclin A2 |
| 37 | Thr68 phosphorylated Chk2 | Ser473 phosphorylated Kap1 | total cyclin E1 |

TABLE A-continued

Exemplary Biomarker Combinations

| # | Biomarker 1 | Biomarker 2 | Biomarker 3 |
|---|---|---|---|
| 38 | Thr68 phosphorylated Chk2 | Ser473 phosphorylated Kap1 | total cyclin A2 |
| 39 | Thr68 phosphorylated Chk2 | Ser642 phosphorylated Wee1 | total cyclin E1 |
| 40 | Thr68 phosphorylated Chk2 | Ser642 phosphorylated Wee1 | total cyclin A2 |
| 41 | Thr68 phosphorylated Chk2 | Ser865 phosphorylated treslin | total cyclin E1 |
| 42 | Thr68 phosphorylated Chk2 | Ser865 phosphorylated treslin | total cyclin A2 |
| 43 | Thr68 phosphorylated Chk2 | Ser1310 phosphorylated MYBBP1A | total cyclin E1 |
| 44 | Thr68 phosphorylated Chk2 | Ser1310 phosphorylated MYBBP1A | total cyclin A2 |
| 45 | Thr68 phosphorylated Chk2 | Ser230 phosphorylated CDC25B | total cyclin E1 |
| 46 | Thr68 phosphorylated Chk2 | Ser230 phosphorylated CDC25B | total cyclin A2 |
| 47 | Thr68 phosphorylated Chk2 | Ser950 phosphorylated claspin | total cyclin E1 |
| 48 | Thr68 phosphorylated Chk2 | Ser950 phosphorylated claspin | total cyclin A2 |
| 49 | Ser516 phosphorylated Chk2 | Ser473 phosphorylated Kap1 | total cyclin E1 |
| 50 | Ser516 phosphorylated Chk2 | Ser473 phosphorylated Kap1 | total cyclin A2 |
| 51 | Ser516 phosphorylated Chk2 | Ser642 phosphorylated Wee1 | total cyclin E1 |
| 52 | Ser516 phosphorylated Chk2 | Ser642 phosphorylated Wee1 | total cyclin A2 |
| 53 | SerS16 phosphorylated Chk2 | Ser865 phosphorylated treslin | total cyclin E1 |
| 54 | Ser516 phosphorylated Chk2 | Ser865 phosphorylated treslin | total cyclin A2 |
| 55 | Ser516 phosphorylated Chk2 | Ser1310 phosphorylated MYBBP1A | total cyclin E1 |
| 56 | Ser516 phosphorylated Chk2 | Ser1310 phosphorylated MYBBP1A | total cyclin A2 |
| 57 | Ser516 phosphorylated Chk2 | Ser230 phosphorylated CDC25B | total cyclin E1 |
| 58 | Ser516 phosphorylated Chk2 | Ser230 phosphorylated CDC25B | total cyclin A2 |
| 59 | Ser516 phosphorylated Chk2 | Ser950 phosphorylated claspin | total cyclin E1 |
| 60 | Ser516 phosphorylated Chk2 | Ser950 phosphorylated claspin | total cyclin A2 |
| 61 | Thr383 phosphorylated Chk2 | Ser473 phosphorylated Kap1 | total cyclin E1 |
| 62 | Thr383 phosphorylated Chk2 | Ser473 phosphorylated Kap1 | total cyclin A2 |
| 63 | Thr383 phosphorylated Chk2 | Ser642 phosphorylated Wee1 | total cyclin E1 |
| 64 | Thr383 phosphorylated Chk2 | Ser642 phosphorylated Wee1 | total cyclin A2 |
| 65 | Thr383 phosphorylated Chk2 | Ser865 phosphorylated treslin | total cyclin E1 |
| 66 | Thr383 phosphorylated Chk2 | Ser865 phosphorylated treslin | total cyclin A2 |
| 67 | Thr383 phosphorylated Chk2 | Ser1310 phosphorylated MYBBP1A | total cyclin E1 |
| 68 | Thr383 phosphorylated Chk2 | Ser1310 phosphorylated MYBBP1A | total cyclin A2 |
| 69 | Thr383 phosphorylated Chk2 | Ser230 phosphorylated CDC25B | total cyclin E1 |
| 70 | Thr383 phosphorylated Chk2 | Ser230 phosphorylated CDC25B | total cyclin A2 |
| 71 | Thr383 phosphorylated Chk2 | Ser950 phosphorylated claspin | total cyclin E1 |
| 72 | Thr383 phosphorylated Chk2 | Ser950 phosphorylated claspin | total cyclin A2 |

In some embodiments, a first biomarker is Ser296 phosphorylated Chk1, a second biomarker is Ser473 phosphorylated Kap1, and a third biomarker is total cyclin E1.

A Background Threshold

As described herein, detection of each biomarker (e.g., each of a first, second, or third biomarker) utilized in the methods disclosed herein is analyzed relative to a background threshold for that biomarker. A background threshold, in some embodiments, represents a level of a particular biomarker (e.g., a signal level) in a cell (e.g., in a cell nucleus) that is considered background noise. When a cell in a tissue sample comprises a biomarker above its background threshold, that cell is considered to be "positive" for that particular biomarker. Each biomarker will have its own background threshold.

In some embodiments, a background threshold is established for a given biomarker based upon biomarker signal intensity observed in tumor samples from multiple subjects who responded poorly or not at all to a Chk1 inhibitor, a Wee1 inhibitor, an ATR inhibitor, or a combination thereof for which the assay is intended. In some embodiments, a background threshold is established for a given biomarker based upon biomarker signal intensity observed in multiple tumor samples having the lowest overall signal intensity. In some embodiments, a background threshold is established for a given biomarker based upon biomarker signal intensity observed in multiple samples of normal (non-tumor) cells. In some embodiments, a background threshold is established by selecting several samples that are negative for the biomarker expression and several samples that are positive for biomarker expression. One can then establish a background threshold that, when applied to samples negative for biomarker expression, results in less than 1% (or other value deemed suitable for scores from biomarker negative samples) of the cells in that sample being above that background threshold. When the selected background threshold is applied to sample positive for biomarker expression, the number of cells above that background threshold should be significantly higher than in the biomarker-negative cells and consistent with degree of the biomarker expression. In some embodiments, a background threshold is a number of cells having a biomarker signal. In some embodiments, a background threshold is an overall signal intensity in a sample. In some embodiments, a background threshold is established as described in Example 7.

Cells within a sample (or an overall sample, depending upon the method of establishing a background threshold) that are determined to be at or above the background threshold are quantified, and considered to be "positive".

A Biomarker Score

As described herein, each biomarker (e.g., each of a first, second, or third biomarker) utilized in methods disclosed herein is analyzed to generate a score for that biomarker (e.g., a first, second, or third biomarker score). For the avoidance of doubt, as used herein, a first biomarker score refers to a biomarker score determined from a first biomarker as described herein, a second biomarker score refers to a biomarker score determined from a second biomarker as described herein, and a third biomarker score refers to a biomarker score determined from a third biomarker as described herein. In some embodiments, cells from a biological sample of a subject that have a first, second, or third biomarker above a background threshold (i.e., cells that are positive for a particular biomarker; e.g., cells that are positive for a particular biomarker in their nuclei) are quantified. The quantity of positive cells for each of a first, second, and/or third biomarker (e.g., a percentage of positive cells relative to total cells in the sample) is quantified as a first, second, and/or third biomarker score, respectively.

In some embodiments, a first, second, and/or third biomarker score is the percentage of positive cells relative to the total cells in a sample for a first, second, and/or third biomarker. Such a biomarker score is referred to herein as a "standard" scoring method. In some embodiments, a first biomarker score is the percentage of positive cells relative to the total cells in a sample for a first biomarker. In some embodiments, a second biomarker score is the percentage of positive cells relative to the total cells in a sample for a second biomarker. In some embodiments, a third biomarker score is the percentage of positive cells relative to the total cells in a sample for a third biomarker.

The present disclosure recognizes that there are multiple ways to generate a biomarker score. In some embodiments, the intensity of signal in a cell, as measured by assay methods described herein (e.g., immunofluorescence assay), for each of a first, second, and/or third biomarker is quantified and used to generate a first, second, and/or third biomarker score. Such a biomarker score is referred to herein as an "intensity" scoring method. In some embodiments, the intensity of signal in a cell is the intensity of signal in a subcellular location (e.g., the intensity of signal in a cell nucleus). For example, in some embodiments, a biomarker score can be generated with a weighted intensity distribution of cells in a sample. This is achieved by calculating the percent bin distribution of cellular signal intensity. Each signal intensity bin is assigned a coefficient (weight) that is dependent on biomarker signal intensity range for this bin (e.g., such that bins with lowest intensities have lowest coefficients and bins with highest intensity have highest coefficients). The percentage of cells in each bin is multiplied by its bin coefficient (weight). The final biomarker score is calculated as sum of these multiplications. For example, a biomarker cellular signal range is between 0 and 30, and the background threshold is 3. The cellular signal range is split into three bins, where bin 1 is 3 to 10, bin 2 is >10 to 20, and bin 3 is >20 to 30 Bin 1 is assigned a coefficient of 0.1, bin 2 is assigned coefficient 1, and bin 3 is assigned coefficient 10. A sample with 10% of positive cells all belonging to bin 1 will have a score of 10%*0.1=1%. Another sample with 3% of positive cells all belonging to bin 3 will have a score of 3%*10=30%. Accordingly, a sample having fewer positive cells but at a higher signal intensity for a biomarker can have a higher biomarker score than a sample having more positive cells but at a lower signal intensity. In some embodiments, characteristics of the distribution of cellular intensity measurements may be used to generate scores, such as median, mean, mode, and quantiles, including the 80%, 85%, 90%, 91%, 92%, 93%, 94%, 95%, 96%, 97%, 98%, and 99% quantiles.

In some embodiments, a first, second, and/or third biomarker score is determined from a weighted intensity distribution of cells in a sample for a first, second, and/or third biomarker. In some embodiments, a first biomarker score is determined from a weighted intensity distribution of cells in a sample for a first biomarker. In some embodiments, a second biomarker score is determined from a weighted intensity distribution of cells in a sample for a second biomarker. In some embodiments, a third biomarker score is determined from a weighted intensity distribution of cells in a sample for a third biomarker.

In some embodiments, weights used to generate a biomarker score from a weighted intensity distribution are specific to the biomarker. In some embodiments, weights used to generate a biomarker score from a weighted intensity distribution are constants. In some embodiments, weights used to generate a biomarker score from a weighted intensity distribution are determined using a function based on the signal intensity range of each bin.

In some embodiments, each of a first, second, and/or third biomarker score is determined using the same method (e.g., a standard scoring method or an intensity scoring method). In some embodiments, different methods can be used to calculate each of a first, second, and/or third biomarker score. For example, in some embodiments, each of a first and second biomarker score is determined by a standard scoring method, and a third biomarker score is determined by an intensity scoring method. In some embodiments, each of a first and third biomarker score is determined by a standard scoring method, and a second biomarker score is determined by an intensity scoring method. In some embodiments, each of a second and third biomarker score is determined by a standard scoring method, and a first biomarker score is determined by an intensity scoring method. In some embodiments, a first biomarker score is determined by a standard scoring method, and each of a second and third biomarker score is determined by an intensity scoring method. In some embodiments, a second biomarker score is determined by a standard scoring method, and each of a first and third biomarker score is determined by an intensity scoring method. In some embodiments, a third biomarker score is determined by a standard scoring method, and each of a first and second biomarker score is determined by an intensity scoring method.

In some embodiments, the present disclosure encompasses the insight that standard scoring and intensity scoring methods can each be used on a given bionarker to detect a Response-Predictive Signature (e.g., to determine whether a patient is or is not a responder to Chk1 inhibitor therapy, Wee1 inhibitor therapy, ATR inhibitor therapy, or a combination thereof). For example, in some embodiments, a given biomarker can have two biomarker scores, where one biomarker score is determined by a standard scoring method, and the other biomarker score is determined by an intensity scoring method. In some embodiments, at least two biomarker scores are generated for a first biomarker. In some embodiments, at least two biomarker scores are generated for a second biomarker. In some embodiments, at least two biomarker scores are generated for a third biomarker.

Those of skill in the art will appreciate that standard scoring is a variation of intensity scoring. For example, depending on the selected weights, biomarker scores based on weighted signal intensity distributions can be equivalent to a biomarker score based on percentage of positive cells. That is, standard scoring is equivalent to assigning the same weight to all signal intensity bins that are greater than a background threshold. Similarly, those of skill in the art will appreciate that background thresholds are a form of intensity scoring. That is, a background threshold is equivalent to assigning a weight of 0 to all signal intensity range bins that are below the background threshold.

In some embodiments, the present disclosure encompasses the insight that two or more biomarker scores can be combined (e.g., typically by summing the biomarker scores) to generate a composite score to detect a Response-Predictive Signature (e.g., to determine whether a patient is or is not a responder to Chk1 inhibitor therapy, Wee1 inhibitor therapy, or ATR inhibitor therapy, or a combination thereof). Use of a composite score can allow for detection of a Response-Predictive Signature that may have a lower value for one biomarker score, but a higher value for another biomarker score. For example, a tissue sample from a subject that comprises cells having a first and third biomarker score above a first and third predictive threshold, but a second biomarker score below a second predictive threshold can still be accurately predicted as responsive, depending on a composite score determined by combining the first, second, and third biomarker scores.

In some embodiments, one or more biomarker scores used to generate the composite score is a transformed biomarker score calculated by using a nonlinear transformation of the original biomarker score using a logarithmic or logistic function. In some embodiments, one or more biomarker scores is weighted prior to being used to generate the composite score. In some embodiments, a first, second, and/or third biomarker scores can be weighted differently for the purposes of determining a composite score. In some embodiments, a first, second, and third biomarker scores are weighted the same. In some embodiments, a first, second, and third biomarker scores are each weighted differently. In some embodiments, each of a first, second, and third biomarker score is weighted 1× when used to determine a composite score. In some embodiments, a first and second biomarker score are weighted 1×, and a third biomarker score is weighted 2× when used to determine a composite score. In some embodiments, a first and third biomarker score are weighted 1×, and a second biomarker score is weighted 2× when used to determine a composite score. In some embodiments, a second and third biomarker score are weighted 1×, and a first biomarker score is weighted 2× when used to determine a composite score.

In some embodiments, a composite score is by combining biomarker scores for each of a first, second, and third biomarker. In some embodiments, a composite score is generated by combining biomarker scores from only two of a first, second, and third biomarker. In some embodiments, a composite score is generated by combining biomarker scores from a first and second biomarker. In some embodiments, a composite score is generated by combining biomarker scores from a first and third biomarker. In some embodiments, a composite score is generated by combining biomarker scores from a second and third biomarker.

A Predictive Threshold

Once biomarker scores are determined for each biomarker to be assessed, analysis of each biomarker score against a corresponding relative threshold is performed to determine whether the patient is a predicted responder or non-responder to Chk1 inhibition therapy, Wee1 inhibition therapy, ATR inhibition therapy, or a combination thereof. The identified threshold is referred to herein as a "predictive threshold".

In some embodiments, when a sample comprises a first, second, and/or third biomarker each associated with a first, second, and/or third biomarker score above (or below for those third biomarkers that are deemed positive when their biomarker score is below a predictive threshold) a corresponding predictive threshold for each biomarker (depending upon whether subject selection requires a particular biomarker score associated with such sample to be above a particular predictive threshold or below in the case of certain third biomarkers), a subject is predicted to be responsive to Chk1 inhibition therapy, Wee1 inhibition therapy, ATR inhibition therapy, or a combination thereof. In some embodiments, a tissue sample of a subject is determined to indicate responsiveness to Chk1 inhibition therapy, Wee1 inhibition therapy, ATR inhibition therapy, or a combination thereof when the sample comprises one, two, three, or more biomarkers (e.g., a first, a second, and a third biomarker), wherein each biomarker is associated with a biomarker score that is greater than or equal to a corresponding predictive threshold for that biomarker score.

It is also understood that, as used throughout the present application, a percentage with respect to a predictive threshold can also be written as a ratio (i.e., 3% is the same as 0.03, 5% is the same as 0.05, 50% is the same as 0.50, etc.).

A predictive threshold, as described herein, in some embodiments, is derived from retrospective analysis of known populations of subjects who have been administered Chk1 inhibition therapy, Wee1 inhibition therapy, or ATR inhibition therapy, or a combination thereof. For example, in some embodiments, a predictive threshold is derived by analysis of samples from prior subjects who have received Chk1 inhibition therapy, Wee1 inhibition therapy, or ATR inhibition therapy, or a combination thereof, and who have been clinically determined to be either responsive or non-responsive. In some embodiments, a predictive threshold is derived from cancer cell lines or PDX models.

As described herein, reference to a "first" predictive threshold corresponds to a predictive threshold for a first biomarker score, derived from an analysis of a first biomarker, as described herein. Similarly, a "second" predictive threshold corresponds to a predictive threshold for a second biomarker score, derived from an analysis of a second biomarker, as described herein; and a "third" predictive threshold corresponds to a predictive threshold for a third biomarker score, derived from an analysis of a third biomarker, as described herein.

In some embodiments, a first predictive threshold is met when a tissue sample of a subject comprises a first biomarker associated with a first biomarker score that is greater than or equal to the first predictive threshold, and where the first biomarker score is determined using a standard scoring method. In some embodiments, a first predictive threshold is met when a first biomarker score is about 3% or greater. In some embodiments, a first predictive threshold is met when a first biomarker score is about 4% or greater. In some embodiments, a first predictive threshold is met when a first biomarker score is about 5% or greater. In some embodiments, a first predictive threshold is met when a first biomarker score is about 6% or greater. In some embodiments, a first predictive threshold is met when a first biomarker score is about 7% or greater. In some embodiments, a first predictive threshold is met when a first biomarker score is about 8% or greater. In some embodiments, a first predictive threshold is met when a first biomarker score is about 9% or greater. In some embodiments, a first predictive threshold is met when a first biomarker score is about 10% or greater. In some embodiments, a first predictive threshold is met when a first biomarker score is about 20% or greater. In some embodiments, a first predictive threshold is met when a first biomarker is met when a first biomarker score is about 30% or greater. In some embodiments, a first predictive threshold is met when a first biomarker score is about 40% or greater. In some embodiments, a first predictive threshold is met when a first biomarker score is about 50% or greater. In some embodiments, a first predictive threshold is met when a first biomarker score is about 60% or greater. In some embodiments, a first predictive threshold is met when a first biomarker score is about 70% or greater. In some embodiments, a first predictive threshold is met when a first biomarker score is about 80% or greater. In some embodiments, a first predictive threshold is met when a first biomarker score is about 90% or greater.

In some embodiments, a second predictive threshold is met when a tissue sample of a subject comprises a second biomarker associated with a second biomarker score that is greater than or equal to the second predictive threshold, and where the second biomarker score is determined using a standard scoring method. In some embodiments, a second predictive threshold is met when a second biomarker score is about 3% or greater. In some embodiments, a second predictive threshold is met when a second biomarker score is about 4% or greater. In some embodiments, a second predictive threshold is met when a second biomarker score is about 5% or greater. In some embodiments, a second predictive threshold is met when a second biomarker score is about 6% or greater. In some embodiments, a second predictive threshold is met when a second biomarker score is about 7% or greater. In some embodiments, a second predictive threshold is met when a second biomarker score is about 8% or greater. In some embodiments, a second predictive threshold is met when a second biomarker score is about 9% or greater. In some embodiments, a second predictive threshold is met when a second biomarker score is about 10% or greater. In some embodiments, a second predictive threshold is met when a second biomarker score is about 20% or greater. In some embodiments, a second predictive threshold is met when a second biomarker score is about 30% or greater. In some embodiments, a second predictive threshold is met when a second biomarker score is about 40% or greater. In some embodiments, a second predictive threshold is about met when a second biomarker score is 50% or greater. In some embodiments, a second predictive threshold is met when a second biomarker score is about 60% or greater. In some embodiments, a second predictive threshold is met when a second biomarker score is about 70% or greater. In some embodiments, a second predictive threshold is met when a second biomarker score is about 80% or greater. In some embodiments, a second predictive threshold is met when a second biomarker score is about 90% or greater.

In some embodiments, a third predictive threshold is met when a tissue sample of a subject comprises a third biomarker associated with a third biomarker score that is greater than or equal to the third predictive threshold, and where the third biomarker score is determined using a standard scoring method. In some embodiments, a third predictive threshold is met when a third biomarker score is about 3% or greater. In some embodiments, a third predictive threshold is met when a third biomarker score is about 4% or greater. In some embodiments, a third predictive threshold is met when a third biomarker score is about 5% or greater. In some embodiments, a third predictive threshold is met when a third biomarker score is about 6% or greater. In some embodiments, a third predictive threshold is met when a third biomarker score is about 7% or greater. In some embodiments, a third predictive threshold is met when a third biomarker score is about 8% or greater. In some embodiments, a third predictive threshold is met when a third biomarker score is about 9%/6 or greater. In some embodiments, a third predictive threshold is met when a third biomarker score is about 10% or greater. In some embodiments, a third predictive threshold is met when a third biomarker score is about 20% or greater. In some embodiments, a third predictive threshold is met when a third biomarker score is about 30% or greater. In some embodiments, a third predictive threshold is met when a third biomarker score is about 40% or greater. In some embodiments, a third predictive threshold is met when a third biomarker score is about 50% or greater. In some embodiments, a third predictive threshold is met when a third biomarker score is about 60% or greater. In some embodiments, a third predictive threshold is met when a third biomarker score is about 70% or greater. In some embodiments, a third predictive threshold is met when a third biomarker score is about 80% or greater. In some embodiments, a third predictive threshold is met when a third biomarker score is about 90% or greater.

In some embodiments, a third predictive threshold is met when a tissue sample of a subject comprises a third biomarker associated with a third biomarker score that is less than or equal to the third predictive threshold, and where the third biomarker score is determined using a standard scoring method. In some embodiments, a third predictive threshold is met when a third biomarker score is about 50% or less. In some embodiments, a third predictive threshold is met when a third biomarker score is about 40% or less. In some embodiments, a third predictive threshold is met when a third biomarker score is about 30% or less. In some embodiments, a third predictive threshold is met when a third biomarker score is about 20% or less. In some embodiments, a third predictive threshold is met when a third biomarker score is about 10% or less. In some embodiments, a third predictive threshold is about 5% or less.

In some embodiments, a first, second, and third predictive threshold are met when a first, second, and third biomarker score are each 3% or greater. In some embodiments, a first, second, or third predictive threshold are met when a first, second, or third biomarker score is about 3% to about 25%. In some embodiments, a subject is responsive when a first predictive threshold is 5% or greater, a second threshold is 5% or greater, and a third predictive threshold is 30% or less.

In some embodiments, a subject is determined to be responsive when a sample of the subject's cells comprise a first, second, and third biomarker, wherein the first biomarker is detected with a first biomarker score at a first predictive threshold of an amount that is 5% or greater, the second biomarker is detected with a second biomarker score at a second predictive threshold of an amount that is 30% or greater, and the third biomarker is detected with a third biomarker score at a third predictive threshold of an amount that is 5% or greater.

In some embodiments, a subject is determined to be responsive when a sample of the subject's cells comprise a first, second, and third biomarker, wherein the first biomarker is detected with a first biomarker score at a first predictive threshold of an amount that is 5% or greater, the second biomarker is detected with a second biomarker score at a second predictive threshold of an amount that is 5% or greater, and the third biomarker is detected with a third biomarker score at a third predictive threshold of an amount that is 5% or greater. In some aspects of these embodiments, the first biomarker is detected with a first biomarker score at a first predictive threshold of an amount that is between 5% and 10% (e.g., 5%, 6%, 7%, 8%, 9%, or 10%), the second biomarker is detected with a second biomarker score at a second predictive threshold of an amount that is between 5% and 10% (e.g., 5%, 6%, 7%, 8%, 9%, or 10%), and the third biomarker is detected with a third biomarker score at a third predictive threshold of an amount that is between 5% and 10% (e.g., 5%, 6%, 7%, 8%, 9%, or 10%). In some more specific aspects of these embodiments, the first biomarker is detected with a first biomarker score at a first predictive threshold of 5%, the second biomarker is detected with a second biomarker score at a second predictive threshold of 5%, and the third biomarker is detected with a third biomarker score at a third predictive threshold of 5%.

As described above, the present disclosure recognizes that there are multiple ways to generate a biomarker score (e.g., by using a standard scoring method, or by using an intensity scoring method), and thus two or more biomarker scores may be used for a given biomarker. In some embodiments, for a given biomarker having two or more biomarker scores, each of the biomarker scores for the biomarker must meet its corresponding predictive threshold in order to determine that a subject is a predicted responder to Chk1 inhibition therapy, Wee1 inhibition therapy, ATR inhibition therapy, or a combination thereof. In some embodiments, for a given biomarker having two or more biomarker scores, at least one of the biomarker scores for the biomarker must meet a corresponding predictive threshold in order to determine that a subject is a predicted responder to Chk1 inhibition therapy, Wee1 inhibition therapy. ATR inhibition therapy, or a combination thereof. For example, in some embodiments, the present disclosure provides a method of treating a disease, disorder, or condition, the method comprising a step of: administering a Chk1 inhibitor, a Wee1 inhibitor, an ATR inhibitor, or a combination thereof to a subject whose tissue sample has been determined to be associated with (a) a first biomarker associated with (i) a biomarker score, determined using a standard scoring method, that is greater than or equal to a corresponding predictive threshold, and/or (ii) a biomarker score, determined using an intensity scoring method, that is greater than or equal to a corresponding predictive threshold; (b) a second biomarker associated with (i) a biomarker score, determined using a standard scoring method, that is greater than or equal to a corresponding predictive threshold, and/or (ii) a biomarker score, determined using an intensity scoring method, that is greater than or equal to a corresponding predictive threshold, and (c) a third biomarker associated with (i) a biomarker score, determined using a standard scoring method, that is greater than or equal to a corresponding predictive threshold, and/or (ii) a biomarker score, determined using an intensity scoring method, that is greater than or equal to a corresponding predictive threshold.

As described above, the present disclosure recognizes that two or more biomarker scores can be combined to generate a composite score to detect a Response-Predictive Signature. In some embodiments, a predictive threshold is a relative threshold against which a composite score is analyzed to determine whether a subject is a predicted responder to Chk1 inhibition therapy, Wee1 inhibition therapy, ATR inhibition therapy, or a combination thereof. The identified threshold is referred to herein as a "composite threshold".

For example, a composite score may be determined for a patient sample having ¼ or 25% of cells positive for each of a first, a second and a third biomarker by taking the sum of the biomarker scores, as determined using a standard scoring method, for each of the three biomarkers after the second biomarker score is multiplied by 2. In such an example, the sample would have a composite score of 0.25+(2*0.25)+0.25=1.0. If a composite threshold is 0.9 or greater, then the patient having a composite score of 1.0 would be predicted to be a responder to Chk1 inhibition therapy, Wee1 inhibition therapy, ATR inhibition therapy, or a combination thereof.

As described herein, a composite score corresponds to a composite threshold for responsiveness. In some embodiments, a composite threshold is met when a tissue sample of a subject comprises two or more of a first, second, and third biomarker associated with a composite score that is greater than or equal to the composite threshold. In some embodiments, a composite threshold is met when a composite score is 0.9 or greater. In some embodiments, a composite threshold is met when a composite score is 1.0 or greater. In some embodiments, a composite threshold is met when a composite score is 1.2 or greater. In some embodiments, a composite threshold is met when a composite score is 1.5 or greater. In some embodiments, a composite threshold is met when a composite score is 1.7 or greater. In some embodiments, a composite threshold is met when a composite score is 2.0 or greater. In some embodiments, a composite threshold is met when a composite score is 2.2 or greater. In some embodiments, a composite threshold is met when a composite score is 2.5 or greater. In some embodiments, a composite threshold is met when a composite score is 2.7 or greater. In some embodiments, a composite threshold is met when a composite score is 3.0 or greater.

It is also understood that, in some embodiments, detection of two of three biomarkers each at a biomarker score above a predictive threshold, or, combined (e.g., in sum) as a composite score above a composite threshold, are sufficient to predict response to a Chk1 inhibitor, a Wee1 inhibitor, an ATR inhibitor, or a combination thereof. In some embodiments, a first biomarker and a second biomarker are detected having a first and a second biomarker score above a first and second predictive threshold. In some embodiments, a first biomarker and a third biomarker are detected having a first and a third biomarker score above a first and third predictive threshold. In some embodiments, a second biomarker and a third biomarker are detected having a second and a third biomarker score above a second and third predictive threshold. In some embodiments, a predictive threshold for a given biomarker is higher for that biomarker when only two biomarkers are used instead of three. By way of example, a first predictive threshold for a first biomarker can be 5%, 10%, 15%, 20%, etc. higher, when used in conjunction with only one other biomarker, than a first predictive threshold when all three biomarkers are detected.

It is also understood that, in some embodiments, detection of one of three biomarkers at a biomarker score above a predictive threshold is sufficient to predict response to a Chk1 inhibitor, a Wee1 inhibitor, an ATR inhibitor, or a combination thereof. In some embodiments, a first biomarker is detected having a first biomarker score above a first predictive threshold. In some embodiments, a second biomarker is detected having a second biomarker score above a second predictive threshold. In some embodiments, a third biomarker is detected having a third biomarker score above a third predictive threshold. In some embodiments, a predictive threshold for a given biomarker is higher for that biomarker when only one biomarker is used instead of two or three biomarkers. By way of example, a first predictive threshold for a first biomarker can be 5%, 10%, 15%, 20%, etc. higher, when used alone, than a first predictive threshold when two or all three biomarkers are detected. In some embodiments, detection of the biomarker in a particular region of interest (e.g., in tumor cells, or in tumor cell nuclei) is required in order to use a single biomarker to predict response to a Chk1 inhibitor, a Wee1 inhibitor, an ATR inhibitor, or a combination thereof.

In some embodiments, when a third biomarker is used alone for detection of a Response-Predictive Signature for treatment with a Wee1 inhibitor, then the third biomarker is not total cyclin E1 In some embodiments, when a third biomarker is used alone for detection of a Response-Predictive Signature for treatment with a Wee1 inhibitor, then the third biomarker is not Ser100 phosphorylated cyclin E1. In some embodiments, when a third biomarker is used alone for detection of a Response-Predictive Signature for treatment with a Wee1 inhibitor, then the third biomarker is not Ser387 phosphorylated cyclin E1. In some embodiments, when a third biomarker is used alone for detection of a Response-Predictive Signature for treatment with a Wee1 inhibitor, then the third biomarker is not Thr395 phosphorylated cyclin E1.

In some embodiments, when a third biomarker is used alone for detection of a Response-Predictive Signature for treatment with adavosertib, then the third biomarker is not total cyclin E1 In some embodiments, when a third biomarker is used alone for detection of a Response-Predictive Signature for treatment with adavosertib, then the third biomarker is not Ser100 phosphorylated cyclin E1. In some embodiments, when a third biomarker is used alone for detection of a Response-Predictive Signature for treatment with adavosertib, then the third biomarker is not Ser387 phosphorylated cyclin E1 In some embodiments, when a third biomarker used alone for detection of a Response-Predictive Signature for treatment with adavosertib, then the third biomarker is not Thr395 phosphorylated cyclin E1.

In some embodiments, when a third biomarker is used alone for detection of a Response-Predictive Signature for treatment with azenosertib, then the third biomarker is not total cyclin E1 In some embodiments, when a third biomarker is used alone for detection of a Response-Predictive Signature for treatment with azenosertib, then the third biomarker is not Ser100 phosphorylated cyclin E1 In some embodiments, when a third biomarker is used alone for detection of a Response-Predictive Signature for treatment with azenosertib, then the third biomarker is not Ser387 phosphorylated cyclin E1 In some embodiments, when a third biomarker is used alone for detection of a Response-Predictive Signature for treatment with azenosertib, then the third biomarker is not Thr395 phosphorylated cyclin E1.

Dna Damage Response and Cell Cycle Checkpoints

Figure 1B:
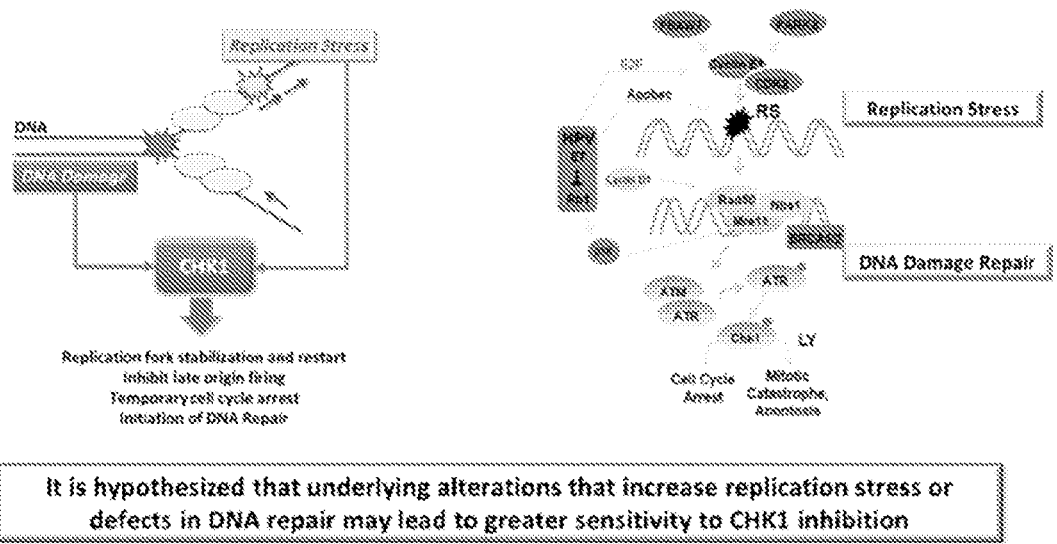
FIG. 1B illustrates Chk1 involvement in replication stress and DNA damage repair.
Figure 2:
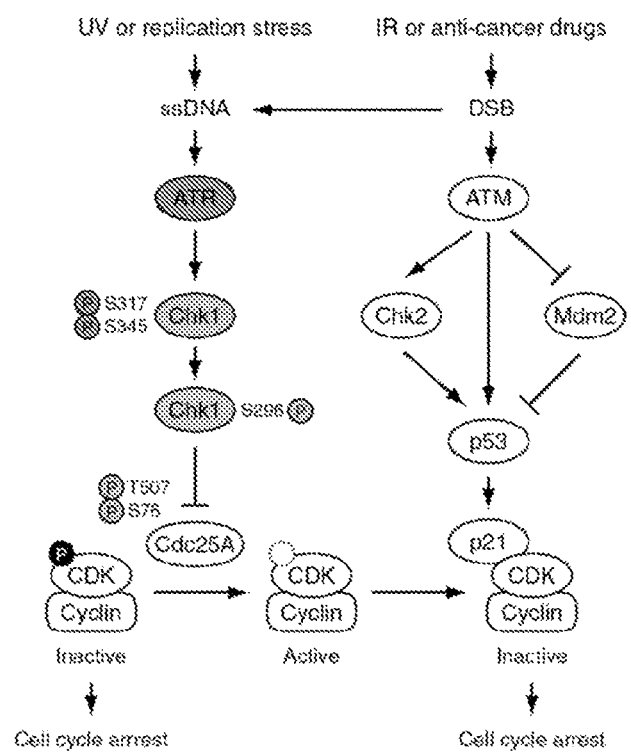
FIG. 2 illustrates the pathway by which Chk1 is activated by phosphorylation.

To protect themselves from DNA damage, multicellular organisms have developed a DNA damage response (DDR) program comprised of multiple checkpoints coupled to DNA replication stress, cell cycle progression and DNA damage, where Chk1 and Chk2 are key mediators as illustrated in FIGS. 1A and 1B. See Smith et al., *Advances in Cancer Research*, vol. 108, p73-112 (2010); Hong et al., *Clin. Cancer Res.* 24(14).3263-3272 (2018). Chk1 and Chk2 are activated by the upstream kinases Ataxia-Telangiectasia and RAD3-related protein (ATR) and Ataxia-Telangiectasia Mutated (ATM), respectively, as illustrated in FIG. 2. Activated ATR-Chk1 or ATM-Chk2 signaling pathways lead to phosphorylation and inhibition of the CDC25 phosphatases, which will lead to an arrest of the cell cycle.

Figure 3:
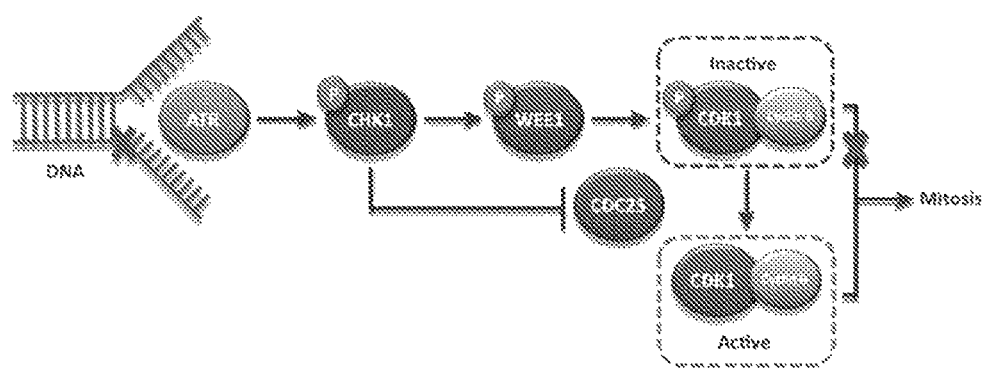
FIG. 3 illustrates the G2/M checkpoint and its regulation by ATR-CHK1-WEE1 signaling pathway.

At the G2/M checkpoint, Chk1 both activates Wee1 kinase and inhibits CDC25 phosphatases, as illustrated in FIG. 3. Matheson et al. Trends in Pharmacological Sciences, vol 37, p872-881 (2016). Chk1 phosphorylates Wee1 at serine 642, CDC25B at serine 230, and CDC25C at serine 216. Perry et al., *Cell Division*, vol. 2, p1-12 (2007), Schmitt et al., *Journal of Cell Science*, vol. 119, p4269-4275 (2006). Activation of Wee1 and inhibition of CDC25 proteins lead to the inhibition of CDK1 and CDK2 kinases that are the main drivers of DNA replication and mitosis. By inhibiting CDKs, the cell cycle arrests, which allow the cells time for DNA repair. Chk1-mediated phosphorylation of CDC25A leads to degradation of CDC25A, while phosphorylation of CDC25B and CDC25C leads to cytosolic sequestration of these proteins. CDC25A is a key regulator of CDK2 and DNA replication. King et al., *Mol. Cancer Ther.,* 14(9): 2004-2013. Chk1-mediated loss of CDC25A activity suspends CDK2 in an inactive phosphorylated state blocking initiation of DNA replication origins, while cytosolic sequestration of CDC25B and CDC25C inhibits the activation of CDK1, resulting in prevention of premature mitosis. Id.

Those of ordinary skill in the art will appreciate that a Response-Predictive Signature able to predict sensitivity to a Chk1 inhibitor, e.g., prexasertib, will also predict sensitivity to a Wee1 inhibitor given that Wee1 phosphorylated by Chk1 on Serine 642 is a direct mediator of Chk1 signaling.

Those of ordinary skill in the art will appreciate that a Response-Predictive Signature able to predict sensitivity to a Chk1 inhibitor, e.g., prexasertib, will also predict sensitivity to an ATR inhibitor given that ATR is directly upstream of Chk1 and activates Chk1 through phosphorylation.

Consistent with the close functional relationship and direct interaction between these proteins, there is a very strong correlation between WEE1 or ATR genetic dependencies and CHEK dependency, as demonstrated by certain of the Examples disclosed herein (e.g., Example 8). This correlation has been shown by RNAi screening across a large panel of cancer cell lines. Similarly, screening of cell lines treated with inhibitors targeting either ATR, Wee1, or Chk1 show highly correlated profiles. In addition, the present disclosure demonstrates that various cancer lines show similar responses to prexasertib as to two different Wee1 inhibitors. Based upon these results, and without being bound by theory, it is hypothesized that the various biomarker-based Response-Predictive Signatures set forth herein for Chk1 inhibitors (and in particular prexasertib) will also be useful to identify subjects who will respond to a Wee1 inhibitor or an ATR inhibitor.

Checkpoint kinase 2 (Chk2), like checkpoint kinase 1, is a serine/threonine kinase that plays an important role in the DNA damage repair pathway. Activated Chk2 phosphorylates its substrates, including BRCA1, E2F1, p53, CDC25A, and CDC25C, to induce the appropriate cellular response. Tian et al., *Drug Design, Development, and Therapy,* 14:2613-2622(2020). Chk2 also impacts tumor progression, for example, by destabilizing DNA repair, or, failing that, causing the cell to die. Id Phosphorylation States Activation of Chk1 and Chk2 involves phosphorylation at particular sites Chk1 and Chk2 are serine/threonine kinases that are phosphorylated at particular positions in response to replication stress or DNA damage. FIG. 2 provides a diagram illustrating Chk1 regulation by phosphorylation. Upon activation, Chk1 and Chk2 phosphorylate a variety of substrate proteins, causing cell cycle arrest, DNA repair, and/or cell death. Patil et al., *Cell Mol. Life Sci.,* 70(21) 4009-4021 (2013).

Oncogenic Viruses

It is also appreciated that certain oncogenic viruses can impact Chk1/Chk2 regulation. In some embodiments, a disease, disorder, or condition is associated with an oncogenic virus. In some embodiments, a disease disorder, or condition is associated with a human papilloma virus, a hepatitis C virus, a hepatitis B virus, and an Epstein-Barr virus.

In some embodiments, an oncogenic virus is a human papilloma virus. Human papilloma viruses (HPV) are risk factors for multiple human cancers, with 90% of cervical, vulvar, vaginal, anal, penile, and oral cancers having some association with HPV. Certain HPV strains are oncogenic, for example, high risk strains HPV16, 18, 31, and 35, which have been found to cause cervical and other genital cancers, including anal, vulvar, vaginal, penile and oral cancers. Without being bound by theory, it is understood that HPV replication after infection generates "onion skin" structures, causing torsional stress promoting the formation of single stranded DNA and double strand breaks that would be recognized as DNA damage by the cell. During the establishment phase of the cell cycle, HPV replication activates a local DDR via aberrant DNA structures of the viral genome. In some embodiments, HPV infection activates STAT-5 (which is associated with cell proliferation, apoptosis, and differentiation), causing phosphorylation of STAT-5, which regulates genome amplification through activation of the ATM DDR. Inhibition of STAT-5 suppresses ATM. Chk2, BRCA1, and RAD51 phosphorylation, and thereby blocks HPV genome amplification HPV strain E7 induces activation of ATM, which activates the downstream effectors BRCA1, Chk2, and p53, leading to cell cycle arrest and HPV amplification. See generally Hong et al., *Future Microbiol.*, 8(12) 1547-1557 (2013); Hong et al., *mBio.*, 6(6): e02006-15 (November-December 2015).

HPV-driven phosphorylation of STAT-5 also causes increases in TopBP1 levels, which activates the ATR signaling pathway. HPV can also directly phosphorylate TopBP1 to regulate E2F1 transcriptional activities. HPV DNA synthesis and genome replication are driven by ATR/Chk1 activation, and ATR/Chk1 DDR regulates cell cycle arrest through E2F1 in HPV-positive cells.

In some embodiments, HPV positive cells demonstrate increased levels of total and phosphorylated forms of DNA damage repair proteins, including, for example, ATR, Chk1, TOPBP1, FANCD2, RAD51, NBS1, BRCA1, 53BP1, RNF168, and Tip60. In some embodiments, HPV positive cells include an increased level of phosphorylated forms of proteins, including pATM, pChk2, pNBS1, pBRCA1, γH2AX, pATR, pChk1, pTOPBP1, pSMC1, and pMRE11.

In some embodiments, an oncogenic virus is a hepatitis B or hepatitis C virus. Hepatitis B and hepatitis C viruses (HBV and HCV, respectively) are associated with, for example, liver cancer, with 65% of liver cancer cases related to HBV/HCV, and 50% attributable to HCV alone. HBV/HCV requires DDR to effectively replicate infected cells, causing increased levels of ATR and phosphorylated Chk1 Cytoplasmic HBV X (HBx) protein, a key factor of HBV cccDNA (covalently closed circular DNA) transcription, induces endoplasmic reticulum stress and DNA damage by activating the Chk2 signaling cascade, resulting in increased HBV transcription and replication. Inhibitors of ATM, ATR, or Chk1 suppress HBV replication and HBV-related pathogenesis. Further, HCV leads to activation of ATM ATM transcript levels are significantly higher in chronically HCV infected patients. Patra et al, Hepatology, 2020 March; 71(3): 780-793.

In some embodiments, an oncogenic virus is an Epstein-Barr virus. Epstein-Barr virus (EBV) deregulates DDR transducers. EBV-infected nasopharyngeal cells demonstrate consistent ATM activation. Suppression of ATM inhibits replication of viral DNA.

Generally, viral oncoproteins activate cellular oncogenes to enter cell cycle, inducing replicative stress and causing DNA single stranded breaks. Single and double strand breaks of DNA generated during repair of single stranded DNA are recognized by ATR and ATM, respectively, and regulate downstream signaling, activation of Chk2, and p53.

Diseases, Disorders, and Conditions

Methods and systems described herein are useful for the treatment of diseases, disorders, and conditions described herein. In some embodiments, a disease, disorder, or condition is associated with Chk1. In some embodiments, a Chk1-associated disease, disorder, or condition is mediated or modulated by a member (e.g., a protein or a phosphorylation state thereof) of an ATR/Chk1 signaling pathway (e.g., Chk1, Chk2, Wee1, ATR, or a combination thereof). In some embodiments, a disease, disorder, or condition is mediated or modulated by Chk1, Chk2, Wee1, ATR, or combination thereof. In some embodiments, a disease, disorder, or condition is mediated or modulated by Chk1. In some embodiments, a disease, disorder, or condition is mediated or modulated by Chk2 In some embodiments, a disease, disorder, or condition is mediated or modulated by Wee1. In some embodiments, a disease, disorder, or condition is mediated or modulated by ATR.

In some embodiments, a disease, disorder, or condition is a Chk1-mediated disease. In some embodiments, a disease, disorder, or condition is a cancer. In some embodiments, a cancer is ovarian cancer, anal cancer, cervical cancer, cancer of the head and neck, esophageal cancer, colon cancer, lung cancer, liver cancer, bladder cancer, breast cancer, endometrial cancer, colorectal cancer, pancreatic cancer, or a sarcoma. In some embodiments, a cancer is anal cancer. In some embodiments, anal cancer is squamous cell carcinoma of the anus. In some embodiments, a cancer is cervical cancer. In some embodiments, a cancer is cancer of the head and neck. In some embodiments, cancer of the head and neck is head and neck squamous cell carcinoma. In some embodiments, a cancer is lung cancer. In some embodiments, lung cancer is small cell lung cancer. In some embodiments, lung cancer is non-small cell lung cancer (e.g., adenocarcinoma of the lung or lung squamous cell carcinoma) In some embodiments, a cancer is bladder cancer. In some embodiments, a cancer is a liver cancer. In some embodiments, a cancer is a breast cancer. In some embodiments, a breast cancer is luminal A breast cancer. In some embodiments, a cancer is endometrial cancer. In some embodiments, a cancer is serous endometrioid cancer. In some embodiments, a cancer is uterine carcinosarcoma. In some embodiments, a cancer is ovarian cancer. In some embodiments, an ovarian cancer is high grade serous ovarian cancer. In some embodiments, a cancer is colorectal cancer. In some embodiments, cancer is pancreatic cancer. In some embodiments, a cancer is medulloblastoma. In some embodiments, cancer is a sarcoma. In some embodiments, a sarcoma is desmoplastic small round cell tumor. In some embodiments, a sarcoma is rhabdomyosarcoma. In some embodiments, a disease, disorder, or condition is a solid tumor.

In some embodiments, a disease, disorder, or condition is a Wee1-mediated disease. In some embodiments, a disease, disorder, or condition is a cancer. In some embodiments, a cancer is ovarian cancer, anal cancer, cervical cancer, cancer of the head and neck, esophageal cancer, colon cancer, lung cancer, liver cancer, bladder cancer, breast cancer, endometrial cancer, colorectal cancer, pancreatic cancer, or a sarcoma. In some embodiments, a cancer is anal cancer. In some embodiments, anal cancer is squamous cell carcinoma of the anus. In some embodiments, a cancer is cervical cancer. In some embodiments, a cancer is cancer of the head and neck. In some embodiments, cancer of the head and neck is head and neck squamous cell carcinoma. In some embodiments, a cancer is lung cancer. In some embodiments, lung cancer is small cell lung cancer. In some embodiments, lung cancer is non-small cell lung cancer (e.g., adenocarcinoma of the lung or lung squamous cell carcinoma). In some embodiments, a cancer is bladder cancer. In some embodiments, a cancer is a liver cancer. In some embodiments, a cancer is a breast cancer. In some embodiments, a breast cancer is luminal A breast cancer. In some embodiments, a cancer is endometrial cancer. In some embodiments, a cancer is serous endometrioid cancer. In some embodiments, a cancer is uterine carcinosarcoma. In some embodiments, a cancer is ovarian cancer. In some embodiments, an ovarian cancer is high grade serous ovarian cancer. In some embodiments, a cancer is colorectal cancer. In some embodiments, cancer is pancreatic cancer. In some embodiments, a cancer is medulloblastoma. In some embodiments, cancer is a sarcoma. In some embodiments, a sarcoma is desmoplastic small round cell tumor In some embodiments, a sarcoma is rhabdomyosarcoma. In some embodiments, a disease, disorder, or condition is a solid tumor.

In some embodiments, a disease, disorder, or condition is an ATR-mediated disease. In some embodiments, a disease, disorder, or condition is a cancer. In some embodiments, a cancer is ovarian cancer, anal cancer, cervical cancer, cancer of the head and neck, esophageal cancer, colon cancer, lung cancer, liver cancer, bladder cancer, breast cancer, endometrial cancer, colorectal cancer, pancreatic cancer, or a sarcoma. In some embodiments, a cancer is anal cancer. In some embodiments, anal cancer is squamous cell carcinoma of the anus. In some embodiments, a cancer is cervical cancer. In some embodiments, a cancer is cancer of the head and neck. In some embodiments, cancer of the head and neck is head and neck squamous cell carcinoma. In some embodiments, a cancer is lung cancer. In some embodiments, lung cancer is small cell lung cancer. In some embodiments, lung cancer is non-small cell lung cancer (e.g., adenocarcinoma of the lung or lung squamous cell carcinoma). In some embodiments, a cancer is bladder cancer. In some embodiments, a cancer is a liver cancer. In some embodiments, a cancer is a breast cancer. In some embodiments, a breast cancer is luminal A breast cancer. In some embodiments, a cancer is endometrial cancer. In some embodiments, a cancer is serous endometrioid cancer. In some embodiments, a cancer is uterine carcinosarcoma. In some embodiments, a cancer is ovarian cancer. In some embodiments, an ovarian cancer is high grade serous ovarian cancer. In some embodiments, a cancer is colorectal cancer. In some embodiments, cancer is pancreatic cancer. In some embodiments, a cancer is medulloblastoma. In some embodiments, cancer is a sarcoma. In some embodiments, a sarcoma is desmoplastic small round cell tumor. In some embodiments, a sarcoma is rhabdomyosarcoma. In some embodiments, a disease, disorder, or condition is a solid tumor.

In some embodiments, a cancer is a recurrent or metastatic cancer. In some aspects of these embodiments, the biomarker combination is any one of the combinations set forth in Table A, above.

In some embodiments, a disease, disorder, or condition is associated with an oncogenic virus. In some aspects of these embodiments, the biomarker combination is any one of the combinations set forth in Table A, above Therapeutic Agents A therapeutic agent is an inhibitor of expression or activity (e.g., kinase activity) of a protein in an ATR/Chk1 signaling pathway. In some embodiments, a therapeutic agent is a Chk1 inhibitor, a Wee1 inhibitor, an ATR inhibitor, or a combination thereof. In some embodiments, a therapeutic agent is a Chk1 inhibitor In some embodiments, a therapeutic agent is a Chk1 inhibitor, and the biomarker combination is any one of the combinations set forth in Table A, above. In some embodiments, a therapeutic agent is a Wee1 inhibitor. In some embodiments, a therapeutic agent is a Wee1 inhibitor, and the biomarker combination is any one of the combinations set forth in Table A, above. In some embodiments, a therapeutic agent is an ATR inhibitor. In some embodiments, a therapeutic agent is an ATR inhibitor, and the biomarker combination is any one of the combinations set forth in Table A, above. In some embodiments, a therapeutic agent is a Chk1 inhibitor and a Wee1 inhibitor. In some embodiments, a therapeutic agent is a Chk1 inhibitor and an ATR inhibitor. In some embodiments, a therapeutic agent is a Wee1 inhibitor and an ATR inhibitor. In some embodiments, a therapeutic agent is a Chk1 inhibitor, a Wee1 inhibitor, and an ATR inhibitor.

In some embodiments, a subject is administered two or more therapeutic agents. In some embodiments, a subject is administered a Chk1 inhibitor and one or both of a Wee1 inhibitor and an ATR inhibitor. In some embodiments, a subject is administered a Chk1 inhibitor and a Wee1 inhibitor. In some embodiments, a subject is administered a Chk1 inhibitor and an ATR inhibitor. In some embodiments, a subject is administered a Wee1 inhibitor and an ATR inhibitor. In some embodiments, a subject is administered a Chk1 inhibitor, a Wee1 inhibitor, and an ATR inhibitor.

The terms "checkpoint kinase 1 inhibitor" and "Chk1 inhibitor" are used herein interchangeably and refer to agents (e.g., small molecule, biologics, and the like) that have inhibitory activity against checkpoint kinase 1. Some Chk1 inhibitors also inhibit other kinases to some extent depending on their selectivity. Some Chk1 inhibitors also inhibit Chk2 to some extent and may be referred to herein as either a Chk1 inhibitor or a Chk1/Chk2 inhibitor Notwithstanding the foregoing, the terms "checkpoint kinase 1 inhibitor" and "Chk1 inhibitor" do not include a compound that primarily inhibits Chk2, but does not significantly inhibit Chk1.

The terms "Wee1 inhibitor" and "ATR inhibitor" refer, respectively, to agents (e.g., small molecules, biologics, and the like) that have inhibitory activity against Wee1 kinase or ATR kinase, respectively.

Inhibitors of Chk1 have emerged as promising therapies for treating cancer by preventing activation of DNA damage checkpoints, and for certain therapies, causing DNA breakage that leads to cell death. In particular, prexasertib, otherwise referred to as LY2606368, a Chk1/Chk2 inhibitor, has been in development as a therapy for treating, among other things, advanced squamous cell carcinoma, SCC of the head and neck, SCC of the anus, and squamous cell non-small cell lung cancer. Hong et al., *Clin. Cancer Res.* 24(14):3263-3272 (2018).

A number of checkpoint kinase 1 inhibitors are currently undergoing investigation. In some embodiments, a checkpoint kinase 1 inhibitor is selected from prexasertib, SRA737, PHI-101, LY2880070. V158411, CASC-578. IMP10, SOL-578, rabusertib, AZD7762, MK-8776, PF-00477736, GDC-0575, XL-844, CBP501, BBI-355, PEP07, and VER-250840. In some embodiments, a checkpoint kinase 1 inhibitor is selected from prexasertib, SRA737, PHI-101, LY2880070, V158411, CASC-578, IMP10, and SOL-578. In some embodiments, a checkpoint kinase 1 inhibitor is selected from rabusertib, AZD7762, MK-8776, PF-00477736, GDC-0575, or XL-844.

In some embodiments, a Chk1 inhibitor is prexasertib, or a pharmaceutically acceptable salt thereof. In some embodiments, a Chk1 inhibitor is prexasertib, or a pharmaceutically acceptable salt thereof, and the biomarker combination is any one of the combinations set forth in Table A. Prexasertib (also known as LY2606368 and ACR-368) is a checkpoint kinase 1 and 2 inhibitor that has been shown to be active as a treatment for a variety of cancers, including sarcoma, in some subjects. As a monotherapy, prexasertib results in "strongly reduced clonogenic survival" by interrupting cell cycle progression, causing induction of apoptosis and induction of double-stranded DNA breakage. Heidler et al., *Int. J. Cancer,* 147(4):1059-1070 (2020). Clinical trials of prexasertib are still ongoing, including trials studying the efficacy of prexasertib in the treatment of acute myeloid leukemia, myelodysplastic syndrome, rhabdomyosarcoma, medulloblastoma, and high grade serous ovarian cancer, among others. Prexasertib is a compound of structure:

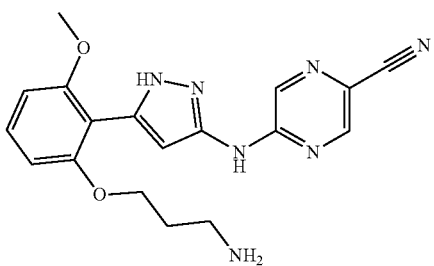 [SMILES: COc1cccc(OCCCN)c1-c1cc(Nc2cnc(C#N)cn2)n[nH]1]

otherwise referred to as 5-(5-(2-(3-aminopropoxy)-6-methoxyphenyl)-1H-pyrazol-3-ylamino)pyrazine-2-carbonitrile, and is described in WO2010/077758 and WO 2017/100071, each of which is incorporated by reference in its entirety.

Hong and others have attempted to identify biomarkers to predict response to prexasertib, but to date, no reliable and consistent signature has been identified. Response rates to prexasertib in clinical trials typically ranged between 5-20%& across cancers, including head and neck, anal, and ovarian cancer, where prexasertib has demonstrated clinical single agent activity. Only one study, a single center, phase 2 study in ovarian cancer conducted at NCI led by Dr. Lee showed a rather high response rate of 29% to single agent prexasertib therapy. See Lee, *Lancet Oncol.* 19(2):207-215 (2018). The duration of response across responsive cancers is impressive, between ~6 months to over 12 months. See Hong et al., *Clin. Cancer Res.* 24(14):3263-3272 (2018). Side effects of prexasertib, while reversible, are common, and include hematological, mechanism-based myelosuppression, including neutropenia, thrombocytopenia, and anemia Lee, *Lancet Oncol.* 19(2):207-215 (2018); Hong et al., *Clin Cancer Res* 24(14):3263-3272 (2018).

In some embodiments, a checkpoint kinase 1 inhibitor is a pharmaceutically acceptable salt of prexasertib. In some embodiments, a therapy described herein is prexasertib mesylate hydrate:

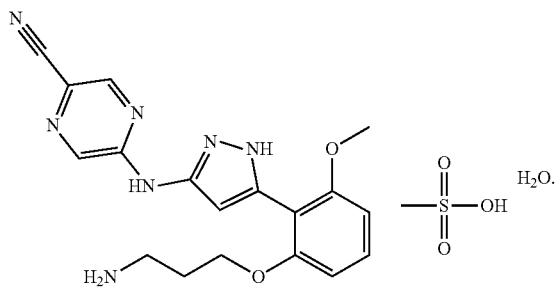

In some embodiments, a therapy described herein is prexasertib (S)-lactate monohydrate:

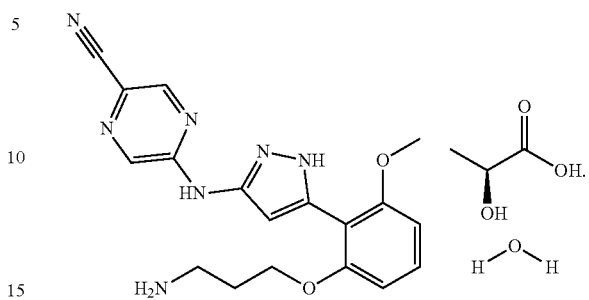

In some embodiments, a checkpoint kinase 1 inhibitor is SRA737 (also known as CCT245737), which is a small molecule of structure:

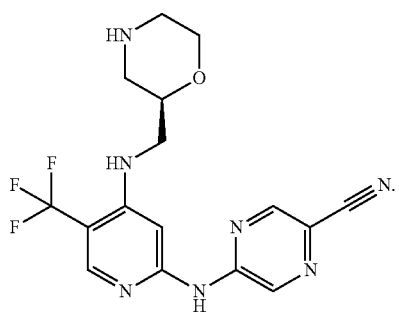 [SMILES: N#Cc1cnc(Nc2cc(NC[C@H]3CNCCO3)c(C(F)(F)F)cn2)cn1]

SRA737 is an orally bioavailable compound. In some embodiments, the Chk1 inhibitor is SRA737, and the biomarker combination is any one of the combinations set forth in Table A.

In some embodiments, a checkpoint kinase 1 inhibitor is PHI-101, which is a small molecule of structure

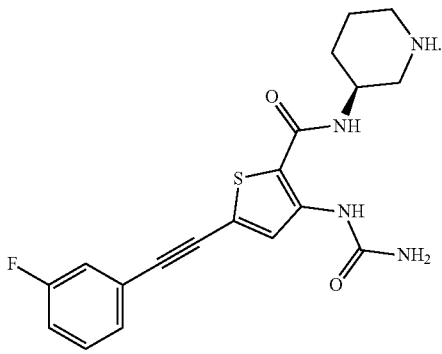 [SMILES: NC(=O)Nc1cc(C#Cc2cccc(F)c2)sc1C(=O)N[C@H]1CCCNC1]

In some embodiments, the Chk1 inhibitor is PHI-101, and the biomarker combination is any one of the combinations set forth in Table A.

In some embodiments, a checkpoint kinase 1 inhibitor is LY2880070 (also known as ESO-01), which is a small molecule of structure:

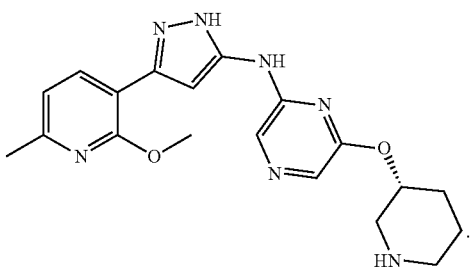 [SMILES: COc1nc(C)ccc1-c1cc(Nc2cncc(O[C@@H]3CCCNC3)n2)[nH]n1]

In some embodiments, the Chk1 inhibitor is LY2880070, and the biomarker combination is any one of the combinations set forth in Table A.

In some embodiments, a checkpoint kinase 1 inhibitor is V158411, which is a small molecule of structure:

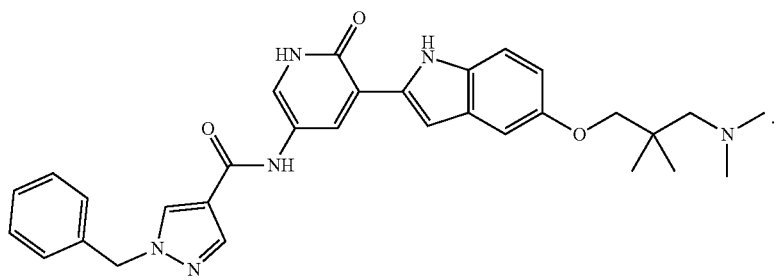 [SMILES: CN(C)CC(C)(C)COc1ccc2[nH]c(-c3cc(NC(=O)c4cnn(Cc5ccccc5)c4)c[nH]c3=O)cc2c1]

In some embodiments, the Chk1 inhibitor is V158411, and the biomarker combination is any one of the combinations set forth in Table A.

In some embodiments, a checkpoint kinase 1 inhibitor is CASC-578. In some embodiments, the Chk1 inhibitor is CASC-578, and the biomarker combination is any one of the combinations set forth in Table A.

In some embodiments, a checkpoint kinase 1 inhibitor is IMP10. In some embodiments, the Chk1 inhibitor is IMP10, and the biomarker combination is any one of the combinations set forth in Table A.

In some embodiments, a checkpoint kinase 1 inhibitor is SOL-578 In some embodiments, the Chk1 inhibitor is SOL-578, and the biomarker combination is any one of the combinations set forth in Table A.

In some embodiments, a Wee1 inhibitor is selected from adavosertib (AZD1775. MK1775), azenosertib (Zn-C3), Debio0123, STC 8123, ATRN-1051, NUV-569, IMP7068, BBI-355, PEP07, SPH-6162, and ZSY-4835. In some embodiments, a Wee1 inhibitor is selected from adavosertib (AZD1775, MK1775), azenosertib (Zn-C3), Debio0123, STC 8123, ATRN-1051, NUV-569, and IMP7068. In some embodiments, a Wee1 inhibitor is adavosertib (AZD1775, MK1775). In some embodiments, the Wee1 inhibitor is adavosertib, and the biomarker combination is any one of the combinations set forth in Table A. In some embodiments, a Wee1 inhibitor is azenosertib (Zn-C3). In some embodiments, the Wee1 inhibitor is azenosertib, and the biomarker combination is anyone of the combinations set forth in Table A. In some embodiments, a Wee1 inhibitor is Debio0123. In some embodiments, the Wee1 inhibitor is Debio0123, and the biomarker combination is any one of the combinations set forth in Table A. In some embodiments, a Wee1 inhibitor is STC 8123 In some embodiments, the Wee1 inhibitor is STC 8123, and the biomarker combination is any one of the combinations set forth in Table A. In some embodiments, a Wee1 inhibitor is ATRN-1051. In some embodiments, the Wee1 inhibitor is ATRN-1051, and the biomarker combination is any one of the combinations set forth in Table A. In some embodiments, a Wee1 inhibitor is NUV-569. In some embodiments, the Wee1 inhibitor is NUV-569, and the biomarker combination is any one of the combinations set forth in Table A. In some embodiments, a Wee1 inhibitor is IMP7068. In some embodiments, the Wee1 inhibitor is IMP7068, and the biomarker combination is any one of the combinations set forth in Table A. In some embodiments, a Wee1 inhibitor is BBI-355. In some embodiments, the Wee1 inhibitor is BBI-355, and the biomarker combination is any one of the combinations set forth in Table A. In some embodiments, a Wee1 inhibitor is PEP07. In some embodiments, the Wee1 inhibitor is PEP07, and the biomarker combination is any one of the combinations set forth in Table A. In some embodiments, a Wee1 inhibitor is SPH6162. In some embodiments, the Wee1 inhibitor is SPH6162, and the biomarker combination is any one of the combinations set forth in Table A. In some embodiments, a Wee1 inhibitor is ZSY-4835. In some embodiments, the Wee1 inhibitor is ZSY-4835, and the biomarker combination is any one of the combinations set forth in Table A.

In some embodiments, a therapeutic agent is a Wee1 inhibitor. In some embodiments, a Wee1 inhibitor is not adavosertib (AZD1775, MK1775).

In some embodiments, an ATR inhibitor is selected from berzosertib (M6620, VX-970), gartisertib (M4344, VX-803), elimusertib (BAY1895344), ceralasertib (AZD6738). M1774, ATRN-119, camonsertib (RP-3500), ART0380, and ATG018. In some embodiments, an ATR inhibitor is berzosertib (M6620, VX-970). In some embodiments, the ATR inhibitor is berzosertib, and the biomarker combination is any one of the combinations set forth in Table A. In some embodiments, an ATR inhibitor is gartisertib (M4344, VX-803). In some embodiments, the ATR inhibitor is gartisertib, and the biomarker combination is any one of the combinations set forth in Table A. In some embodiments, an ATR inhibitor is elimusertib (BAY1895344). In some embodiments, the ATR inhibitor is elimusertib, and the biomarker combination is any one of the combinations set forth in Table A. In some embodiments, an ATR inhibitor is ceralasertib (AZD6738). In some embodiments, the ATR inhibitor is ceralasertib, and the biomarker combination is any one of the combinations set forth in Table A. In some embodiments, an ATR inhibitor is M1774. In some embodiments, the ATR inhibitor is M1774, and the biomarker combination is any one of the combinations set forth in Table A In some embodiments, an ATR inhibitor is ATRN-119. In some embodiments, the ATR inhibitor is ATRN-119, and the biomarker combination is any one of the combinations set forth in Table A. In some embodiments, an ATR inhibitor is camonsertib (RP-3500). In some embodiments, the ATR inhibitor is camonsertib (RP-3500), and the biomarker combination is any one of the combinations set forth in Table A. In some embodiments, an ATR inhibitor is ATR0380. In some embodiments, the ATR inhibitor is ART0380, and the biomarker combination is any one of the combinations set forth in Table A. In some embodiments, an ATR inhibitor is ATG018. In some embodiments, the ATR inhibitor is ATG018, and the biomarker combination is any one of the combinations set forth in Table A.

DNA Synthesis Inhibitors

The present disclosure further encompasses an insight that a DNA synthesis inhibitor induces sensitivity to a Chk1 inhibitor, a Wee1 inhibitor, an ATR inhibitor, or a combination thereof. In some embodiments, the present disclosure provides a method of treating a disease, disorder, or condition described herein (e.g., a Chk1-mediated disease, a Wee1-mediated disease, and/or an ATR-mediated disease) comprising administering a Chk1 inhibitor, a Wee1 inhibitor, an ATR inhibitor, or a combination thereof, together with a DNA synthesis inhibitor. A DNA synthesis inhibitor, in some embodiments, is administered contemporaneously with a Chk1 inhibitor, a Wee1 inhibitor, an ATR inhibitor, or a combination thereof.

Chk1 regulates the intra-S and G2/M checkpoints and is important for maintaining latent replication origins during S phase to prevent unscheduled replication firing. While normal cells have multiple functional cell cycle checkpoints, many cancers are defective in certain checkpoints, and therefore rely heavily on other checkpoints for survival. For example, cancer cells with non-functional p53 have a defective G1/S cell cycle checkpoint and are thus highly dependent on function intra-S and G2/M checkpoints and corresponding Chk1 activity for proper DNA replication and repair, see e.g., Bartek et al., *Cancer Cell*, 4-421-429 (2003). Without wishing to be bound by any particular theory, the present disclosure encompasses an insight that a DNA synthesis inhibitor can induce sensitivity to a therapeutic agent, e.g., Chk1 inhibitor, a Wee1 inhibitor, an ATR inhibitor, or a combination thereof, as inhibition of DNA synthesis increases DNA replication stress and dependency on Chk1 to stabilize stalled replication forks.

In some embodiments, a DNA synthesis inhibitor and a Chk1 inhibitor, a Wee1 inhibitor, an ATR inhibitor, or a combination thereof are administered to a subject whose tissue sample has been determined to not exhibit a Response-Predictive Signature. In some embodiments, a Chk1 inhibitor, a Wee1 inhibitor, an ATR inhibitor, or a combination thereof, and the DNA synthesis inhibitor are administered simultaneously. In some embodiments, a Chk1 inhibitor, a Wee1 inhibitor, an ATR inhibitor, or a combination thereof, and a DNA synthesis inhibitor are administered sequentially. In some embodiments, a Chk1 inhibitor, a Wee1 inhibitor, an ATR inhibitor, or a combination thereof are administered after administration of the DNA synthesis inhibitor. In some embodiments, a Chk1 inhibitor, a Wee1 inhibitor, an ATR inhibitor, or a combination thereof, and a DNA synthesis inhibitor are administered as a single composition. In some embodiments, a Chk1 inhibitor, a Wee1 inhibitor, an ATR inhibitor, or a combination thereof, and a DNA synthesis inhibitor are administered separately, e.g., in separate compositions, via separate administration routes (e.g., one agent orally and another agent intravenously), and/or at different time points. In some embodiments, a Chk1 inhibitor, a Wee1 inhibitor, an ATR inhibitor, or a combination thereof, and a DNA synthesis inhibitor are administered together in a combination composition, via the same administration route, and/or at the same time.

In some embodiments, administration of a DNA synthesis inhibitor to a subject that has been determined not to exhibit a Response-Predictive Signature to a therapeutic agent (e.g., a Chk1 inhibitor, a Wee1 inhibitor, and/or a ATR inhibitor) will sensitize the subject to the therapeutic agent such that the subject will exhibit the Response-Predictive Signature. In other words, in some embodiments, administration of a DNA synthesis inhibitor to a subject will convert the subject from a non-responder to a therapeutic agent to a responder to the therapeutic agent. In some embodiments, a subject whose tissue sample exhibits a Response-Predictive Signature to a therapeutic agent after administration of a DNA synthesis inhibitor is administered the therapeutic agent. In other embodiments, a subject whose tissue sample does not exhibit a Response-Predictive Signature is administered a DNA synthesis inhibitor prior to (e.g., 5, 10, 15, 20, 25, 30, 45, 60, or 120 minutes, or 3, 4, 5, 6, 8, 12, or 24 hours before), or simultaneously with the therapeutic agent.

In some embodiments, a DNA synthesis inhibitor is a nucleoside analog. In some embodiments, a DNA synthesis inhibitor is a purine nucleoside analog (e.g., cladribine, clofarabine, fludarabine, nelarabine, pentostatin, tezacitabine, 6-mercaptopurine, and 6-thioguanine). In some embodiments, a DNA synthesis inhibitor is a pyrimidine nucleoside analog (e.g., capecitabine, cytarabine, decitabine, floxuridine, gemcitabine, vidaza, 5-fluorouracil). In some embodiments, a DNA synthesis inhibitor is cladribine. In some embodiments, a DNA synthesis inhibitor is clofarabine. In some embodiments, a DNA synthesis inhibitor is fludarabine. In some embodiments, a DNA synthesis inhibitor is nelarabine. In some embodiments, a DNA synthesis inhibitor is pentostatin. In some embodiments, a DNA synthesis inhibitor is tezacitabine. In some embodiments, a DNA synthesis inhibitor is 6-mercaptopurine. In some embodiments, a DNA synthesis inhibitor is 6-thioguanine. In some embodiments, a DNA synthesis inhibitor is capecitabine. In some embodiments, a DNA synthesis inhibitor is cytarabine. In some embodiments, a DNA synthesis inhibitor is decitabine. In some embodiments, a DNA synthesis inhibitor is floxuridine. In some embodiments, a DNA synthesis inhibitor is vidaza. In some embodiments, a DNA synthesis inhibitor is 5-fluorouracil.

Figure 4:
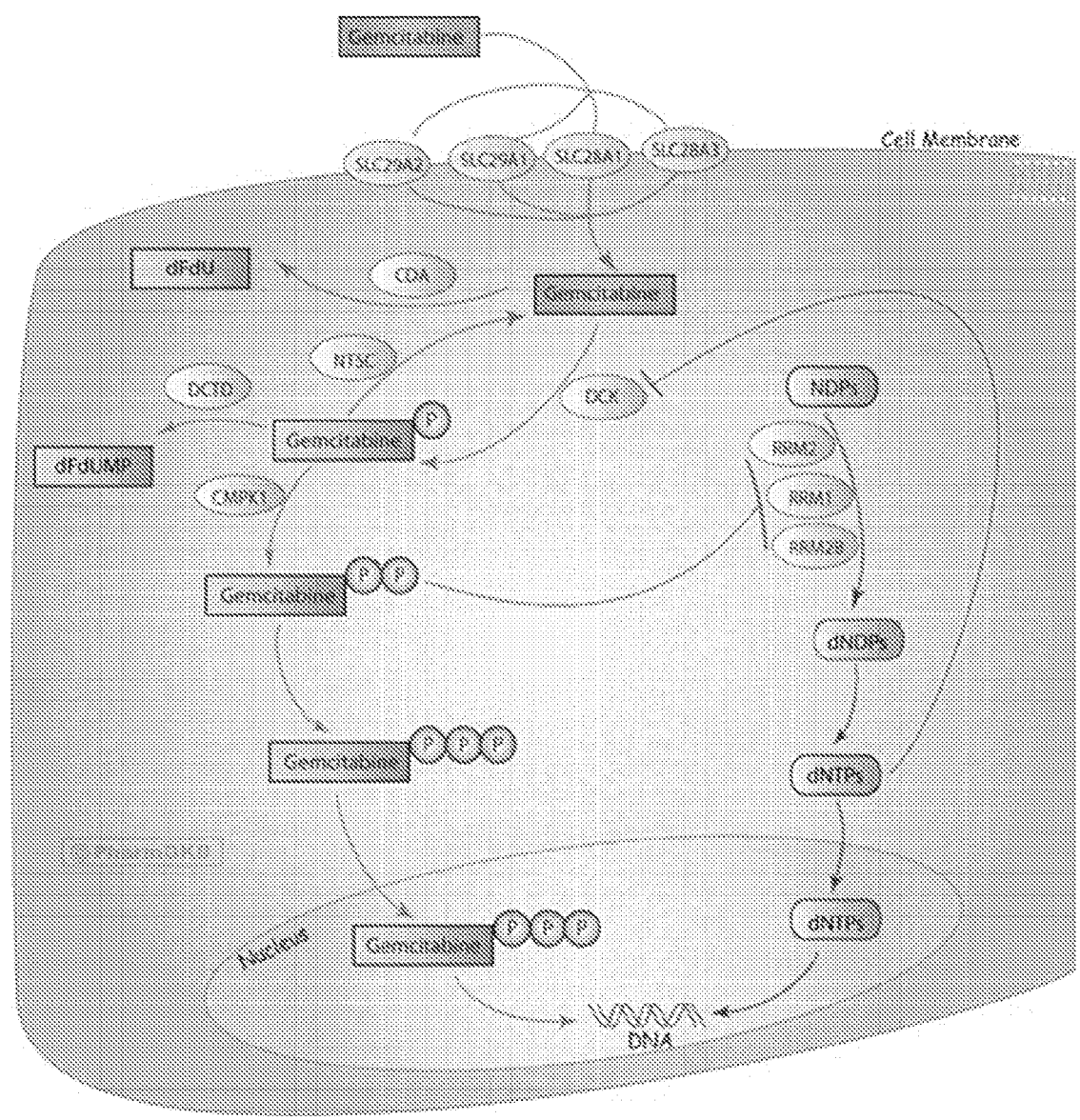
FIG. 4 illustrates the pathway involved in gemcitabine cellular uptake, its processing, and effect on cellular processes involved in DNA synthesis.

In some embodiments, a DNA synthesis inhibitor is gemcitabine (2',2'-difluoro 2'-deoxycytidine (dFdC)), or a pharmaceutically acceptable salt thereof. Gemcitabine is a nucleoside analog that acts to inhibit DNA synthesis. Gemcitabine has been used as a monotherapy and in different combinations and with different schedules of administration in multiple solid tumor and hematological malignancies. Upon administration, gemcitabine is actively taken up by cells via a transporter and then is phosphorylated to form gemcitabine monophosphate (dFdCMP) by the rate-limiting enzyme deoxycytidine kinase. Two additional phosphates are added by other enzymes to convert dFdCMP into gemcitabine diphosphate (dFdCDP) and gemcitabine triphosphate (dFdCTP). Gemcitabine diphosphate inhibits ribonucleotide reductase (RRM) resulting in the depletion of cellular dNTP pools. This depletion in cellular deoxynucleotides (particularly dCTP) favors incorporation of dFdCTP over dCTP into DNA, dFdCTP incorporation into DNA inhibits further DNA synthesis resulting in masked chain termination FIG. 4 illustrates the above mechanisms. See e.g., Alvarellos et al., *Pharmacogenet. Genomics,* 24:564-574 (2014). Gemcitabine is a compound of structure:

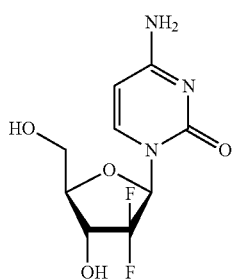

In some embodiments, a DNA synthesis inhibitor is gemcitabine and a therapeutic agent is not SRA737. In some embodiments, a DNA synthesis inhibitor is gemcitabine and a therapeutic agent is not LY2880070. In some embodiments, a DNA synthesis inhibitor is gemcitabine and a therapeutic agent is not V158411 In some embodiments, a DNA synthesis inhibitor is gemcitabine and a therapeutic agent is not CASC-578. In some embodiments, a DNA synthesis inhibitor is gemcitabine and a therapeutic agent is not rabusertib. In some embodiments, a DNA synthesis inhibitor is gemcitabine and a therapeutic agent is not AZD7762. In some embodiments, a DNA synthesis inhibitor is gemcitabine and a therapeutic agent is not MK8776. In some embodiments, a DNA synthesis inhibitor is gemcitabine and a therapeutic agent is not PF-00477736 In some embodiments, a DNA synthesis inhibitor is gemcitabine and a therapeutic agent is not GDC-0575 In some embodiments, a DNA synthesis inhibitor is gemcitabine and a therapeutic agent is not XL-844.

In some embodiments, a DNA synthesis inhibitor is gemcitabine and a therapeutic agent is not adavosertib. In some embodiments, a DNA synthesis inhibitor is gemcitabine and a therapeutic agent is not azenosertib (Zn-C3). In some embodiments, a DNA synthesis inhibitor is gemcitabine and a therapeutic agent is not NUV-569.

In some embodiments, a DNA synthesis inhibitor is gemcitabine and a therapeutic agent is not berzosertib. In some embodiments, a DNA synthesis inhibitor is gemcitabine and a therapeutic agent is not elimusertib. In some embodiments, a DNA synthesis inhibitor is gemcitabine and a therapeutic agent is not ceralasertib. In some embodiments, a DNA synthesis inhibitor is gemcitabine and a therapeutic agent is not camonsertib (RP-3500).

In some embodiments, a DNA synthesis inhibitor is a DNA-damaging agent (e.g., a platinum-based anti-neoplastic agent (e.g., cisplatin and carboplatin), an alkylating agent (e.g., temozolomide (TMZ), and ionizing radiation). In some embodiments, a DNA synthesis inhibitor is a platinum-based anti-neoplastic agent. In some embodiments, a DNA synthesis inhibitor is cisplatin. In some embodiments, a DNA synthesis inhibitor is carboplatin. In some embodiments, a DNA synthesis inhibitor is an alkylating agent. In some embodiments, a DNA synthesis inhibitor is temozolomide. In some embodiments, a DNA synthesis inhibitor is ionizing radiation.

In some embodiments, a DNA synthesis inhibitor is a topoisomerase inhibitor. In some embodiments, a DNA synthesis inhibitor is a topoisomerase I inhibitor and/or a topoisomerase II inhibitor. In some embodiments, a DNA synthesis inhibitor is a topoisomerase I inhibitor (e.g. camptothecin or a derivative thereof (e.g., topotecan, irinotecan, and belotecan), an indenoisoquinoline (e.g., indotecan and indimitecan), phenanthridine or a derivative thereof (e.g., topovale), and an indolocarbazole). In some embodiments, a DNA synthesis inhibitor is a topoisomerase II inhibitor (e.g., an anthracycline (e.g., doxorubicin, daunorubicin, epirubicin, and idarubicin), etoposide, and teniposide). In some embodiments, a DNA synthesis inhibitor is camptothecin or a derivative thereof. In some embodiments, a DNA synthesis inhibitor is topotecan. In some embodiments, a DNA synthesis inhibitor is irinotecan. In some embodiments, a DNA synthesis inhibitor is belotecan. In some embodiments, a DNA synthesis inhibitor is an indenoisoquinoline. In some embodiments, a DNA synthesis inhibitor is indotecan. In some embodiments, a DNA synthesis inhibitor is indimitecan. In some embodiments, a DNA synthesis inhibitor is phenanthridine or a derivative thereof. In some embodiments, a DNA synthesis inhibitor is topovale. In some embodiments, a DNA synthesis inhibitor is an indolocarbazole. In some embodiments, a DNA synthesis inhibitor is an anthracycline. In some embodiments, a DNA synthesis inhibitor is doxorubicin. In some embodiments, a DNA synthesis inhibitor is daunorubicin. In some embodiments, a DNA synthesis inhibitor is epirubicin. In some embodiments, a DNA synthesis inhibitor is idarubicin. In some embodiments, a DNA synthesis inhibitor is etoposide. In some embodiments, a DNA synthesis inhibitor is teniposide.

In some embodiments, a DNA synthesis inhibitor is an antifolate (e.g., methotrexate and pemetrexed). In some embodiments, a DNA synthesis inhibitor is methotrexate. In some embodiments, a DNA synthesis inhibitor is pemetrexed.

Regions of Interest in a Biological Sample

In some embodiments, a biological sample from a subject to be analyzed for a Response-Predictive Signature is tissue from a tumor biopsy of the subject. Within that tumor biopsy is one or more regions of interest (ROI) in which the biomarkers are determined. In some embodiments, the ROI is or comprises the tumor cells. In some embodiments, the ROI is or comprises one or more cell types in the microenvironment around the tumor cells, such as the stromal cells, mesenchymal cells, vascular cells, macrophages, etc. In some embodiments, the ROI is or comprises a subset of cells in the tumor or the microenvironment around a tumor, e.g., cell that are positive for a particular cell type-specific marker (other than the biomarkers that are used to determine the Response-Predictive Signature), such as KRAS-positive cells, certain cell surface marker-positive cells. In some embodiments, the ROI is or comprises a sub-cellular region (e.g., nucleus, cytoplasm, etc.). Such regions or cells can be distinguished in the biological sample by various established methods, including using pattern recognition software that identifies specific ROI based on e.g. tissue morphology or e.g. staining with an antibody specific for that cell type-specific marker(s) and then measuring the biomarkers only in those previously defined ROI or labelled cells or by separating such labeled cells from other cells prior to measuring the biomarkers therein.

Detecting a Response-Predictive Signature

Methods for detecting the presence of a Response-Predictive Signature can be performed according to methods known in the art. In some embodiments, the present disclosure comprises determining whether a subject is a responder or non-responder to a Chk1 inhibitor, a Wee1 inhibitor, an ATR inhibitor, or a combination thereof via analysis of a tissue sample from the subject. In some embodiments, a tissue sample is a sample of a tumor from the subject. In some embodiments, a tissue sample is analyzed to determine whether the tissue sample exhibits a Response-Predictive Signature comprising a first, second, and/or third biomarker, as described herein.

In some embodiments, a Response-Predictive Signature described herein is detected by contacting a sample (e.g., a tissue sample, e.g., a tumor sample) from the subject with an antibody specific for each of the first, second, and third biomarkers. In some embodiments, a Response-Predictive Signature is determined for each of a first, second, and third biomarker by multiplex protein-based assay (e.g., immunofluorescence). As described herein, when biomarker amounts or levels are above (or below for those third biomarkers that are deemed positive when their biomarker amounts or levels are below a threshold) the amounts or levels set by a Response-Predictive Signature, then a patient is determined to be a responder, otherwise, the patient is deemed a non-responder.

The present technologies are surprisingly sensitive such that a large quantity of total cells from a sample are not required to determine whether a subject is responsive. For example, in some embodiments, a sample that is analyzed comprises about 50 cells or more. In some embodiments, a sample that is analyzed comprises about 100 cells or more. In some embodiments, a sample that is analyzed comprises about 200 cells or more. In some embodiments, a sample that is analyzed comprises about 300 cells or more. In some embodiments, a sample that is analyzed comprises about 400 cells or more. In some embodiments, a sample that is analyzed comprises about 500 cells or more. In some embodiments, a sample that is analyzed comprises about 600 cells or more. In some embodiments, a sample that is analyzed comprises about 700 cells or more. In some embodiments, a sample that is analyzed comprises about 800 cells or more. In some embodiments, a sample that is analyzed comprises about 900 cells or more. In some embodiments, a sample that is analyzed comprises about 1000 cells or more. In some embodiments, a sample that is analyzed comprises about 200 to about 300 cells.

Methods of Prediction

In some embodiments, the present disclosure provides methods and systems for determining and/or validating response to a Chk1 inhibitor (e.g., prexasertib), a Wee1 inhibitor, an ATR inhibitor, or a combination thereof. In some embodiments, biomarker presence is measured from cells taken from a subject suffering from a disease, disorder, or condition described herein. In some embodiments, cells taken from a subject are tumor cells.

In some embodiments, the present disclosure provides a method of determining (e.g., prior to administration of therapy) and/or validating response of a subject to a Chk1 inhibitor. In some embodiments, the present disclosure provides a method of determining (e.g., prior to administration of therapy) and/or validating response of a subject to a Wee1 inhibitor. In some embodiments, the present disclosure provides a method of determining (e.g., prior to administration of therapy) and/or validating response of a subject to an ATR inhibitor. Such methods are useful to predict, for example, prior to administration of a particular therapy, whether a subject is a responder or a non-responder to the therapy, allowing practitioners to decide the best course of treatment before a single dose has been administered. In some embodiments, the present disclosure provides methods and systems for validating suspected response or non-response to a particular therapy, to subjects who have received said therapy.

In some embodiments, a subject to be treated has previously been treated with an anti-cancer agent. In some embodiments, a method or system described herein further comprises administering a Chk1 inhibitor, a Wee1 inhibitor, an ATR inhibitor, or a combination thereof in combination with a second anti-cancer agent. In some embodiments, a second anti-cancer agent is a DDR inhibitor. In some embodiments, a second anti-cancer agent is selected from veliparib (ABT-888), senaparib (IMP4297), eprenetapopt (APR-246), stenoparib, fluzoparib (HS10160), adavosertib (AZD1775), guadecitabine, berzosertib, fadraciclib (CYC065), SRA737, P53MVA, LY3143921, NOV1401, NOV1402, NMS-293, TSL1502, olaparib, MEDI0457, aprea-solid tumors-5, cetuximab, and cisplatin. In some embodiments, a second anti-cancer agent is selected from azenosertib, BBI-355, PEP07, SPH-6162, ZSY-4835, ART0380, and ATG018 In some embodiments, a second anti-cancer agent is a DNA synthesis inhibitor (e.g., gemcitabine).

Methods of Treatment and Therapy Monitoring

Targeted therapies in cancer have reshaped the management of different types of disease, including, for example, chronic myeloid leukemia, BRAF-mutant melanoma, HER2-amplified breast cancer, certain thyroid cancers, and non-small cell lung cancers (NSCLC). Despite these well-profiled successes, it has become evident that targeted therapies may benefit only subgroups of patients and even among the initial responders, resistance can develop over time.

Predicting which patients will and will not respond or develop resistance to particular therapies is the effort of much ongoing work, in particular in the field of cancer therapy. For many therapies, however, patients must adopt a "wait and see" approach, where clinical characteristics are monitored over time before a determination of response or non-responses can be made. With cancer patients, treatment time is critical, and the luxury of waiting to see if a therapy is effective is not always an option. Further, cancer clinical trials have experienced some important paradigm shifts to embrace the era of biomarker guided precision oncology. By integrating the right biomarker information, trial designers can properly select, or at least enrich, trial cohorts for patients who are most likely to benefit from a particular therapy.

One such therapy is prexasertib, an inhibitor of checkpoint kinases 1 and 2 (Chk1 and Chk2). Prexasertib has been found to induce DNA damage and apoptosis in cancer cells in preclinical studies, as well as anticancer activity in patients with advanced solid tumors in a phase 1 clinical trial. Lowery et al., *Clin Cancer. Res.*, 23(15):4354-4363 (2017); Hong et al., *J. Clin. Oncol.*, 34(15):1764-1771 (2016).

The present disclosure provides, among other things, an insight that particular biomarkers, in combination, can be used to predict response to prexasertib. A combination of biomarkers, as described herein provides superior predictive power over the use of individual biomarkers or other combinations (e.g., two biomarkers). Such an insight allows patients the opportunity to use therapy that may prolong life, or otherwise seek alternative therapy that will help in other ways. Accordingly, the present disclosure provides methods and systems for treating diseases, disorder, or conditions, comprising administering a therapy to a subject determined to be responsive to a Chk1 inhibitor (e.g., prexasertib), a Wee1 inhibitor, an ATR inhibitor, or a combination thereof.

Further, the present disclosure provides technologies for monitoring therapy for a given subject or cohort of subjects. For example, in some embodiments, repeated monitoring over time permits or achieves detection of one or more changes in a subject's gene expression or characteristics that may impact ongoing treatment regiments. In some embodiments, a change is detected in response to which particular therapy administered to the subject is continued, is altered, or is suspended. In some embodiments, therapy may be altered, for example, by increasing or decreasing frequency and/or amount of administration of one or more agents or treatments with which the subject is already being treated. Alternatively or additionally, in some embodiments, therapy may be altered by addition of therapy with one or more new agents or treatments. In some embodiments, therapy may be altered by suspension or cessation of one or more particular agents or treatments. In some embodiments, monitoring comprises quantifying or analyzing changes in a Response-Predictive Signature of a subject and altering treatment accordingly.

System and Architecture

Figure 6:
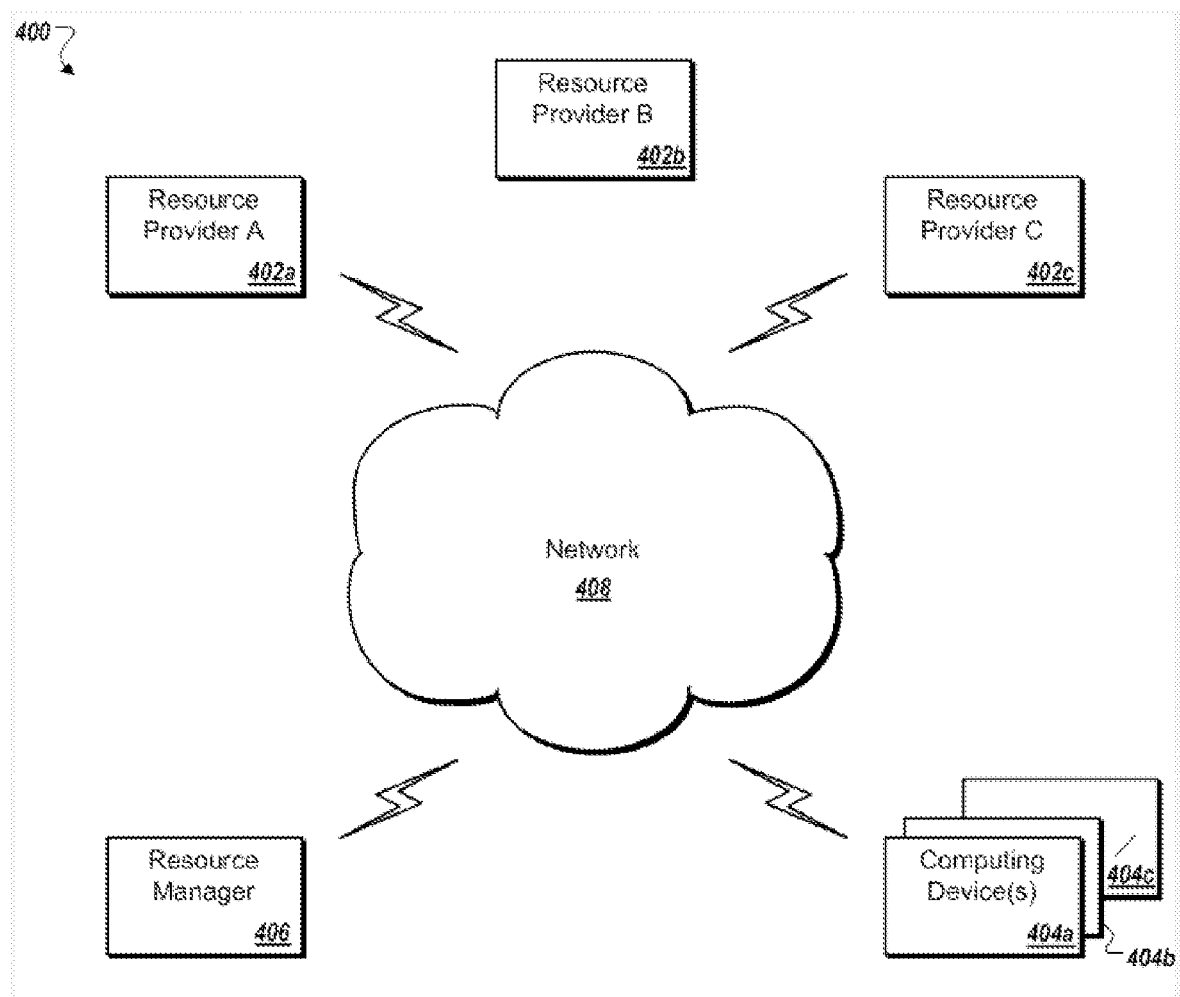
FIG. 6 is an example network environment and computing devices for use in various embodiments.

As shown in FIG. 6, an implementation of a network environment 400 for use in providing systems, methods, and architectures as described herein is shown and described. In brief overview, referring now to FIG. 6, a block diagram of an exemplary cloud computing environment 400 is shown and described. The cloud computing environment 400 may include one or more resource providers 402a, 402b, 402c (collectively, 402). Each resource provider 402 may include computing resources. In some implementations, computing resources may include any hardware and/or software used to process data. For example, computing resources may include hardware and/or software capable of executing algorithms, computer programs, and/or computer applications. In some implementations, exemplary computing resources may include application servers and/or databases with storage and retrieval capabilities. Each resource provider 402 may be connected to any other resource provider 402 in the cloud computing environment 400. In some implementations, the resource providers 402 may be connected over a computer network 408. Each resource provider 402 may be connected to one or more computing devices 404a, 404b, 404c (collectively, 404), over the computer network 408.

The cloud computing environment 400 may include a resource manager 406. The resource manager 406 may be connected to the resource providers 402 and the computing devices 404 over the computer network 408. In some implementations, the resource manager 406 may facilitate the provision of computing resources by one or more resource providers 402 to one or more computing devices 404. The resource manager 406 may receive a request for a computing resource from a particular computing device 404. The resource manager 406 may identify one or more resource providers 402 capable of providing the computing resource requested by the computing device 404. The resource manager 406 may select a resource provider 402 to provide the computing resource. The resource manager 406 may facilitate a connection between the resource provider 402 and a particular computing device 404. In some implementations, the resource manager 406 may establish a connection between a particular resource provider 402 and a particular computing device 404. In some implementations, the resource manager 406 may redirect a particular computing device 404 to a particular resource provider 402 with the requested computing resource.

Figure 7:
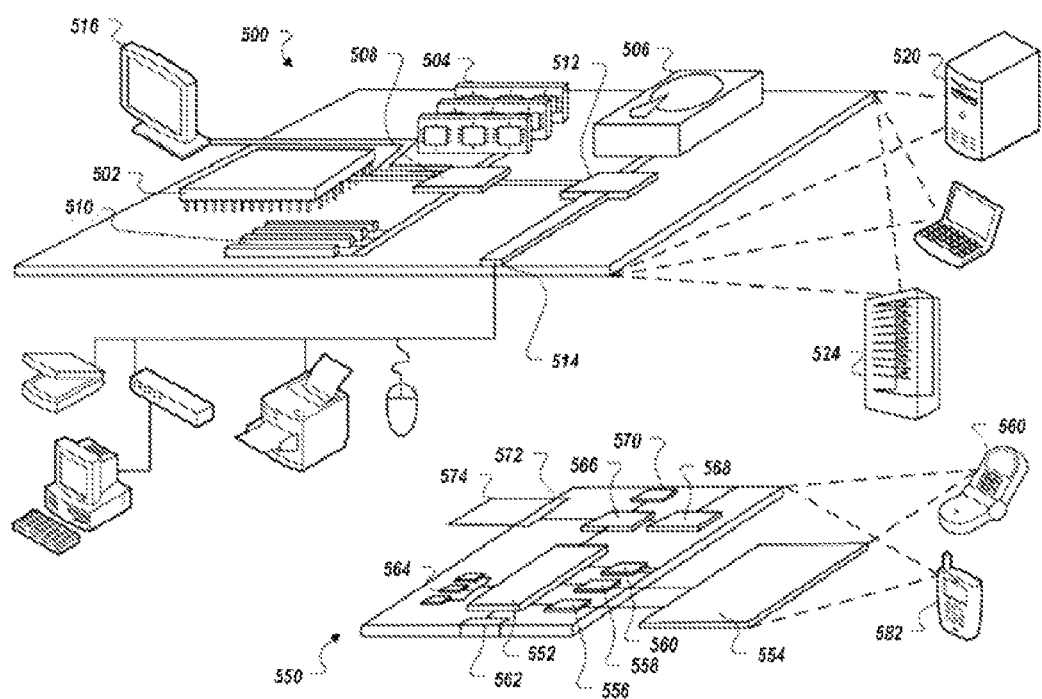
FIG. 7 shows an example of a computing device 500 and a mobile computing device 550 that can be used to implement the techniques described in this disclosure.

FIG. 7 shows an example of a computing device 500 and a mobile computing device 550 that can be used to implement the techniques described in this disclosure. The computing device 500 is intended to represent various forms of digital computers, such as laptops, desktops, workstations, personal digital assistants, servers, blade servers, mainframes, and other appropriate computers. The mobile computing device 550 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as a display 516 coupled to the high-speed interface 508. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system). Thus, as the term is used herein, where a plurality of functions are described as being performed by "a processor", this encompasses embodiments wherein the plurality of functions are performed by any number of processors (one or more) of any number of computing devices (one or more) Furthermore, where a function is described as being performed by "a processor", this encompasses embodiments wherein the function is performed by any number of processors (one or more) of any number of computing devices (one or more) (e.g., in a distributed computing system).

The memory 504 stores information within the computing device 500. In some implementations, the memory 504 is a volatile memory unit or units. In some implementations, the memory 504 is a non-volatile memory unit or units. The memory 504 may also be another form of computer-readable medium, such as a magnetic or optical disk.

The storage device 506 is capable of providing mass storage for the computing device 500. In some implementations, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 502), perform one or more methods, such as those described above. The instructions can also be stored by one or more storage devices such as computer- or machine-readable mediums (for example, the memory 504, the storage device 506, or memory on the processor 502).

The high-speed interface 508 manages bandwidth-intensive operations for the computing device 500, while the low-speed interface 512 manages lower bandwidth-intensive operations. Such allocation of functions is an example only. In some implementations, the high-speed interface 508 is coupled to the memory 504, the display 516 (e.g., through a graphics processor or accelerator), and to the high-speed expansion ports 510, which may accept various expansion cards (not shown). In the implementation, the low-speed interface 512 is coupled to the storage device 506 and the low-speed expansion port 514. The low-speed expansion port 514, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. In addition, it may be implemented in a personal computer such as a laptop computer 522. It may also be implemented as part of a rack server system 524. Alternatively, components from the computing device 500 may be combined with other components in a mobile device (not shown), such as a mobile computing device 550. Each of such devices may contain one or more of the computing devices 500 and the mobile computing device 550, and an entire system may be made up of multiple computing devices communicating with each other.

The mobile computing device 550 includes a processor 552, a memory 564, an input/output device such as a display 554, a communication interface 566, and a transceiver 568, among other components. The mobile computing device 550 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate.

The processor 552 can execute instructions within the mobile computing device 550, including instructions stored in the memory 564. The processor 552 may be implemented as a chipset of chips that include separate and multiple analog and digital processors. The processor 552 may provide, for example, for coordination of the other components of the mobile computing device 550, such as control of user interfaces, applications run by the mobile computing device 550, and wireless communication by the mobile computing device 550.

The processor 552 may communicate with a user through a control interface 558 and a display interface 556 coupled to the display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a SIMM (Single In Line Memory Module) card interface. The expansion memory 574 may provide extra storage space for the mobile computing device 550 or may also store applications or other information for the mobile computing device 550. Specifically, the expansion memory 574 may include instructions to carry out or supplement the processes described above and may include secure information also. Thus, for example, the expansion memory 574 may be provided as a security module for the mobile computing device 550 and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or NVRAM memory (non-volatile random-access memory), as discussed below. In some implementations, instructions are stored in an information carrier. In some embodiments, the instructions, when executed by one or more processing devices (for example, processor 552), perform one or more methods, such as those described above. The instructions can also be stored by one or more storage devices, such as one or more computer- or machine-readable mediums (for example, the memory 564, the expansion memory 574, or memory on the processor 552). In some implementations, the instructions can be received in a propagated signal, for example, over the transceiver 568 or the external interface 562.

The mobile computing device 550 may communicate wirelessly through the communication interface 566, which may include digital signal processing circuitry where necessary. The communication interface 566 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 568 using a radiofrequency in addition, short-range communication may occur, such as using a Bluetooth®, Wi-Fi™, or other such transceiver (not shown). In addition, a GPS (Global Positioning System) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, etc.) and may also include sound generated by applications operating on the mobile computing device 550.

The mobile computing device 550 may be implemented in a number of different forms, as shown in the figure. For example, it may be implemented as a cellular telephone 580. It may also be implemented as part of a smart-phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship with each other.

In some implementations, the modules described herein can be separated, combined or incorporated into single or combined modules. The modules depicted in the figures are not intended to limit the systems described herein to the software architectures shown therein.

Elements of different implementations described herein may be combined to form other implementations not specifically set forth above. Elements may be left out of the processes, computer programs, databases, etc. described herein without adversely affecting their operation. In addition, the logic flows depicted in the figures do not require the particular order shown, or sequential order, to achieve desirable results. Various separate elements may be combined into one or more individual elements to perform the functions described herein. In view of the structure, functions and apparatus of the systems and methods described here, in some implementations.

It is contemplated that systems, architectures, devices, methods, and processes of the claimed invention encompass variations and adaptations developed using information from the embodiments described herein. Adaptation and/or modification of the systems, architectures, devices, methods, and processes described herein may be performed, as contemplated by this description.

Throughout the description, where articles, devices, systems, and architectures are described as having, including, or comprising specific components, or where processes and methods are described as having, including, or comprising specific steps, it is contemplated that, additionally, there are articles, devices, systems, and architectures of the present invention that consist essentially of, or consist of, the recited components, and that there are processes and methods according to the present invention that consist essentially of, or consist of, the recited processing steps.

It should be understood that the order of steps or order for performing certain action is immaterial so long as the invention remains operable. Moreover, two or more steps or actions may be conducted simultaneously.

The mention herein of any publication, for example, in the Background section, is not an admission that the publication serves as prior art with respect to any of the claims presented herein. The Background section is presented for purposes of clarity and is not meant as a description of prior art with respect to any claim.

Headers are provided for the convenience of the reader—the presence and/or placement of a header is not intended to limit the scope of the subject matter described herein.

EXEMPLARY EMBODIMENTS

The following numbered embodiments, while non-limiting, are exemplary of certain aspects of the disclosure:

Embodiment 1. A method of treating a disease, disorder, or condition comprising a step of administering a therapeutic agent that is an inhibitor of expression or activity of a protein in an ATR/Chk1 signaling pathway to a subject whose tissue sample has been determined to exhibit a Response-Predictive Signature;

wherein the Response-Predictive Signature comprises one or more of.

(a) a first biomarker score that is greater than or equal to a first predictive threshold, wherein the first biomarker is selected from Ser280 phosphorylated Chk1, Ser296 phosphorylated Chk1, Ser317 phosphorylated Chk1, Ser345 phosphorylated Chk1, nuclear pan Chk1, Thr68 phosphorylated Chk2, Ser516 phosphorylated Chk2, Thr383 phosphorylated Chk2, and Thr387 phosphorylated Chk2;

(b) a second biomarker score that is greater than or equal to a second predictive threshold, wherein the second biomarker is selected from Ser473 phosphorylated Kap1, Ser642 phosphorylated Wee1, pan Wee1, Ser865 phosphorylated treslin, Ser743 phosphorylated TLK1, Ser612 phosphorylated RB1, Ser1310 phosphorylated MYBBP1A, Ser508 phosphorylated SETMAR, Thr2252 phosphorylated SRRM2, Ser230 phosphorylated CDC25B, Ser950 phosphorylated claspin, Ser37 phosphorylated FAM122A, Ser151 phosphorylated CDC25B, Ser280 phosphorylated CDC25B, Ser481 phosphorylated FOXM1, and Ser704 phosphorylated FOXM1, and
(c) a third biomarker score that is:
  (i) greater than or equal to a third predictive threshold, wherein the third biomarker is selected from total cyclin E1, Ser100 phosphorylated cyclin E1, Ser103 phosphorylated cyclin E1, Ser387 phosphorylated cyclin E1. Thr395 phosphorylated cyclin E1, Thr199 phosphorylated nucleophosmin, Ser54 phosphorylated CDC6, Ser74 phosphorylated CDC6, pan nuclear CDC6, Ser1000 phosphorylated treslin, pan Cks1, pan Cks2, or total cyclin A2; or
  (ii) less than or equal to a third predictive threshold, wherein the third biomarker is selected from total SCF, total FBXW7, or total p27.

Embodiment 2 A method of treating a disease, disorder, or condition comprising a step of: administering a therapeutic agent that is an inhibitor of expression or activity of a protein in an ATR/Chk1 signaling pathway in combination with a DNA synthesis inhibitor to a subject whose tissue sample has been determined to not exhibit a Response-Predictive Signature to the therapeutic agent;
wherein the Response-Predictive Signature comprises one or more of:
(a) a first biomarker score that is greater than or equal to a first predictive threshold, wherein the first biomarker is selected from Ser280 phosphorylated Chk1, Ser296 phosphorylated Chk1, Ser317 phosphorylated Chk1, Ser345 phosphorylated Chk1, nuclear pan Chk1, Thr68 phosphorylated Chk2, Ser516 phosphorylated Chk2, Thr383 phosphorylated Chk2, and Thr387 phosphorylated Chk2;
(b) a second biomarker score that is greater than or equal to a second predictive threshold, wherein the second biomarker is selected from Ser473 phosphorylated Kap1, Ser642 phosphorylated Wee1, pan Wee1, Ser865 phosphorylated treslin, Ser743 phosphorylated TLK1, Ser612 phosphorylated RB1, Ser1310 phosphorylated MYBBP1A, Ser508 phosphorylated SETMAR, Thr2252 phosphorylated SRRM2, Ser230 phosphorylated CDC25B, Ser950 phosphorylated claspin, Ser37 phosphorylated FAM122A, Ser151 phosphorylated CDC25B, Ser280 phosphorylated CDC25B, Ser481 phosphorylated FOXM1, and Ser704 phosphorylated FOXM1; and
(c) a third biomarker score that is:
  (i) greater than or equal to a third predictive threshold, wherein the third biomarker is selected from total cyclin E1, Ser100 phosphorylated cyclin E1, Ser103 phosphorylated cyclin E1, Ser387 phosphorylated cyclin E1, Thr395 phosphorylated cyclin E1, Thr199 phosphorylated nucleophosmin, Ser54 phosphorylated CDC6, Ser74 phosphorylated CDC6, pan nuclear CDC6, Ser1000 phosphorylated treslin, pan Cks1, pan Cks2, or total cyclin A2; or
  (ii) less than or equal to a third predictive threshold, wherein the third biomarker is selected from total SCF, total FBXW7, or total p27.

Embodiment 3. The method of Embodiment 2, wherein the DNA synthesis inhibitor is gemcitabine.

Embodiment 4 A method for validating and/or classifying a subject as a likely responder or non-responder to a therapeutic agent that is an inhibitor of expression or activity of a protein in an ATR/Chk1 signaling pathway, the method comprising:
(a) receiving, by a processor of a computing device, data from a tissue sample of the subject's cells providing levels of each of one or more of a first, second, and a third biomarker in the tissue sample,
(b) receiving, by the processor, a corresponding first, second, and third predictive threshold for each of the first, second, and third biomarkers,
(c) calculating, by the processor, a first, second, and third biomarker score from the levels of each of the first, second, and third biomarkers using the data received in step (a),
(d) comparing, by the processor, the first, second, and third biomarker scores relative to the corresponding first, second, and third predictive thresholds using the data received in step (b) and calculated in step (c) to determine the presence or absence of a Response-Predictive Signature in the tissue sample;
(e) classifying, by the processor, the subject as responsive to the therapeutic agent based on presence of the Response-Predictive Signature in the tissue sample or as non-responsive to the therapeutic agent based on absence of the Response-Predictive Signature in the tissue sample;
wherein:
the first biomarker is selected from Ser280 phosphorylated Chk1, Ser296 phosphorylated Chk1, Ser317 phosphorylated Chk1, Ser345 phosphorylated Chk1, nuclear pan Chk1, Thr68 phosphorylated Chk2, Ser516 phosphorylated Chk2, Thr383 phosphorylated Chk2, and Thr387 phosphorylated Chk2;
the second biomarker is selected from Ser473 phosphorylated Kap1, Ser642 phosphorylated Wee1, pan Wee1, Ser865 phosphorylated treslin, Ser743 phosphorylated TLK1, Ser612 phosphorylated RB1, Ser1310 phosphorylated MYBBP1A, Ser508 phosphorylated SETMAR, Thr2252 phosphorylated SRRM2, Ser230 phosphorylated CDC25B, Ser950 phosphorylated claspin, Ser37 phosphorylated FAM122A, Ser151 phosphorylated CDC25B, Ser280 phosphorylated CDC25B, Ser481 phosphorylated FOXM1, and Ser704 phosphorylated FOXM1; and
the third biomarker is selected from total cyclin E1, Ser100 phosphorylated cyclin E1, Ser103 phosphorylated cyclin E1, Ser387 phosphorylated cyclin E1, Thr395 phosphorylated cyclin E1, Thr199 phosphorylated nucleophosmin, Ser54 phosphorylated CDC6, Ser74 phosphorylated CDC6, pan nuclear CDC6, Ser1000 phosphorylated treslin, pan Cks1, pan Cks2, total cyclin A2, total SCF, total FBXW7, or total p27.

Embodiment 5. The method of any one of Embodiments 1-4, wherein the Response-Predictive Signature comprises at least two of the first biomarker score, the second biomarker score, and the third biomarker score.

Embodiment 6. The method of any one of Embodiments 1-5, wherein the Response-Predictive Signature comprises each of the first biomarker score, the second biomarker score, and the third biomarker score.

Embodiment 7. The method of any one of Embodiments 1-6, wherein at least one of the first biomarker score, the second biomarker score, and the third biomarker score is determined as the percentage of cells positive for the corresponding first biomarker, second biomarker, or third biomarker in the tissue sample.

Embodiment 8. The method any one of Embodiments 1-7, wherein each of the first biomarker score, the second biomarker score, and the third biomarker score is determined as the percentage of cells positive for the corresponding first biomarker, second biomarker, and third biomarker in the tissue sample.

Embodiment 9. The method of Embodiment 7 or 8, wherein the first predictive threshold is 3% or greater of cells positive for the first biomarker.

Embodiment 10. The method of Embodiment 7 or 8, wherein the first predictive threshold is 5%, 6%, 7%, 8%, 9%, or 10% of cells positive for the first biomarker.

Embodiment 11. The method of any one of Embodiments 7-10, wherein the second predictive threshold is 3% or greater of cells positive for the second biomarker.

Embodiment 12. The method of any one of Embodiments 7-10, wherein the second predictive threshold is 5%, 6%, 7%, 8%. 9%, or 10% of cells positive for the second biomarker.

Embodiment 13. The method of any one of Embodiments 7-12, wherein the third predictive threshold is 3% or greater of cells positive for the third biomarker.

Embodiment 14 The method of any one of Embodiments 7-12, wherein the third predictive threshold is 5%, 6%, 7%, 8%, 9%, or 10% of cells positive for the third biomarker.

Embodiment 15. The method of Embodiment 8, wherein the first biomarker is Ser296 phosphorylated Chk1, the second biomarker is Ser473 phosphorylated Kap1, and third biomarker is cyclin E1 (i.e., total cyclin E1, as described herein); and wherein each of the first predictive threshold, the second predictive threshold, and the third predictive threshold is 5%, 6%, 7%, 8%, 9%, or 10% of cells positive for each of the first biomarker, the second biomarker, and the third biomarker.

Embodiment 16. The method of any one of Embodiments 1-6, wherein at least one of the first biomarker score, the second biomarker score, and the third biomarker score is determined from a weighted intensity distribution of the corresponding first biomarker, second biomarker, or third biomarker in the tissue sample.

Embodiment 17. The method of Embodiment 16, wherein each of the first biomarker score, the second biomarker score, and the third biomarker score is determined from a weighted intensity distribution of the corresponding first biomarker, second biomarker, and third biomarker in the tissue sample.

Embodiment 18. A method of treating a disease, disorder or condition comprising a step of:
administering a therapeutic agent that is an inhibitor of expression or activity of a protein in an ATR/Chk1 signaling pathway to a subject whose tissue sample has been determined to exhibit a Response-Predictive Signature;
wherein the Response-Predictive Signature comprises a composite score greater than or equal to a composite threshold, wherein the composite score comprises two or more of:
(a) a first biomarker score, wherein the first biomarker is selected from Ser280 phosphorylated Chk1, Ser296 phosphorylated Chk1, Ser317 phosphorylated Chk1, Ser345 phosphorylated Chk1, nuclear pan Chk1, Thr68 phosphorylated Chk2, Ser516 phosphorylated Chk2, Thr383 phosphorylated Chk2, and Thr387 phosphorylated Chk2,
(b) a second biomarker score, wherein the second biomarker is selected from Ser473 phosphorylated Kap1, Ser642 phosphorylated Wee1, pan Wee1, Ser865 phosphorylated treslin, Ser743 phosphorylated TLK1, Ser612 phosphorylated RB1, Ser1310 phosphorylated MYBBP1A, Ser508 phosphorylated SETMAR, Thr2252 phosphorylated SRRM2, Ser230 phosphorylated CDC25B, Ser950 phosphorylated claspin. Ser37 phosphorylated FAM122A, Ser151 phosphorylated CDC25B, Ser280 phosphorylated CDC25B, Ser481 phosphorylated FOXM1, and Ser704 phosphorylated FOXM1; and
(c) a third biomarker score, wherein the third biomarker is selected from total cyclin E1, Ser100 phosphorylated cyclin E1, Ser103 phosphorylated cyclin E1, Ser387 phosphorylated cyclin E1, Thr395 phosphorylated cyclin E1, Thr199 phosphorylated nucleophosmin, Ser54 phosphorylated CDC6, Ser74 phosphorylated CDC6, pan nuclear CDC6, Ser1000 phosphorylated treslin, pan Cks1, pan Cks2, and total cyclin A2.

Embodiment 19. A method of treating a disease, disorder or condition comprising a step of:
administering a therapeutic agent that is an inhibitor of expression or activity of a protein in an ATR/Chk1 signaling pathway in combination with a DNA synthesis inhibitor to a subject whose tissue sample has been determined to not exhibit a Response-Predictive Signature to the therapeutic agent;
wherein the Response-Predictive Signature comprises a composite score greater than or equal to a composite threshold, wherein the composite score comprises two or more of:
(a) a first biomarker score, wherein the first biomarker is selected from Ser280 phosphorylated Chk1, Ser296 phosphorylated Chk1, Ser317 phosphorylated Chk1, Ser345 phosphorylated Chk1, nuclear pan Chk1, Thr68 phosphorylated Chk2, Ser516 phosphorylated Chk2, Thr383 phosphorylated Chk2, and Thr387 phosphorylated Chk2;
(b) a second biomarker score, wherein the second biomarker is selected from Ser473 phosphorylated Kap1, Ser642 phosphorylated Wee1, pan Wee1, Ser865 phosphorylated treslin, Ser743 phosphorylated TLK1, Ser612 phosphorylated RB1, Ser1310 phosphorylated MYBBP1A, Ser508 phosphorylated SETMAR, Thr2252 phosphorylated SRRM2, Ser230 phosphorylated CDC25B, Ser950 phosphorylated claspin. Ser37 phosphorylated FAM122A, Ser151 phosphorylated CDC25B, Ser280 phosphorylated CDC25B, Ser481 phosphorylated FOXM1, and Ser704 phosphorylated FOXM1; and
(c) a third biomarker score, wherein the third biomarker is selected from total cyclin E1, Ser100 phosphorylated cyclin E1, Ser103 phosphorylated cyclin E1, Ser387 phosphorylated cyclin E1, Thr395 phosphorylated cyclin E1, Thr199 phosphorylated nucleophosmin, Ser54 phosphorylated CDC6. Ser74 phosphorylated CDC6, pan nuclear CDC6. Ser1000 phosphorylated treslin, pan Cks1, pan Cks2, and total cyclin A2.

Embodiment 20. The method of Embodiment 19, wherein the DNA synthesis inhibitor is gemcitabine.

Embodiment 21. A method for validating and/or classifying a subject as a likely responder or non-responder to a therapeutic agent that is an inhibitor of expression or activity of a protein in an ATR/Chk1 signaling pathway, the method comprising:
  (a) receiving, by a processor of a computing device, data from a tissue sample of the subject's cells providing levels of each of one or more of a first, second, and a third biomarker in the tissue sample;
  (b) receiving, by the processor, a composite threshold;
  (c) calculating, by the processor, a first, second, and third biomarker score from the levels of each of the first, second, and third biomarkers using the data received in step (a);
  (d) calculating, by the processor, a composite score from the first, second, and third biomarker scores using the data calculated in step (c);
  (e) comparing, by the processor, the composite score relative to the composite threshold using the data received in step (b) and calculated in step (d) to determine the presence or absence of a Response-Predictive Signature in the tissue sample;
  (f) classifying, by the processor, the subject as responsive to the therapeutic agent based on presence of the Response-Predictive Signature in the tissue sample or as non-responsive to the therapeutic agent based on absence of the Response-Predictive Signature in the tissue sample;
  wherein:
    the first biomarker is selected from Ser280 phosphorylated Chk1. Ser296 phosphorylated Chk1, Ser317 phosphorylated Chk1, Ser345 phosphorylated Chk1, nuclear pan Chk1, Thr68 phosphorylated Chk2, Ser516 phosphorylated Chk2, Thr383 phosphorylated Chk2, and Thr387 phosphorylated Chk2;
    the second biomarker is selected from Ser473 phosphorylated Kap1, Ser642 phosphorylated Wee1, pan Wee1, Ser865 phosphorylated treslin, Ser743 phosphorylated TLK1, Ser612 phosphorylated RB1, Ser1310 phosphorylated MYBBP1A, Ser508 phosphorylated SETMAR, Thr2252 phosphorylated SRRM2, Ser230 phosphorylated CDC25B, Ser950 phosphorylated claspin, Ser37 phosphorylated FAM122A, Ser151 phosphorylated CDC25B, Ser280 phosphorylated CDC25B, Ser481 phosphorylated FOXM1, and Ser704 phosphorylated FOXM1; and
    the third biomarker is selected from total cyclin E1. Ser100 phosphorylated cyclin E1, Ser103 phosphorylated cyclin E1, Ser387 phosphorylated cyclin E1, Thr395 phosphorylated cyclin E1, Thr199 phosphorylated nucleophosmin, Ser54 phosphorylated CDC6, Ser74 phosphorylated CDC6, pan nuclear CDC6, Ser1000 phosphorylated treslin, pan Cks1, pan Cks2, total cyclin A2, total SCF, total FBXW7, or total p27.

Embodiment 22. The method of any one of Embodiments 18-21, wherein the composite score comprises each of the first biomarker score, the second biomarker score, and the third biomarker score.

Embodiment 23. The method of any one of Embodiments 18-22, wherein the composite score is the sum of each of the biomarker scores, optionally wherein the biomarker scores are differentially weighted prior to summing.

Embodiment 24. The method of any one of Embodiments 18-23, wherein at least one of the first biomarker score, the second biomarker score, and the third biomarker score is determined as the percentage of cells positive for the corresponding first biomarker, second biomarker, or third biomarker in the tissue sample.

Embodiment 25. The method of any one of Embodiments 18-24, wherein each of the first biomarker score, the second biomarker score, and the third biomarker score is determined as the percentage of cells positive for the corresponding first biomarker, second biomarker, and third biomarker in the tissue sample.

Embodiment 26 The method of any one of Embodiments 18-25, wherein at least one of the first biomarker score, the second biomarker score, and the third biomarker score is determined from a weighted intensity distribution of the corresponding first biomarker, second biomarker, or third biomarker in the tissue sample.

Embodiment 27. The method of Embodiment 26, wherein each of the first biomarker score, the second biomarker score, and the third biomarker score is determined from a weighted intensity distribution of the corresponding first biomarker, second biomarker, and third biomarker in the tissue sample.

Embodiment 28. The method of any one of Embodiments 1-27, wherein the disease, disorder, or condition is associated with Chk1, Wee1, ATR, or a combination thereof.

Embodiment 29. The method of any one of Embodiments 1-28, wherein the disease, disorder, or condition is a cancer.

Embodiment 30. The method of Embodiment 29, wherein cancer is characterized by solid tumors.

Embodiment 31 The method of Embodiment 29, wherein the cancer is selected from ovarian cancer, anal cancer, cervical cancer, cancer of the head and neck, esophageal cancer, colon cancer, lung cancer (small cell and non-small cell), pancreatic cancer, liver cancer, bladder cancer, breast cancer, endometrial cancer, and sarcomas.

Embodiment 32. The method of Embodiment 31, wherein the cancer is ovarian cancer.

Embodiment 33. The method of Embodiment 32, wherein the ovarian cancer is high grade serous ovarian cancer.

Embodiment 34. The method of any one of Embodiments 1-33, wherein the disease, disorder, or condition is associated with an oncogenic virus.

Embodiment 35. The method of any one of Embodiments 1-34, wherein the tissue sample is a tumor biopsy.

Embodiment 36. The method of any one of Embodiments 1-34, wherein the tissue sample is tumor cells in the tumor biopsy.

Embodiment 37. The method of any one of Embodiments 1-36, wherein at least one of the first biomarker score, the second biomarker score, and the third biomarker score is determined based on detection of the first biomarker, the second biomarker, or the third biomarker in the nucleus of cells in the tissue sample.

Embodiment 38 The method of Embodiment 37, wherein each of the first biomarker score, the second biomarker score, and the third biomarker score are determined based on detection of the first biomarker, the second biomarker, or the third biomarker in the nucleus of cells in the tissue sample.

Embodiment 39. The method of any one of Embodiments 1-38, wherein the therapeutic agent is a Chk1 inhibitor, a Wee1 inhibitor, an ATR, or a combination thereof.

Embodiment 40. The method of Embodiment 39, wherein the therapeutic agent is a Chk1 inhibitor.

Embodiment 41. The method of Embodiment 40, wherein the Chk1 inhibitor is prexasertib, SRA-737, PHI-101, LY2880070, V158411, CASC-578, IMP10, SOL-578, or a pharmaceutically acceptable salt of any of the foregoing.

Embodiment 42. The method of Embodiment 41, wherein the Chk1 inhibitor is prexasertib, or a pharmaceutically acceptable salt thereof.

Embodiment 43. The method of Embodiment 42, wherein the Chk1 inhibitor is prexasertib (S)-lactate monohydrate.

Embodiment 44 The method of Embodiment 39, wherein the therapeutic agent is a Wee1 kinase inhibitor.

Embodiment 45. The method of Embodiment 44, wherein the Wee1 kinase inhibitor is selected from adavosertib (AZD1775, MK1775), azenosertib (Zn-C3), Debio0123, STC 8123, ATRN-1051, NUV-569, and IMP7068.

Embodiment 46. The method of Embodiment 39, wherein the therapeutic agent is an ATR inhibitor.

Embodiment 47. The method of Embodiment 46, wherein the ATR inhibitor is selected from berzosertib (M6620, VX-970), gartisertib (M4344, VX-803), elimusertib (BAY1895344), ceralasertib (AZD6738), M1774, ATRN-119, and camonsertib (RP-3500).

Embodiment 48. The method of any one of Embodiments 1-47, wherein the first biomarker is selected from: Ser296 phosphorylated Chk or nuclear Chk1.

Embodiment 49. The method of Embodiment 48, wherein the first biomarker is Ser296 phosphorylated Chk1.

Embodiment 50 The method of any one of Embodiments 1-49, wherein the second biomarker is Ser473 phosphorylated Kap1.

Embodiment 51. The method of any one of Embodiments 1-50, wherein the third biomarker is cyclin E1 (i.e. total cyclin E1, as described herein).

Embodiment 52. The method of any one of Embodiments 1-51, wherein the first biomarker is Ser296 phosphorylated Chk1, the second biomarker is Ser473 phosphorylated Kap1, and the third biomarker is total cyclin E1 (i.e., total cyclin E1, as described herein).

Embodiment 53. The method of any one of Embodiments 1-52, further comprising administering a second anticancer agent to the subject.

Embodiment 54. A system for validating and/or classifying a subject suffering from a disease, disorder, or condition as likely responsive or likely non-responsive to a therapy prior to administration of said therapy, the system comprising:
a processor, and
a memory having instructions thereof, the instruction, when executed by the processor, cause the processor to perform one or more steps of the method of any one of Embodiments 1-53.

EXEMPLIFICATION

The present teachings include descriptions provided in the Examples that are not intended to limit the scope of any claim. Unless specifically presented in the past tense, inclusion in the Examples is not intended to imply that the experiments were actually performed. The following non-limiting examples are provided to further illustrate the present teachings. Those of skill in the art, in light of the present disclosure, will appreciate that many changes can be made in the specific embodiments that are disclosed and still obtain a like or similar result without departing from the spirit and scope of the present teachings.

Example 1: Prediction of Human Cancer Cell Line Sensitivity

The present Example demonstrates the use of a provided Response-Predictive Signature to predict the sensitivity of human cancer cell lines to treatment with prexasertib. Prior efforts to identify a Response-Predictive Signature have been unsuccessful in predicting sensitivity to prexasertib in human cell lines. In the present Example, fourteen human cancer cell lines were evaluated for three biomarkers to determine the presence of a Response-Predictive Signature that successfully predicts sensitivity to treatment with prexasertib.

In order to classify the cancer cell lines as predicted responders or non-responders, tissue microarrays (TMAs) generated from cell pellets of the human cancer cell lines were stained using antibodies against the three biomarkers and imaged using immunofluorescence microscopy. Biomarker 1 (BM1) was Ser296 phosphorylated Chk1. Biomarker 2 (BM2) was Ser473 phosphorylated Kap1. Biomarker 3 (BM3) was total cyclin E1. Staining with DAPI was used to identify cell nuclei.

For each cancer cell line, individual biomarker scores were calculated as the fraction of tumor cells in the sample that were positive for the biomarker (Table 1). An individual tumor cell was classified as positive for a biomarker if the average nuclear signal (i.e., the average of signal intensities for pixels within the nucleus) of the biomarker in the cell was greater than a background threshold value. For each biomarker, individual tumor cells were assigned to one of 50 bins corresponding to equally spaced average nuclear signal ranges for the biomarker. The background threshold for biomarker 1 was set to include cells with average nuclear signal corresponding to bin 19 or greater. The background threshold for biomarker 2 was set to include cells with average nuclear signal corresponding to bin 7 or greater. The background threshold for biomarker 3 was set to include cells with average nuclear signal corresponding to bin 10 or greater.

To predict the response status of each cell line, a composite score was calculated for each cell line by using a sum of the values of each of the three individual biomarker scores for the cancer cell line giving biomarkers 1 and 3 a 1× weighting and biomarker 2 a 2× weighting (Table 1), e.g., (biomarker 1 score)+(2×biomarker 2 score)+(biomarker 3 score). Human cancer cell lines with a composite score greater than a composite threshold of 0.9 were predicted to be responders (i.e., sensitive to treatment with prexasertib), while cancer cell lines with a composite score less than the composite threshold were predicted to be non-responder (i.e., insensitive to treatment with prexasertib) (Table 1). Those skilled in the art will understand that other values for the composite threshold may also be capable of discriminating between responders and non-responders.

Figure 8:
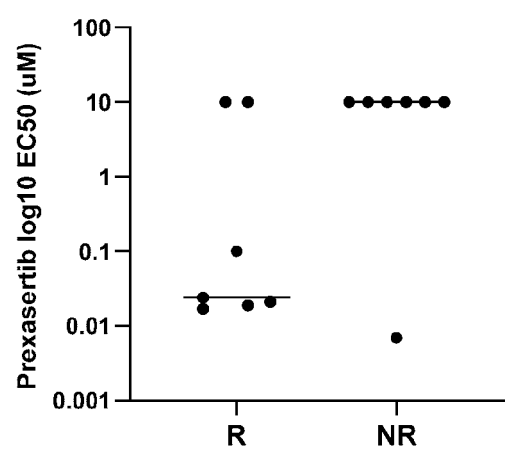
FIG. 8 is a plot providing the sensitivity to prexasertib of predicted responsive (R) and non-responsive (NR) human cancer cell lines. The horizontal line for each group indicates the median.

Predicted response to prexasertib was compared to experimentally measured sensitivity to prexasertib. Sensitivity to prexasertib was quantified as the concentration of prexasertib that when used to treat a cell line resulted in reduction in cell viability by 50% (i.e., $EC_{50}$) $EC_{50}$ values of less than or equal to 1 µM were considered to be actual responders, while values of greater than 1 µM were considered to be actual non-responders. Comparison of predicted response status based on the provided Response-Predictive Signature and the experimentally determined sensitivity demonstrates that the provided Response-Predictive Signature can successfully predict sensitivity to prexasertib treatment (FIG. 8 and Table 1).

Table 1 shows for each evaluated human cancer cell line the individual biomarker scores (BM1, BM2, and BM3), composite score, and predicted response status (R=responder; NR=non-responder), measured sensitivity to prexasertib ($EC_{50}$), and actual response status (R=responder: NR=non-responder) based on measured sensitivity to prexasertib.

TABLE 1

Prediction of human cancer cell line sensitivity

| Cell Line | BM1 Score | BM2 Score | BM3 Score | Composite Score | Prediction | $EC_{50}$ (μM) | Actual |
|---|---|---|---|---|---|---|---|
| U2020 | 0.23 | 0.03 | 0.60 | 0.88 | NR | 0.007 | R |
| CAOV3 | 0.16 | 0.18 | 0.43 | 0.95 | R | 0.017 | R |
| OVCAR3 | 0.86 | 0.47 | 0.83 | 2.63 | R | 0.019 | R |
| BT549 | 0.04 | 0.82 | 0.26 | 1.94 | R | 0.021 | R |
| PC3 | 0.55 | 0.32 | 0.15 | 1.34 | R | >10 | NR |
| A2780 | 0.75 | 0.01 | 0.34 | 1.10 | R | >10 | NR |
| HCT116 | 0.03 | 0.50 | 0.41 | 1.44 | R | 0.1** | R |
| Kuramochi | 0.14 | 0.48 | 0.77 | 1.85 | R | 0.024 | R |
| A549 | 0.14 | 0.00 | 0.27 | 0.42 | NR | >10 | NR |
| U1752 | 0.01 | 0.02 | 0.23 | 0.27 | NR | >10 | NR |
| DU145 | 0.05 | 0.06 | 0.17 | 0.32 | NR | >10 | NR |
| MCF7 | 0.25 | 0.02 | 0.41 | 0.71 | NR | >10 | NR |
| PANC1 | 0.19 | 0.02 | 0.03 | 0.25 | NR | >10** | NR |
| T47D | 0.02 | 0.10 | 0.06 | 0.29 | NR | >10 | NR |

Figure 9A:
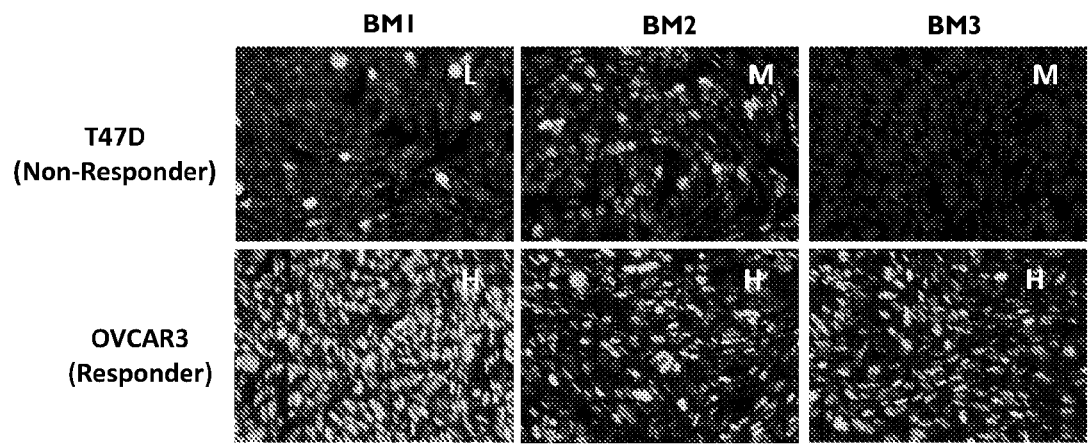
FIG. 9A shows images of a predicted responsive (OVCAR3) and non-responsive (T47D) human cancer cell line stained using antibodies against each of three biomarkers (BM1—Ser296 phosphorylated Chk1, BM2—Ser473 phosphorylated Kap1, BM3—total cyclin E1) and with DAPI staining.
Figure 9B:
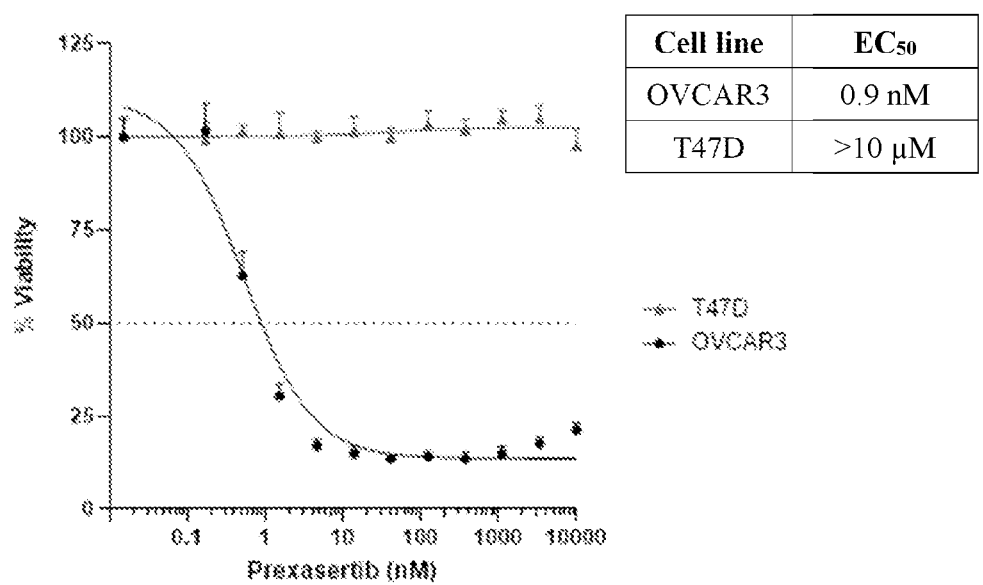
FIG. 9B is a graph providing the percent viability of predicted responsive (OVCAR3) and non-responsive (T47D) human cancer cell lines treated with a range of concentrations of prexasertib. The accompanying table provides the calculated $EC_{50}$ values for each cell line.

**indicates the EC50 value was determined using external data from prior publications Prediction of responders and non-responders can also be accomplished by categorizing individual biomarker scores for each human cancer cell line. Individual biomarker scores between 0 and 0.05 (e.g., have 0 to 5% positive cells) can be classified as low (L). Individual biomarker scores between 0.05 and <0.30 (e.g., have between 5% and <30% positive cells) can be classified as medium (M). Individual biomarker scores between 0.30 and up to 1.00 (e.g., have between 30% and up to 100% positive cells) can be classified as high (H). Responders and non-responders can be predicted based on score classifications for each biomarker (Table 2). To predict a non-responder by this method a score for one or more of the 3 biomarkers should be in L category. To predict a responder by this method, a score for all of the three biomarkers should be in M or H category. The pattern of biomarker score category was used to predict human cancer cell line T47D as a non-responder and OVCAR3 as a responder (FIG. 9A), which is consistent with observed sensitivity to treatment with prexasertib for the two cell lines (FIG. 9B) These results demonstrate successful prediction of response to prexasertib in human cancer cell lines using the three biomarkers.

Table 2 shows biomarker score categories used to predict responders (R) and non-responders (NR).

TABLE 2

Biomarker score categories for predicting human cancer cell line sensitivity

| | Score category | | |
|---|---|---|---|
| Prediction | BM1 | BM2 | BM3 |
| NR | L | L | L |
| R | M or H | M or H | M or H |

Figure 9C:
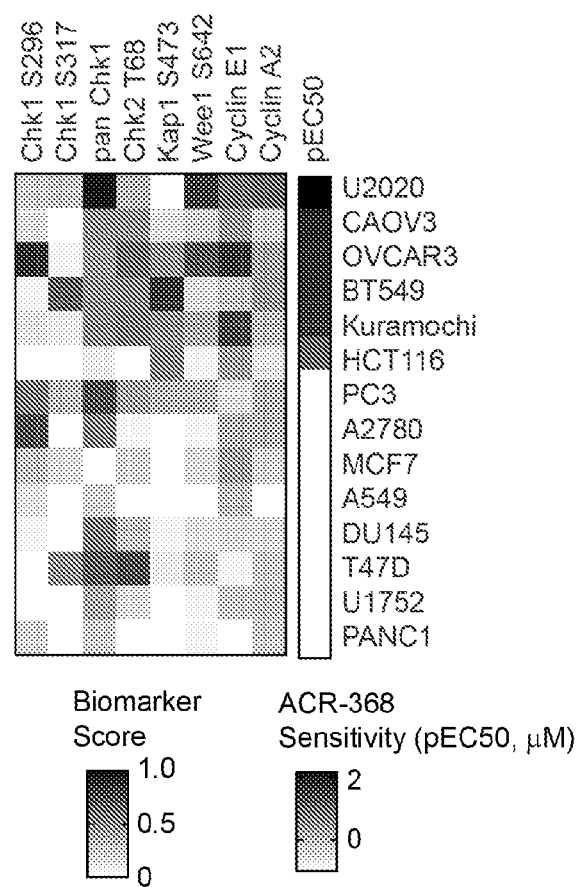
FIG. 9C is a heat map showing the scores for various BM1, BM2, and BM3 in prexasertib-sensitive and prexasertib-resistant cell lines. The BM1 biomarkers analyzed were S296 phosphorylated Chk1 (Chk1 S296), S317 phosphorylated Chk1 (Chk1 S317), T68 phosphorylated Chk2 (Chk2 T68), and total (pan) Chk1 (pan Chk1). The BM2 biomarkers analyzed were S642 phosphorylated Wee1 (Wee1 S642) and S473 phosphorylated Kap1 (Kap1 S473). The BM3 biomarkers analyzed were cyclin A2 and total cyclin E1. The sensitivity of each of the cell lines to prexasertib ("ACR-368") is indicated in the rightmost column (pEC50) and are ordered top to bottom from most sensitive to least sensitive.

Additional biomarker combinations also accurately predict response to prexasertib. For example, biomarker levels of various BM1 (S317 phosphorylated Chk1, T68 phosphorylated Chk2, and total (pan) Chk1), BM2 (S642 phosphorylated Wee1), and BM3 (cyclin A2) were assessed in many of the cell lines tested in Table 1 using the procedure set forth above. The results for each of these other biomarkers and the relative sensitivity of each of the cell lines tested are displayed in a heat map in FIG. 9C.

Example 2: Prediction of Patient Response Frequency Across Human Tumors

The present Example demonstrates the use of a provided Response-Predictive Signature to predict the patient response frequency to treatment with prexasertib for several human cancer types.

To determine the predicted patient response frequency for each human cancer type, tissue microarrays (TMAs) were acquired that contained multiple tumor samples for each cancer type. The tumor samples were manually stained using antibodies against three biomarkers and imaged using immunofluorescence microscopy. Biomarker 1 (BM1) was Ser296 phosphorylated Chk1. Biomarker 2 (BM2) was Ser473 phosphorylated Kap1. Biomarker 3 (BM3) was total cyclin E1. The tumor samples were additionally stained using an antibody against epithelial cytokeratins to identify and distinguish tumor cells of interest from the surrounding stroma. Staining with DAPI was also performed to identify cell nuclei.

For each tumor sample, individual biomarker scores were calculated as the fraction of tumor cells in the sample that were positive for the biomarker. Individual tumor cells were classified as positive for a biomarker if the average nuclear signal of the biomarker for the cell was greater than a background threshold value for the biomarker. The individual biomarker scores can be further binned as either high, medium, or low based on the biomarker score. Individual biomarker scores between 0 and <0.05 were considered low, scores between 0.05 and <0.30 were considered medium, and scores between 0.30 and 1.00 were considered high.

Each tumor sample was predicted as either a responder or non-responder to prexasertib treatment based on a provided Response-Predictive Signature. A tumor sample was predicted to be a responder (R) if each of the individual biomarker scores for the three biomarkers was equal to or greater than a corresponding predictive threshold value for the biomarker. A tumor sample was predicted to be a non-responder (NR) if any of the individual biomarker scores was less than the corresponding predictive threshold value for the biomarker. The predictive threshold values in the present, non-limiting, example for BM1, BM2, and BM3 were 0.05, 0.30, and 0.05, respectively. Those skilled in the art will understand that other values for the predictive thresholds may also be capable of discriminating between responders and non-responders.

The predicted response frequency for each cancer type was calculated based on the number of tumor samples predicted to be responders compared to the total number of tumor samples tested for the cancer type (Table 3). For cancer types where clinical trials examining prexasertib have been performed, the observed response rate (ORR) in patients correlates with the predicted response frequency, thus demonstrating the successful prediction of response rate for different cancer types using the provided Response- Predictive Signature (Table 2). Surprisingly, bladder and endometrial cancers—two cancer types for which clinical trials for prexasertib have not been conducted—were predicted to have a high response frequency compared to other examined cancer types, suggesting that these cancer types are promising new indications for treatment with prexasertib (Table 3). Additionally, the ability of the provided Response-Predictive Signature to predict response rates across multiple different cancer types indicates that the provided Response-Predictive Signature can predict response to treatment for any cancer. Therefore, the biomarkers and provided Response-Predictive Signature described herein define a new way of predicting response to treatment based on the biomarkers without requiring specific information regarding the tissue location or cellular origin of the cancer.

Table 3 shows the results from studies to predict response frequencies using tumor samples for multiple cancer types. For each cancer type, the total tumor samples analyzed, the number of tumors samples classified as predicted responders, and the predicted response frequency are shown. For cancer types where clinical trials have been performed for prexasertib, the observed response rate (ORR) is provided.

TABLE 3

Predicted response frequency by cancer type

| Cancer type | Total tumor samples | Predicted responders | Predicted response frequency | ORR in trials |
|---|---|---|---|---|
| Bladder | 42 | 17 | 40% | N/A |
| Endometrial | 59 | 21 | 36% | N/A |
| Ovarian, metastases | 31 | 10 | 32% | 32% (trial 1*) |
| Ovarian, primary HGS | 84 | 15 | 18% | 19% (trial 2~) |
| Anal, SCC | 11 | 2 | 18% | 15% |
| Cervical, SCC | 76 | 13 | 17% | N/A |
| Head and Neck, SCC | 50 | 8 | 16% | 5% |
| Esophageal, SCC | 82 | 9 | 11% | N/A |
| Colon | 111 | 10 | 9% | N/A |
| Lung Adenocarcinoma | 62 | 1 | 2% | N/A |
| Breast, luminal A | 32 | 0 | 0% | N/A |
| Lung Squamous | 60 | 0 | 0% | N/A |
| SCLC | 18 | 0 | 0% | 0% (platinum resistant) |
|  |  |  |  | 5% (platinum sensitive) |

*Trial 1 is a NCI phase II trial
~Trial 2 is a 46 multi-center, 8-country study which showed 12% confirmed and 7% unconfirmed responders
HGS = high-grade serous; SCC = squamous cell carcinoma; SCLC = small cell lung cancer To evaluate the robustness of the predicted response frequency using the provided Response-Predictive Signature, a second set of tumor samples for each of bladder, endometrial, and primary high-grade serous ovarian cancers were tested. For the second set, instead of a manual staining procedure, an automated staining instrument was used for preparing the tumor samples. The predicted response frequencies for the second set of tumor samples (Table 4) was similar to the response frequencies from the first set of tumor samples (Table 3), demonstrating that the provided Response-Predictive Signature is robust to the method of sample preparation.

Table 4 shows the results of studies to predict response frequencies using tumor samples for multiple cancer types. For each cancer type, the total tumor samples analyzed, the number of tumors samples classified as predicted responders, and the predicted response frequency are shown.

TABLE 4

Predicted response frequencies using an automated staining instrument

| Cancer type | Total tumor samples | Predicted responders | Predicted response frequency |
|---|---|---|---|
| Bladder | 29 | 13 | 45% |
| Endometrial | 51 | 17 | 33% |
| Ovarian, primary HGS | 41 | 10 | 24% |

Example 3: Prediction of Prexasertib Response in Patient-Derived Xenograft (PDX) Models The present Example demonstrates the prediction of response to prexasertib treatment using patient-derived xenograft models of ovarian tumors. Samples of fourteen ovarian PDX tumors were acquired, stained using antibodies against three biomarkers, and imaged using immunofluorescence microscopy. Biomarker 1 (BM1) was Ser296 phosphorylated Chk1. Biomarker 2 (BM2) was Ser473 phosphorylated Kap1. Biomarker 3 (BM3) was total cyclin E1. Staining with epithelial cytokeratins and DAPI was also performed to identify tumor areas and cell nuclei, respectively. For each PDX model individual biomarker scores were calculated as the fraction of tumor cells in the sample that were positive for the biomarker (Table 5). Individual tumor cells were classified as positive for a biomarker if the average nuclear signal of the biomarker for the cell was greater than a background threshold value. Each PDX model was predicted as either a responder or non-responder to prexasertib treatment based on a provided Response-Predictive Signature (Table 5). A PDX model was predicted to be a responder (R) if all the individual biomarker scores for each of the three biomarkers were equal to or greater than a corresponding predictive threshold value for the biomarker. A PDX model was predicted to be a non-responder (NR) if any of the individual biomarker scores was less than the corresponding predictive threshold value for the biomarker. The predictive threshold values for BM1, BM2, and BM3 were 0.051, 0.05, and 0.05, respectively. Those skilled in the art will understand that other values for the predictive thresholds may also be capable of discriminating between responders and non-responders.

Figure 10:
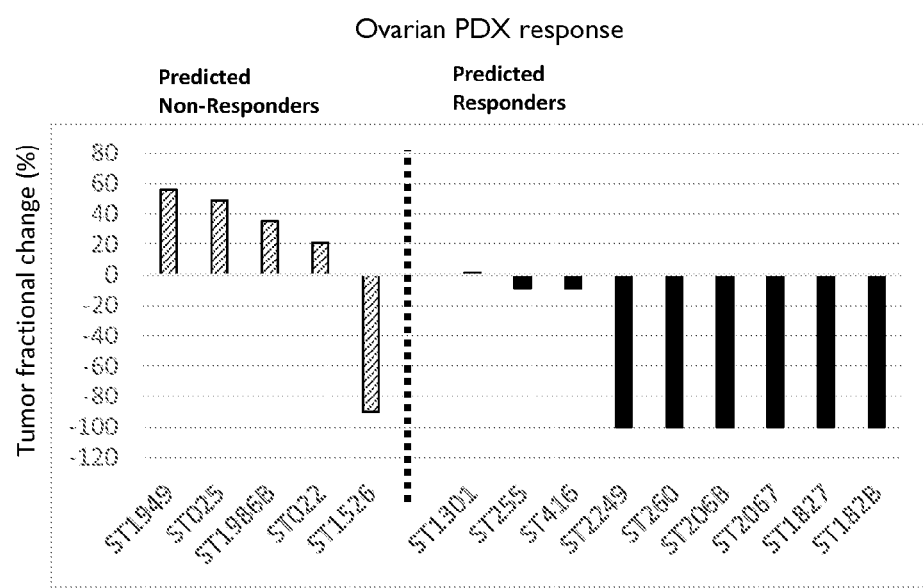
FIG. 10 is a plot providing the fractional change in tumor volume upon treatment with prexasertib compared to treatment with vehicle control for various predicted responsive and non-responsive ovarian patient-derived xenograft (PDX) tumor models.

To evaluate whether the provided Response-Predictive Signature can predict response to prexasertib treatment, the predicted response for each PDX model was compared to an experimentally determined response to prexasertib treatment for the same PDX model. The experimentally measured response was quantified as follows: if a treated tumor reduced in size/volume, then the percent regression compared to an initial volume of a treated tumor was provided, if a treated tumor increased in size/volume, then a percent ratio of the treated tumor's growth was divided by control tumor (i.e., untreated tumor) growth (d[T/C]). Negative values for regression percentage indicate response to treatment with prexasertib, while positive values indicate continued growth and non-response to prexasertib treatment. The experimentally measured response was further categorized as complete regression (near −100% regression), partial regression (−50% to −100% regression), stasis (<20% median tumor growth to −50% regression), and growth (>20% median tumor growth). The predicted response correlated with the experimentally determined response (Table 5 and FIG. 10), demonstrating that the Response-Predictive Signature can successfully predict response to prexasertib treatment in ovarian PDX tumor models.

Table 5 shows the results of a study to predict response to prexasertib treatment in ovarian PDX tumor models. For each PDX model, the individual biomarker scores, predicted response, measured regression percentage, and measured response type is indicated.

TABLE 5

Prediction of response to prexasertib treatment in ovarian PDX tumor models

| PDX model | BM1 Score | BM2 Score | BM3 Score | Prediction | Best d[T/C], or Regression (%) | Response type |
|---|---|---|---|---|---|---|
| ST182B | 0.95 | 0.85 | 0.63 | R | −100 | CR |
| ST1827 | 0.76 | 0.09 | 0.62 | R | −100 | CR |
| ST2067 | 0.59 | 0.64 | 0.6 | R | −100 | CR |
| ST206B | 0.74 | 0.23 | 0.42 | R | −100 | CR |
| ST255 | 0.75 | 0.61 | 0.32 | R | −8.9 | S |
| ST260 | 0.2 | 0.39 | 0.32 | R | −100 | CR |
| ST2249 | 0.78 | 0.29 | 0.3 | R | −100 | CR |
| ST416 | 0.57 | 0.07 | 0.17 | R | −9 | S |
| ST1301 | 0.32 | 0.55 | 0.15 | R | 1.2 | S |
| ST022 | 0.16 | 0.02 | 0 | NR | 21.1 | G |
| ST1526 | 0.06 | 0.01 | 0.11 | NR | −90 | PR |
| ST1986B | 0.6 | 0 | 0.39 | NR | 35.1 | G |
| ST025 | 0.63 | 0 | 0 | NR | 48.9 | G |
| ST1949 | 0.05 | 0.11 | 0.58 | NR | 56 | G |

CR = complete regression;
PR = partial regression;
S = stasis;
G = growth.

Figure 11:
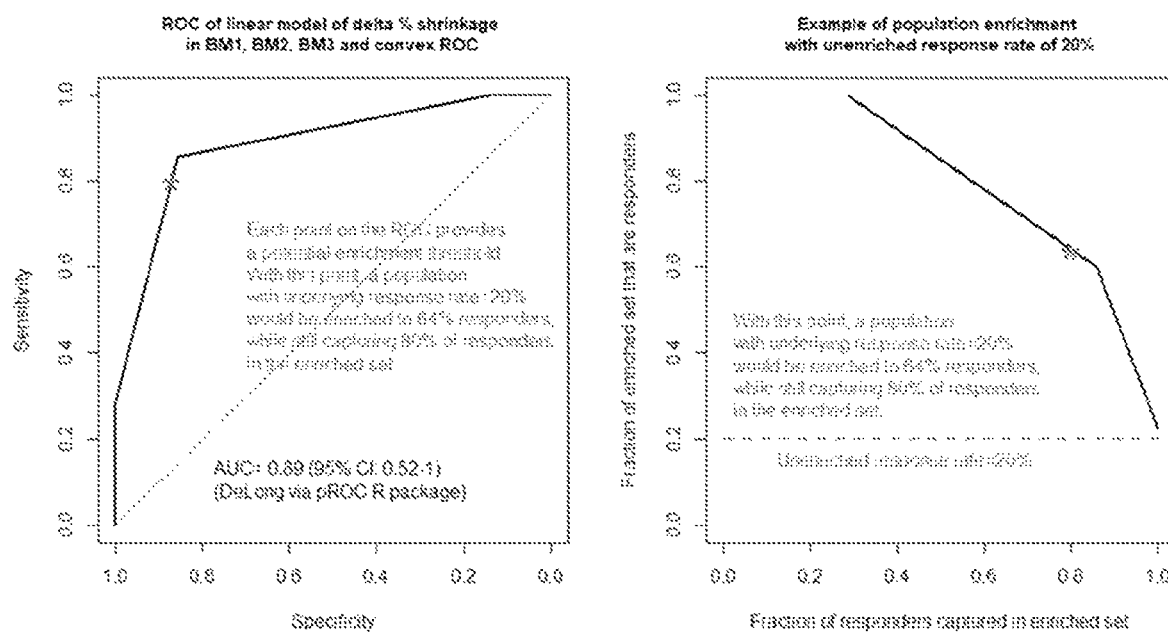
FIG. 11 are plots showing results of using linear modeling of individual biomarker scores to predict responsive and non-responsive samples using ovarian PDX tumor models. It demonstrates the substantial enrichment for drug response provided by the Response-Predictive Signature. The unenriched response rate of 20% is increased to 64%, while successfully identifying 80% of drug responders.

An alternative Response-Predictive Signature to predict response to prexasertib treatment was also developed from the ovarian PDX tumor models based on linear modeling of the individual biomarker scores and the percent shrinkage in tumor volume upon treatment (e.g., regression percentage). To evaluate the performance of this model, an analysis of the receiver operator curve (ROC) was performed. The model was determined to be highly predictive with an area under the curve (AUC) of 0.89 with a 95% confidence interval of 0.52 to 1 (FIG. 11). This model would allow selection, from a population that has a 20% actual response rate, a predicted response group that is 64% responders (~3.5-fold responder enrichment), while still capturing 80% of all actual responders in the population (FIG. 11). This responder enrichment is more than double the observed response rate (ORR) required for an accelerated registration trial and demonstrates the success of the biomarkers in predicting response to prexasertib treatment.

Example 4: Prediction of Patient Responders Using Fresh-Frozen Clinical Tumor Samples The present Example demonstrates the prediction of patient response to prexasertib therapy using pre-treatment tumor biopsy sections from metastatic high-grade serous ovarian cancer patients. The study was conducted in a blinded, prospectively designed manner on pretreatment tumor biopsies collected from ovarian cancer patients treated in phase 2 trials at the NCI in the past with prexasertib, including a previous single center phase II clinical trial for prexasertib in metastatic high-grade serous ovarian cancer, see Lee et al., Lancet Oncol. 19(2):207-215 (2018). These past studies were unable to identify predictive biomarkers. To evaluate whether a provided Response-Predictive Signature can successfully predict patient responders, frozen, de-identified sections of pre-treatment tumor biopsies from the phase II clinical trials were obtained. Moreover, they were received without any knowledge about clinical annotation, including response to prexasertib Each patient tumor biopsy sample was stained using antibodies against three biomarkers and imaged using immunofluorescence microscopy. Biomarker 1 (BM1) was Ser296 phosphorylated Chk1. Biomarker 2 (BM2) was Ser473 phosphorylated Kap1. Biomarker 3 (BM3) was total cyclin E1. Unless otherwise indicated, these were the biomarkers used throughout the Examples.

The tumor samples were additionally stained using an antibody against cytokeratin in order to identify and distinguish tumor cells of interest from the surrounding stroma and stained with DAPI to identify cell nuclei.

For each patient tumor biopsy sample, individual biomarker scores were calculated as the fraction of tumor cells in the sample that were positive for the biomarker (Table 6). Individual tumor cells were classified as positive for a biomarker if the average nuclear signal of the biomarker for the cell was greater than a background threshold value. For each biomarker, individual tumor cells were assigned to one of 50 bins corresponding to equally spaced average nuclear signal ranges for the biomarker. The background threshold for biomarker 1 was set to include cells with average nuclear signal corresponding to bin 13 or greater. The background threshold for biomarker 2 was set to include cells with average nuclear signal corresponding to bin 9 or greater. The background threshold for biomarker 3 was set to include cells with average nuclear signal corresponding to bin 10 or greater.

Each patient was predicted as either a responder or non-responder to prexasertib treatment based on a provided Response-Predictive Signature (Table 6) A patient was predicted to be a responder (R) if all the individual biomarker scores for each of the three biomarkers were equal to or greater than a corresponding predictive threshold value for the biomarker. A patient was predicted to be a non-responder (NR) if any of the individual biomarker scores was less than the corresponding predictive threshold value for the biomarker. The predictive threshold values for BM1, BM2, and BM3 were 0.141, 0.071, and 00404, respectively. Those skilled in the art will understand that other values for the predictive thresholds may also be capable of discriminating between responders and non-responders.

Figure 5:
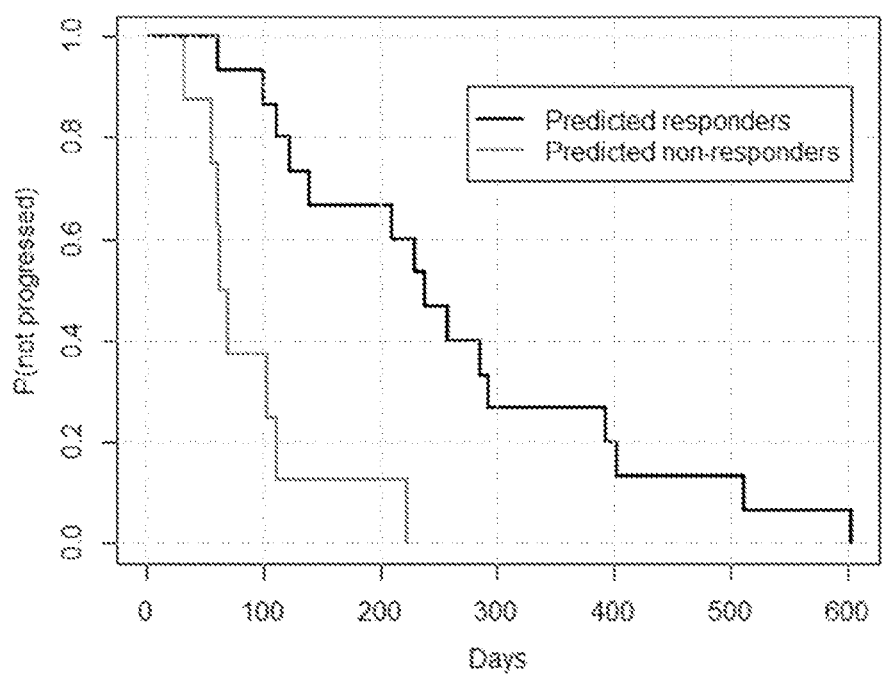
FIG. 5 is a plot providing median survival of predicted responsive and non-responsive subjects that were administered prexasertib.
Figure 12:
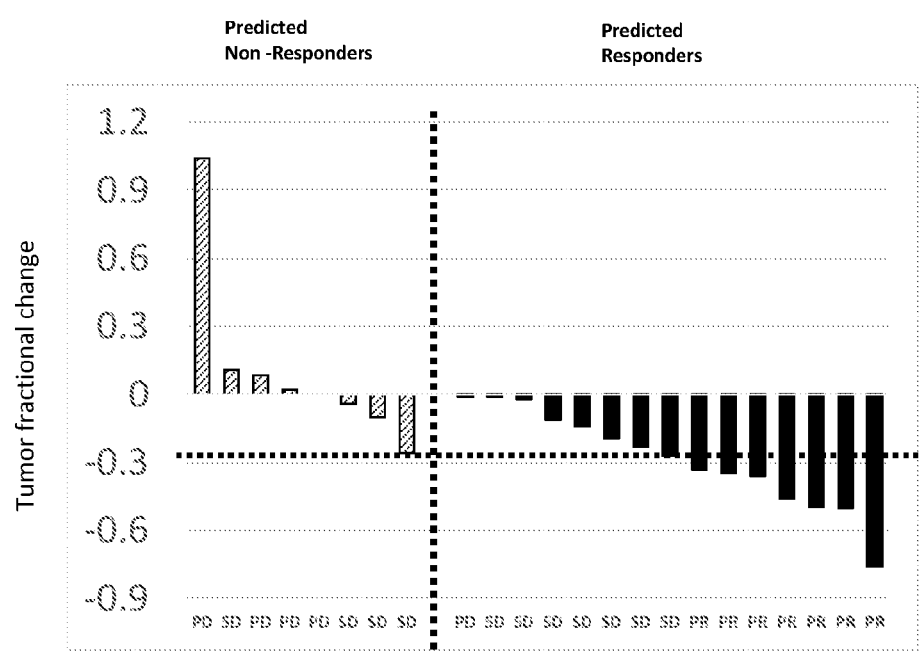
FIG. 12 is a plot providing the fractional change in tumor volume upon treatment with prexasertib for ovarian cancer patients who were predicted to be either responsive or non-responsive in a blinded, prospectively-designed study based on pre-treatment tumor biopsies collected from patients previously treated with prexasertib.
Figure 13:
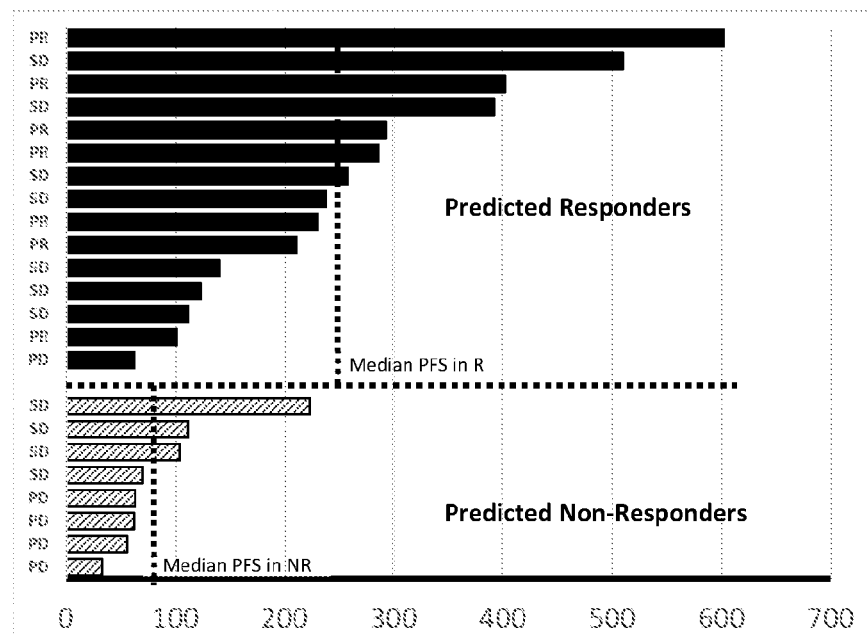
FIG. 13 is a plot providing the progression-free survival (PFS) of predicted responsive (R) and non-responsive (NR) ovarian cancer patients treated with prexasertib from the same patient cohort as shown in FIG. 11. The accompanying table shows the median PFS for all predicted responders and non-responders, and for predicted responders and non-responders with stable disease (SD). The 80% confidence interval (CI) is shown, if determined.
Figure 14A:
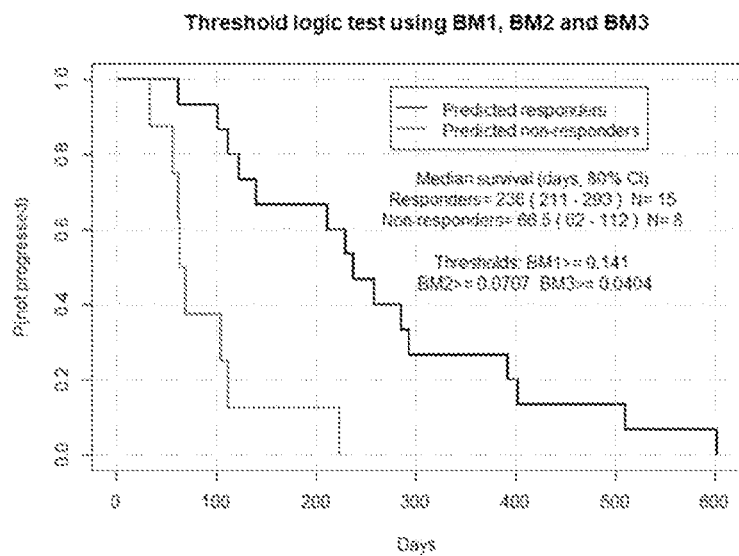
FIGS. 14A-14G are plots showing the survival over time of predicted responder and predicted non-responder ovarian cancer patient groups treated with prexasertib. Prediction of response status was performed using three biomarkers individually and in combination.
Figure 14B:
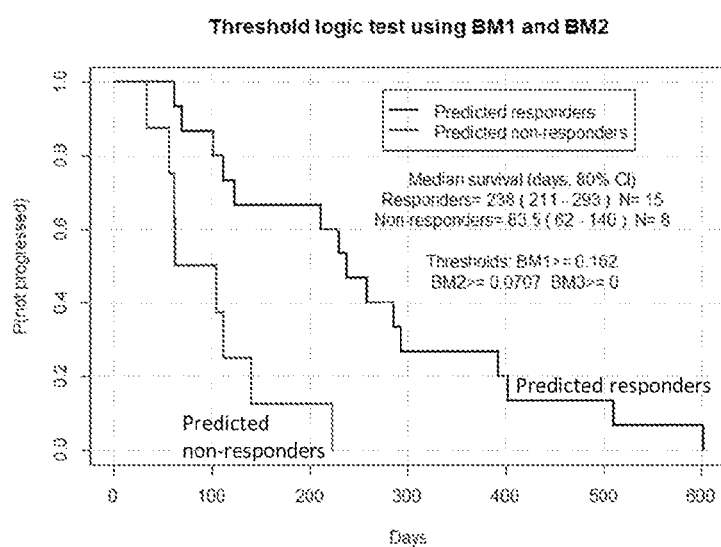
Figure 14C:
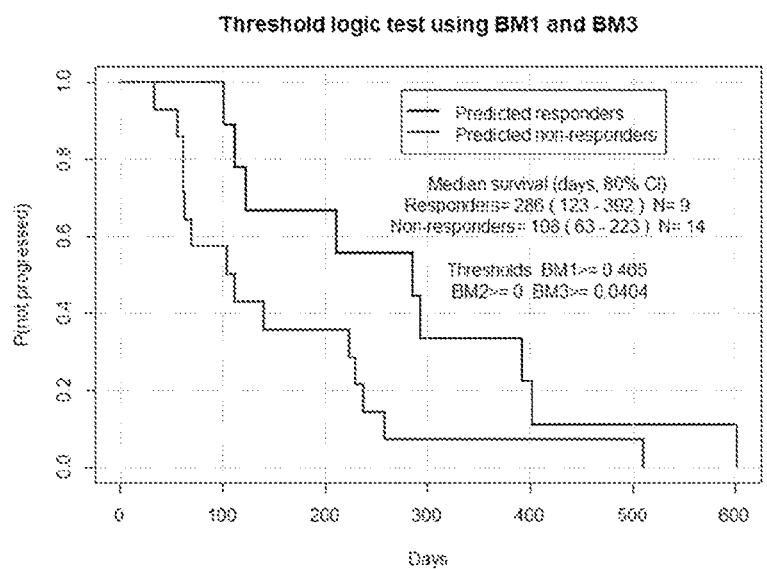
Figure 14D:
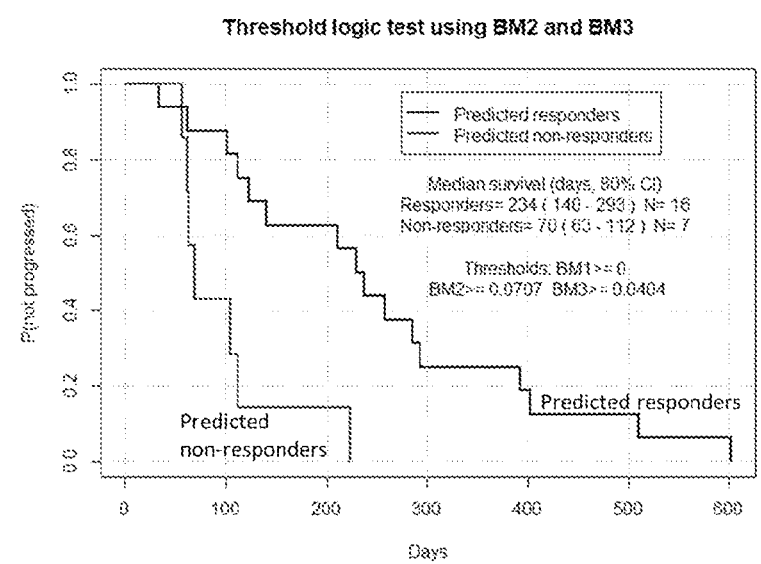
Figure 14E:
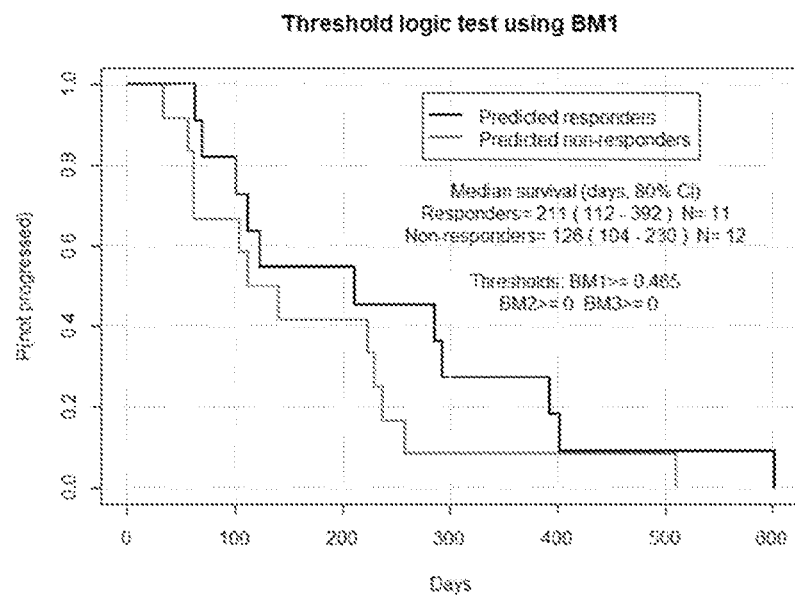
Figure 14F:
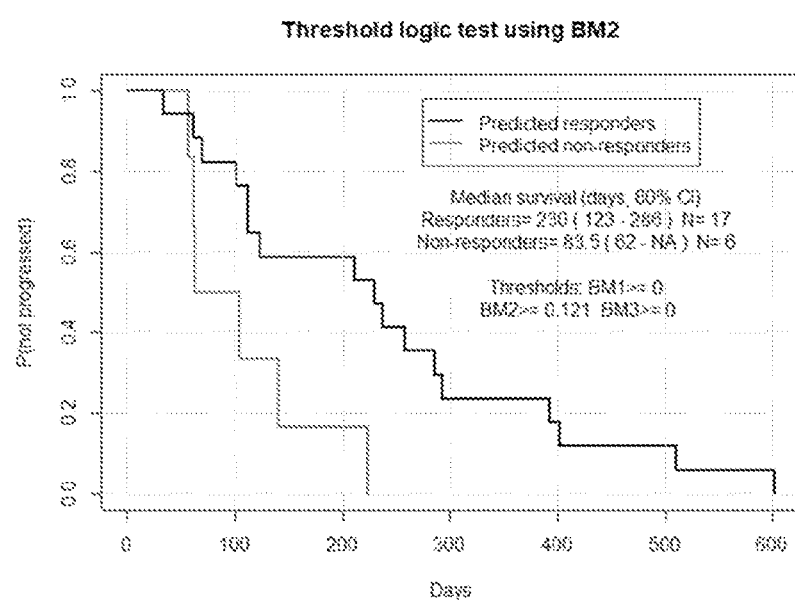
Figure 14G:
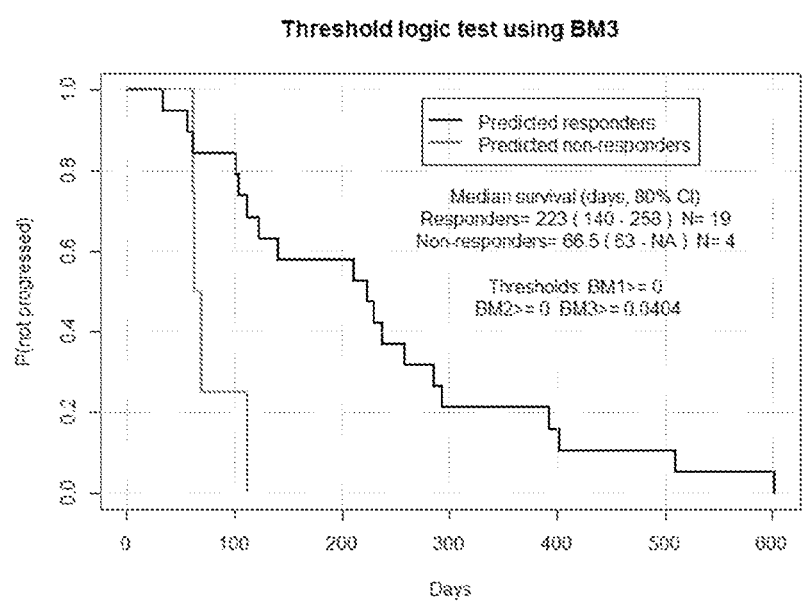

To evaluate whether the provided Response-Predictive Signature can predict response to prexasertib treatment, the predicted response for each patient was compared to the observed treatment outcomes in the previously conducted phase II clinical trials for the patient (Table 6 and FIGS. 5, 12, and 13). This was done in a blinded manner, with quantitative biomarker scores and clinical annotation provided to a third-party biostatistician and the principal investigator, respectively. Observed treatment outcomes were classified according to RECIST criteria as partial response (PR), stable disease (SD), or progressive disease (PD). Notably, all patients that showed partial response were predicted to be responders, while no patients predicted to be non-responders showed partial response (Table 6). Additionally, the observed treatment outcome was quantified based on the fractional change in tumor volume after treatment and progression free survival (PFS) (Table 6 and FIGS. 5, 12, and 13). Patients predicted to be responders showed observed treatment outcomes with greater reduction in tumor volume (FIG. 12) and generally longer PFS (FIGS. 5 and 13) when treated with prexasertib. Surprisingly, even for patients that showed stable disease after treatment with prexasertib, those that were predicted to be responders displayed longer PFS than those that were predicted as non-responders (FIG. 13). These results demonstrate that the provided Response-Predictive Signature can successfully predict patient response to prexasertib using pre-treatment tumor biopsy samples.

Table 6 shows the results of a study to predict patient response to prexasertib treatment using pre-treatment tumor biopsy sections from metastatic high-grade serous ovarian cancer patients. For each patient, the individual biomarker scores, predicted response, RECIST classification of treatment result, fractional change in tumor volume (FracShrink), and PFS is provided.

To validate the combination of the three biomarkers for use in predicting response to treatment with prexasertib, the ability of the individual biomarkers and combinations of two of the three biomarkers to predict response to treatment was evaluated for comparison. For each individual biomarker or combination of biomarkers, patients were predicted as either a responder or non-responder to prexasertib treatment based on a Response-Predictive Signature. A patient was predicted to be a responder if the individual biomarker scores for each biomarker being examined were equal to or greater than a corresponding predictive threshold value for the biomarker (Table 7). A patient was predicted to be a non-responder if any of the individual biomarker scores for the biomarkers being examined was less than the corresponding predictive threshold value for the biomarker. Predictive thresholds for each biomarker were determined by optimizing to minimize the sum of the number of patients classified as a responder that showed progressive disease upon treatment and the number of patients classified as a non-responder that showed partial response upon treatment. Within optimal ranges, the predictive thresholds were further optimized based on the difference between the mean of maximum shrinkage in SD.

Table 7 shows the predictive threshold values used for predicting responder and non-responder patients using the three biomarkers in combination, in combinations of two biomarkers, and individually.

TABLE 7

Predictive threshold values used to classify patients as predicted responders and non-responders

| Biomarkers for Prediction | Predictive Threshold | | |
|---|---|---|---|
| | BM1 | BM2 | BM3 |
| BM1, BM2, BM3 | 0.141 | 0.0707 | 0.0404 |
| BM1, BM2 | 0.162 | 0.0707 | N/A |

TABLE 6

Prediction of patient response to prexasertib treatment using pre-treatment tumor biopsy sections

| Patient | BM1 Score | BM2 Score | BM3 Score | Prediction | Treatment Result (RECIST) | FracShrink | PFS (days) |
|---|---|---|---|---|---|---|---|
| 3600 | 0.63 | 0.69 | 0.67 | R | SD | −0.194 | 112 |
| 4300 | 0.82 | 0.92 | 0.64 | R | SD | −0.01 | 123 |
| 1369 | 0.88 | 0.34 | 0.62 | R | PR | −0.36 | 101 |
| 305 | 0.81 | 0.22 | 0.55 | R | PR | −0.345 | 402 |
| 32 | 0.72 | 0.51 | 0.43 | R | PR | −0.46 | 286 |
| 4000 | 0.53 | 0.26 | 0.36 | R | PR | −0.33 | 211 |
| 4600 | 0.64 | 0.33 | 0.27 | R | SD | −0.27 | 392 |
| 1391av | 0.35 | 0.47 | 0.245 | R | PD | −0.01 | 62 |
| 1352av | 0.355 | 0.66 | 0.22 | R | SD | −0.23 | 510 |
| 1101 | 0.48 | 0.41 | 0.2 | R | PR | −0.76 | 602 |
| 550 | 0.3 | 0.67 | 0.15 | R | SD | −0.14 | 238 |
| 81 | 0.42 | 0.6 | 0.13 | R | SD | −0.02 | 258 |
| 1000 | 0.16 | 0.12 | 0.11 | R | SD | −0.11 | 140 |
| 3 | 0.54 | 0.77 | 0.09 | R | PR | −0.5 | 293 |
| 1200av | 0.35 | 0.23 | 0.06 | R | PR | −0.495 | 230 |
| 1550 | 0.7 | 0.54 | 0.04 | NR | SD | 0.109 | 70 |
| 51 | 0.44 | 0.07 | 0.27 | NR | PD | 0 | 56 |
| 406 | 0.33 | 0.05 | 0.58 | NR | SD | −0.26 | 223 |
| 4150 | 0.46 | 0.04 | 0.1 | NR | SD | −0.1 | 104 |
| 126 | 0.61 | 0.01 | 0.02 | NR | PD | 1.04 | 63 |
| 68 | 0.14 | 0.43 | 0.1 | NR | PD | 0.02 | 33 |
| 412 | 0.12 | 0.03 | 0.01 | NR | PD | 0.085 | 62 |
| 4200 | 0.05 | 0.43 | 0.02 | NR | SD | −0.04 | 112 |

"av" indicates patients with duplicate tested biopsy samples which were scored as a single averaged sample.

TABLE 7-continued

Predictive threshold values used to classify patients as predicted responders and non-responders

| Biomarkers for Prediction | Predictive Threshold | | |
|---|---|---|---|
| | BM1 | BM2 | BM3 |
| BM1, BM3 | 0.465 | N/A | 0.0404 |
| BM2, BM3 | N/A | 0.0707 | 0.0404 |
| BM1 | 0.465 | N/A | N/A |
| BM2 | N/A | 0.121 | N/A |
| BM3 | N/A | N/A | 0.0404 |

The ability of the three biomarkers to predict response to treatment either individually, in a combination of two biomarkers, or as a combination of all three biomarkers was evaluated using the observed treatment outcome for predicted responder and non-responder patient groups. Prediction using all three biomarkers in combination showed greater separation in median survival after treatment with prexasertib between predicted responder and non-responder groups than prediction using the biomarkers individually or in a combination of two biomarkers (FIGS. 14A-14G). These results support the synergistic effect of using all three biomarkers in combination, as opposed to the individual biomarkers on their own, to predict response to treatment.

Example 5: Prediction of Patient Responders Using Formalin-Fixed Paraffin Embedded Clinical Tumor Samples This Example demonstrated the prediction of patient response to prexasertib therapy using pre-treatment formalin-fixed paraffin embedded (FFPE) tumor biopsy sections from metastatic high-grade serous ovarian cancer patients. Biopsy samples from several independent clinical phase 2 studies were merged for this analysis based on availability. Study JTJN (NCT03414047) was a large multicenter, multi-country, non-randomized, parallel cohort, Phase 2 study of prexasertib in subjects with advanced stage, high grade serous ovarian, primary peritoneal, or fallopian tube cancer. Several single-center phase 2 studies sponsored by NCI of prexasertib in BRCA1/2 wild-type or BRCA1/2 mutant recurrent high-grade serous ovarian cancer (NCT02203513) provided additional FFPE samples; see Lee, Lancet Oncol. 19(2):207-215 (2018) To evaluate whether a provided Response-Predictive Signature can successfully predict patient responders, sections of pre-treatment tumor biopsies were stained blinded to treatment outcome using antibodies against three biomarkers (biomarker 1 (BM1) Ser296 phosphorylated Chk1, biomarker 2 (BM2) Ser473 phosphorylated Kap1, and biomarker 3 (BM3) total cyclin E1) and imaged using immunofluorescence microscopy. The tumor samples were additionally stained using an antibody against cytokeratin in order to identify and distinguish tumor cells of interest from the surrounding stroma and stained with DAPI to identify cell nuclei.

Individual biomarker scores were calculated for each biomarker as the fraction of tumor cells in the sample that were positive for the biomarker (Table 8). The quantitative biomarker scores were provided to a third-party biostatistician. Individual tumor cells were classified as positive for a biomarker if the average nuclear signal of the biomarker for the cell was greater than a background threshold value. For each biomarker, individual tumor cells were assigned to one of 50 bins corresponding to equally spaced average nuclear signal ranges for the biomarker. The background threshold for biomarker 1 was set to include cells with average nuclear signal corresponding to bin 8 or greater. The background threshold for biomarker 2 was set to include cells with average nuclear signal corresponding to bin 5 or greater. The background threshold for biomarker 3 was set to include cells with average nuclear signal corresponding to bin 11 or greater.

Individual Response-Predictive Signature (Table 8) was used to predict whether a patient was a prexasertib treatment responder or non-responder. A patient was predicted to be a responder (R) if the biomarker score for each of the three biomarkers was equal to or greater than a corresponding predictive threshold value for that biomarker A patient was predicted to be a non-responder (NR) if any of the individual biomarker scores was less than the corresponding predictive threshold value for the biomarker. The predictive thresholds were derived through logistic and linear regression methods as well as direct optimization, and performance evaluated through extensive train-test via Jack-Knife to prevent overfitting and further evaluated with bootstrapping. Predictive threshold values based on transformations using the logistic function directly model the probability of a patient responding, given the patient's biomarker scores and intensity measurements. Predictive threshold values based on transformations using the log function capture the expected log-normal, constant coefficient of variation distribution of the measurements. The predictive threshold values for BM1, BM2, and BM3 were 0.18, 0.08, and 0.11, respectively. Those skilled in the art will understand that other values for the predictive thresholds may also be capable of discriminating between responders and non-responders.

Figure 15:
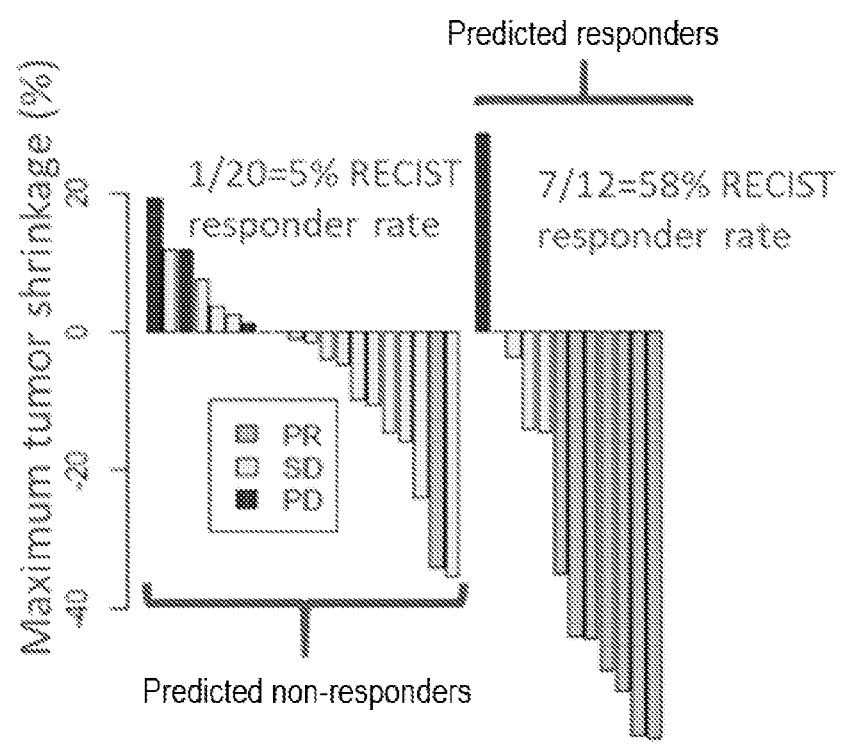
FIG. 15 shows prediction of ovarian cancer patient response to prexasertib treatment with the Response-Predictive Signature plotted as maximal tumor shrinkage. Predictions were made in a blinded, prospectively designed manner on formalin-fixed paraffin embedded pre-treatment tumor biopsy sections collected from patients treated with prexasertib from past clinical trials. Wilcoxon p-value is 0.008 for difference in tumor shrinkage between predicted responders and predicted non-responders.
Figure 16A:
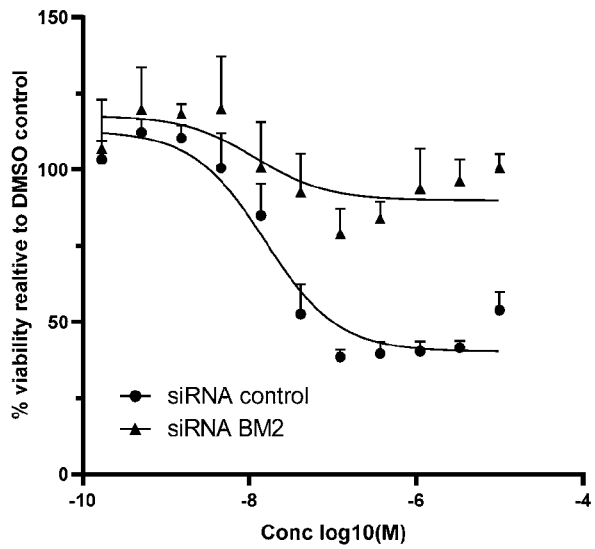
FIGS. 16A-16D are plots demonstrating the sensitivity of OVCAR3 cells knocked down with biomarker-specific siRNA or control siRNA to various concentrations of prexasertib.
Figure 16B:
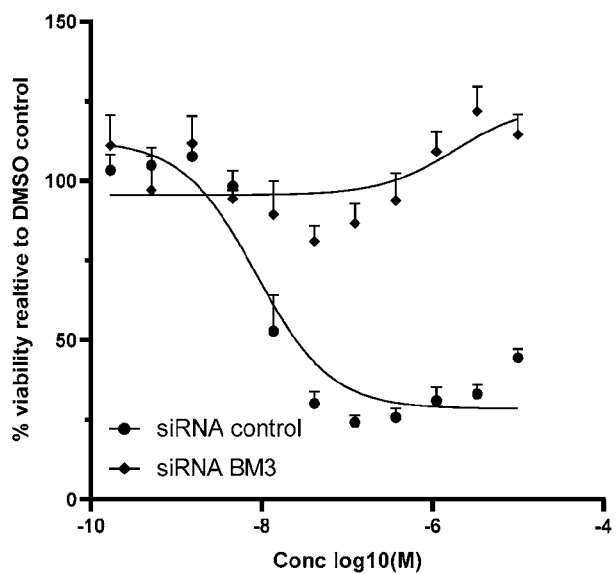
Figure 16C:
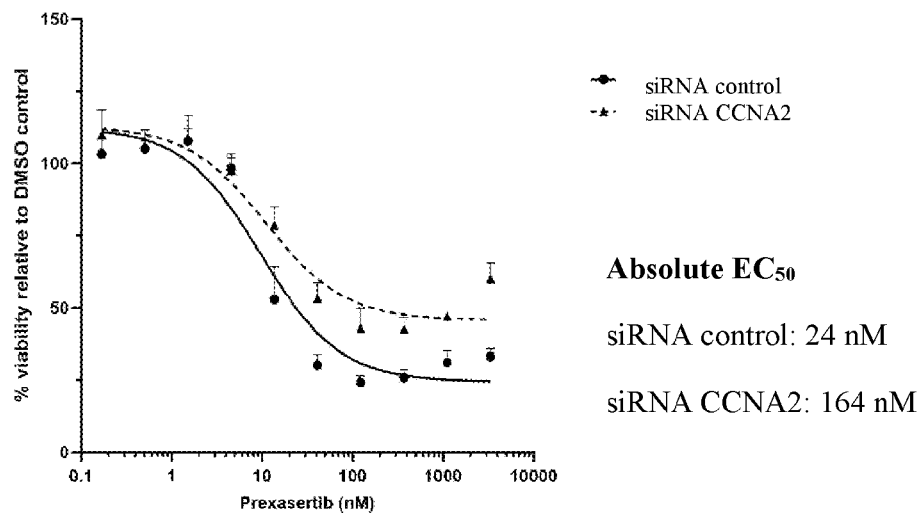
Figure 16D:
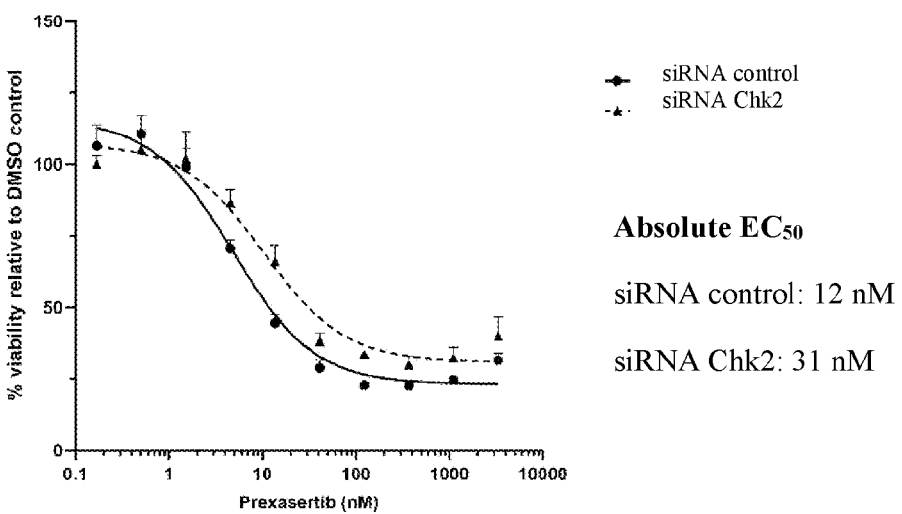

The Response-Predictive Signature was evaluated by comparing predicted response to prexasertib of each patient to observed response in the clinical trials (Table 8, FIG. 15). Observed clinical trial responses were provided separately to the third party biostatistician. They were classified according to RECIST criteria as complete response (CR), partial response (PR), stable disease (SD), or progressive disease (PD). Additionally, the observed treatment outcome was quantified based on the maximum fractional change in tumor volume after treatment (Table 8, FIG. 15). Notably, all but one patient that showed RECIST response (PR or CR) were predicted to be responders, and all but one patient that showed RECIST progressive disease (PD) were predicted to be non-responders. Clinical RECIST responder rate (PR or CR) among those predicted by the Response-Predictive Signature to be non-responders was 5%. Clinical RECIST responder rate (PR or CR) among those predicted by the Response-Predictive Signature to be responders was 58%. This 58% represented a substantial responder-enrichment over the overall unenriched response rate of 25%. The Response-Predictive Signature also showed statistical significance in identifying patients with increase tumor shrinkage after prexasertib treatment, with a Wilcoxon test p-value of 0.008 (FIG. 15).

Table 8 shows the results of a study to predict patient response to prexasertib treatment using pre-treatment tumor biopsy sections from metastatic high-grade serous ovarian cancer patients. For each patient, the individual biomarker scores, Response-Predictive Signature. RECIST classification of treatment result, and fractional change in tumor volume (FracShrink) are provided.

TABLE 8

Response-Predictive Signature prediction of patient response to prexasertib treatment using formalin-fixed paraffin embedded pre-treatment tumor biopsy sections

| ID | BM1 Score | BM2 Score | BM3 Score | Response-Predictive Signature | RECIST Responder | RECIST response category | Best Tumor Shrinkage (fraction from baseline) |
|---|---|---|---|---|---|---|---|
| 1243 | 0.664 | 0.097 | 0.511 | R | TRUE | PR | 0.444 |
| 1006 | 0.371 | 0.008 | 0.166 | NR | FALSE | SD | 0.048 |
| 1020 | 0.766 | 0.109 | 0.344 | R | FALSE | SD | 0.146 |
| 1037 | 0.287 | 0.084 | 0.082 | NR | FALSE | SD | 0.159 |
| 1042 | 0.826 | 0.528 | 0.642 | R | FALSE | SD | 0 |
| 1061 | 0.261 | 0.078 | 0.477 | NR | FALSE | SD | −0.037 |
| 1069 | 0.569 | 0.058 | 0.003 | NR | FALSE | PD | −0.118 |
| 1095 | 0.379 | 0.015 | 0.397 | NR | FALSE | SD | 0.353 |
| 1107 | 0.749 | 0.053 | 0.418 | NR | FALSE | SD | −0.024 |
| 1126 | 0.728 | 0.003 | 0.158 | NR | FALSE | SD | −0.077 |
| 1155 | 0.306 | 0.068 | 0.142 | NR | FALSE | SD | 0 |
| 1167 | 0.682 | 0.226 | 0.513 | R | TRUE | PR | 0.441 |
| 1173 | 0.680 | 0.111 | 0.282 | R | TRUE | PR | 0.52 |
| 1179 | 0.843 | 0.14 | 0.448 | R | TRUE | PR | 0.584 |
| 1191 | 0.227 | 0.003 | 0.482 | NR | TRUE | PR | 0.342 |
| 1206 | 0.648 | 0.271 | 0.535 | R | FALSE | PD | −0.287 |
| 1217 | 0.602 | 0.023 | 0.234 | NR | FALSE | SD | 0 |
| 1241 | 0.822 | 0.137 | 0.029 | NR | FALSE | SD | 0.105 |
| 1254 | 0.414 | 0.009 | 0.22 | NR | FALSE | PD | −0.192 |
| 1262 | 0.033 | 0.013 | 0.634 | NR | FALSE | SD | 0.146 |
| 1267 | 0.397 | 0.425 | 0.242 | R | FALSE | SD | 0.038 |
| 1269 | 0.755 | 0.467 | 0.301 | R | TRUE | PR | 0.492 |
| 1286 | 0.637 | 0.074 | 0.247 | NR | FALSE | PD | −0.012 |
| 1298 | 0.198 | 0.015 | 0.07 | NR | FALSE | SD | −0.118 |
| 3203 | 0.887 | 0.002 | 0.442 | NR | FALSE | SD | 0.015 |
| 3403 | 0.859 | 0.088 | 0.452 | R | TRUE | PR | 0.59 |
| 3703 | 0.2 | 0.006 | 0.287 | NR | FALSE | SD | 0.24 |
| 2053 | 0.773 | 0.117 | 0.537 | R | TRUE | PR | 0.35 |
| 4153 | 0.311 | 0.004 | 0.007 | NR | FALSE | SD | 0.1 |
| 4203 | 0.124 | 0 | 0.059 | NR | FALSE | SD | 0.04 |
| 4302 | 0.035 | 0.217 | 0.26 | NR | FALSE | SD | 0.01 |
| 553 | 0.288 | 0.147 | 0.174 | R | FALSE | SD | 0.14 |

SD: stable disease;
PR: partial response;
PD: progressive disease;
RECIST: Response Evaluation Criteria In Solid Tumor;
BM1: biomarker 1;
BM2: biomarker 2;
BM3: biomarker 3;
R: Responder;
NR: Non-responder

Example 6: Knockdown of Biomarkers in Prexasertib-Sensitive Cells Causes Prexasertib Resistance The present Example provides experimental evidence that reducing levels of one of biomarkers BM1, BM2, or BM3 via siRNA knockdown below predictive threshold levels increases resistance to prexasertib in certain cells. In the present example, knockdown of BM1 is knockdown of CHEK2 (which encodes Chk2) and is thus representative of any one of Thr68 phosphorylated Chk2, Ser516 phosphorylated Chk2, Thr383 phosphorylated Chk2, or Thr387 phosphorylated Chk2 as BM1. Knockdown of BM2 is knockdown of TRIM28 (which encodes Kap1) and is representative of Ser473 phosphorylation of Kap1 as BM2. Knockdown of BM3 is knockdown of either: i) CCNE1 (which encodes cyclin E1) and is thus representative of any one of total cyclin E1, Ser100 phosphorylated cyclin E1, Ser103 phosphorylated cyclin E1, Ser387 phosphorylated cyclin E1, or Thr395 phosphorylated cyclin E1 as BM3; or (ii) CCNA2 (which encodes cyclin A2) and is thus representative of total cyclin A2 as BM3.

As shown in Table 1, above, OVCAR3 cells are responsive to prexasertib. OVCAR3 cells cultured in RPMI medium with 20% FBS were transfected with siRNA (Silencer Select, cat #4390824. ThermoFisher) targeting TRIM28 (KAP1) CCNE1. CCNA2, or CHEK2, as compared with a negative control siRNA (cat #4390843, ThermoFisher) using RNAiMAX transfection reagent (ThermoFisher). Twenty-four hours after the transfection, cells were reseeded into 384-well plates and left to adhere for 24 hours before being treated with increasing doses of prexasertib. Relative cell viability against a DMSO control was assessed 72 hours after drug treatment using Cell Titer Glo 2.0 (Promega) and a SpectraMax microplate reader. The results are shown in FIGS. 16A-16D. Error bars represent standard deviations from quadruplicate samples. The absolute $EC_{50}$ for prexasertib in the BM2 (TRIM28 (KAP1)) and BM3 (CCNE1) siRNA knockdown experiments was each >10 µM, as compared to 0.1 µM and 0.025 µM for cells treated with a negative control siRNA in the BM2 (TRIM28 (KAP1)) and BM3 (CCNE1 (cyclin E1)) knockdown experiment, respectively. The absolute $EC_{50}$ for prexasertib in the BM1 (CHEK2 (Chk2)) and BM3 (CCNA2 (cyclin A2)) siRNA knockdown experiments was 31 nM and 164 nM, respectively, as compared to 12 nM and 24 nM for cells treated with a negative control siRNA in the BM1 (CHEK2 (Chk2)) and BM3 (CCNA2 (cyclin A2)) knockdown experiment, respectively.

Example 7: Determination of Background Threshold and Scoring Tumor Samples for Phosphorylated KAP1 ("Biomarker 2"

This Example demonstrates how to determine a background threshold level for a biomarker for use in the disclosed methods.

Biomarker 2 intensity Measurements

A typical data set included multiple tumor samples from different subjects and multiple images were obtained from each tumor sample. Each tumor sample was stained with a cytokeratin-specific stain to distinguish tumor cells from non-tumor cells, DAPI (a nucleus-specific stain), and an antibody specific for biomarker 2 (BM2). These multiplex images from each tumor sample were uploaded into inForm® Tissue Analysis Software (Akoya Biosciences), which then calculated a mean BM2 intensity for each nucleus in an image. An example of the readout of this calculation is shown in the Table 9 below for 12 different cell nuclei in one image of a tumor sample.

TABLE 9

Intensity readout of BM2 signal from nuclei in a tumor sample image

| Cell ID | Nucleus BM2 mean intensity values |
|---|---|
| 1 | 177.879 |
| 2 | 284.748 |
| 3 | 135.543 |
| 4 | 229.742 |
| 5 | 40.959 |
| 6 | 44.578 |
| 7 | 123.17 |
| 8 | 70.191 |

TABLE 9-continued

Intensity readout of BM2 signal from
nuclei in a tumor sample image

| Cell ID | Nucleus BM2 mean intensity values |
|---|---|
| 9 | 118.828 |
| 10 | 233.291 |
| 11 | 277.025 |
| 12 | 399.835 |

Bin Distribution and Bin Size Calculation inForm software generated a 50-bin frequency distribution for mean nuclear BM2 signal. To determine bin size as the main distribution parameter, a signal intensity range for the highest intensity bin (i.e., the 50$^{th}$ bin) was established. This was done by taking three representative sample images from three separate tumor samples that had the highest overall intensity for BM2 staining. In each of these sample images, we measured the nuclear signal intensity of the top 2% cells having the highest BM2 signal. We then averaged those intensity values to provide a threshold for the highest bin, which was 500 intensity units. The size of each bin was 1/50 of 50$^{th}$ bin threshold, or 10 intensity units (i.e., bin 1: 0-10 intensity units; bin 2—11-20 intensity units . . . bin 49: 481-490 intensity units; bin 50: >491 intensity units). For each image in the dataset, the inForm software calculated the BM2 signal intensity for each nucleus therein and distributed that nucleus into the appropriate bin. This was done for each image of each tumor sample in the dataset. The resulting output for a given image was a table with values for number of tumor nuclei (numerical) or % of tumor nuclei (percentage) in each bin. A part of this table representing bins 1-10 is shown below (Table 10). Next, for each tumor sample a combined 50-bin percentage distribution is calculated by combining 50-bin frequency distributions for each image of that tumor sample.

TABLE 10

First 10 bins of a 50-bin distribution for a representative image of a tumor sample

| | Bin 1 | Bin 2 | Bin 3 | Bin 4 | Bin 5 | Bin 6 | Bin 7 | Bin 8 | Bin 9 | Bin 10 |
|---|---|---|---|---|---|---|---|---|---|---|
| % of tumor nuclei in bin | 0.13% | 0.52% | 2.09% | 2.74% | 3.66% | 3.26% | 4,57% | 4.44% | 5.09% | 4.83% |
| Number of tumor nuclei in bin | 1 | 4 | 16 | 21 | 28 | 25 | 35 | 34 | 39 | 37 |

Background Threshold Determination

A background threshold was determined by first combining the 50-bin distributions from the three tumor samples having the lowest overall BM2 staining intensity ("BM2 lowest") and three tumor samples having the highest overall BM2 staining intensity ("BM2 highest") in the dataset. The overall BM2 staining intensity for a tumor sample was calculated by inForm software as mean intensity of BM2 in all tumor nuclei in all images from that sample. To generate combined distributions, for each bin, the number of nuclei from each image of each of the three selected tumor samples falling in that bin is summed and then the percentage of nuclei from those three samples was calculated. BM2 scores were calculated for different bins as percent of all cells present in a given bin and all bins above, e.g., the score for bin 8 was the sum of percent of cells in bins 8-50. Representative bin scores for bins 8-12 is shown in Table 11. Bin 9, which provided a bin score for "BM2 lowest" samples closest to 1% was selected as the background threshold bin. With a bin size of 10 intensity units, that corresponds to background threshold value of 80 intensity units.

TABLE 11

Calculations for determination of background threshold

| | Score 8$^{th}$ bin | Score 9$^{th}$ bin | Score 10$^{th}$ bin | Score 11$^{th}$ bin | Score 12$^{th}$ bin |
|---|---|---|---|---|---|
| BM2 Lowest | 2.21% | 1.10% | 0.60% | 0.34% | 0.22% |
| BM2 highest | 81.59% | 77.36% | 73.22% | 69.51% | 65.43% |

A similar process was used to determine the background threshold for other biomarkers useful in the methods disclosed herein.

Example 8: CHEK1 Gene Dependency Correlates with WEE1 and ATR Gene Dependency

Figure 17A:
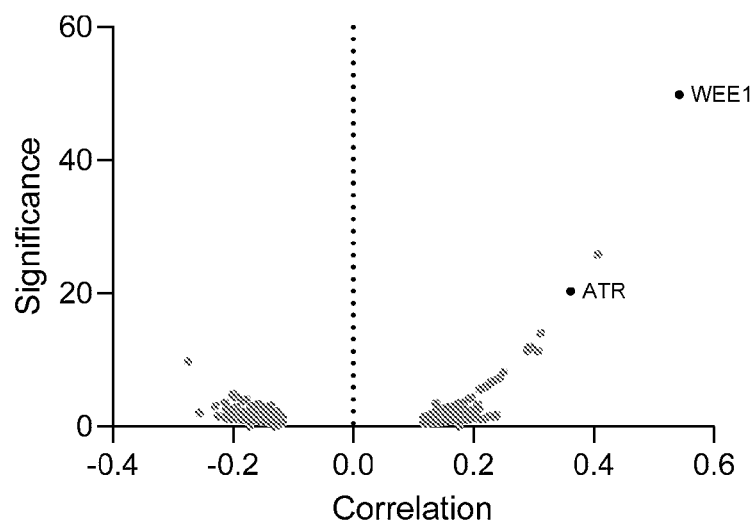
FIG. 17A shows a volcano plot of WEE1 and ATR genetic dependencies correlating to CHEK1 dependency. Data retrieved from DepMap portal (depmap.org/portal).
Figure 17B:
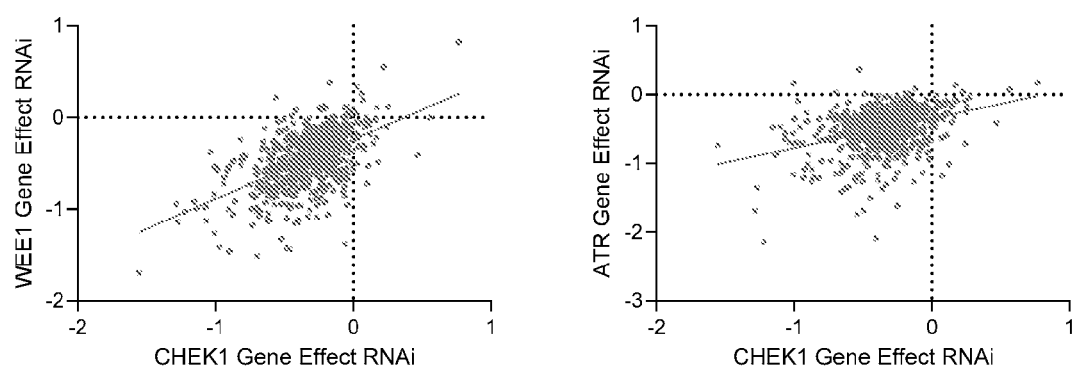
FIG. 17B shows scatter plots of WEE1 (left) and ATR (right) genetic dependencies correlating to CHEK1 dependency. Data retrieved from DepMap portal (depmap.org/portal).

This Example demonstrates that knockdown of WEE1 or ATR by RNAi highly correlates to CHEK1 dependency across hundreds of screened cell lines. Data was plotted by searching for top co-dependencies for CHEK1 gene, as assessed by RNAi screening, in the DepMap portal (depmap.org/portal). FIG. 17A shows a volcano plot of the top 1000 genetic dependencies (gray dots) correlated to CHEK1 dependency across CCLE (Cancer Cell Line Encyclopedia) RNAi data, with WEE1 and ATR dependencies highlighted (black dots and annotated). FIG. 17B show scatter plots of CHEK1 RNAi scores correlated to WEE1 RNAi scores across 669 CCLE cell lines (left panel) and ATR RNAi scores across 710 CCLE cell lines (right panel). Table 12 summarizes the top 10 significant genetic dependencies, showing values of number of cell lines involved, Correlation r, statistic P and Q, as well as −log10 transformed Q.

TABLE 12

Top 10 genetic dependencies correlated to CHEK1 dependencies

| Gene | Number of Cell Lines | Correlation | P Value | Q Value | Significance (−log10 Q) |
|---|---|---|---|---|---|
| WEE1 | 669 | 0.542313 | 2.04E−52 | 1.34E−50 | 49.8713 |
| RAD17 | 706 | 0.407553 | 1.25E−29 | 1.28E−26 | 25.89238 |
| TOPBP1 | 706 | 0.406527 | 1.78E−29 | 1.28E−26 | 25.89238 |
| ATR | 710 | 0.36156 | 2.38E−23 | 4.66E−21 | 20.33153 |
| RRM2 | 706 | 0.312035 | 2.08E−17 | 9.97E−15 | 14.00121 |
| U2SURP | 708 | 0.296935 | 7.05E−16 | 1.05E−12 | 11.97959 |

TABLE 12-continued

Top 10 genetic dependencies correlated to CHEK1 dependencies

| Gene | Number of Cell Lines | Correlation | P Value | Q Value | Significance (-log10 Q) |
|---|---|---|---|---|---|
| RRM1 | 706 | 0.290604 | 3.31E−15 | 1.19E−12 | 11.92433 |
| POLE | 708 | 0.288901 | 4.46E−15 | 3.31B−12 | 11.47974 |
| CLSPN | 599 | 0.308174 | 1.21E−14 | 4.55E−12 | 11.3416 |
| CDC24B | 708 | −0.27518 | 9.09E−14 | 1.74E−10 | 9.760373 |

Figure 18:
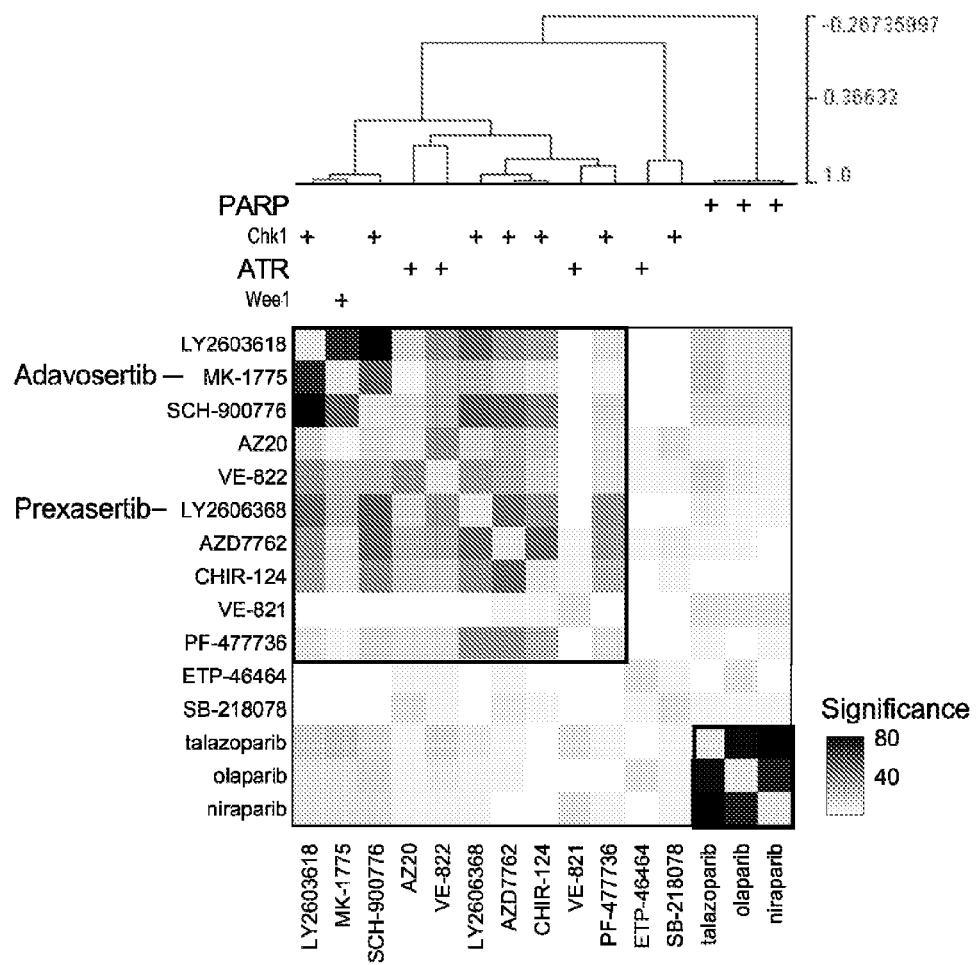
FIG. 18 shows inhibitors targeting Chk1, Wee1, and ATR exhibiting highly correlating profiles. Data retrieved from DepMap portal (depmap.org/portal).

Example 9: Inhibitors Targeting Chk1, Wee1 and ATR Exhibit Highly Correlating Profiles This Example demonstrates that the sensitivity profiles of cell lines treated with various Chk1 inhibitors, Wee1 inhibitors, or ATR inhibitors show strong correlation. FIG. 18 shows data that was retrieved from the dataset of PRISM Secondary Drug Screen at DepMap Portal (depmap.org/portal) and subsequently analyzed for correlations. The correlation matrix shows hierarchically clustered correlation significance (−log10 transformed p value) among sensitivity profiles of CCLE cell lines for Chk1, Wee1, and ATR inhibitors. Highly correlated profiles of Chk1, Wee1, and ATR inhibitors are highlighted with a black-bordered box (top left). In contrast, sensitivity profiles of PARP inhibitors are shown with distinguishable correlations, also highlighted with a black-bordered box (bottom right). Dendogram is shown with distance value indicated to the right.

Figure 19A:
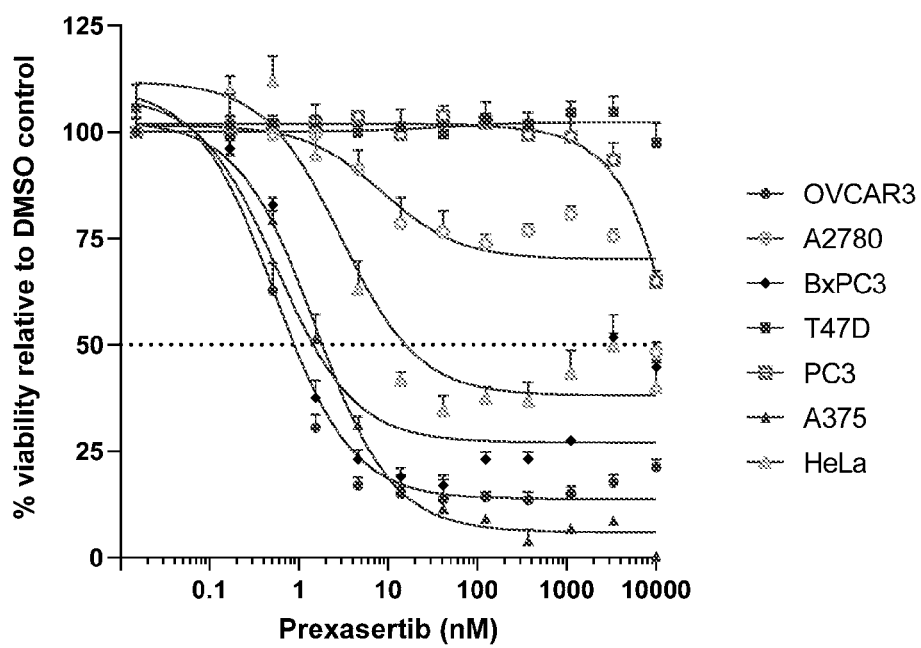
FIG. 19A shows sensitivity to Chk1 inhibitor prexasertib across cell lines of various indications (ovarian cancer, breast cancer, prostate cancer, pancreatic cancer, cervical cancer, melanoma).
Figure 19B:
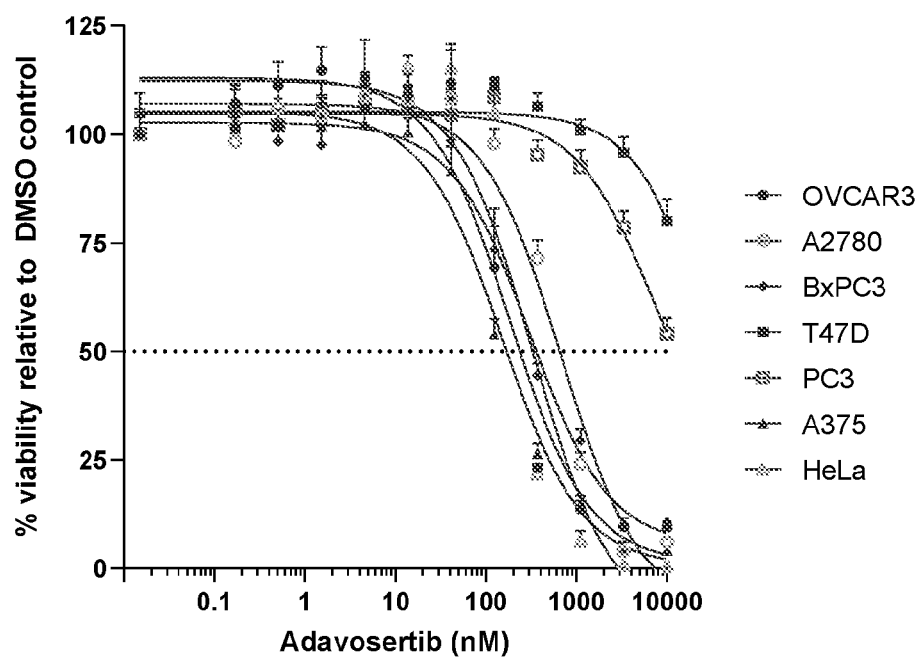
FIG. 19B shows sensitivity to Wee1 inhibitor adavosertib across cell lines of various indications (ovarian cancer, breast cancer, prostate cancer, pancreatic cancer, cervical cancer, melanoma).
Figure 19C:
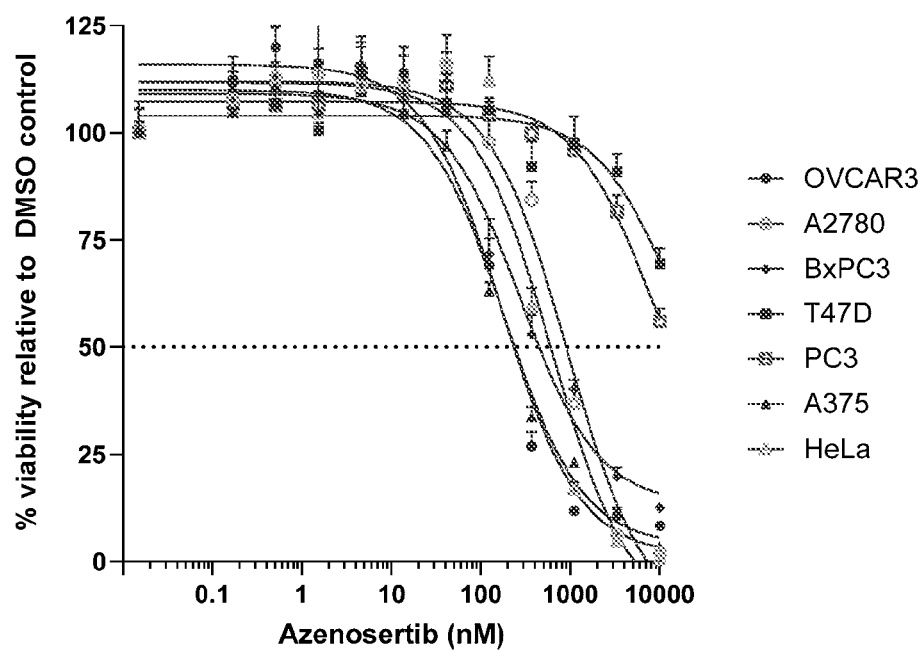
FIG. 19C shows sensitivity to Wee1 inhibitor azenosertib (Zn-C3) across cell lines of various indications (ovarian cancer, breast cancer, prostate cancer, pancreatic cancer, cervical cancer, melanoma).
Figure 20:
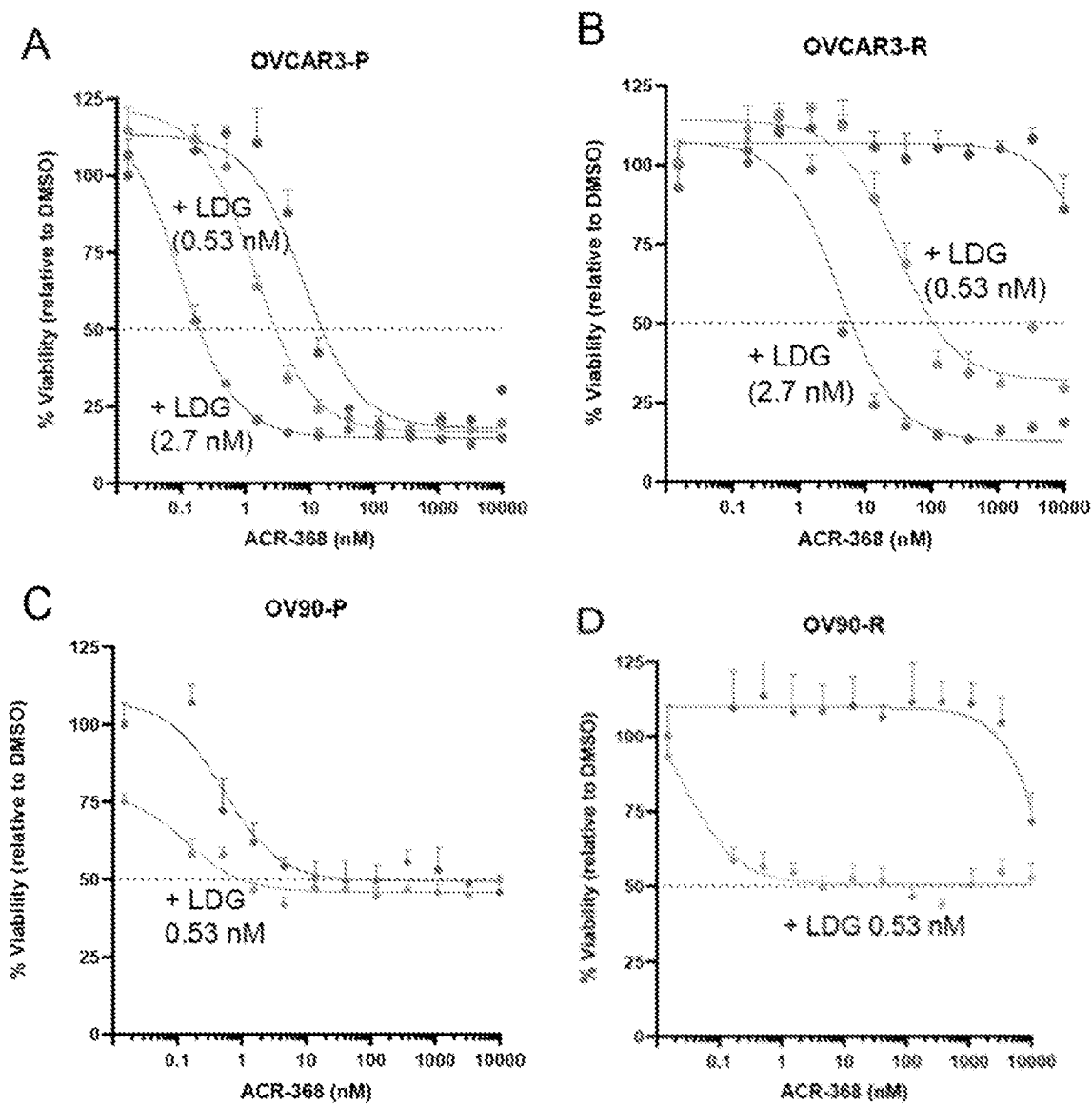
FIGS. 20A-20K show dose response viability curves in various cell lines for treatment with prexasertib (denoted as "ACR-368") over a range of concentrations alone or in combination with gemcitabine at low doses (denoted as "LDG"; 0.53 or 2 7 nM).
Figure 20:
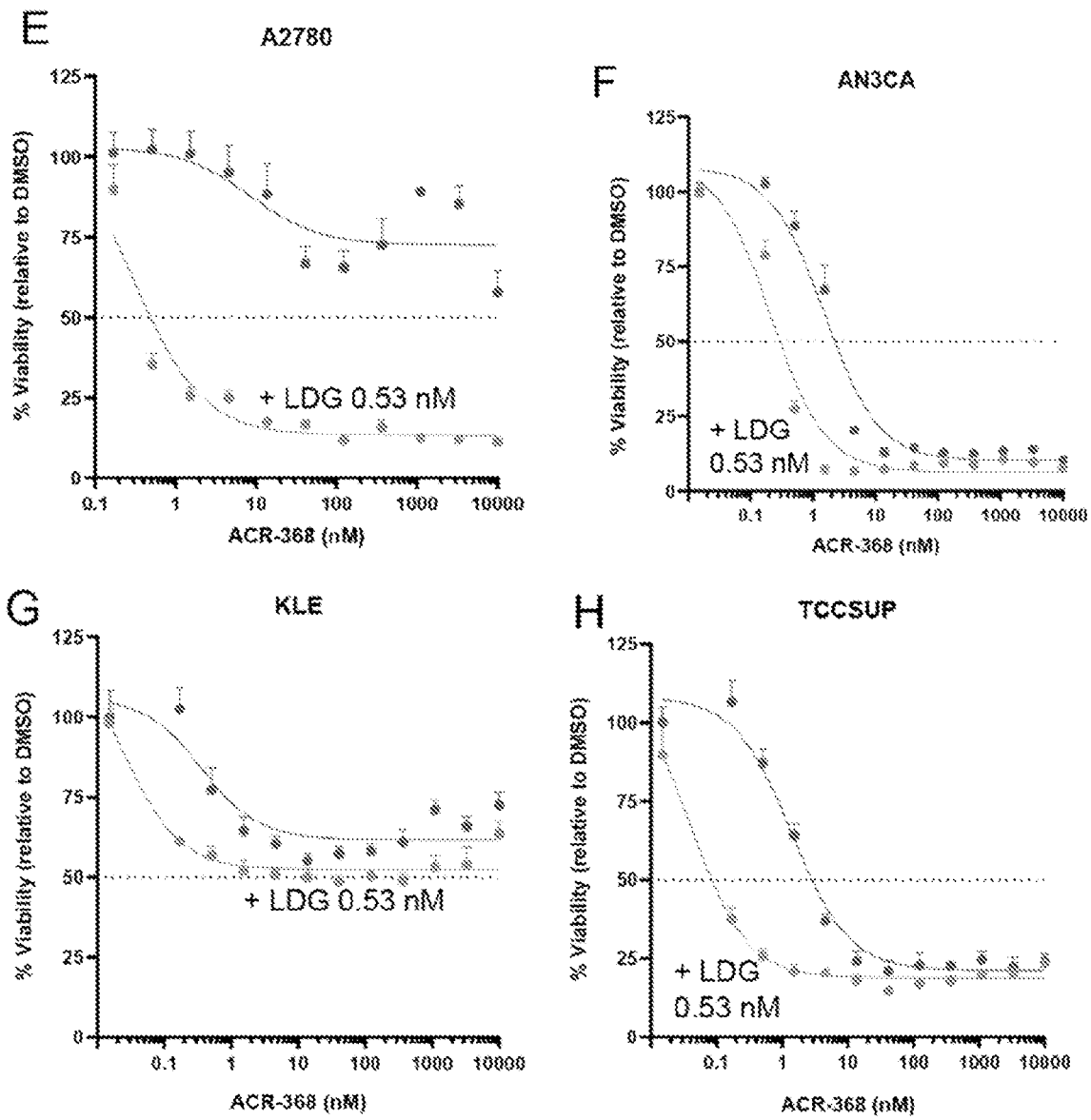
Figure 20:
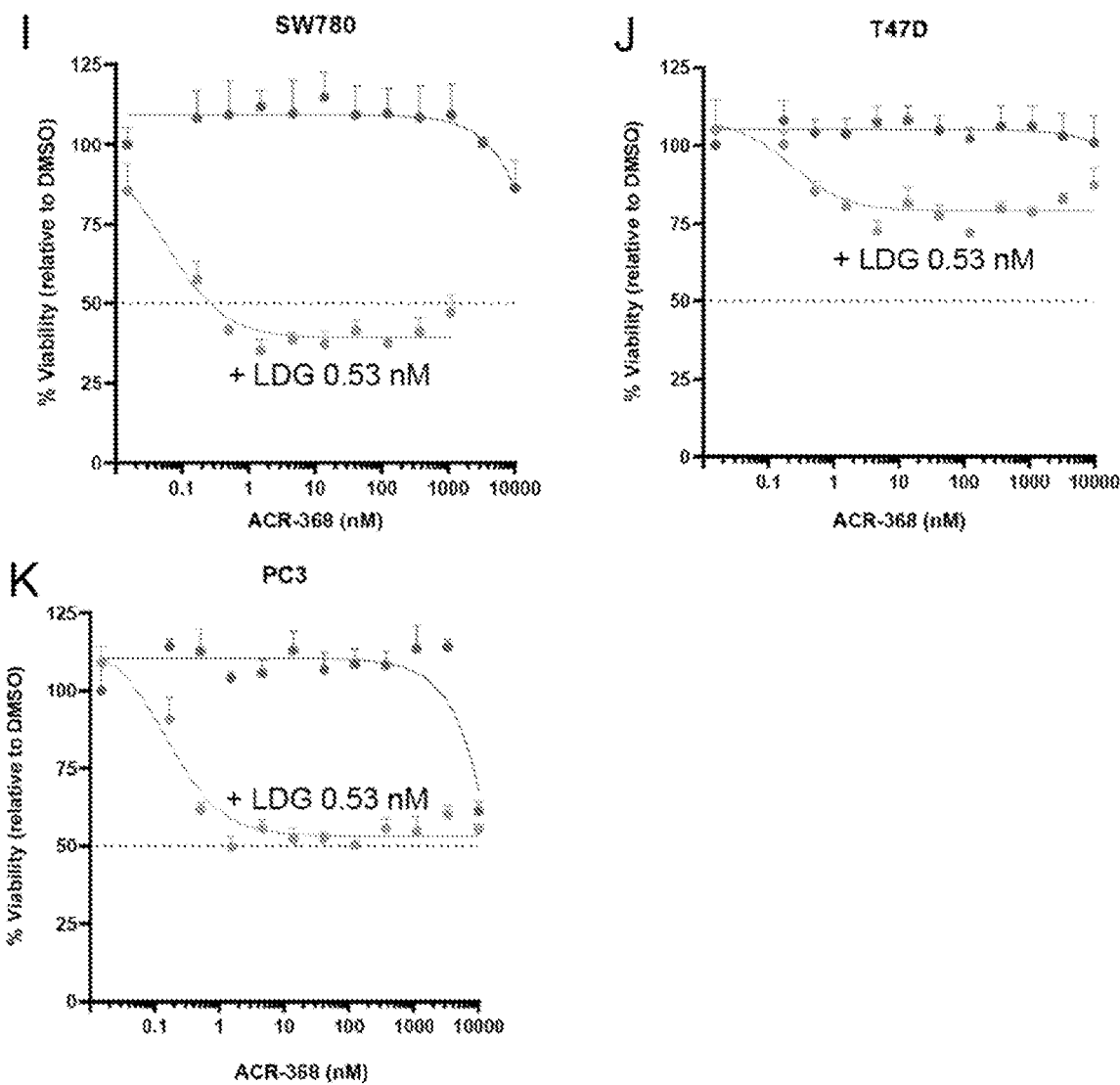

Example 10: Cell Lines that are Predicted Sensitive to Chk1 Inhibitor are Also Sensitive to Wee1 Inhibitors The present Example provides experimental evidence that cell lines predicted to be sensitive to a Chk1 inhibitor (e.g., prexasertib, are also sensitive to Wee1 inhibitors (e.g., adavosertib (AZD1775, MK1775) and azenosertib (Zn-C3)). Cell lines were treated with increasing doses of either prexasertib, adavosertib, or azenosertib, and relative cell viability against a DMSO control was assessed 72 h after drug treatment using Cell Titer Glo 2.0 (Promega) and a SpectraMax microplate reader. The results are shown in FIGS. 19A-19C. Error bars represent standard deviations from quadruplicate samples. Cell lines were ranked according to sensitivity to each drug and the results are presented in table below (Table 13).

TABLE 13

Cell line sensitivity to prexasertib, adavosertib, and azenosertib showing most sensitive cell line in the top and least sensitive cell line at the bottom for each drug, respectively

| Prexasertib | Abs IC$_{50}$ (nM) | Adavosertib | Abs IC$_{50}$ (nM) | Azenosertib | Abs IC$_{50}$ (nM) |
|---|---|---|---|---|---|
| OVCAR3 | 0.9 | A375 | 170 | OVCAR3 | 233 |
| BxPC3 | 1.4 | OVCAR3 | 237 | A375 | 239 |
| A375 | 1.8 | HeLa | 328 | BxPC3 | 448 |
| HeLa | 15 | BxPC3 | 360 | HeLa | 604 |
| A2780 | >10 000 | A2780 | 653 | A2780 | 900 |
| PC3 | >10 000 | PC3 | >10 000 | PC3 | >10 000 |
| T47D | >10 000 | T47D | >10 000 | T47D | >10 000 |

Example 11: Treatment with Gemcitabine Sensitizes Cell Lines to Treatment with Prexasertib The present Example provides experimental evidence that treatment with gemcitabine sensitizes human cancer cell lines to treatment with prexasertib A panel of human cancer cell lines were treated with various concentrations of prexasertib (0.17, 0.51, 1.5, 4.6, 13.7, 31.2, 123.5, 370.4, 1111, 3333, and 10000 nM) alone or in combination with various low dose concentrations of gemcitabine (0.53 and 2.7 nM). The panel of cell lines included ovarian, endometrial, bladder, breast, and prostate cancer cell lines. Two ovarian cancer cell lines (OVCAR3 and OV90) were used to generate acquired prexasertib resistant cells. For both cell lines, the parental cells (OVCAR3-P and OV90-P) and acquired prexasertib resistant cells (OVCAR3-R and OV90-R) were tested. Additionally, the panel included three cell lines that are naïve resistant to prexasertib (SW780, T47D, and PC3) After three days of treatment, cell viability relative to DMSO control was assessed using Cell Titer Glo 2.0 (Promega). Dose viability curves for prexasertib treatment alone or in combination with lose dose gemcitabine are shown in FIGS. 20A-20K. Relative and absolute half-maximal inhibitory concentrations (IC$_{50}$) were determined for prexasertib and are shown in Table 14. The results show that across a number of cancer cell lines, including acquired prexasertib resistant cells (OVCAR3-R and OV90-R) and naïve prexasertib resistant cells (SW780, T47D, and PC3), treatment with low dose gemcitabine increases sensitivity to prexasertib treatment.

TABLE 14

Effect of low dose gemcitabine on prexasertib sensitivity in human cancer cell lines

| Cancer Type | Cell Line | Gemcitabine (nM) | Prexasertib Relative IC$_{50}$ (nM) | Prexasertib Absolute IC$_{50}$ (nM) |
|---|---|---|---|---|
| Ovarian | OVCAR3-P | 0 | 8.0 | 16 |
| Ovarian | OVCAR3-P | 0.53 | 1.4 | 3.0 |
| Ovarian | OVCAR3-P | 2.7 | 0.1 | 0.2 |
| Ovarian | OVCAR3-R | 0 | — | — |
| Ovarian | OVCAR3-R | 0.53 | 30 | 106 |
| Ovarian | OVCAR3-R | 2.7 | 4.0 | 6.2 |
| Ovarian | OV90-P | 0 | 0.5 | 49 |
| Ovarian | OV90-P | 0.53 | 0.14 | 0.93 |
| Ovarian | OV90-R | 0 | — | — |
| Ovarian | OV90-R | 0.53 | 0.03 | — |
| Ovarian | A2780 | 0 | 8.5 | — |
| Ovarian | A2780 | 0.53 | 0.3 | 0.5 |
| Endometrial | AN3CA | 0 | 1.5 | 2.2 |

TABLE 14-continued

Effect of low dose gemcitabine on prexasertib sensitivity in human cancer cell lines

| Cancer Type | Cell Line | Gemcitabine (nM) | Prexasertib Relative $IC_{50}$ (nM) | Prexasertib Absolute $IC_{50}$ (nM) |
|---|---|---|---|---|
| Endometrial | AN3CA | 0.53 | 0.2 | 0.3 |
| Endometrial | KLE | 0 | 0.36 | — |
| Endometrial | KLE | 0.53 | 0.02 | — |
| Bladder | TCCSUP | 0 | 1.4 | 2.8 |
| Bladder | TCCSUP | 0.53 | 0.04 | 0.08 |
| Bladder | SW780 | 0 | — | — |
| Bladder | SW780 | 0.53 | 0.06 | 0.3 |
| Breast | T47D | 0 | — | — |
| Breast | T47D | 0.53 | 0.22 | — |
| Prostate | PC3 | 0 | — | — |
| Prostate | PC3 | 0.53 | 0.15 | — |

To determine whether gemcitabine and prexasertib acts synergistically, additively, or potentially antagonistically, the panel of human cancer cell lines were treated with various concentrations of prexasertib (0.17, 0.51, 15, 4.6, 13.7, 31.2, 123.5, 3704, 1111, 3333, and 10000 nM) in combination with various concentrations of gemcitabine (1, 3, 13, 67, 333, 1667, 8333 nM). After three days treatment, cell viability relative to DMSO control was assessed using Cell Titer Glo 2.0 (Promega). Drug combination effect was evaluated using SynergyFinder 2.0, see Iaevski et al., *Nucleic Acids Res.*, gkaa216 (2020), and is presented in Table 15 as a Bliss synergy score for each cell line. Bliss synergy scores greater than 10 are indicative of a synergistic effect between prexasertib and gemcitabine, while scores between 10 and −10 are indicative of an additive effect and scores less than −10 are indicative of an antagonistic effect. The results show that across a number of cancer cell lines, combination therapy with prexasertib and gemcitabine generally results in synergistic or additive effects. Additionally, acquired prexasertib resistant cells (OVCAR3-R and OV90-R) showed a striking increase in synergy score as compared to parental cells (OVCAR3-P and OV90-P). Taken together, the results of this Example support use of a combination of prexasertib and gemcitabine (e.g., low doses of gemcitabine) for treatment of predicted non-responders to prexasertib treatment.

TABLE 15

Synergy scores for prexasertib and gemcitabine in human cancer cell lines

| Cancer Type | Cell Line | Bliss Synergy Score |
|---|---|---|
| Ovarian | OVCAR3-P | 14.82 |
| Ovarian | OVCAR3-R | 36.126 |
| Ovarian | OV90-P | −8.25 |
| Ovarian | OV90-R | 10.997 |
| Ovarian | A2780 | 11.139 |
| Endometrial | AN3CA | 17.63 |
| Endometrial | KLE | 3.728 |
| Bladder | TCCSUP | 13.337 |
| Bladder | SW780 | 7.841 |
| Breast | T47D | 2.319 |
| Prostate | PC3 | 13.178 |

Figure 21:
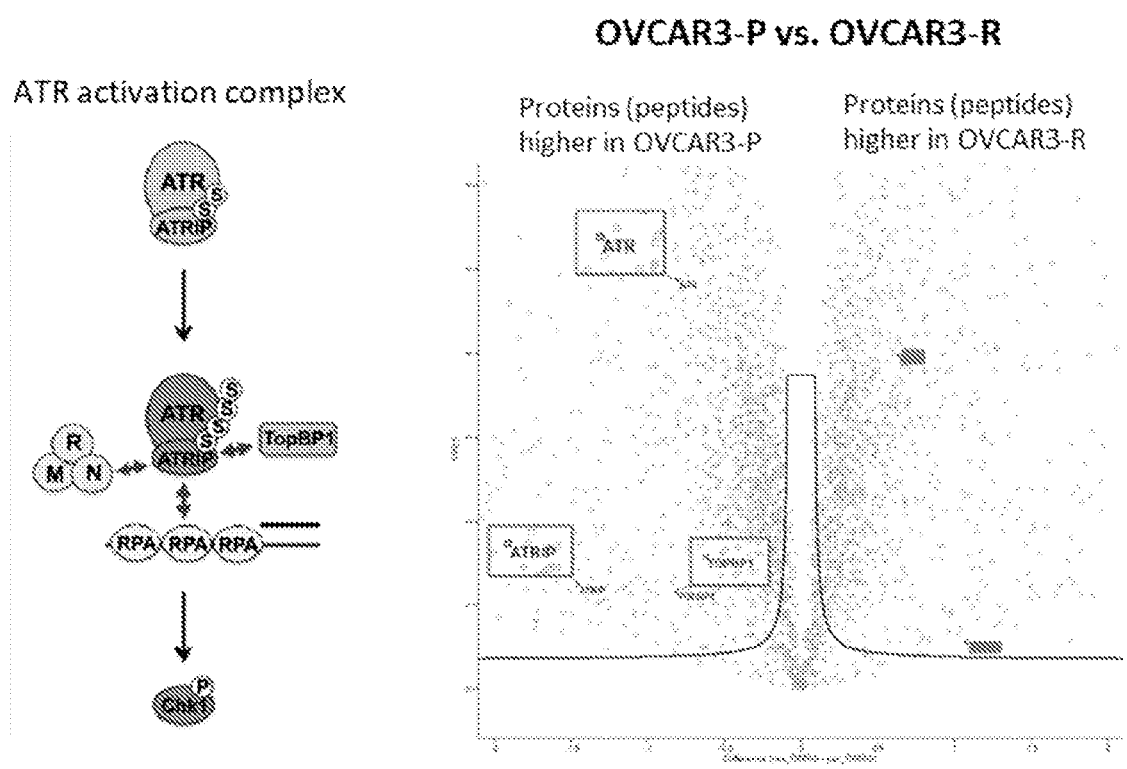
FIG. 21 shows results of global pan-proteomic analysis of parental OVCAR3 (OVCAR3-P) cells compared to for acquired prexasertib resistant OVCAR3 (OVCAR3-R) cells. The left panel is an illustration of the components of the ATR activation complex, which includes ATR, ATRIP, and TOPBP1. The right panel shows is a volcano plot of the proteomic data. Each point on the plot corresponds to a particular protein. The horizontal axis shows log2 fold difference between protein abundance in OVCAR3-P as compared to OVCAR3-R cells (i.e., proteins more abundant in OVCAR3-P cells are plotted to the left). The vertical axis denotes statistical significance. ATR, ATRIP, and TOPBP1 are highlighted in the volcano plot.

Example 12: Gemcitabine Treatment Increases Biomarkers Predictive of Prexasertib Sensitivity The present Example provides experimental evidence that treatment with gemcitabine increases biomarkers predictive of prexasertib sensitivity. A global pan-proteomic analysis of parental (OVCAR3-P) and acquired prexasertib resistant (OVCAR3-R) ovarian cancer cells was performed to evaluate changes in protein expression in acquired prexasertib resistant cells. The results show that several proteins (ATR, ATRIP, and TOPBP1) involved in the ATR activation complex are less abundant in OVCAR3-R cells (FIG. 21), indicating lower ATR-Chk1-signaling axis in OVCAR3-R cells compared to OVCAR3-P cells. These results are consistent with the observation that the OVCAR3-R cells are less sensitive to treatment with the Chk1 inhibitor prexasertib (Example 11).

Figure 22:
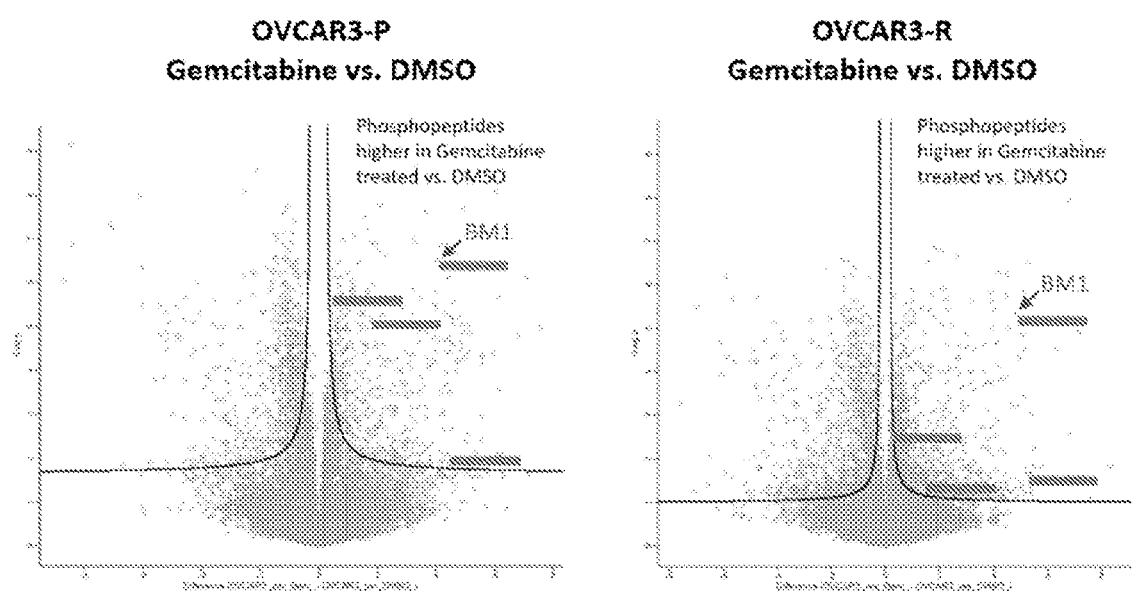
FIG. 22 shows results of global phospho-proteomic analysis of treatment with 10 nM gemcitabine for 24 hours compared to DMSO control in parental OVCAR3 (OVCAR3-P) cells (left panel) and in acquired prexasertib resistant OVCAR3 (OVCAR3-R) cells (right panel). Each panel shows a volcano plot of the phospho-proteomic data. Each point on the plots corresponds to a particular protein. The horizontal axis shows log2 fold difference between phospho-protein abundance the gemcitabine treated condition as compared to DMSO control (i.e., phospho-proteins increased by gemcitabine are plotted to the right). The vertical axis denotes statistical significance. Ser296 phosphorylated Chk1 is indicated as BM1.
Figure 23:
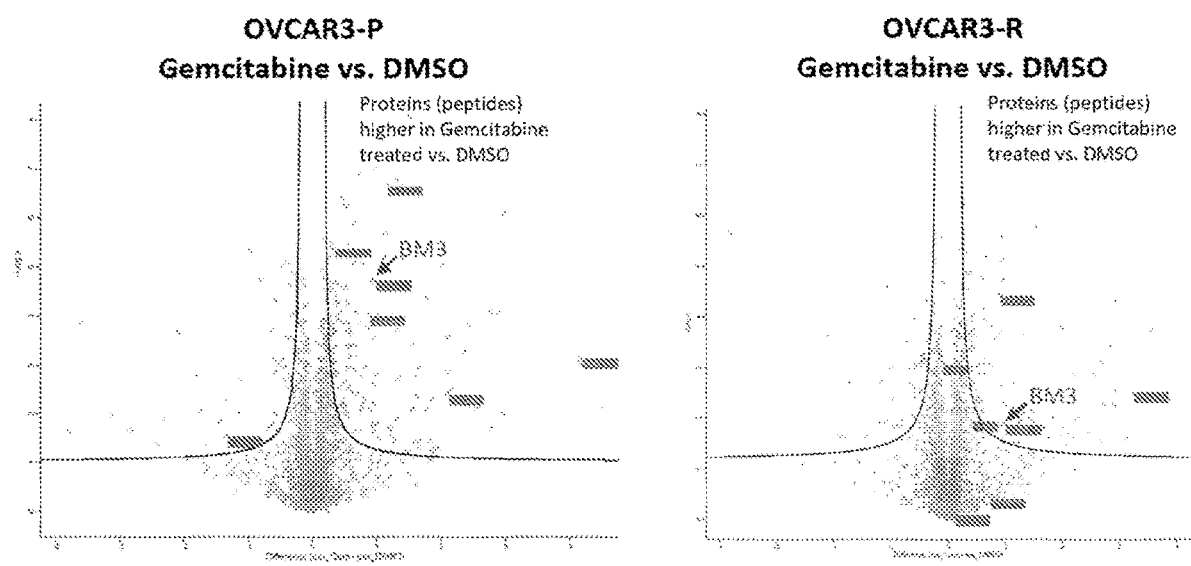
FIG. 23 shows results of global pan-proteomic analysis of treatment with 10 nM gemcitabine for 24 hours compared to DMSO control in parental OVCAR3 (OVCAR3-P) cells (left panel) and in acquired prexasertib resistant OVCAR3 (OVCAR3-R) cells (right panel). Each panel shows a volcano plot of the pan-proteomic data. Each point on the plots corresponds to a particular protein. The horizontal axis shows log2 fold difference between protein abundance the gemcitabine treated condition as compared to DMSO control (i.e., proteins increased by gemcitabine are plotted to the right). The vertical axis denotes statistical significance. Total cyclin E1 is indicated as BM3.
Figure 24:
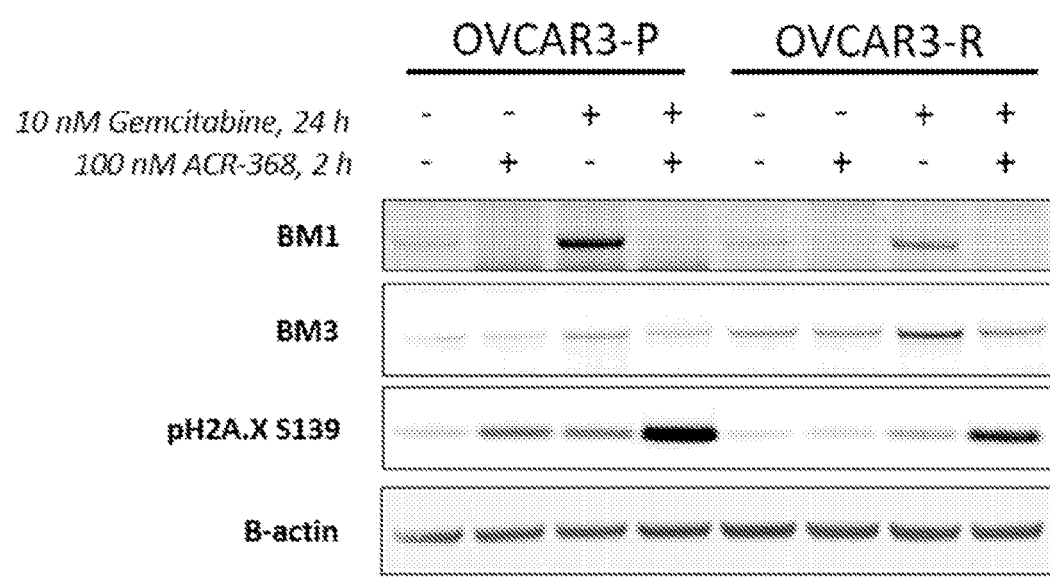
FIG. 24 shows a western blot of parental OVCAR3 (OVCAR3-P) cells and acquired prexasertib resistant OVCAR3 (OVCAR3-R) cells treated with gemcitabine and/or prexasertib (ACR-368). Ser296 phosphorylated Chk1 (BM1), total cyclin E1 (BM3), and Ser139 phosphorylated H2A.X were detected in each sample. Beta-actin was detected as a loading control.

To determine whether treatment with gemcitabine can alter the abundance of biomarkers associated with a Response-Predictive Signature, a global pan-proteomic and phosphor-proteomic analysis was performed to compare treatment with low dose gemcitabine (10 nM for 24 hours) to DMSO control in both OVCAR3-P and OVCAR3-R cells. The results show that gemcitabine treatment results in a significant increase Ser296 phosphorylated Chk1, a first biomarker (BM1) (FIG. 22). Additionally, the results show that gemcitabine treatment results in a significant increase in abundance of total cyclin E1, a third biomarker (BM3)(FIG. 23). The increased levels of BM1 and BM3 were verified using western blot analysis of the samples (FIG. 24). In addition, increased levels of phosphorylated H2AX, a marker of DNA damage, were detected in cells treated with the combination of gemcitabine and prexasertib, compared to either treatment with prexasertib or gemcitabine alone (FIG. 24).

Taken together, these results demonstrate that treatment with gemcitabine causes an increase in biomarkers (BM1 and BM3) associated with a Response-Predictive Signature predictive of response to treatment with prexasertib. Such results support treatment of predicted non-responders with a combination of gemcitabine (e.g., at low doses) and prexasertib.

Figure 25:
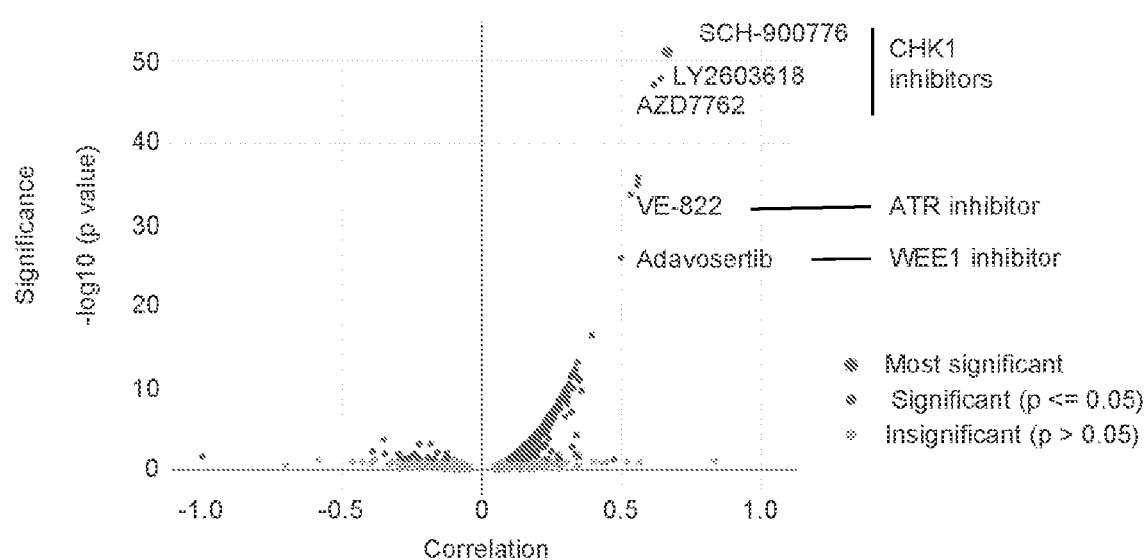
FIG. 25 shows a scatter plot of the top 1,000 drugs (gray dots and black dots) having the most correlation to prexasertib sensitivity (as determined by AUC). The Pearson coefficient of sensitivity pattern between each drug and prexasertib is plotted on the X-axis, and the corresponding significance of the given correlation derived from −log10 (p value) is plotted on the Y-axis. Drugs which exhibit significant correlation with prexasertib are indicated by black dots. Drugs which are similar or related to prexasertib in terms of mechanism of action are labeled with their specific names and targets. The actual number of cell lines for each drug correlation varies from 3 to 457.

Example 13: Prexasertib Sensitivity Correlates with Sensitivity to Other Chk1 Inhibitors as Well as WEE1 and ATR Inhibitors This Example demonstrates that the sensitivity to prexasertib across cancer cell lines highly correlates with sensitivity of those cell lines to the Chk1 inhibitors SCH-900776, LY2603618, and AZD7762. It also demonstrates a good correlation between sensitivity to prexasertib and sensitivity to the ATR inhibitor VE-822 and to the Wee1 inhibitor adavosertib. Data is from cancer cell lines and systematic viability profiling of their sensitivity to compounds performed at the Broad Institute [PRISM Repurposing Screen; Corsello et al., Nat Cancer 1(2):235-248 (2020), Yu et al., Nat Biotechnology 34(4):419-423 (2016)]. Data was plotted by searching for top co-dependencies for prexasertib sensitivity in the DepMap portal (depmap.org/portal). FIG. 25 shows the results of this study on a scatter plot.

Example 14: Mass Spectrometry-Based Phosphoproteomics Substantiates Biomarkers Predicting Prexasertib Sensitivity Human ovarian cancer cell lines OVCAR3 (prexasertib sensitive) and A2780 (prexasertib non-sensitive cells) were cultured in RPMI medium supplemented with 20% or 10% FBS, respectively. Cells were seeded in 100 mm petri dishes, in 4 replicates, and incubated for 48 hours. Subsequently, cell cycle synchronization was performed using 2.5 mM thymidine solution for 24 hours. After synchronization, plates were carefully rinsed with PBS and the cells were treated with either DMSO containing medium (vehicle control) or 100 mM prexasertib for a total of 2.5 hours. Cell lysis was carried out by carefully removing medium and rinsing the plates twice with PBS before adding hot (95° C.) lysis buffer containing 100 mM Tris-HCl (pH 8.5), 5% SDS. 5 mM tris(2-carboxyethyl)phosphine (TCEP), and 10 mM 2-chloroacetamide (CAA) Cells were immediately scraped down into the lysis buffer, collected in 1.5 mL tube and heated at 95° C. for 10 min. Samples were sonicated on ice using a microprobe with pulsing 1 second on/1 second off for a total of 1 minute. Protein concentration was measured, and 0.5 mg of protein was used for mass spectrometry sample preparation and phospho-peptide enrichment, e.g., as described in Bekker-Jensen et al., *Molecular & Cellular Proteomics*. 19(4):716-729 (2020). Phosphoproteomics data was acquired using an orbitrap mass spectrometer operated through data independent acquisition and the resulting mass spectra were analyzed using the directDIA approach as described in Bekker-Jensen et al., *Nature Communications* 11(1):787(2020). The following phosphorylated biomarkers set forth in Table 16 below were found to be elevated in a prexasertib-sensitive cell line as compared to a prexasertib-insensitive cell line, thus supporting their selection as biomarkers for determining sensitivity to prexasertib (and other Chk1 inhibitors), as well as inhibitors of other proteins that correlate to Chk1, such as Chk2, Wee1, and ATR. Table 16 sets forth the relative abundance (log2 intensity ratio) of phosphosites in prexasertib sensitive OVCAR3 cells vs. non-sensitive A2780 cells (DMSO control samples), with adjusted p-values, indicated with * if significant (FC 1.5, limma t-test FDR 0.05). A log2 intensity ratio >0 corresponds to a phosphosite that was detected in higher abundance in OVCAR3 sensitive cells compared to A2780 non-sensitive cells in DMSO control samples. Multiplicity (M1 or M2) denotes whether the phosphosite was detected in a singly or doubly phosphorylated peptide.

TABLE 16

Biomarkers elevated in an untreated prexasertib-sensitive cell line compared to an untreated prexasertib-resistant cell line

| Biomarker | Multiplicity | log2 intensity ratio (OVCAR3:A2780) | P-value, adjusted |
|---|---|---|---|
| Ser280 phosphorylated Chk1 | M1 | 0.2 | 3.51E-01 |
| Ser296 phosphorylated Chk1 | M1 | 0.56 | 1.00E-01 |
| Ser516 phosphorylated Chk2 | M1 | 1.44 | 2.13E-02* |
| Thr383 phosphorylated Chk2 | M1 | 1.06 | 1.30E-04* |
| Ser473 phosphorylated Kap1 | M1 | 1.25 | 4.83E-07* |
| Ser642 phosphorylated Wee1 | M1 | 1.36 | 4.62E-06* |
| Ser865 phosphorylated treslin | M1 | 0.62 | 2.35E-02* |
| Ser1310 phosphorylated MYBBP1A | M1 | 4.26 | 4.76E-05* |
| Ser230 phosphorylated CDC25B | M1 | 0.1 | 6.38E-01 |
| Ser950 phosphorylated claspin | M1 | 0.35 | 9.87E-02 |
| Ser100 phosphorylated cyclin E1 | M1 | 1.15 | 1.22E-03* |
| Ser103 phosphorylated cyclin E1 | M1 | 1.5 | 3.73E-07* |
| Ser387 phosphorylated cyclin E1 | M1 | 2.54 | 7.49E-07* |
| Ser387 phosphorylated cyclin E1 | M2 | 1.54 | 5.70E-04* |
| Thr395 phosphorylated cyclin E1 | M1 | 0.7 | 1.51E-01 |
| Thr395 phosphorylated cyclin E1 | M2 | 1.54 | 7.34E-04* |
| Ser54 phosphorylated CDC6 | M1 | 0.21 | 3.79E-01 |
| Ser74 phosphorylated CDC6 | M1 | 0.27 | 6.16E-01 |

*indicates that the P-value is <0.05.

SEQUENCES

| Protein (UniProt ID) | SEQ ID NO: | Sequence |
|---|---|---|
| Chk1 (O14757) | 1 | MAVPFVEDWDLVQTLGEGAYGEVQLAVNRVTEEAVAVKIVDMKRAV DCPENIKKEICINKMLNHENVVKFYGHRREGNIQYLFLEYCSGGEL FDRIEPDIGMPEPDAQRFFHQLMAGVVYLHGIGITHRDIKPENLLL DERDNLKISDFGLATVFRYNNRERLLNKMCGTLPYVAPELLKRREF HAEPVDVWSCGIVITAMLAGELPWDQPSDSCQEYSDWKEKKTYLNP WKKIDSAPLALLHKILVENPSARITIPDIKKDRWYNKPLKKGAKRP |

SEQUENCES

| Protein (UniProt ID) | SEQ ID NO: | Sequence |
|---|---|---|
| | | RVTSGGVSESPSGFSKHIQSNLDFSPVNSASSEENVKYSSSQPEPR<br>TGLSLWDTSPSYIDKLVQGISFSQPTCPDHMLLNSQLLGTPGSSQN<br>PWQRLVKRMTRFFTKLDADKSYQCLKETCEKLGYQWKKSCMNQVTI<br>STTDRRNNKLIFKVNLLEMDDKILVDFRLSKGDGLEFKRHFLKIKG<br>KLIDIVSSQKIWLPAT |
| Chk2 (O96017) | 2 | MSRESDVEAQQSHGSSACSQPHGSVTQSQGSSSQSQGISSSSTSTM<br>PNSSQSSHSSSGTLSSLETVSTQELYSIPEDQEPEDQEPEEPTPAP<br>WARLWALQDGFANLECVNDNYWFGRDKSCEYCFDEPLLKRTDKYRT<br>YSKKHFRIFREVGPKNSYIAYIEDHSGNGTFVNTELVGKGKRRPLN<br>NNSEIALSLSRNKVFVFFDLTVDDQSVYPKALRDEYIMSKTLGSGA<br>CGEVKLAFERKTCKKVAIKIISKRKFAIGSAREADPALNVETEIEI<br>LKKLNHPCIIKIKNFFDAEDYYIVLELMEGGELFDKVVGNKRLKEA<br>TCKLYFYQMLLAVQYLHENGIIHRDLKPENVLLSSQEEDCLIKITD<br>FGHSKILGETSLMRTLCGTPTYLAPEVLVSVGTAGYNRAVDCWSLG<br>VILFICLSGYPPFSEHRTQVSLKDQITSGKYNFIPEVWAEVSEKAL<br>DLVKKLLVVDPKARFTTEEALRHPWLQDEDMKRKFQDLLSEENEST<br>ALPQVLAQPSTSRKRPREGEAEGAETTKRPAVCAAVL |
| Kap1 (Q13263) | 3 | MAASAAASAAAASAASGSPGPGEGSAGGEKRSTAPSAAASASASA<br>AASSPAGGGAEALELLEHCGVCRERLRPEREPRLLPCLHSACSACL<br>GPAAPAAANSSGDGGAAGDGTVVDCPVCKQQCFSKDIVENYFMRDS<br>GSKAATDAQDANQCCTSCEDNAPATSYCVECSEPLCETCVEAHQRV<br>KYTKDHTVRSTGPAKSRDGERTVYCNVHKHEPLVLFCESCDTLTCR<br>DCQLNAHKDHQYQFLEDAVRNQRKLLASLVKRLGDKEATLQKSTKE<br>VRSSIRQVSDVQKRVQVDVKMAILQIMKELNKRGRVLVNDAQKVTE<br>GQQERLERQHWTMTKIQKHQEHILRFASWALESDNNTALLLSKKLI<br>YFQLHRALKMIVDPVEPHGEMKFQWDLNAWTKSAEAFGKIVAERPG<br>TNSTGPAPMAPPRAPGPLSKQGSGSSQPMEVQEGYGFGSGDDPYSS<br>AEPHVSGVKRSRSGEGEVSGLMRKVPRVSLERLDLDLTADSQPPVF<br>KVFPGSTTEDYNLIVIERGAAAAATGQPGTAPAGTPGAPPLAGMAI<br>VKEEETEAAIGAPPTATEGPETKPVLMALAEGPGAEGPRLASPSGS<br>TSSGLEVVAPEGTSAPGGGPGTLDDSATICRVCQKPGDLVMCNQCE<br>FCFHLDCHLPALQDVPGEEWSCSLCHVLPDLKEEDGSLSLDGADST<br>GVVAKLSPANQRKCERVLLALFCHEPCRPLHQLATDSTFSLDQPGG<br>TLDLTLIRARLQEKLSPPYSSPQEFAQDVGRMFKQFNKLTEDKADV<br>QSIIGLQRFFETRMNEAFGDTKFSAVLVEPPPMSLPGAGLSSQELS<br>GGPGDGP |
| Wee1 (P30291) | 4 | MSFLSRQQPPPPRRAGAACTLRQKLIFSPCSDCEEEEEEEEEGSG<br>HSTGEDSAFQEPDSPLPPARSPTEPGPERRRSPGPAPGSPGELEED<br>LLLPGACPGADEAGGGAEGDSWEEEGFGSSSPVKSPAAPYFLGSSF<br>SPVRCGGPGDASPRGCGARRAGEGRRSPRPDHPGTPPHKTFRKLRL<br>FDTPHTPKSLLSKARGIDSSSVKLRGSSLFMDTEKSGKREFDVRQT<br>PQVNINPFTPDSLLLHSSGQCRRRKRTYWNDSCGEDMEASDYELED<br>ETRPAKRITITESNMKSRYTTEFHELEKIGSSEGFGSVFKCVKRLDG<br>CIYAIKRSKKPLAGSVDEQNALREVYAHAVLGQHSHVVRYFSAWAE<br>DDHMLIQNEYCNGGSLADAISENYRIMSYFKEAELKDLLLQVGRGL<br>RYIHSMSLVHMDIKPSNIFISRTSIPNAASEEGDEDDWASNKVMFK<br>IGDLGHVTRISSPQVEEGDSRFLANEVLQENYTHLPKADIFALALT<br>VVCAAGAEPLPRNGDQWHEIRQGRLPRIPQVLSQEFTELLKVMIHP<br>DPERRPSAMALVKHSVLLSASRKSAEQLRIELNAEKFKNSLLQKEL<br>KKAQMAKAAAEERALFTDRMATRSTTQSNRTSRLIGKKMNRSVSLT<br>IY |
| Treslin (Q7Z2Z1) | 5 | MACCHKVMLLLDTAGGAARHSRVRRAALRLLTYLSCRFGLARVHWA<br>FKFFDSQCARSRPSRVSDFRELGSRSWEDFEEELEARLEDRAHLPG<br>PAPRATHTHGALMETLLDYQWDRPEITSPTKPILRSSGRRLLDVES<br>EAKEAEAALGGLVNAVFLLAPCPHSQRELLQFVSGCEAQAQRLPPT<br>PKQVMEKLLPKRVREVMVARKITFYWVDTTEWSKLWESPDHLGYWT<br>VCELLHHGGGTVLPSESFSWDFAQAGEMLLRSGIKLSSEPHLSPWI<br>SMLPTDATLNRLLYNSPEYEASFPRMEGMLFLPVEAGKEIQETWTV<br>TLEPLAMHQRHFQKPVRIFLKGSVAQWSLPTSSTLGTDSWMLGSPE<br>ESTATQRLLFQQLVSRLTAEELHLVADVDPGEGRPPITGVISPLSA<br>SAMILTVCRTKEAEFQRHVLQTAVADSPRDTASLFSDVVDSILNQT<br>HDSLADTASAASPVPEWAQQELGHTTPWSPAVVEKWFPFCNISGAS<br>SDLMESFGLLQAASANKEESSKTEGELIHCLAELYQRKSREESTIA<br>HQEDSKKKRGVPRTPVRQKMNTMCRSLKMLNVARLNVKAQKLHPDG<br>SPDVAGEKGIQKIPSGRTVDKLEDRGRTLRSSKPKDFKTEEELLSY<br>IRENYQKTVATGEIMLYACARNMISTVKMPLKSKGTKELEVNCLNQ<br>VKSSLLKTSKSLRQNLGKKLDKEDKVRECQLQVFLRLEMCLQCPSI<br>NESTDDMEQVVEEVTDLLRMVCLTEDSAYLAEFLEEILRLYIDSIP<br>KTLGNLYNSLGFVIPQKLAGVLPTDFFSDDSMTQENKSPLLSVPFL<br>SSARRSVSGSPESDELQELRTRSAKKRRKNALIRHKSIAEVSQNLR |

| Protein (UniProt ID) | SEQ ID NO: | Sequence |
|---|---|---|
| | | QIEIPKVSKRATKKENSHPAPQQPSQPVKDTVQEVTKVRRNLFNQE LLSPSKRSLKRGLPRSHSVSAVDGLEDKLDNFKKNKGYHKLLTKSV AETPVHKQISKRLLHRQIKGRSSDPGPDIGVVEESPEKGDEISLRR SPRIKQLSFSRTHSASFYSVSQPKSRSVQRVHSFQQDKSDQRENSP VQSIRSPKSLLFGAMSEMISPSEKGSARMKKRSRNTLDSEVPAAYQ TPKKSHQKSLSFSKITPRRISHTPQTPLYTPERLQKSPAKMTPTKQ AAFKESLKDSSSPGHDSPLDSKITPQKRHTQAGEGTSLETKTPRTP KRQGTQPPGFLPNCTWPHSVNSSPESPSCPAPPTSSTAQPRRECLT PIRDPLRTPPRAAAFMGTPQNQTHQQPHVLRAARAEEPAQKLKDKA IKTPKRPGNSTVTSSPPVTPKKLFTSPLCDVSKKSPFRKSKIECPS PGELDQKEPQMSPSVAASLSCPVPSTPPELSQRATLDTVPPPPPSK VGKRCRKISDPRRSIVECQPDASATPGVGTADSPAAPTDSRDDQKG LSLSPQSPPERRGYPGPGLRSDWHASSPLLITSDTEEVTLLSEAEH HGIGDLKSNVLSVEEGEGLRTADAEKSSLSHPGIPPSPPSCGPGSP LMPSRDVHCTTDGRQCQASAQLDNLPASAWHSTDSASPQTYEVELE MQASGLPKLRIKKIDPSSSLEAEPLSKEESSLGEESFLPALSMPRA SRSLSKPEPTYVSPPCPRLSHSTPGKSRGQTYICQACTPTHGPSST PSPFQTDGVPWTPSPKHSGKTTPDIIKDWPRRKRAVGCGAGSSSGR GEVGADLPGSLSLLESEGKDHGLELSIHRTPILEDFELEGVCQLPD QSPPRNSMPKAEEASSWGQFGLSSRKVLLAKEEADRGAKRICDLR EDSEVSKSKEGSPSWSAWQLPSTGDEEVFVSGSTPPPSCAVRSCLS ASALQALTQSPLLFQGKTPSSQSKDPRDEDVDVLPSTVEDSPFSRA FSRRRPISRTYTRKKLMGTWLEDL |
| TLK1 (Q9UKI8-1) | 6 | MSVQSSSGSLEGPPSWSQLSTSPTPGSAAAARSLLNHTPPSGRPRE GAMDELHSLDPRRQELLEARFTGVASGSTGSTGSCSVGAKASTNNE SSNHSFGSLGSLSDKESETPEKKQSESSRGRKRKAENQNESSQGKS IGGRGHKISDYFEYQGGNGSSPVRGIPPAIRSPQNSHSHSTPSSSV RPNSPSPTALAFGDHPIVQPKQLSFKIIQTDLIMLKLAALESNKIQ DLEKKEGRIDDLLRANCDLRRQIDEQQKLLEKYKERLNKCISMSKK LLIEKSTQEKLSSREKSMQDRLRLGHFTTVRHGASFTEQWTDGFAF QNLVKQQEWVNQQREDIERQRKLLAKRKPPTANNSQAPSINSEPKQ RKNKAVNGAENDPFVRPNLPQLLTLAEYHEQEEIFKLRLGHLKKEE AEIQAELERLERVRNLHIRELKRINNEDNSQFKDHPTLNERYLLLH LLGRGGFSEVYKAFDLYEQRYAAVKIHQLNKSWRDEKKENYHKHAC REYRIHKELDHPRIVKLYDYFSLDTDTFCTVLEYCEGNDLDFYLKQ HKLMSEKEARSIVMQIVNALRYLNEIKPPIIHYDLKPGNILLVDGT ACGEIKITDFGLSKIMDDDSYGVDGMDLTSQGAGTYWYLPPECFVV GKEPPKISNKVDVWSVGVIFFQCLYGRKPFGHNQSQQDILQENTIL KATEVQFPVKPVVSSEAKAFIRRCLAYRKEDRFDVHQLANDPYLLP HMRRSNSSGNLHMAGLTASPTPPSSSIITY |
| RB1 (P06400) | 7 | MPPKTPRKTAATAAAAAAEPPAPPPPPPPEEDPEQDSGPEDLPLVR LEFEETEEPDFTALCQKLKIPDHVRERAWLTWEKVSSVDGVLGGYI QKKKELWGICIFIAAVDLDEMSFTFTELQKNIEISVHKFFNLLKEI DTSTKVDNAMSRLLKKYDVLFALFSKLERTCELIYLTQPSSSISTE INSALVLKVSWITFLLAKGEVLQMEDDLVISFQLMLCVLDYFIKLS PPMLLKEPYKTAVIPINGSPRTPRRGQNRSARIAKQLENDTRIIEV LCKEHECNIDEVKNVYFKNFIPFMNSLGLVTSNGLPEVENLSKRYE EIYLKNKDLDARLFLDHDKTLQTDSIDSFETQRTPRKSNLDEEVNV IPPHTPVRTVMNTIQQLMMILNSASDQPSENLISYFNNCTVNPKES ILKRVKDIGYIFKEKFAKAVGQGCVEIGSQRYKLGVRLYYRVMESM LKSEEERLSIQNFSKLLNDNIFHMSLLACALEVVMATYSRSTSQNL DSGTDLSFPWILNVLNLKAFDFYKVIESFIKAEGNLTREMIKHLER CEHRIMESLAWLSDSPLFDLIKQSKDREGPTDHLESACPLNLPLQN NHTAADMYLSPVRSPKKKGSTTRVNSTANAETQATSAFQTQKPLKS TSLSLFYKKVYRLAYLRLNTLCERLLSEHPELEHIIWTLFQHTLQN EYELMRDRHLDQIMMCSMYGICKVKNIDLKFKIIVTAYKDLPHAVQ ETFKRVLIKEEEYDSIIVFYNSVFMQRLKTNILQYASTRPPTLSPI PHIPRSPYKFPSSPLRIPGGNIYISPLKSPYKISEGLPTPTKMTPR SRILVSIGESFGTSEKFQKINQMVCNSDRVLKRSAEGSNPPKPLKK LRFDIEGSDEADGSKHLPGESKFQQKLAEMTSTRTRMQKQKMNDSM DTSNKEEK |
| MYBBP1A (Q9BQG0) | 8 | MESRDPAQPMSPGEATQSGARPADRYGLLKHSREFLDFFWDIAKPE QETRLAATEKLLEYLRGRPKGSEMKYALKRLITGLGVGRETARPCY SLALAQLLQSFEDLPLCSILQQIQEKYDLHQVKKAMLRPALFANLF GVLALFQSGRLVKDQEALMKSVKLLQALAQYQNHLQEQPRKALVDI LSEVSKATLQEILPEVLKADINIILSSPEQLELFLLAQQKVPSKLK KLVGSVNLFSDENVPRLVNVLKMAASSVKKDRKLPAIALDLLRLAL KEDKFPRFWKEVVEQGLLKMQFWPASYLCFRLLGAALPLLTKEQLH LVMQGDVIRHYGEHVCTAKLPKQFKFAPEMDDYVGTFLEGCQDDPE RQLAVLVAFSSVTNQGLPVTPTFWRVVRFLSPPALQGYVAWLRAMF LQPDLDSLVDFSTNNQKKAQDSSLHMPERAVFRLRKWIIFRLVSIV |

| Protein (UniProt ID) | SEQ ID NO: | Sequence |
|---|---|---|
| | | DSLHLEMEEALTEQVARFCLFHSFFVTKKPTSQIPETKHPFSFPLE
NQAREAVSSAFFSLLQTLSTQFKQAPGQTQGGQPWTYHLVQFADLL
LNHSHNVTTVTPFTAQQRQAWDRMLQTLKELEAHSAEARAAAFQHL
LLLVGIHLLKSPAESCDLLGDIQTCIRKSLGEKPRRSRTKTIDPQE
PPWVEVLVEILLALLAQPSHLMRQVARSVFGHICSHLTPRALQLIL
DVLNPETSEDENDRVVVTDDSDERRLKGAEDKSEEGEDNRSSESEE
ESEGEESEEEERDGVDQGFREQLMTVLQAGKALGGEDSENEEELG
DEAMMALDQSLASLFAEQKLRIQARRDEKNKLQKEKALRRDFQIRV
LDLVEVLVTKQPENALVLELLEPLLSIIRRSLRSSSSKQEQDLLHK
TARIFTHHLCRARRYCHDLGERAGALHAQVERLVQQAGRQPDSPTA
LYHFNASLYLLRVLKGNTAEGCVHETQEKQKAGTDPSHMPTGPQAA
SCLDLNLVTRVYSTALSSFLTKRNSPLTVPMFLSLFSRHPVLCQSL
LPILVQHITGPVRPRHQACLLLQKTLSMREVRSCFEDPEWKQLMGQ
VLAKVTENLRVLGEAQTKAQHQQALSSLELLNVLFRTCKHEKLTLD
LTVLLGVLQGQQQSLQQGAHSTGSSRLHDLYWQAMKTLGVQRPKLE
KKDAKEIPSATQSPISKKRKKKGFLPETKKRKKRKSEDGTPAEDGT
PAATGGSQPPSMGRKKRNRTKAKVPAQANGTPTTKSPAPGAPTRSP
STPAKSPKLQKKNQKPSQVNGAPGSPTEPAGQKQHQKALPKKGVLG
KSPLSALARKKARLSLVIRSPSLLQSGAKKKAQVRKAGKP |
| SETMAR (Q53H47-1) | 9 | MFAEAAKTTRPCGMAEFKEKPEAPTEQLDVACGQENLPVGAWPPGA
APAPFQYTPDHVVGPGADIDPTQITFPGCICVKTPCLPGTCSCLRH
GENYDDNSCLRDIGSGGKYAEPVFECNVLCRCSDHCRNRVVQKGLQ
FHFQVFKTHKKGWGLRTLEFIPKGRFVCEYAGEVLGFSEVQRRIHL
QTKSDSNYIIAIREHVYNGQVMETFVDPTYIGNIGRFLNHSCEPNL
LMIPVRIDSMVPKLALFAAKDIVPEEELSYDYSGRYINLTVSEDKE
RLDHGKLRKPCYCGAKSCTAFLPFDSSLYCPVEKSNISCGNEKEPS
MCGSAPSVFPSCKRLTLETMKMMLDKKQIRAIFLFEFKMGRKAAET
TRNINNAFGPGTANERTVQWWFKKFCKGDESLEDEERSGRPSEVDN
DQLRAIIEADPLTTTREVAEELNVNHSTVVRHLKQIGKVKKLDKWV
PHELTENQKNRRFEVSSSLILRNHNEPFLDRIVTCDEKWILYDNRR
RSAQWLDQEEAPKHFPKPILHPKKVMVTIWWSAAGLIHYSFLNPGE
TITSEKYAQEIDEMNQKLQRLQLALVNRKGPILLHDNARPHVAQPT
LQKLNELGYEVLPHPPYSPDLLPTNYHVFKHLNNFLQGKRFHNQQD
AENAFQEFVESQSTDFYATGINQLISRWQKCVDCNGSYFD |
| SRRM2 (Q9UQ35-1) | 10 | MYNGIGLPTPRGSGTNGYVQRNLSLVRGRRGERPDYKGEEELRRLE
AALVKRPNPDILDHERKRRVELRCLELEEMMEEQGYEEQQIQEKVA
TFRLMLLEKDVNPGGKEETPGQRPAVTETHQLAELNEKKNERLRAA
FGISDSYVDGSSFDPQRRAREAKQPAPEPPKPYSLVRESSSSRSPT
PKQKKKKKKDRGRRSESSSPRRERKKSSKKKKHRSESESKKRKHR
SPTPKSKRKSKDKKRKRSRSTTPAPKSRRAHRSTSADSASSSDTSR
SRSRSAAAKTHTTALAGRSPSPASGRRGEGDAPFSEPGTTSTQRPS
SPETATKQPSSPYEDKDKDKKEKSATRPSPSPERSSTGPEPPAPTP
LLAERHGGSPQPLATTPLSQEPVNPPSEASPTRDRSPPKSPEKLPQ
SSSSESSPPSPQPTKVSRHASSSPESPKPAPAPGSHREISSSPTSK
NRSHGRAKRDKSHSHTPSRRMGRSRSPATAKRGRSRSRTPTKRGHS
RSRSPQWRRSRSAQRWGRSRSPQRRGRSRSPQRPGWSRSRNTQRRG
RSRSARRGRSHSRSPATRGRSRSRTPARRGRSRSRTPARRRSRSRT
PTRRRSRSRTPARRCRSRSRTPARRRSRTRSPVRRRSRSRSPARRS
GRSRSRTPARRGRSRSRTPARRGRSRSRTPARRSGRSRSRTPARRG
RSRSRTPRRGRSRSRSLVRRGRSHSRTPQRRGRSGSSSERKNKSRT
SQRRSRSNSSPEMKKSRISSRRSRSLSSPRSKAKSRLSLRRSLSGS
SPCPKQKSQTPPRRSRSGSSQPKAKSRTPPRRSRSSSSPPPKQKSK
TPSRQSHSSSSPHPKVKSGTPPRQGSITSPQANEQSVTPQRRSCFE
SSPDPELKSRTPSRHSCSGSSPPRVKSSTPPRQSPSRSSSPQPKVK
AIISPRQRSHSGSSSPSPSRVTSRTTPRRSRSVSPCSNVESRLLPR
YSHSGSSSPDTKVKPETPPRQSHSGSISPYPKVKAQTPPGPSLSGS
KSPCPQEKSKDSLVQSCPGLSLSLCAGVKSSTPPGESYFGVSSLQLK
GQSQTSPDHRSDTSSPEVRQSHSESPSLQSKSQTSPKGGRSRSSSP
VTELASRSPIRQDRGEFSASPMLKSGMSPEQSRFQSDSSSYPTVDS
NSLLGQSRLETAESKEKMALPPQEDATASPPRQKDKFSPFPVQDRP
ESSLVFKDTLRTPPRERSGAGSSPETKEQNSALPTSSQDEELMEVV
EKSEEPAGQILSHLSSELKEMSTSNFESSPEVEERPAVSLTLDQSQ
SQASLEAVEVPSMASSWGGPHFSPEHKELSNSPLRENSFGSPLEFR
NSGPLGTEMNTGFSSEVKEDLNGPPFLNQLETDPSLDMKEQSTRSSG
HSSSELSPDAVEKAGMSSNQSISSPVLDAVPRTPSRERSSSASSPE
MKDGLPRTPSRRSRSGSSPGLRDGSGTPSRHSLSGSSPGMKDIPRT
PSRGRSECDSSPEPKALPQTPRPRSRSPSSPELNNKCLTPQRERSG
SESSVDQKTVARTPLGQRSRSGSSQELDVKPSASPQERSESDSSPD
SKAKTRTPLRQRSRSGSSPEVDSKSRLSPRRSRSGSSPEVDKPRA
APRAQSGSDSSPEPKAPAPRALPRRSRSGSSSKGRGPSPEGSSSTE
SSPEHPPKSRTARRGSRSSPEPKTKSRTPPRRRSSRSSPELTRKAR
LSRRSRSASSSPETRSRTPPRHRRSPSVSSPEPAEKSRSSRRRRSA |

SEQUENCES

| Protein (UniProt ID) | SEQ ID NO: | Sequence |
|---|---|---|
| | | SSPRTKTTSRRGRSPSPKPRGLQRSRSRSRREKTRTTRRRDRSGSS<br>QSTSRRRQRSRSRSRVTRRRGGSGYHSRSPARQESSRTSSRRRRG<br>RSRTPPTSRKRSRSRTSPAPWKRSRSRASPATHRRSRSRTPLISRR<br>RSRSRTSPVSRRRSRSRTSVTRRRSRSRASPVSRRRSRSRTPPVTR<br>RRSRSRTPTTRRRSRSRTPPVTRRRSRSRTPPVTRRRSRSRTSPIT<br>RRRSRSRTSPVTRRRSRSRTSPVTRRRSRSRTSPVTRRRSRSRTPP<br>AIRRRSRSRTPLLPRKRSRSRSPLAIRRRSRSRTPRTARGKRSLTR<br>SPPAIRRRSASGSSSDRSRSATPPATRNHSGSRTPPVALNSSRMSC<br>FSRPSMSPTPLDRCRSPGMLEPLGSSRTPMSVLQQAGGSMMDGPGP<br>RIPDHQRTSVPENHAQSRIALALTAISLGTARPPPSMSAAGLAARM<br>SQVPAPVPLMSLRTAPAANLASRIPAASAAAMNLASARTPAIPTAV<br>NLADSRTPAAAAAMNLASPRTAVAPSAVNLADPRTPTAPAVNLAGA<br>RTPAALAALSLTGSGTPPTAANYPSSSRTPQAPASANLVGPRSAHA<br>TAPVNIAGSRTAAALAPASLTSARMAPALSGANLTSPRVPLSAYER<br>VSGRTSPPLLDRARSRTPPSAPSQSPMTSERAPSPSSRMGQAPSQS<br>LLPPAQDQPRSPVPSAFSDQSRCLIAQTTPVAGSQSLSSGAVATTT<br>SSAGDHNGMLSVPAPGVPHSDVGEPPASTGAQQPSALAALQPAKER<br>RSSSSSSSSSSSSSSSSSSSSSSSGSSSSDSEGSSLPVQPEVAL<br>KRVPSPTPAPKEAVREGRPPEPTPAKRKRRSSSSSSSSSSSSSSS<br>SSSSSSSSSSSSSSSSSSSSSSSSSPSPAKPGPQALPKPASPKKP<br>PPGERRSRSPRKPIDSLRDSRSLSYSPVERRRPSPQPSPRDQQSSS<br>SERGSRRGQRGDSRSPSHKRRRETPSPRPMRHRSSRSP |
| CDC25B (P30305) | 11 | MEVPQPEPAPGSALSPAGVCGGAQRPGHLPGLLLGSHGLLGSPVRA<br>AASSPVTTLTQTMHDLAGLGSETPKSQVGTLLFRSRSRLTHLSLSR<br>RASESSLSSESSESSDAGLCMDSPSPMDPHMAEQTFEQAIQAASRI<br>IRNEQFAIRRFQSMPVRLLGHSPVLRNITNSQAPDGRRKSEAGSGA<br>ASSSGEDKENDGFVFKMPWKPTHPSSTHALAEWASRREAFAQRPSS<br>APDLMCLSPDRKMEVEELSPLALGRFSLTPAEGDTEEDDGFVDILE<br>SDLKDDDAVPPGMESLISAPLVKTLEKEEEKDLVMYSKCQRLFRSP<br>SMPCSVIRPILKRLERPQDRDTPVQNKRRRSVTPPEEQQEAEEPKA<br>RVLRSKSLCHDEIENLLDSDHRELIGDYSKAFLLQTVDGKHQDLKY<br>ISPETMVALLTGKFSNIVDKFVIVDCRYPYEYEGGHIKTAVNLPLE<br>RDAESFLLKSPIAPCSLDKRVILIFHCEFSSERGPRMCRFIRERDR<br>AVNDYPSLYYPEMYILKGGYKEFFPQHPNFCEPQDYRPMNHEAFKD<br>ELKTFRLKTRSWAGERSRRELCSRLQDQ |
| Claspin (Q9HAW4) | 12 | MTGEVGSEVHLEINDPNVISQEEADSPSDSGQGSYETIGPLSEGDS<br>DEEIFVSKKLKNRKVLQDSDSETEDTNASPEKTTYDSAEEENKENL<br>YAGKNTKIKRIYKTVADSDESYMEKSLYQENLEAQVKPCLELSLQS<br>GNSTDFTTDRKSSKKHIHDKEGTAGKAKVKSKRRLEKEERKMEKIR<br>QLKKKETKNQEDDVEQPFNDSGCLLVDKDLFETGLEDENNSPLEDE<br>ESLESIRAAVKNKVKKHKKKEPSLESGVHSFEEGSELSKGTTRKER<br>KAARLSKEALKQLHSETQRLIRESALNLPYHMPENKTIHDFFKRKP<br>RPTCHGNAMALLKSSKYQSSHHKEIIDTANTTEMNSDHHSKGSEQT<br>TGAENEVETNALPVVSKETQIITGSDESCRKDLVKNEELEIQEKQK<br>QSDIRPSPGDSSVLQQESNFLGNNHSEECQVGGLVAFEPHALEGEG<br>PQNPEETDEKVEEPEQQNKSSAVGPPEKVRRFTLDRLKQLGVDVSI<br>KPRLGADEDSFVILEPETNRELEALKQRFWKHANPAAKPRAGQTVN<br>VNVIVKDMGTDGKEELKADVVPVTLAPKKLDGASHTKPGEKLQVLK<br>AKLQEAMKLRRFEERQKRQALFKLDNEDGFEEEEEEEEEMTDESEE<br>DGEEKVEKEEKEEELEEEEEKEEEEEEEGNQETAEFLLSSEEIETK<br>DEKEMDKENNDGSSEIGKAVGFLSVPKSLSSDSTLLLFKDSSSKMG<br>YFPTEEKSETDENSGKQPSKLDEDDSCSLLTKESSHNSSFELIGST<br>IPSYQPCNRQTGRGTSFFPTAGGFRSPSPGLFRASLVSSASKSSGK<br>LSEPSLPIEDSQDLYNASPEPKTLFLGAGDFQFCLEDDTQSQLLDA<br>DGFLNVRNHRNQYQALKPRLPLASMDENAMDANMDELLDLCTGKFT<br>SQAEKHLPRKSDKKENMEELLNLCSGKFTSQDASTPASSELNKQEK<br>ESSMGDPMEEALALCSGSFPTDKEEEDEEEEFGDFRLVSNDNEFDS<br>DEDEHSDSGNDLALEDHEDDDEEELLKRSEKLKRQMRLRKYLEDEA<br>EVSGSDVGSEDEYDGEEIDEYEEDVIDEVLPSDEELQSQIKKIHMK<br>TMLDDDKRQLRLYQERYLADGDLHSDGPGRMRKFRWKNIDDASQMD<br>LFHRDSDDDQTEEQLDESEARWRKERIEREQWIRDMAQQGKITAEE<br>EEEIGEDSQFMILAKKVTAKALQKNASRPMVIQESKSLLRNPFEAI<br>RPGSAQQVKTGSLLNQPKAVLQKLAALSDHNPSAPRNSRNFVFHTL<br>SPVKAEAAKESSKSQVKKRGPSFMTSPSPKHLKIDDSTSGLTRSIF<br>KYLES |

| | | SEQUENCES |
|---|---|---|
| Protein (UniProt ID) | SEQ ID NO: | Sequence |
| FAM122A (Q96E09) | 13 | MAQEKMELDLELPPGTGGSPAEGGGSGGGGGLRRSNSAPLIHGLSD TSPVFQAEAPSARRNSTTFPSRHGLLLPASPVRMHSSRLHQIKQEE GMDLINRETVHEREVQTAMQISHSWEESFSLSDNDVEKSASPKRID FIPVSPAPSPTRGIGKQCFSPSLQSFVSSNGLPPSPIPSPTTRFTT RRSQSPINCIRPSVLGPLKRKCEMETEYQPKRFFQGITNMLSSDVA QLSDPGVCVSSDTLDGNSSSAGSSCNSPAKVSTTTDSPVSPAQAAS PFIPLDELSSK |
| FOXM1 (Q08050-1) | 14 | MKTSPRRPLILKRRRLPLPVQNAPSETSEEEPKRSPAQQESNQAEA SKEVAESNSCKFPAGIKIINHPTMPNTQVVAIPNNANIHSIITALT AKGKESGSSGPNKFILISCGGAPTQPPGLRPQTQTSYDAKRTEVTL ETLGPKPAARDVNLPRPPGALCEQKRETCADGEAAGCTINNSLSNI QWLRKMSSDGLGSRSIKQEMEEKENCHLEQRQVKVEEPSRPSASWQ NSVSERPPYSYMAMIQFAINSTERKRMTLKDIYTWIEDHPPYFKHI AKPGWKNSIRHNLSLHDMFVRETSANGKVSFWTIHPSANRYLTLDQ VFKPLDPGSPQLPEHLESQQKRPNPELRRNMTIKTELPLGARRKMK PLLPRVSSYLVPIQFPVNQSLVLQPSVKVPLPLAASLMSSELARHS KRVRIAPKVLLAEEGIAPLSSAGPGKEEKLLFGEGFSPLLPVQTIK EEEIQPGEEMPHLARPIKVESPPLEEWPSPAPSFKEESSHSWEDSS QSPTPRPKKSYSGLRSPTRCVSEMLVIQHRERRERSRSRRKQHLLP PCVDEPELLFSEGPSTSRWAAELPFPADSSDPASQLSYSQEVGGPF KTPIKETLPISSTPSKSVLPRTPESWRLTPPAKVGGLDFSPVQTSQ GASDPLPDPLGLMDLSTTPLQSAPPLESPQRLLSSEPLDLISVPFG NSSPSDIDVPKPGSPEPQVSGLAANRSLTEGLVLDTMNDSLSKILL DISFPGLDEDPLGPDNINWSQFIPELQ |
| Cyclin E1 (P24864) | 15 | MPRERRERDAKERDTMKEDGAEFSARSRKRKANVTVFLQDPDEEM AKIDRTARDQCGSQPWDNNAVCADPCSLIPTPDKEDDDRVYPNSTC KPRIIAPSRGSPLPVLSWANREEVWKIMLNKEKTYLRDQHFLEQHP LLQPKMRAILLDDWLMEVCEVYKLHRETFYLAQDFFDRYMATQENVV KTLLQLIGISSLFIAAKLEEIYPPKLHQFAYVTDGACSGDEILTME LMIMKALKWRLSPLTIVSWLNVYMQVAYLNDLHEVLLPQYPQQIFI QIAELLDLCVLDVDCLEFPYGILAASALYHFSSSELMQKVSGYQWC DIENCVKWMVPFAMVIRETGSSKLKHFRGVADEDAHNIQTHRDSLD LLDKARAKKAMLSEQNRASPLPSGLLTPPQSGKKQSSGPEMA |
| Nucleophosmin (P06748-1) | 16 | MEDSMDMDMSPLRPQNYLFGCELKADKDYHFKVDNENEHQLSLRT VSLGAGAKDELHIVEAEAMNYEGSPIKVTLATLKMSVQPTVSLGGF EITPPVVLRLKCGSGPVHISGQHLVAVEEDAESEDEEEEDVKLLSI SGKRSAPGGGSKVPQKKVKLAADEDDDDDEEDDDEDDDDDDFDDE EAEEKAPVKKSIRDTPAKNAQKSNQNGKDSKPSSTPRSKGQESFKK QEKTPKTPKGPSSVEDIKAKMQASIEKGGSLPKVEAKFINYVKNCF RMTDQEAIQDLWQWRKSL |
| CDC6 (Q99741) | 17 | MPQTRSQAQATISFPKRKLSRALNKAKNSSDAKLEPTNVQTVTCSP RVKALPLSPRKRLGDDNLCNTPHLPPCSPPKQGKKENGPHSHTLK GRRLVFDNQLTIKSPSKRELAKVHQNKILSSVRKSQEITINSEQRC PLKKESACVRLFKQEGTCYQQAKLVLNTAVPDRLPAREREMDVIRN FLREHICGKKAGSLYLSGAPGTGKTACLSRILQDLKKELKGFKTIM LNCMSLRTAQAVEPAIAQEICQEEVSRPAGKDMMRKLEKHMTAEKG PMIVLVLDEMDQLDSKGQDVLYTLFEWPWLSNSHLVLIGIANTLDL TDRILPRLQAREKCKPQLLNFPPYTRNQIVTILQDRLNQVSRDQVL DNAAVQFCARKVSAVSGDVRKALDVCRRAIEIVESDVKSQTILKPL SECKSPSEPLIPKRVGLIHISQVISEVDGNRMTLSQEGAQDSFPLQ QKILVCSLMLLIRQLKIKEVTLGKLYEAYSKVCRKQQVAAVDQSEC LSLSGLLEARGILGLKRNKETRLTKVFFKIEEKEIEHALKDKALIG NILATGLP |
| Cks1 (P61024) | 18 | MSHKQIYYSDKYDDEEFEYRHVMLPKDIAKLVPKTHLMSESEWRNL GVQQSQGWVHYMIHEPEPHILLFRRPLPKKPKK |
| Cks2 (P33552) | 19 | MAHKQIYYSDKYFDEHYEYRHVMLPRELSKQVPKTHLMSEEEWRRL GVQQSLGWVHYMIHEPEPHILLFRRPLPKDQQK |
| Cyclin A2 (P20248) | 20 | MLGNSAPGPATREAGSALLALQQTALQEDQENINPEKAAPVQQPRT RAALAVLKSGNPRGLAQQQRPKTRRVAPLKDLPVNDEHVTVPPWKA NSKQPAFTIHVDEAEKEAQKKPAESQKIEREDALAFNSAISLPGPR KPLVPLDYPMDGSFESPHIMDMSIILEDEKPVSVNEVPDYHEDIHT YLREMEVKCKPKVGYMKKQPDITNSMRAILVDWLVEVGEEYKLQNE TLHLAVNYIDRFLSSMSVLRGKLQLVGTAAMLLASKFEEIYPPEVA EFVYITDDTYTKKQVLRMEHLVLKVLTFDLAAPTVNQFLTQYFLHQ QPANCKVESLAMFLGELSLIDADPYLKYLPSVIAGAAFHLALYTVT GQSWPESLRKTGYTLESLKPCLMDLHQTYLKAPQHAQQSIREKYK NSKYHGVSLLNPPETLNL |

SEQUENCES

| Protein (UniProt ID) | SEQ ID NO: | Sequence |
|---|---|---|
| Skp1 (P63208) | 21 | MPSIKLQSSDGEIFEVDVEIAKQSVTIKTMLEDLGMDDEGDDDPVP LPNVNAAILKKVIQWCTHHKDDPPPPEDDENKEKRTDDIPVWDQEF LKVDQGTLFELILAANYLDIKGLLDVTCKTVANMIKGKTPEEIRKT FNIKNDFTEEEEAQVRKENQWCEEK |
| Cullin (Q13616) | 22 | MSSTRSQNPHGLKQIGLDQIWDDLRAGIQQVYTRQSMAKSRYMELY THVYNYCTSVHQSNQARGAGVPPSKSKKGQTPGGAQFVGLELYKRL KEFLKNYLTNLLKDGEDLMDESVLKFYTQQWEDYRFSSKVLNGICA YLNRHWVRRECDEGRKGIYEIYSLALVTWRDCLFRPLNKQVTNAVL KLIEKERNGETINTRLISGVVQSYVELGLNEDDAFAKGPTLTVYKE SFESQFLADTERFYTRESTEFLQQNPVTEYMKKAEARLLEEQRRVQ VYLHESTQDELARKCEQVLIEKHLEIFHTEFQNLLDADKNEDLGRM YNLVSRIQDGLGELKKLLETHIHNQGLAAIEKCGEAALNDPKMYVQ TVLDVHKKYNALVMSAFNNDAGFVAALDKACGRFINNNAVTKMAQS SSKSPELLARYCDSLLKKSSKNPEEAELEDTLNQVMVVFKYIEDKD VFQKFYAKMLAKRLVHQNSASDDAEASMISKLKQACGFEYTSKLQR MFQDIGVSKDLNEQFKKHLTNSEPLDLDFSIQVLSSGSWPFQQSCT FALPSELERSYQRFTAFYASRHSGRKLTWLYQLSKGELVTNCFKNR YTLQASTFQMAILLQYNTEDAYTVQQLTDSTQIKMDILAQVLQILL KSKLLVLEDENANVDEVELKPDTLIKLYLGYKNKKLRVNINVPMKT EQKQEQETTHKNIEEDRKLLIQAAIVRIMKMRKVLKEQQLLGEVLT QLSSRFKPRVPVIKKCIDILIEKEYLERVDGEKDTYSYLA |
| FBXW7 (Q969H0) | 23 | MNQELLSVGSKRRRTGGSLRGNPSSSQVDEEQMNRVVEEEQQQQLR QQEEEHTARNGEVVGVEPRPGGQNDSQQGQLEENNNRFISVDEDSS GNQEEQEEDEEHAGEQDEEDEEEEMDQESDDFDQSDDSSREDEHT HTNSVTNSSSIVDLPVHQLSSPFYTKTTKMKRKLDHGSEVRSFSLG KKPCKVSEYTSTTGLVPCSATPTTFGDLRAANGQGQQRRRITSVQP PTGLQEWLKMFQSWSGPEKLLALDELIDSCEPTQVKHMMQVIEPQF QRDFISLIPKELALYVLSFLEPKDLLQAAQTCRYWRILAEDNLLWR EKCKEEGIDEPLHIKRRKVIKPGFIHSPWKSAYIRQHRIDTNWRRG ELKSPKVLKGHDDHVITCLQFCGNRIVSGSDDNTLKVWSAVTGKCL RTLVGHTGGVWSSQMRDNIIISGSTDRTLKVWNAETGECIHTLYGH TSTVRCMHLHEKRVVSGSRDATLRVWDIETGQCLHVLMGHVAAVRC VQYDGRRVVSGAYDFMVKVWDPETETCLHTLQGHTNRVYSLQFDGI HVVSGSLDTSIRVWDVETGNCIHTLIGHQSLTSGMELKDNILVSGN ADSTVKIWDIKTGQCLQTLQGPNKHQSAVTCLQFKNFVITSSDDG TVKLWDLKTGEFIRNLVTLESGGSGGVVWRIRASNTKLVCAVGSRN GTEETKLLVLDFDVDMK |
| p27 (P46527) | 24 | MSNVRVSNGSPSLERMDARQAEHPKPSACRNLFGPVDHEELTRDLE KHCRDMEEASQRKWNFDFQNHKPLEGKYEWQEVEKGSLPEFYYRPP RPPKGACKVPAQESQDVSGSRPAAPLIGAPANSEDTHLVDPKTDPS DSQTGLAEQCAGIRKRPATDDSSTQNKRANRTEENVSDGSPNAGSV EQTPKKPGLRRRQT |

The invention claimed is:

1. A method of treating a cancer comprising a step of: administering a prexasertib or a pharmaceutically acceptable salt thereof to a subject whose cancer cell tissue sample has been determined to exhibit a Response-Predictive Signature;
wherein the Response-Predictive Signature comprises:
(a) a first biomarker score that is greater than or equal to a first predictive threshold, wherein the first biomarker is Ser296 phosphorylated Chk1;
(b) a second biomarker score that is greater than or equal to a second predictive threshold, wherein the second biomarker is Ser473 phosphorylated Kap1; and
(c) a third biomarker score that is greater than or equal to a third predictive threshold, wherein the third biomarker is total cyclin E1;
and wherein the cancer is selected from ovarian cancer, endometrial cancer, or bladder cancer.

2. The method of claim 1, wherein at least one of the first biomarker score, the second biomarker score, and the third biomarker score is determined as the percentage of cells positive for the corresponding first biomarker, second biomarker, or third biomarker in the tissue sample.

3. The method claim 2, wherein each of the first biomarker score, the second biomarker score, and the third biomarker score is determined as the percentage of cells positive for the corresponding first biomarker, second biomarker, and third biomarker in the tissue sample.

4. The method of claim 2, wherein the first predictive threshold is 3% or greater of cells positive for the first biomarker;
the second predictive threshold is 3% or greater of cells positive for the second biomarker; and
the third predictive threshold is 3% or greater of cells positive for the third biomarker.

5. The method of claim 4, wherein the first predictive threshold is 5%, 6%, 7%, 8%, 9%, or 10% of cells positive for the first biomarker;
the second predictive threshold is 5%, 6%, 7%, 8%, 9%, or 10% of cells positive for the second biomarker; and the third predictive threshold is 5%, 6%, 7%, 8%, 9%, or 10% of cells positive for the third biomarker.

6. The method of claim 1, wherein at least one of the first biomarker score, the second biomarker score, and the third biomarker score is determined from a weighted intensity distribution of the corresponding first biomarker, second biomarker, or third biomarker in the tissue sample.

7. The method of claim 6, wherein each of the first biomarker score, the second biomarker score, and the third biomarker score is determined from a weighted intensity distribution of the corresponding first biomarker, second biomarker, and third biomarker in the tissue sample.

8. A method of treating a cancer comprising a step of:
administering a therapeutic agent that is an inhibitor of expression or activity of a protein in an ATR/Chk1 signaling pathway to a subject whose cancer tissue sample has been determined to exhibit a Response-Predictive Signature;
wherein the Response-Predictive Signature comprises a composite score greater than or equal to a composite threshold, wherein the composite score comprises each of:
(a) a first biomarker score, wherein the first biomarker is Ser296 phosphorylated Chk1;
(b) a second biomarker score, wherein the second biomarker is Ser473 phosphorylated Kap1; and
(c) a third biomarker score, wherein the third biomarker is total cyclin E1;
and wherein the cancer is selected from ovarian cancer, endometrial cancer, or bladder cancer.

9. The method of claim 8, wherein the composite score is the sum of each of the biomarker scores, optionally wherein the biomarker scores are differentially weighted prior to summing.

10. The method of claim 8, wherein at least one of the first biomarker score, the second biomarker score, and the third biomarker score is determined as the percentage of cells positive for the corresponding first biomarker, second biomarker, or third biomarker in the tissue sample.

11. The method of claim 10, wherein each of the first biomarker score, the second biomarker score, and the third biomarker score is determined as the percentage of cells positive for the corresponding first biomarker, second biomarker, and third biomarker in the tissue sample.

12. The method of claim 8, wherein at least one of the first biomarker score, the second biomarker score, and the third biomarker score is determined from a weighted intensity distribution of the corresponding first biomarker, second biomarker, or third biomarker in the tissue sample.

13. The method of claim 12, wherein each of the first biomarker score, the second biomarker score, and the third biomarker score is determined from a weighted intensity distribution of the corresponding first biomarker, second biomarker, and third biomarker in the tissue sample.

14. The method of claim 1, wherein the cancer is ovarian cancer.

15. The method of claim 8, wherein the cancer is ovarian cancer.

16. The method of claim 15, wherein the ovarian cancer is high grade serous ovarian cancer.

17. The method of claim 14, wherein the disease ovarian cancer is high grade serous ovarian cancer.

18. The method of claim 1, wherein each of the first biomarker score, the second biomarker score, and the third biomarker score is determined based on detection of the first biomarker, the second biomarker, or the third biomarker in the nucleus of cells in the cancer tissue sample.

19. The method of claim 8, wherein each of the first biomarker score, the second biomarker score, and the third biomarker score is determined based on detection of the first biomarker, the second biomarker, or the third biomarker in the nucleus of cells in the tissue sample.

20. The method of claim 1, wherein the pharmaceutically acceptable salt of prexasertib administered to the subject is prexasertib (S)-lactate monohydrate.

21. The method of claim 8, wherein the pharmaceutically acceptable salt of prexasertib administered to the subject is prexasertib (S)-lactate monohydrate.

22. The method of claim 1, further comprising administering a second anti-cancer agent to the subject.

23. The method of claim 8, further comprising administering a second anti-cancer agent to the subject.

24. The method of claim 1, wherein the cancer is endometrial cancer.

25. The method of claim 8, wherein the cancer is endometrial cancer.

26. The method of claim 1, wherein the cancer is bladder cancer.

27. The method of claim 8, wherein the cancer is bladder cancer.

* * * * *